United States Patent [19]
Kimura et al.

[11] Patent Number: 5,214,717
[45] Date of Patent: May 25, 1993

[54] PATTERN RECOGNITION DATA PROCESSING DEVICE USING AN ASSOCIATIVE MATCHING METHOD

[75] Inventors: Masayuki Kimura; Hirotomo Aso, both of Sendai; Yutaka Katsuyama, Machida; Kenji Suzuki, Shiogama; Hisayoshi Hayasaka, Sendai; Yoshiyuki Sakurai, Watari, all of Japan

[73] Assignee: Fujitsu Limited, Japan

[21] Appl. No.: 660,756

[22] Filed: Feb. 25, 1991

[30] Foreign Application Priority Data

| Feb. 26, 1990 | [JP] | Japan | 2-42641 |
| Mar. 12, 1990 | [JP] | Japan | 2-58042 |
| Mar. 19, 1990 | [JP] | Japan | 2-66854 |
| Mar. 20, 1990 | [JP] | Japan | 2-68151 |

[51] Int. Cl.$^5$ .............................. G06K 9/48
[52] U.S. Cl. ......................... 382/21; 382/9; 382/10; 382/18; 382/30
[58] Field of Search ............... 382/9, 10, 13, 21, 30, 382/34

[56] References Cited

U.S. PATENT DOCUMENTS

| 4,119,946 | 10/1978 | Taylor | 382/30 |
| 4,573,196 | 2/1986 | Crane et al. | 382/13 |
| 4,607,386 | 8/1986 | Morita et al. | 382/13 |
| 4,651,289 | 3/1987 | Maeda et al. | 382/18 |
| 4,718,102 | 1/1988 | Crane et al. | 382/13 |

*Primary Examiner*—José Couso
*Attorney, Agent, or Firm*—Nikaido, Marmelstein, Murray & Oram

[57] ABSTRACT

This invention pertains to a data processing system for pattern recognition by sorting the scores of the candidate patterns by their feature vectors per an associative matching method. It aims first at determining feature vectors at a high speed even if a recognition device obtains dictionary data in dot units, second at determining scores by an association conformance recognition device, and third at sorting inputted data from the highest score at a high speed. The feature of this invention resides in a data processing device that incorporates a first memory for memorizing stroke information for patterns supplied in dot units; a first address generator for generating first addresses for specifying the positions at which the stroke information is memorized; a second memory for memorizing weight data for the stroke information; a second address generator for generating second addresses for reading stroke information memorized in the first memory and third addresses for reading, from the second memory, the weight data corresponding to the stroke information read by the second addresses; accumulators of the number of the stroke directions supplied with weight data outputted from the second memory; and a decoder for decoding the stroke information memorized in the first memory and for accumulating weights for the respective stroke directions to enable the accumulators per the decoding result.

12 Claims, 91 Drawing Sheets

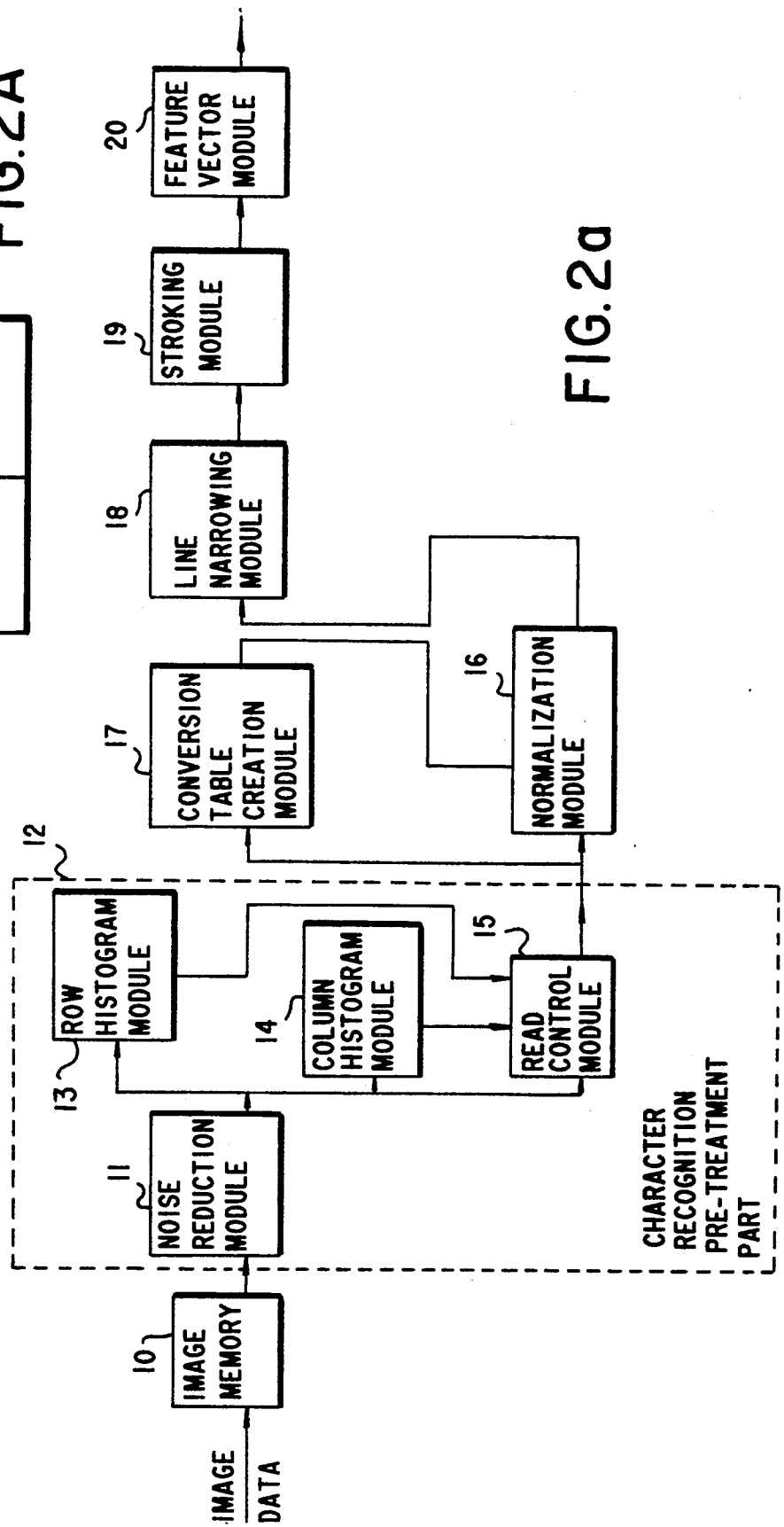

```
for i = 1 to M {
    for j = 1 to M {
        r_den [i] = if img [i][j-1] == 0 and img [i][j] == 1
                        then r_den [i] +1
                    else r_den [i] ;
        r_acc [i] = if r_den [i] == 0 and r_acc [i-1] == 0 then 0
                    else r_den [i] x b + r_acc [i-1] + 1 ;
        r_max [i] = if r_den [i] == 0 then r_max [i-1]
                    else r_acc [i] ;
        c_den [j] = if img [i-1][j] == 0 and img [i][j] == 1
                        then c_den [j] + 1
                    else c_den [j] ;
        c_acc [j] = if c_den [j] == 0 and c_acc [j-1] == 0 then 0
                    else c_den [j] x b + c_acc [j-1] + 1 ;
        c_max [j] = if c_den [j] == 0 then c_max [j-1]
                    else c_acc [j] ;
    }
}
```

FIG. 12

```
for i = 1 to D {
    for t = 1 to M {
        o_img [i] = if F[t-1] x D < i x H and i x H ≤ F [t] x D
                        then i_img [t]
                    else o_img [i] ;
    }
}
```

```
for i = 1 to M {
    for j = 1 to M {
        r_den [i] = if img [i][j] == 1 then r_den [i] + 1
                else r_den [i] ;
        c_den [j] = if img [i][j] == 1 then c_den [j] + 1
                else c_den [j] ;
    }
}
```

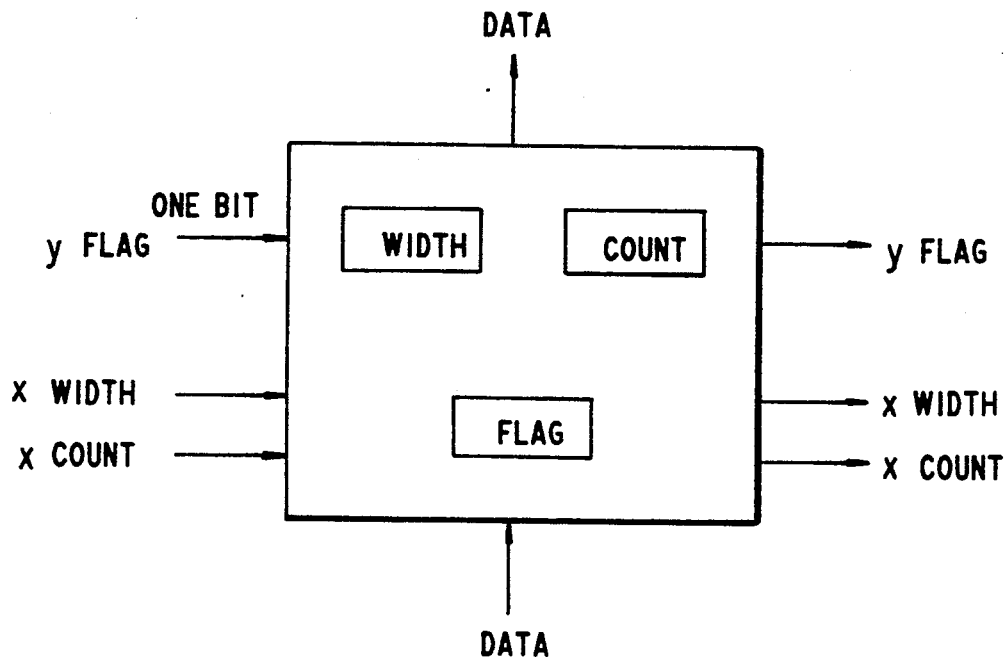

IN HORIZONTAL DIRECTION
  X FLAG = IF DATA == 1 THEN 1
           ELSE X FLAG
  X COUNT = IF X COUNT >0 THEN X COUNT + 1
            ELSE IF X FLAG == 1 OR DATA == 1 THEN 1
            ELSE X COUNT
  X WIDTH = IF X FLAG == 1 OR DATA == 1 THEN X COUNT + 1
            ELSE X WIDTH

IN VERTICAL DIRECTION
  y FLAG = IF DATA == 1 THEN 1
           ELSE y FLAG
  y COUNT = IF y COUNT >0 THEN y COUNT + 1
            ELSE IF y FLAG == 1 OR DATA == 1 THEN 1
            ELSE y COUNT
  y WIDTH = IF y FLAG == 1 OR DATA == 1 THEN y COUNT + 1
            ELSE y WIDTH

FIG. 26

IN HORIZONTAL DIRECTION
  X FLAG = IF DATA == 0 THEN 0
           ELSE 1
  X COUNT = IF DATA == 1 AND X FLAG == 0 THEN x COUNT + x STACK + 1
            ELSE X COUNT + X STACK
  X STACK = IF DATA = 1 AND X FLAG == 0 THEN X STACK + 1
            ELSE X STACK

IN VERTICAL DIRECTION
  y FLAG = IF DATA == 0 THEN 0
           ELSE 1
  y COUNT = IF DATA == 1 AND y FLAG == 0 THEN y COUNT + y STACK + 1
            ELSE y COUNT + y STACK
  y STACK = IF DATA == 1 AND y FLAG == 0 THEN y STACK + 1
            ELSE y STACK

FIG. 34

CONVERSION TABLE II( I)   I   III I)*D(D=64)                               ΣW(W=100)     J

SET----100     1

| H( 1) | 0 |
|---|---|
| H( 2) | 0 |
| H( 3) | 0 |
| H( 4) | 1 |
| H( 5) | 2 |

1   0   COMPARISON-(INEFFECTIVE RESULT)   100   1
2   0   COMPARISON-(INEFFECTIVE RESULT)   100   1
3   0   COMPARISON-(INEFFECTIVE RESULT)   100   1
4   64  COMPARISON-(INEFFECTIVE RESULT)   100   1
5   128 COMPARISON-(INEFFECTIVE RESULT)   100   1

SET----200     2

| H( 5) | 2 |
|---|---|
| H( 6) | 3 |
| H( 7) | 4 |

5   128 COMPARISON-(INEFFECTIVE RESULT)   200   2
6   192 COMPARISON-(INEFFECTIVE RESULT)   200   2
7   256 COMPARISON-(INEFFECTIVE RESULT)   200   2

SET----300     3

| H( 7) | 4 |
|---|---|
| H( 8) | 5 |

7   256 COMPARISON-(INEFFECTIVE RESULT)   300   3
8   320 COMPARISON-(INEFFECTIVE RESULT)   300   3

SET----400     4

| H( 8) | 5 |
|---|---|
|  |  |

8   320 COMPARISON-(INEFFECTIVE RESULT)   400   4

(SIMILARLY PERFORMED UNTIL SET J=64 HAS EFFECTIVE RESULT)

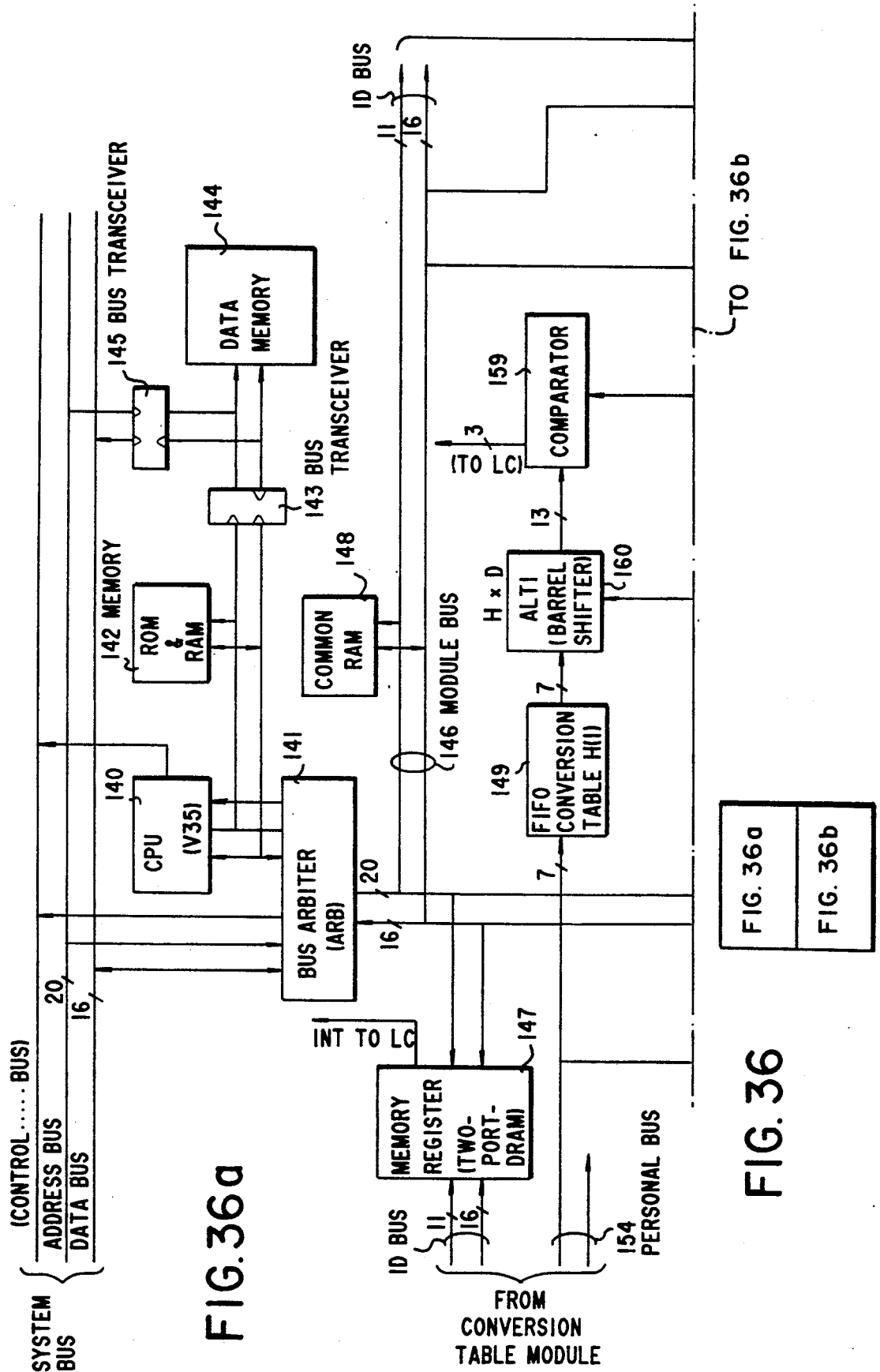

| t | 1 | 2 | 3 | 4 |
|---|---|---|---|---|
| (J+1) | $A_1$ | $E_1$ | $I_1$ | $M_1$ |
| (J) | $B_1$ | $F_1$ | $J_1$ | $N_1$ |
| (J-1) | $C_1$ | $G_1$ | $K_1$ | $O_1$ |
| (J-2) | $D_1$ | $H_1$ | $L_1$ | $P_1$ |

Fig. 47

| | RS11 | RS12 | RS13 | R9 |
|---|---|---|---|---|
| t=1 (J) (J-1) | * * * * * * * * BI CI | * * * * AI BI | * * * * * * CI DI | * * R9 |
| t=2 (J) (J-1) | * * * * BI FI CI GI | * * AI EI BI FI | * CI GI * DI HI | * DI |
| t=3 (J) (J-1) | * BI FI JI * CI GI KI | * AI EI II BI FI JI | CI GI KI LI DI HI LI | * HI |
| t=4 (J) (J-1) | BI FI JI NI CI GI KI OI | EI II MI FI JI NI | GI KI OI PI HI LI | * LI |

| DATA(DX) OUTPUT | ADDRESS(AX) INPUT | | | |
|---|---|---|---|---|
| | A2B,A8B,A6B | A3B,A4B,A6B | A3B,A4B,A5B | A1B,A0B,A7B |
| VERTICAL 0 1 0 | * | * | * 1 * | * * * |
| HORIZONTAL 1 1 1 | * | 1 | * 0 * | * * * |
| 45° 1 1 0 | * | 0 | * 0 1 | * * * |
| 135° 0 1 1 | * | 0 | * 0 0 | * * 1 |
| VERTICAL 0 1 0 | * | 0 | * 0 0 | * 1 0 |
| HORIZONTAL 1 1 1 | 1 | 0 | * 0 0 | * 0 0 |
| 45° 1 1 0 | 0 1 | 0 | * 0 0 | 1 0 0 |
| 135° 0 1 1 | 0 1 | 0 | 1 0 0 | 0 0 0 |
| 1 0 0 | 0 1 | 0 | 0 0 0 | 0 0 0 |
| NO PICTURE ELEMENT 0 0 0 | * 0 | * | * * * | * * * |
| WITHIN BLOCK 1 0 1 | 1 1 1 | 1 | * 1 * | * 1 * |
| OTHER X 0 0 1 | * 1 | * | * 1 * | 1 * 1 |

Fig. 53

| OUTPUT | A2B,A8B,A6B | A3B,A4B,A5B | A1B,A0B,A7B |
|---|---|---|---|
| 000 | 010 | 000 | 000 |
| 0 | 110 | 000 | 000 |
| 0 | 011 | 000 | 000 |
| 0 | 010 | 100 | 000 |
| 0 | 010 | 010 | 000 |
| 0 | 010 | 001 | 000 |
| 0 | 010 | 000 | 100 |
| 0 | 010 | 000 | 010 |
| 0 | 010 | 000 | 001 |
| 1 | *** | *** | *** |

Fig. 54

| FIFO-DATA | | | | | | |
|---|---|---|---|---|---|---|
| DO1 (1) | DO2 | DO3 | DO4 | | DO1 (2) | DO2 |
| DO5 (1) | DO6 | DO7 | DO8 | | DO5 (2) | DO6 |
| DO9 (1) | DO10 | DO11 | DO12 | ×16 | | |
| DO13 (1) | | | | | | |

FIFO-DATA 1, FIFO-DATA 2, FIFO-DATA 3, FIFO-DATA 4 ......... FIFO-DATA 17, FIFO-DATA 18 ........

Fig. 56

DATA IN MEMORY

| | ADDRESS |
|---|---|
| FIFO-DATA 1 | 0000 |
| FIFO-DATA 17 | 0001 |
| FIFO-DATA 33 | 0002 |
| FIFO-DATA 49 | 0003 |
| FIFO-DATA 65 | 0004 |
| FIFO-DATA 81 | 0005 |
| FIFO-DATA 97 | 0006 |
| FIFO-DATA 113 | 0007 |

| | |
|---|---|
| FIFO-DATA 257 | 0015 |
| FIFO-DATA 273 | 0016 |
| FIFO-DATA 289 | 0017 |

| | |
|---|---|
| FIFO-DATA 1009 | 0063 |
| FIFO-DATA 2 | 0064 |
| FIFO-DATA 18 | 0065 |
| FIFO-DATA 34 | 0066 |

| | |
|---|---|
| FIFO-DATA 1024 | 1023 |

Fig. 57

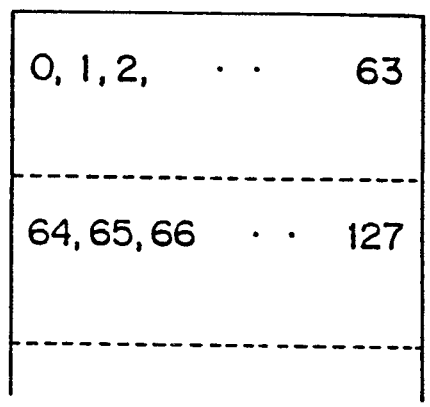
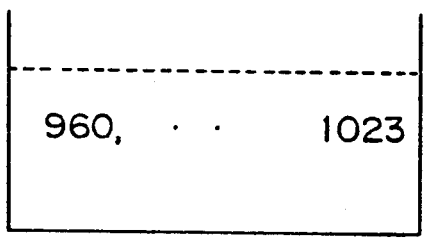
Fig. 58

- AD : MEMORIZED DISTANCE
- AN : MEMORIZED CLASS NUMBER
- AF : DISTANCE SUPPLIED TO NEXT CELL
- AG : CLASS NUMBER SUPPLIED TO NEXT CELL

MEANING OF EACH FUNCTION
- AFD : AD = IFAF' < AD' THENAF' ELSEAD'
- AFN : AN = IFAF' < AD' THENAG' ELSEAN'
- AFR : AF = IFAF' < AD' THENAD' ELSEAF'
- AFG : AG = IFAF' < AD' THENAN' ELSEAG'

CP : INPUTTED SCORE
CN : INPUTTED CHINESE CHARACTER NUMBER
CF : SCORE SUPPLIED TO NEXT CELL
CG : CHINESE CHARACTER NUMBER SUPPLIED TO NEXT CELL

MEANING OF EACH FUNCTION
   CFP : CP = IFCF' > CP' THENCF' ELSECP'
   CFN : CN = IFCF' > CP' THENCG' ELSECN'
   CFF : CF = IFCF' > CP' THENCP' ELSECF'
   CFG : CG = IFCF' > CP' THENCN' ELSECG'

| s | m | $\log m$ | METHOD OF (d) $\log m \times s$ | METHOD OF (b) $m + \log \cdot s$ |
|---|---|---|---|---|
| 4 | 1024 | 10 | 40 | 1026 |
| 8 | 512 | 9 | 72 | 515 |
| 16 | 256 | 8 | 128 | 260 |
| 32 | 128 | 7 | 224 | 133 |
| 64 | 64 | 6 | 384 | 70 |
| 128 | 32 | 5 | 640 | 39 |

Fig. 75

DP : INPUTTED SCORE
MEANING OF FUNCTION
  DFP : DP = IF $DB_1$ == DD THEN DP' + 5
            ELSE IF $DB_2$ == DD THEN DP' + 4
            ELSE IF $DB_3$ == DD THEN DP' + 3
            ELSE IF $DB_4$ == DD THEN DP' + 2
            ELSE IF $DB_5$ == DD THEN DP' + 1
            ELSE DP'

FIG. 79
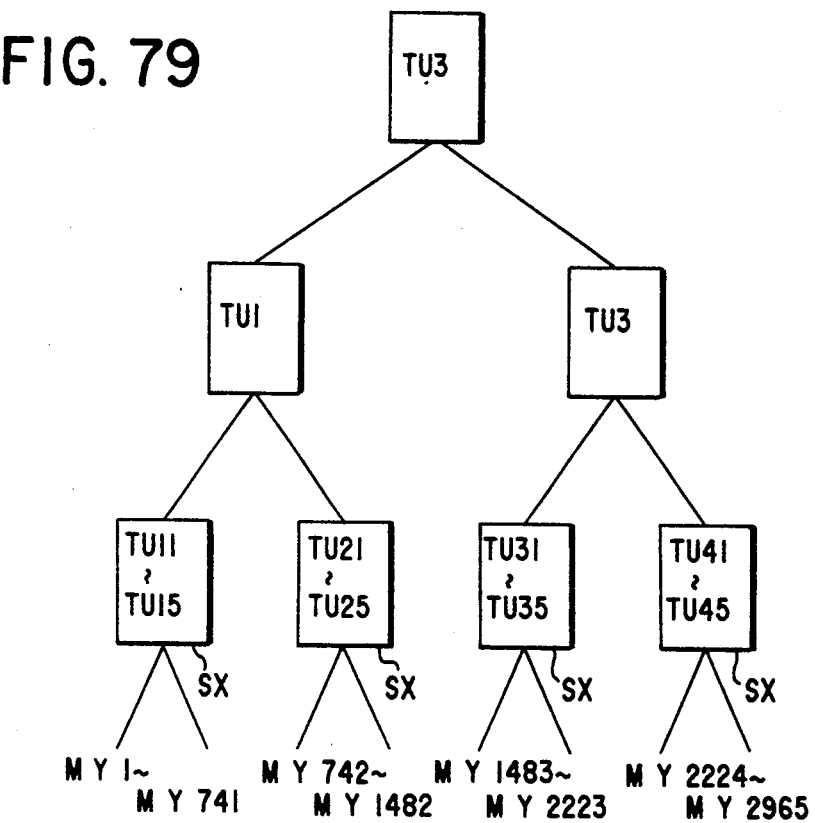
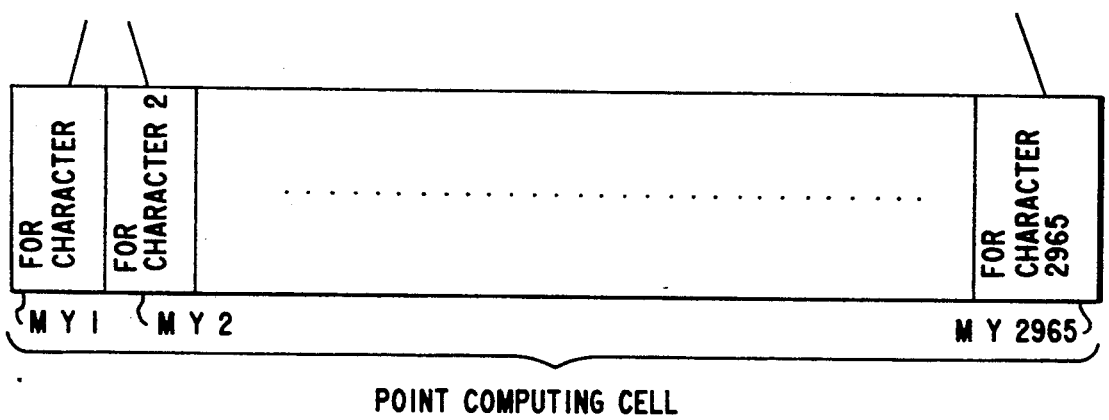
POINT COMPUTING CELL

EP : INPUTTED SCORE
EN : CHINESE CHARACTER NUMBER STORED
ER : RESET SIGNAL

MEANING OF RESPECTIVE FUNCTION
  EFP : EP = IFEP' ≠ - I THENEP'
            ELSE IFEPI > EPR THENEPI
            ELSE EPR
  EFN : EN = IFEP' ≠ - I THENEN'
            ELSE IFEPI > EPR THENENI
            ELSE ENR
  EFRI : ERI = IFEP' ≠ - I THEN 0
             ELSE IFEPI > EPR THEN I
             ELSE 0
  EFRR : ENR = IFEP' ≠ -I THEN 0
             ELSE IFEPI > EPR THEN 0
             ELSE I

FIG. 82
(1)
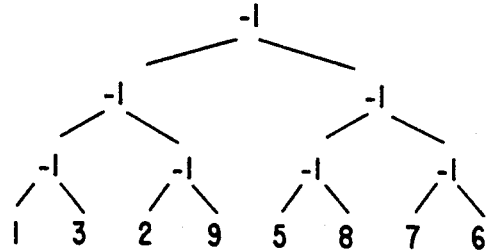
(2)
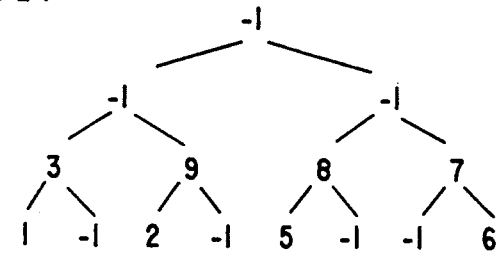
(3)
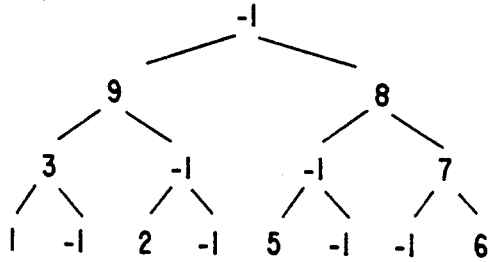
(4)
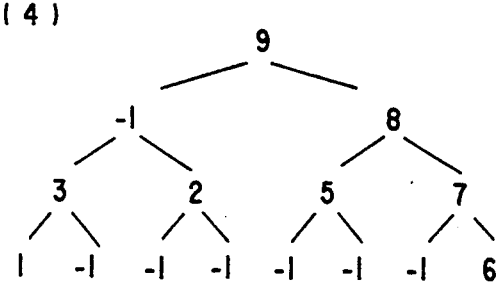
(5)
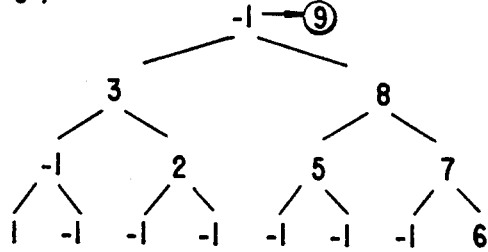
(6)
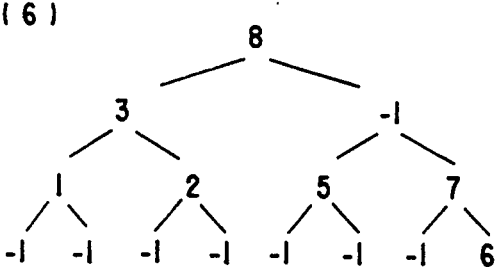
(7)
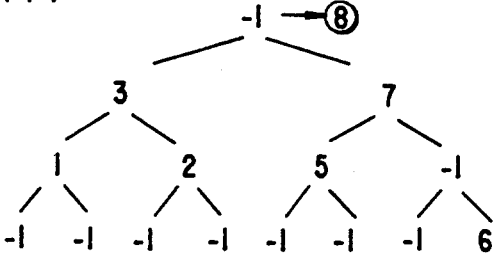
(8)
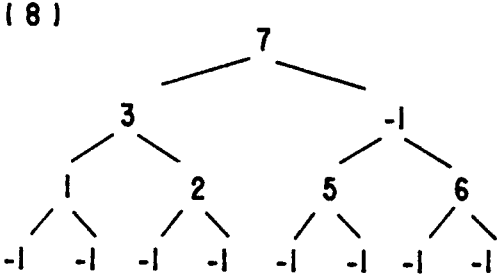

PATTERN RECOGNITION DATA PROCESSING DEVICE USING AN ASSOCIATIVE MATCHING METHOD

BACKGROUND OF THE INVENTION

This invention pertains to a data processing system which recognizes patterns such as characters by sorting the scores of the candidate patterns according to their feature vectors, using an associative matching method.

This invention aims first at determining feature vectors at high speed, even when a recognition device obtains dictionary data in dot units; second at determining scores by performing the association conformance recognition system for a recognition device; and third at sorting inputted data from the highest score at a high speed.

With advances in computer systems, reading devices for receiving image data, for extracting characters from received image data and for recognizing respective characters in sentences of read documents are being put into practical use. These devices divide dot data read (e.g. by an image scanner) into predetermined areas and compare the characters within each divided area with preregistered characters, and output the most similar character as the result.

These predetermined data are generally stored in a dictionary memory which memorizes, for example, featuring data of the respectively defined characters. When a character to be recognized is inputted, it is similarly featured, so that the distance (i.e., the difference) from the predetermined featuring data stored in the dictionary memory is obtained. The character with the least distance is outputted as the recognition result.

Such conventional computer systems for character recognition use a feature vector method for extracting features of data stored in their dictionary memories and the image data of inputted characters. The feature vectors in this method are obtained by determining in dot units the directions of the strokes composing a character, dividing a character area into a plurality of areas, and summing the respective stroke directions in the respective divided areas. The feature vectors are used to improve the recognition rates of the inputted characters.

To determine the number of strokes in respective directions in the divided areas from the obtained stroke data, respective stroke data for the divided areas are read and the values of the registers provided beforehand for the respective directions are incremented. Further, to weight the respective divisions in a character area, the registers provided in correspondence with the stroke directions appropriately weight their values. Processing of all relevant stroke data in dot units often takes a long time. Thus, there is a problem that it takes to long to determine feature vectors.

To improve recognition rates, characters are currently read at a higher resolution. Therefore, a large number of dots are required for recognition. This necessarily increases the amount of dot information for a character and also takes too long.

Such conventional computer systems also determine the distances between the obtained feature data and the feature data memorized beforehand for the respective characters. The feature data are expressed by numeric values representing the features of the respective parts of characters and are memorized in matrices of at least two dimensions. Distances are defined as the sum of the squares of the differences between the values obtained for a character to be recognized and the values memorized in the matrices at respective feature points. The code of the character with the least distance (i.e., the smallest sum of the squares of the differences) is outputted as the recognition result of the inputted character.

When the character preregistered in the dictionary having the smallest distance with the inputted character is determined, the respective distances between the features of all the characters prestored in the dictionary matrices and the features of an inputted character must be calculated. The features are expressed by a large number of values stored in the multi-dimensional matrices, not by single values. Thus, the number of operations for determining the distances by accumulating the squares of the differences between respective features is enormous and takes too much time.

At the same time, such conventional computer systems for character recognition need to rearrange the codes of the preregistered characters to determine the rank of the distances. Also, character areas are divided into a plurality of sub-areas and scores are assigned to the respective sub-areas from the one with the least distance and the scores are summed. Thus, the candidate characters are sequentially obtained from the candidate character with the highest score. Thus, in determining the candidate characters, scores for characters need to be rearranged from the one with the highest score (i.e., from the one with the least distance).

Conventionally, the distances or scores are sorted sequentially to determine the rank of the candidate characters, each time a new distance or score is inputted.

For instance, when the five upper-ranked candidate characters with the highest scores and least distances are obtained, memory for storing the five highest scores and the corresponding character codes is provided. The memory compares the highest memorized score with the inputted score.

When the inputted score is less than the highest memorized score, the inputted score is compared with the second highest memorized score. When the inputted score is less than the second highest memorized score, the inputted score is compared with the third highest memorized score. When the inputted score is less than the third highest memorized score, the inputted score is compared with the fourth highest memorized score. When the inputted score is less than the fourth highest memorized score, the inputted score is compared with the fifth highest memorized score.

If the inputted score is greater than or equal to the memorized score the inputted score and the corresponding character code are stored at the original memory positions for the compared score and the corresponding character code, and the compared score and the corresponding character code as well as the lower scores and their character codes are sequentially shifted to the original memory positions for the lower scores and the corresponding character codes, so that their ranks are sequentially lowered. Since such processings are performed each time a new score and the corresponding character code are inputted, they take too much time.

According to this method, which is called the one-hundred-percent (100%) matching recognition method, to output the character codes with the shortest distances obtained from feature data, the more candidate characters there are, the more time the processings take for their recognitions.

The associative matching recognition method is devised to solve these problems.

According to this method, the character areas to be recognized (i.e., feature areas) are divided, and the representative features for the respective divisions are memorized as classes to which candidate characters belong. Classes similar to the inputted feature vectors for the respective division areas are ranked, and scores commensurate with the ranks are assigned to the classes. Then, the scores of the classes to which candidate characters belong are summed.

However, even the association conformance mode cannot meet more severe requests to improve the processing speed in character recognition, because the recognition processing speed is satisfactory when there is an increased number of characters registered in the dictionary or candidate characters selected for an inputted character to be recognized.

SUMMARY OF THE INVENTION

This invention, by utilizing simpler and smaller circuits capable of performing processings similar to those described earlier at a high speed, prevents the operation processings in a character recognition algorithm from becoming complicated, even if a large volume of information needs to be processed when feature vectors are generated.

Since this invention enables information corresponding to inputted data to be sequentially sorted either in ascending or descending order and a comparison is performed in a single clock cycle, the candidate characters can be selected and ranked at high speed.

Since the inputted feature data are divided and scores are assigned to the classes for the candidates and sequentially accumulated, even if a large number of characters are registered in the dictionary to be compared with the inputted character, the scores of the candidate codes are determined at high speed by sequential pipeline processings. Hence, a high-speed character recognition device utilizing the association conformance recognition method is realized.

BRIEF DESCRIPTION OF THE DRAWINGS

FIG. 2A illustrates that FIGS. 2a-b should be together;
FIG. 2a-b show a system configuration of a character-recognizing device using an image data normalization circuit of this invention;
FIG. 2B shows a configuration of an association dictionary;
FIG. 12 illustrates creations of conversion functions in the normalization module using the first principle of this invention;
FIG. 13 shows a loop program for a normalization by the normalization module using the first principle in this invention;
FIG. 19 shows an algorithm for a histogram calculation in the normalization module using the first principle of this invention.

FIG. 26 shows in detail the configuration of a linear histogram computing cell of the row-histogram module and the column-histogram module using the second principle of this invention, which utilizes a systolic array;

FIG. 34 explains the operations of the normalization part in the normalization module using the third principle of this invention;

FIG. 36 illustrates that FIGS. 36a-b should be together;

FIGS. 36a-b show in detail the system configuration of the normalization module using the third principle of this invention;

FIG. 47 is an input data diagram in the line-narrowing module using the second principle of this invention, which utilizes a systolic array;

FIG. 53 is a stroking table representing shift register values and an output in the stroking module in its embodiment of this invention using an array; and FIG. 54 is a noise reduction table in the stroking module in its embodiment of this invention using an array.

FIG. 56 shows a view for explaining input data,

FIG. 57 shows an arrangement of data stored in a memory,

FIG. 58 shows the relation between the image data after conversion and the memory addresses, FIG. 59 is a generated address table for region 1, FIG. 60 shows a weighting table address table for region 1, FIG. 61 shows a generation address table for region 2, FIG. 62 shows a weighting table address table for region 2.

FIG. 75 is a table of the division numbers.

FIG. 79 shows the hierarchical configuration of score resorting cells, score sorting cells, and score computing cells, FIG. 82 shows data flow in a sorting operation.

DESCRIPTION OF THE PREFERRED EMBODIMENT

Figure 1A:
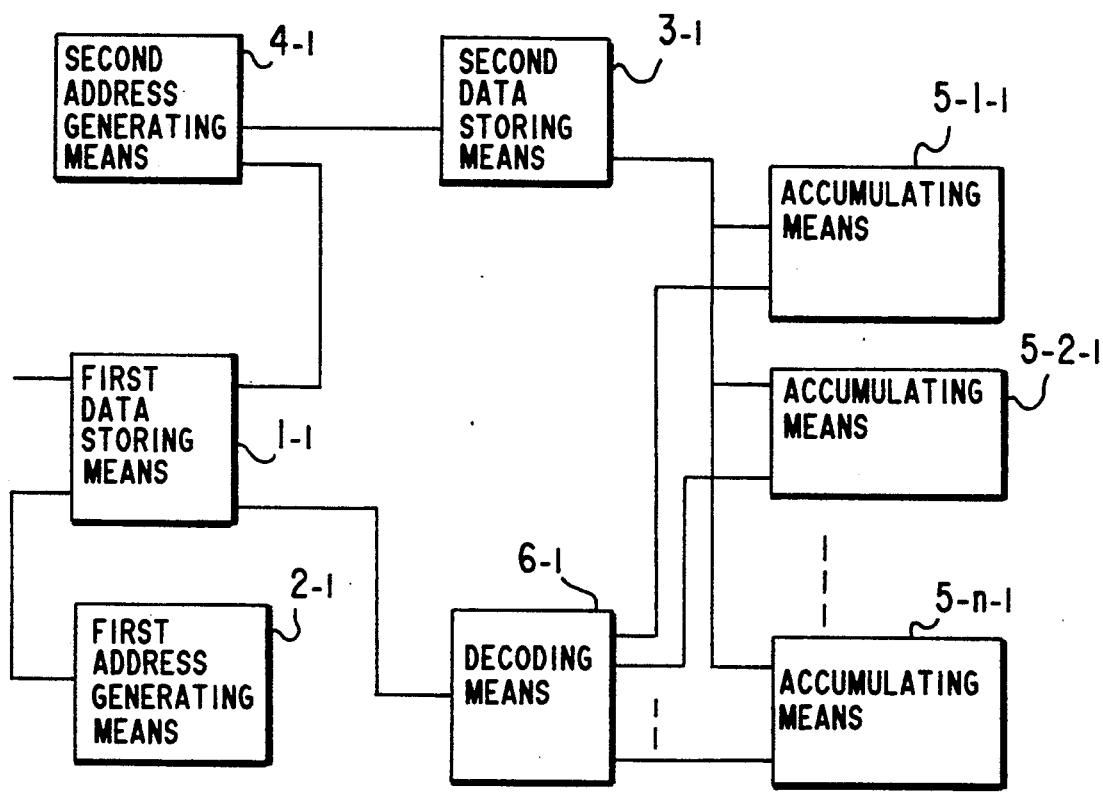
FIG. 1A is a first block diagram of this invention.

FIG. 1A is a first block diagram of this invention.

A first data memorizing unit 1-1 memorizes at least stroke information for a character pattern supplied in dot units. The stroke information includes the direction in which a stroke comprising dots extends.

A first address generating unit 2-1 generates first addresses for specifying the position at which the stroke information is memorized.

A second data memorizing unit 3-1 memorizes weight data for the stroke information. The weight data represent, for example, weights for respective dot positions in each stroke.

A second address generating unit 4-1 generates second addresses for reading stroke information memorized in the first data memory unit 1-1 and third addresses for reading from the second data memory unit 2-1 the weight data corresponding to the stroke information read from the second addresses.

N accumulating units 5-1-1 through 5-N-1 are provided in correspondence with the number of stroke directions and is supplied with weight data outputted from the second data memory unit 3-1.

A decoding unit 6-1 decodes stroke information memorized in the first data memory unit 1-1 and accumulates weight information for the respective directions. This enables the accumulation units 5-1-1 through 5-N-1 according to the decoding result.

For instance, stroking information in a character area is memorized in units comprising a single dot or a plurality of dots at positions in the first data memorizing means 1-1 specified by the first addresses generated by the first address generating unit 2-1. The second address generating means 4-1 supplies the second addresses for specifying the dots existing in certain areas to the first data memorizing unit 1-1, so that feature vectors in certain areas are determined. The first data memorizing unit 1-1 supplies the stroke data specified by the second addresses to the decoding unit 6-1. In correspondence with the positions specified by the second addresses, supplied to the first data memory means 1-1, the second address generating means 4-1 supplies the third addresses specifying the positions corresponding to the second data memorizing unit 3-1 memorizing the weight information in a certain area. Data outputted from the second data memorizing unit 3-1 are weight data supplied to the accumulating units 5-1-1 through 5-N-1, which are provided in correspondence with the stroke directions. The decoding unit 6-1 decodes the values corresponding to the storing directions and enables one of the accumulating units 5-1-1 through 5-N-1, so that the accumulating units 5-1-1 through 5-N-1 obtain the accumulated values of the weights for the respective directions.

The first addresses generated by the first address generating unit 2-1 enable accumulations for the respective areas in a character, so that the respective dots are memorized in the specific address positions. When the stroke information for respective weights memorized in the second data memorizing unit 3-1 is read by the second addresses from the second address generating means 4-1, the processing is expedited.

Figure 1B:
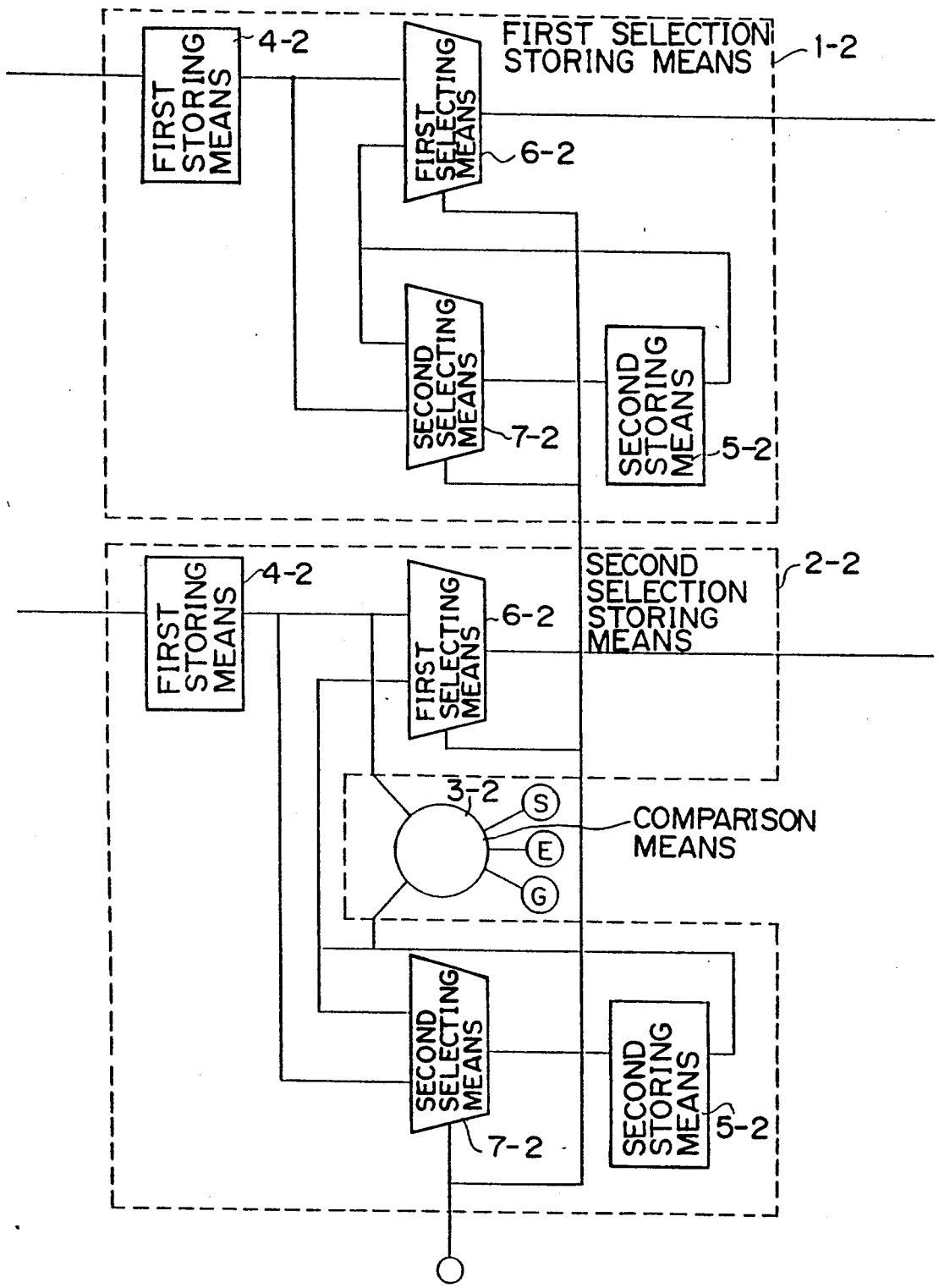
FIG. 1B is a second block diagram of this invention.

FIG. 1B is a second block diagram of this invention.

First and second selection memory units 1-2 and 2-2 temporarily memorize first inputted data. Also, controlled by a received selection signal, the first and second selection memory units 1-2 and 2-2 output the first data temporarily memorized and keep storing earlier memorized second data "as is", or output the second data memorized earlier and store the temporarily memorized first data in the memory unit having originally memorized second data.

The comparison unit 3-2 compares the second data memorized in the second selection memory unit 2-2 with the temporarily memorized first data and controls the first and second selection memory units 1-2 and 2-2 according to the comparison result.

The first and second selection memory units 1-2 and 2-2 further include a first memory unit 4-2 for temporarily memorizing the first inputted data, a second memory unit 5-2 for memorizing the second data, a first selection unit 6-2, supplied with the first data temporarily memorized in the first memory unit 4-2 at its first input terminal and with the second data memorized in the second memory unit 5-2 at its second input terminal, for outputting data supplied either to the first or second input terminal selected by the result of the comparison unit 3-2, and a second selection unit 7-2, supplied with second data memorized in the second memory unit 5-2 at its first input terminal and with first data temporarily memorized in the first memory unit 4-2 at its second input terminal, for outputting to the second memory means 5-2 data received either at the first or second input terminal selected by the result of the comparison unit 3-2.

The first data temporarily memorized in the first memory unit 4-2 in the second selection memory unit 2-2 and the second data memorized in the second memory unit 5-2 in the second selection memory unit 2-2 are supplied to the comparison unit 3-2, which outputs a comparison result to output terminals S, E, and G indicating the three cases of the relations between the compared data. When larger data are kept, the comparison unit 3-2 and the first and second selection units 6-2 and 7-2 in the second memory unit 5-2 are supplied upon receiving a signal outputted from output terminal G representing larger data in the comparison unit 3-2.

Thus, since, for example, 1 is outputted from output terminal G in this case, the first and second selection units 6-2 and 7-2 select data inputted from their respective first input terminals. That is, since the data memorized in the second memory means 5-2 are kept "as is" when they are greater than the data temporarily memorized in the first memory unit 4-2, the second selection unit 7-2 selects the first input terminal and supplies the data inputted from the first input terminal to the second memory unit 5-2. Accordingly, data memorized in the second memory unit 5-2 do not change, and the first memory unit 6-2 selects and outputs data temporarily memorized in the first memory unit 4-2.

Since the first and second selection units 6-2 and 7-2 in the second selection memory unit 2-2 select similarly to the first and second selection units 6-2 and 7-2 in the first selection memory unit 1-2, the second memory unit 5-2 in the first selection memory unit 1-2 memorizes the information corresponding to the data in the second memory unit 5-2 in the second selection memory unit 2-2. The first selection unit 6-2 in the first selection memory unit 2-2 outputs data corresponding to the information temporarily memorized in the first memory means 4-2 in the second selection memory unit 2-2.

Meanwhile, when the first data temporarily memorized in the first memory unit 4-2 are greater than the second data memorized in the second memory unit 5-2 in the second selection memory unit 2-2, the comparison unit 3-2 outputs 0, and the first and second selection unit 6-2 and 7-2 in the second selection memory unit 2-2 select the outputs from their second selection terminals. That is, the second selection means 7-2 in the second selection memory unit 2-2 outputs the first data memorized in the first memory unit 4-2 to the second memory unit 5-2 to store them in it. The first selection unit 6-2 in the second selection memory unit 2-2 outputs the data memorized in the second memory unit 5-2. That is, when the inputted data are larger than the memorized data, the inputted data are memorized and the originally memorized data are outputted. The first selection memory unit 1-2 similarly perform these operations. That is, data memorized in the second memory unit 5-2 in the second selection memory unit 2-2 correspond to data outputted from the second memory unit 5-2.

Through the above actions, the inputted data are sequentially memorized from the largest or smallest ones, and their ranks are obtained at a high speed.

Figure 1C:
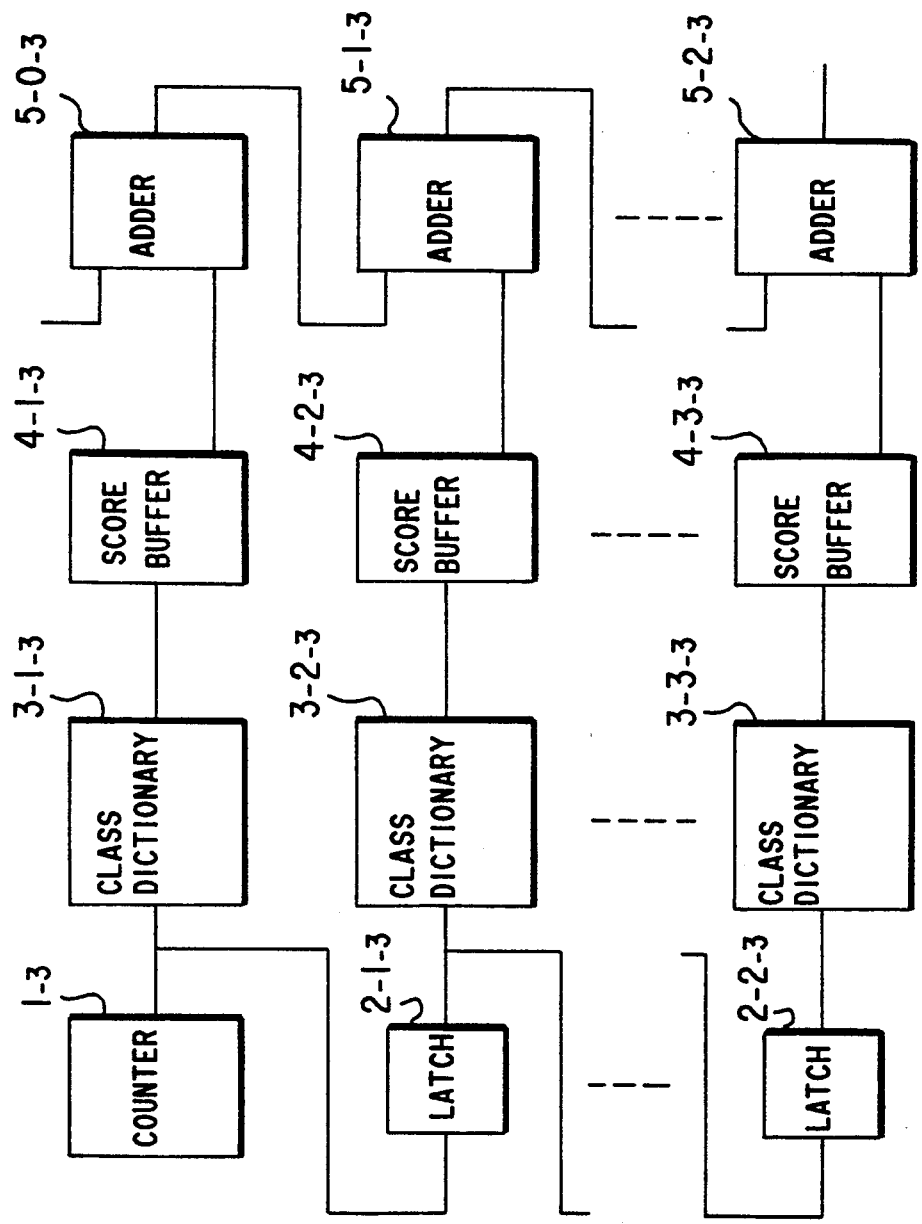
FIG. 1C is a third block diagram of this invention.

FIG. 1C is a third block diagram of this invention.

This invention pertains to the association conformance recognition method for recognizing inputted characters by dividing feature areas, separating the features into representative classes for the respective divisions, assigning scores to classes belonging to the respective divisions, and accumulating the respective scores of the classes to which a plurality of character codes of the candidates belong.

A counter 1-3 specifies a plurality of character codes of the candidates to be recognized.

Since latch circuits 2-1-3 and 2-2-3 sequentially shift the stored data, each time the value of the counter 1-3 is incremented by one (1), the counter 1-3 outputs the maximum value and the latch circuits 2-1-3 and 2-2 memorize the values less by one (1) and two (2), respectively.

Class dictionaries 3-1-3, 3-2-3 and 3-3-3 memorize classes to which a plurality of codes for the respective divisions belong, and are addressed by the value of the counter 1-3 and the values memorized in the latch circuits 2-1-3 and 2-2-3.

Score buffers 4-1-3, 4-2-3 and 4-3-3 receive class outputs from the class dictionaries 3-1-3, 3-2-3 and 3-3-3 at their addresses and memorize the scores corresponding to the classes for the respective divisions by the addresses corresponding to the classes.

Adders 5-0-3, 5-1-3 and 5-2-3 are provided in correspondence with the score buffers 4-1-3, 4-2-3 and 4-3-3 and sequentially add the class scores outputted from the score buffers 4-1-3, 4-2-3 and 4-3-3. For instance, the adder 5-0-3 adds the score outputted from the score buffer 4-1-3 to the initial value, the adder 5-1-3 adds the score outputted from the next score buffer 4-2-3 to the output from the adder 5-0-3, and the adder 5-2-3 adds the score outputted from the next score buffer 4-3-3 to the output from the adder 5-1-3.

The adders 5-1-3 and 5-2-3 are synchronized in outputting the adding results upon receiving synchronizing signals.

After generating an address, the counter 1-3, a circuit for outputting codes to be recognized, addresses the class dictionary 3-1-3, which outputs to the score buffer 4-1-3 the class number to which the code belongs upon receiving the value at its address.

As described earlier, the latch circuits 2-1-3 and 2-2-3 sequentially shift the value in the counter 1-3 and memorize value less by one (1) and two (2), respectively, than the value memorized in the counter 1-3. That is, when the class dictionary 3-1-3 is addressed by the counter 1-3, the class dictionary 3-2-3 addresses the code outputted before.

The score buffers 4-1-3, 4-2-3 and 4-3-3 memorize the scores given to the classes from the nearest one in correspondence with the features of the characters to be recognized in the respective divisions. When the score buffer 4-1-3 is addressed by the class dictionary 3-1-3, the adder 5-0-3 adds the received score of the class addressed by the value of the counter 1-3. This value is then added to the initial value such as zero (0). The result is outputted to the adder 5-1-3. The adder 5-0-3 outputs data (i.e., the next code) only when the counter 1-3 is incremented. The latch circuit 2-3 memorizes the same code as the value stored in the counter 1-3 at the earlier described operation time. The same classes in the class dictionaries 3-1-3 and 3-2-3 are addressed by the clock pulses described earlier. That is, the same classes in the different divisions are specified. The same classes are converted by the score buffer 4 2-3 to the scores corresponding to the classes. The converted scores are added to the adder 5-1-3, which adds the value outputted from the score buffer 4-2-3 and the value outputted from the adder 5-0-3. Thus, the corresponding scores for the same codes are added. By sequentially repeating the above operations, the adders 5-0-3, 5-1-3 and 5-2-3 sequentially add the scores in the same divisions, until finally the adder 5-2-3 outputs the score corresponding to the code. Thus, the scores of the candidate characters are obtained at high speed.

Figure 1D:
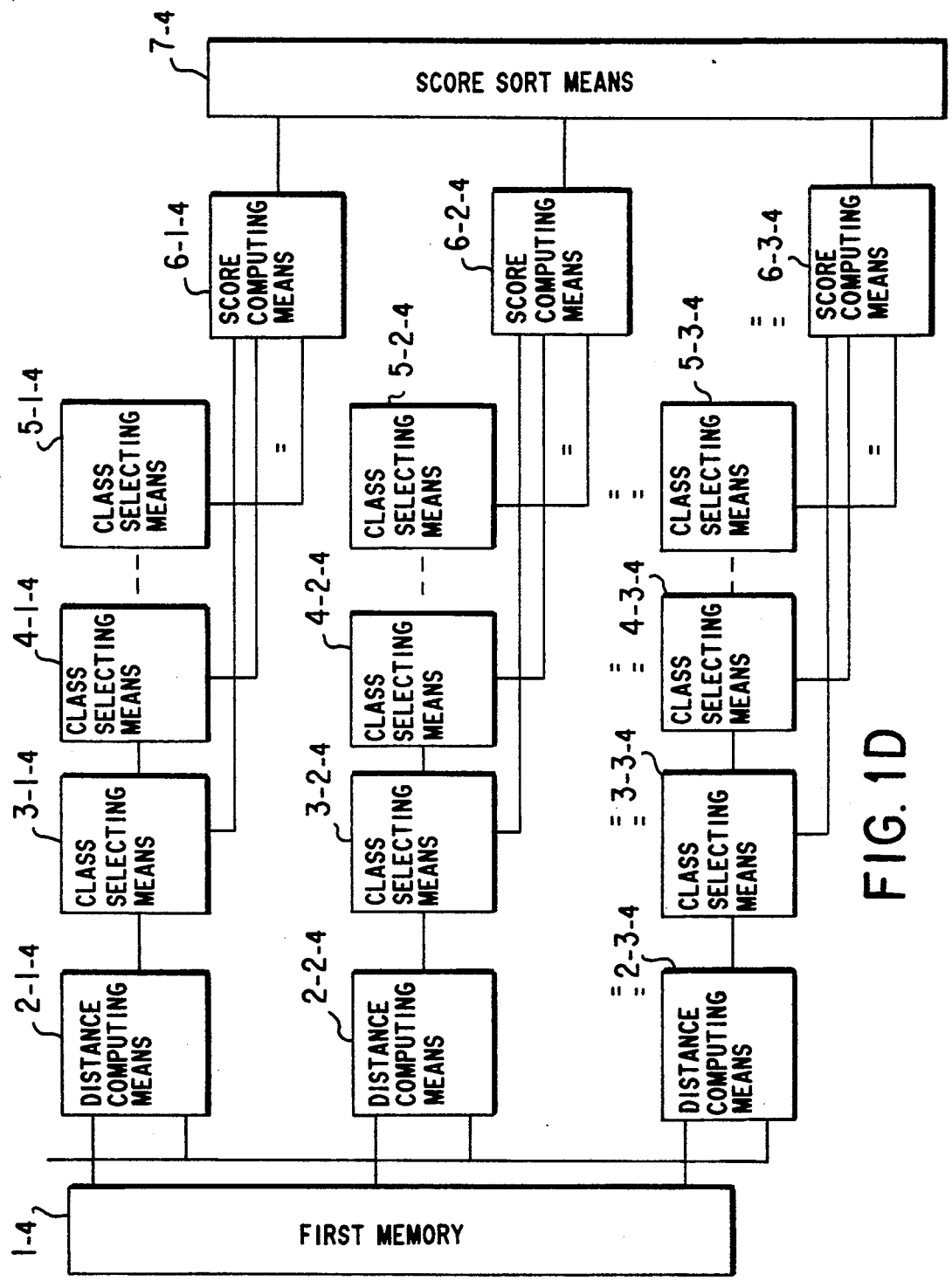
FIG. 1D is a fourth block diagram of this invention.

FIG. 1D is a fourth block diagram of this invention.

A first memory 1-4 memorizes classified numbers and feature data of dictionary patterns.

Nine (9) class selection units comprising three (3) pairs of three (3) serially connected class selection units 3-1-4, 4-1-4 and 5-1-4; 3-2-4 4-2-4 and 5-2-4; and 3-3-4, 4-3-4 and 5-3-4, compare the inputted values with the memorized values, keep the memorized values "as is" and output the inputted values when the memorized values are less than the inputted values, or output the memorized values and memorize the inputted values instead.

Three (3) distance computing units, 2-1-4, 2-2-4 and 2-3-4, commonly receive feature data of inputted patterns, compute the respective distances between the feature data of the dictionary patterns memorized in the first memory 1-4 and the inputted feature data, and supply the computation result to the three (3) class selection units 3-1-4, 3-2-4 and 3-3-4 in the first stage of the three (3) pairs of three (3) serially connected class selection units 3-1-4, 4-1-4 and 5-1-4; 3-2-4 4-2-4 and 5-2-4; and 3-3-4, 4-3-4 and 5-3-4, and determine the scores for the feature data of the inputted patterns.

Score computing units 6-1-4, 6-2-4 and 6-3-4 respectively receive the outputs from the class selection units 5-1-4, 5-2-4 and 5-3-4 in the third and final stage of the three (3) pairs of three (3) serially connected class selection units 3-1-4, 4-1-4 and 5-1-4; 3-2-4 4-2-4 and 5-2-4; and 3-3-4, 4-3-4 and 5-3-4, and obtain scores corresponding to the feature data of the inputted patterns. For instance, the score computing units 6-1-4, 6-2-4 and 6-3-4 are connected with a second memory, not shown in FIG. 1D, for memorizing the classes to which the respective characters belong; judge whether the classes inputted from the class selection units 5-1-4, 5-2-4 and 5-3-4 are the same as the classes to which the characters belong; and accumulate the weighted scores in correspondence with the sequence of serially connected class selection cells when they are actually the same.

A score sorting unit 7-4 determines the numbers for the patterns from the highest scores obtained at the score computing units 6-1-4, 6-2-4 and 6-3-4. For instance, the score sorting unit 7-4 comprises a plurality of sorting cells connected in a tree form. Each score sorting cell has two input terminals, so that they receive the higher of the scores supplied at their respective input terminals, reset the sorting cells in the preceding stage supplying the higher scores, and output the received scores to the sorting cells in the following stage.

The distance computing units 2-1-4, 2-2-4 and 2-3-4 receive feature data, such as feature vectors, of inputted patterns and determine the distances between the feature vectors and other feature vectors preregistered in the first memory 1-4. The nine (9) class selection units 3-1-4, 4-1-4 and 5-1-4; 3-2-4 4-2-4 and 5-2-4; and 3-3-4, 4-3-4 and 5-3-4, serially connected in three stages are rearranged according to the distances. For instance, the the classes corresponding to the respective squares in divided patterns are memorized.

The score computing units 6-1-4, 6-2-4 and 6-3-4 similarly assign respective scores to the squares, judge the conformance of their class numbers with the class numbers for the respective characters in the second memory, and accumulate the weighted scores outputted from the class selection units 5-1-4, 5-2-4 and 5-3-4 in the third and final stage of the nine (9) class selection units 3-1-4, 4-1-4 and 5-1-4; 3-2-4 4-2-4 and 5-2-4; and 3-3-4, 4-3-4 and 5-3-4, serially connected in three stages.

The score sorting unit 7-4 rearranges the character codes from the one with the highest core and outputs either the character code with the highest score or the character codes with the highest scores, as the recognition result.

Since the distances are classified by dividing the feature vectors in respective squares and higher scores are assigned to preregistered characters belonging to the classes with less distances in recognizing an inputted character, the distance computing amount for each character is small and the processing is expedited. The nine (9) class selection cells 3-1-4, 4-1-4 and 5-1-4; 3-2-4 4-2-4 and 5-2-4; and 3-3-4, 4-3-4 and 5-3-4, serially connected in three stages, can.be configured in a systolic array, thus further increasing the processing speeds.

FIG. 2A shows a system configuration of a character-recognizing device using an image data normalization circuit of this invention.

Information read by, for example, an image scanner is stored in an image memory 10 as image data. The image memory 10 has memory capacity for a page read by the image scanner. Each dot of the read information is stored as two-value data of either white or black (i.e., 0 or 1).

Image data stored in the image memory 10 are supplied to a noise reduction module 11, where noise generated during reading time is eliminated. The eliminated noise is irrelevant to the character information. For example, the noise reduction module 11 treats as white a black dot in a center of a three-by-three mask pattern in which only the dot in the center is black and the eight surrounding dots are white. Although the configuration of this invention allows the noise reduction module 11 to operate in a character recognition pre-treatment part 12, it could be set to operate at some other time, e.g., when the read image data are stored in character units in a normalization module 16 to be described later. Alternatively, it could be at a time of line-narrowing or stroking.

The image data which have undergone a noise elimination through the noise reduction module 11 are supplied to a row-histogram module 13, a column-histogram module 14 and a read control module 15.

The row-histogram module 13 projects the read information, such as the content of the form read by the image scanner described earlier, in the row direction and finds the number of dots in each dot row. That is, it finds the number of black dots in each dot row (in the horizontal direction).

As in the row-histogram module 13 described earlier, the column-histogram module 14, projects the read information in the column direction and finds the number of dots in each dot unit column.

The row-histogram module 13 sequentially counts the number of black dots (for each dot row) in data sequentially read in one dot unit in the row direction from the image memory 10 (similarly to a dot reading by a raster scan) and supplied through the noise reduction module 11. That is, the row-histogram module 13 sequentially finds the number of black dots in each row. The numbers of black dots in respective rows form a row histogram.

The column-histogram module 14 has counters each corresponding to a black dot position in a dot row, and increments the counter corresponding to the black dot position when a dot in a row is sequentially supplied.

By performing these operations for one page, the row-histogram module 13 and the column-histogram module 14 respectively obtain a row histogram and a column histogram each representing the numbers of dots in row positions and column positions. The result is supplied to the read control module 15.

The read control module 15 sequentially obtains the row position and the column position from the row histogram and the column histogram, respectively. These positions can be found, for instance, by a cycle of the row histogram or the column histogram.

The read control module 15 finds the row and column positions and performs the following additional processings. Image data (e.g. information read by an image scanner), can have an obliqueness due to the paper position. To cope with this, the read control module 15 sequentially changes the angle with which a histogram is obtained, so that an adjusted angle is obtained. Then, the image data supplied from the noise reduction module 11 are reinputted to obtain the final histogram, so that row data for one cycle period corresponding to the obliqueness are read from the point whence the row histogram (having a maximum value) obtained from the adjusted obliqueness changes from zero to a positive number (or from a positive number to zero) and is stored in a row buffer provided in the read control module 15.

Further, the read control module 15 again obtains a column histogram in a row from the row data stored in the row buffer and cuts out data of one character area to be outputted to a normalization module 16 and a conversion table creation module 17 from the point whence the column histogram changes from zero to a positive number.

The conversion table creation module 17 is for obtaining conversion data for enabling the normalization module 16 to normalize a character. The conversion table creation module 17 projects the data of one character area extracted by the read control module 15 in the column and row directions, thereby incrementing the respective counters in the column and row directions by the dot row unit and by the dot column unit from the column and row with a black dot, to obtain the final counter value in one character area.

The normalization module 16 magnifies the size of one character area from the size when the character in the character area is originally extracted, per the final counter values in the row and column directions of the dots in the extracted character, to the full sized character (e.g., comprising sixty-four (64) by sixty-four (64) dots).

For example, if the conversion table creation module 17 has forty-eight (48) dots in both the column and row directions, the normalization module 16 converts a forty-eight (48) by forty-eight (48) dot character to a sixty-four (64) by sixty-four (64) dot character, where row and column dot data of particular positions are repeatedly used as the same data in magnifying the character.

In case of a contraction, row and column dot data of particular positions are repeatedly read which are contracted as the same row and column dot data by "OR" additions.

After the normalization module 16 magnifies a character to a full sized character (e.g. of sixty-four (64) by sixty-four (64) dots, a line-narrowing module 18 narrows the width of the character by using a mask of eleven (11) dots comprising a center dot and eight (8) other dots in the surrounding three (3) by three (3) area, as well as the second left dot and the second up dots from the center dot. Alternatively a mask used in narrowing could be of nine (9) dots in the three (3) by three (3) dot area around the center dot.

The width of a line around a dot of a character can be narrowed by a control of the earlier described mask whereby a center dot of a predetermined pattern is set to zero. By repeating the narrowing procedures with masks, lines of a character are set to a width of one dot.

The narrowed line character (e.g., of sixty-four (64) by sixty-four (64) dots, obtained by the line-narrowing module 18 is supplied to a stroking module 19 for stroking. The stroking module 19 expresses a dot by a total of four kinds of strokes wherein there is a black dot above or below; right or left; right above or left below; and left above or right below an objective dot (i.e. a center dot). If the objective dot belongs to plural kinds of strokes among the four (4) kinds described above, a prioritization (e.g., the vertical direction first, the horizontal direction second, etc.) for deciding the kind of stroke the objective dot belongs to. When the objective dot is white or the center dot value is zero (0), the stroke is not considered to exist.

Since the stroking module 19 has five (5) cases wherein a stroke exists in any of four (4) directions, (i.e., vertical, horizontal, slash, and back-slash directions) or does not exist, the state of each dot is expressed as a three (3) bit value. The resultant three (3) by sixty-four (64) by sixty-four (64) bits of information are supplied to a feature vector module 20.

The feature vector module 20 divides the stroking information obtained at the earlier described stroking module 19 both horizontally and vertically in eight (8) dot units. A vector module area of a total of two hundred fifty-six (256) [sixteen (16) by sixteen (16)] dots encompasses one of the divided areas, the area below it, the area to its right, and the area to its lower right, each having 64 dots. The feature vector module 20 counts whether or not any of the four kinds of strokes in the vertical, horizontal, slash and back-slash directions exists. Although a feature vector is obtained in a vector module area comprising sixteen (16) by sixteen (16) dots, since a vector module area is vertically or horizontally shifted by eight (8) dots, there are seven (7) feature vector areas in both the row and column directions. Therefore, each character has a total of forty-nine (49) [seven (7) by seven (7)] vector module areas for feature vectors.

When the feature vector module 20 counts the number of strokes in each of the four directions for the respective vector module areas described earlier, the feature vector module 20 weights each dot representing a directional stroke, such that a center part of a vector module area comprising sixteen (16) by sixteen (16) dots has a higher weight in obtaining a feature vector. The weight reduces with distance from the center. For instance, a dot representing a directional stroke in the center area comprising four (4) by four (4) dots has a weight of four (4); a dot representing a directional stroke in the surrounding harrow comprising eight (8) by eight (8) dots, excluding the four (4) by four (4) dot area at the center, has a weight of three (3); a dot representing a directional stroke in the outer surrounding harrow area comprising twelve (12) by twelve (12) dots, excluding the eight (8) by eight (8) dot area at the center, has a weight of two (2); and a dot representing a directional stroke in the outermost harrow area comprising sixteen (16) by sixteen (16) dots, excluding the twelve (12) by twelve (12) dot area at the center, has a weight of one (1).

Since the feature vectors set characters to be recognized to the same size, the same characters (of different writings) have approximately the same feature vector. That is, each character has its specific feature vector. However, since there are very similar characters, an embodiment of this invention uses standard patterns of feature vectors for classification in each vector module area for a feature vector, such that a distance is found between a supplied unknown input and twenty (20) classes of standard patterns in each vector module area, in order to improve operation processing speed and recognition rate. That is, the distance is found between the feature vector of the character to be read in each vector module area obtained from the feature vector module 20 and the feature vector of a standard pattern in the vector module area. Each vector module area is classified into classes 1 through 20, and the order of the classes having class distances in respective vector modules is found from the smallest to the fifth-smallest.

A distance computing module 21 calculates the distances by using a class dictionary 23-1 (memorizing standard patterns in class units) in a vector dictionary 26. A candidate dictionary 23-2 is used to calculate the distances for respective candidate characters. (At this time a switch SW selects the candidate dictionary 23-2.)

An upper rank selection and score assignment module 22 determines the five (5) top-ranked classes described earlier and the scores of the corresponding classes in the respective vector module areas. That is, the upper rank selection and score assignment module 22 determines the scores given to the respective classes of the first to fifth ranks from the distances obtained by the distance computing module 21 (i.e., the scores of the respective candidate characters). For instance, five (5) points are given to the candidate character having the smallest distance, and decremental points of four (4) through one (1) are given to respective classes having the second smallest to the fifth smallest distances. These procedures are performed for all forty-nine (49) vector module areas. The processing result of the upper rank selection and score assignment module 22 is supplied to a comprehensive rating module 24.

The comprehensive rating module 24 is for calculating the degree of conformance between an input objective (i.e., an inputted character) and its candidate character, and operates in three modes comprising an associative matching method rated by a score, and a one hundred percent conformance mode and an individual conformance mode each rated by a distance.

The association conformance mode is for calculating the score of a candidate character from the vector module area corresponding to the candidate character stored in an association dictionary 23-3 and a class belonging to the vector module area.

Figure 2B:
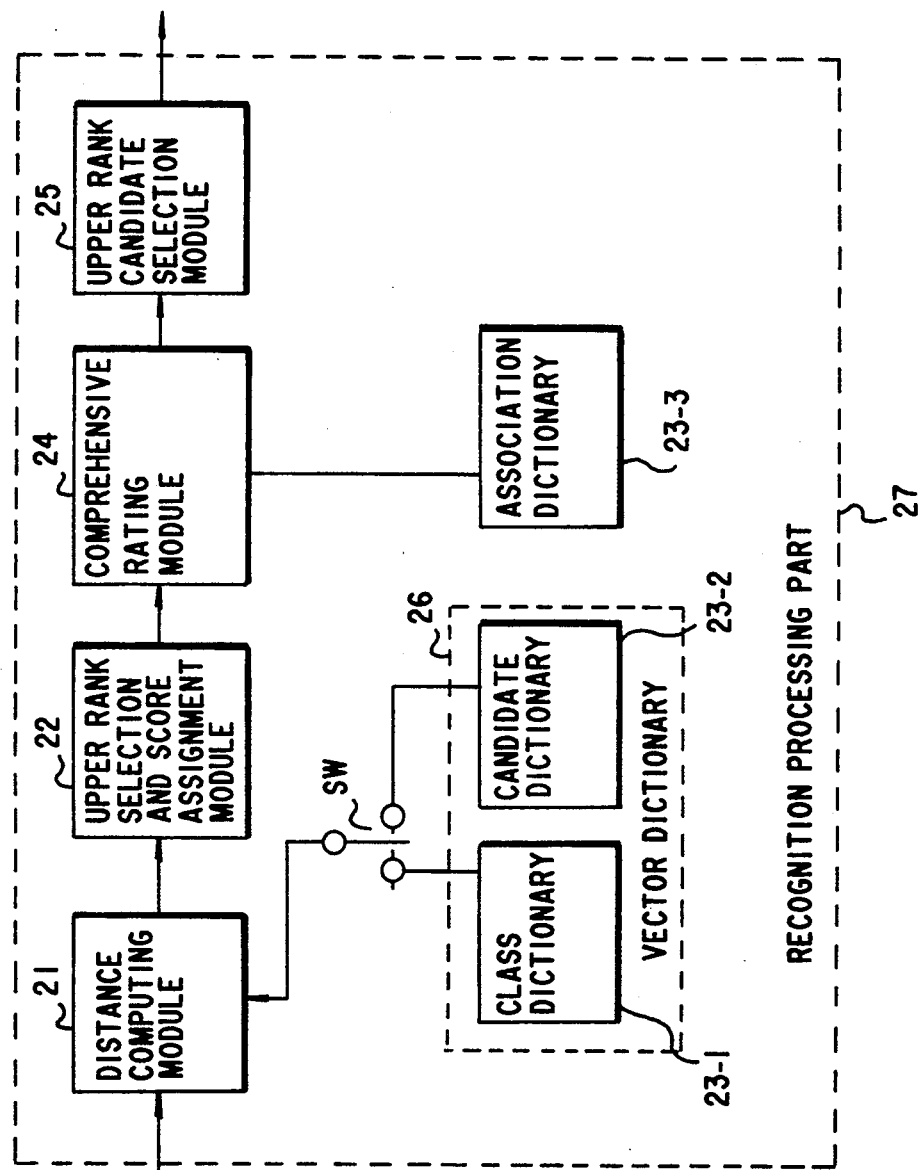

FIG. 2B shows the configuration of an association dictionary.

As shown in FIG. 2B, the association dictionary 23-3 stores the identifications for the classes to which the candidate characters belong in the respective vector module areas by using the identifications for the candidate characters in the respective vector module areas as the addresses. The association dictionary 23-3 stores only these data obtained by clustering sets of feature vectors corresponding to the identifications for the vector module areas of the respective candidate characters by their (weighted) distances. The class dictionary 23-1 of the same structure corresponding to the association dictionary 23-3 is created concurrently in the distance computing module 21.

When at least two kinds of dictionaries are stored in one memory, the one to be used is designated at a dictionary reference starting point. (By comprehensively rating each of the dictionaries divided by identifications for the candidate characters in parallel, they can be referenced at higher speeds.)

The association dictionary 23-3 is a table describing the identifications "K" for the classes wherein a candidate character "a" belongs to a vector module area "m". By expressing this relation by, $$C(m,a) = K$$

for a candidate character "a" ($=1$ through $c\_cand$), the association dictionary 23-3 is obtained as $$V(a) = SIGMA(m=1 \text{ through } c\_mask) \, P(m, C(m,a))$$

where $P(m,K)$ represents a score, and $V(a)$ represents a comprehensive rating value for the candidate character "a".

The one hundred percent conformance mode and the individual conformance mode in the comprehensive rating module 24 are for calculating comprehensive rating value $V(a)$ for each candidate character "a". The one hundred percent conformance mode sets $a=1$ through $c\_cand$; the individual conformance mode sets $J=1$ through $c\_kind$ and $a=b(j)$; and a distance is expressed as $d(m,a)$, in obtaining $V(a)$ which is a (weighted) distance of the feature vector between the candidate character "a" and the input object.

$$V(a) = SIGMA(m=1 \text{ through } c\_mask) \, d(m,a)$$

The upper-rank candidate selection module 25 selects and outputs a plurality of characters (e.g. five (5) top-ranked characters) that become the recognition results of the read image data.

The operations described earlier are performed in a pipeline processing. For instance, one page of the image memory 10 for memorizing image data are read in a pipeline processing, divided into rows by the read control module 1 5 and outputted to the normalization module 16 in a unit of one character, so that the line-narrowing, stroking, feature vector making and recognition processing described earlier are performed.

As described above, the upper-rank candidate selection module 25 is for selecting the five (5) top-ranked characters by ranking the candidate characters per the comprehensive rating value $V(a)$.

Its inputs are $$[a', V(a) \tfrac{1}{2} a', a=1 \text{ through } c\_cand \text{ revised}]$$

for an association one hundred percent conformance mode; and $$[j, V(a) \tfrac{1}{2} j = 1 \text{ through } c\_kind, a=b(j)]$$

The desc ending/ascending order of the comprehensive rating value $V(a)$ of the individual conformance mode is sequentially from the biggest for character association; and sequentially from the smallest for others.

Its outputs are identifications for the candidate characters arrayed in a sorting result of the inputs (or the inputting order) and their comprehensive rating values V(a).

Figure 3:
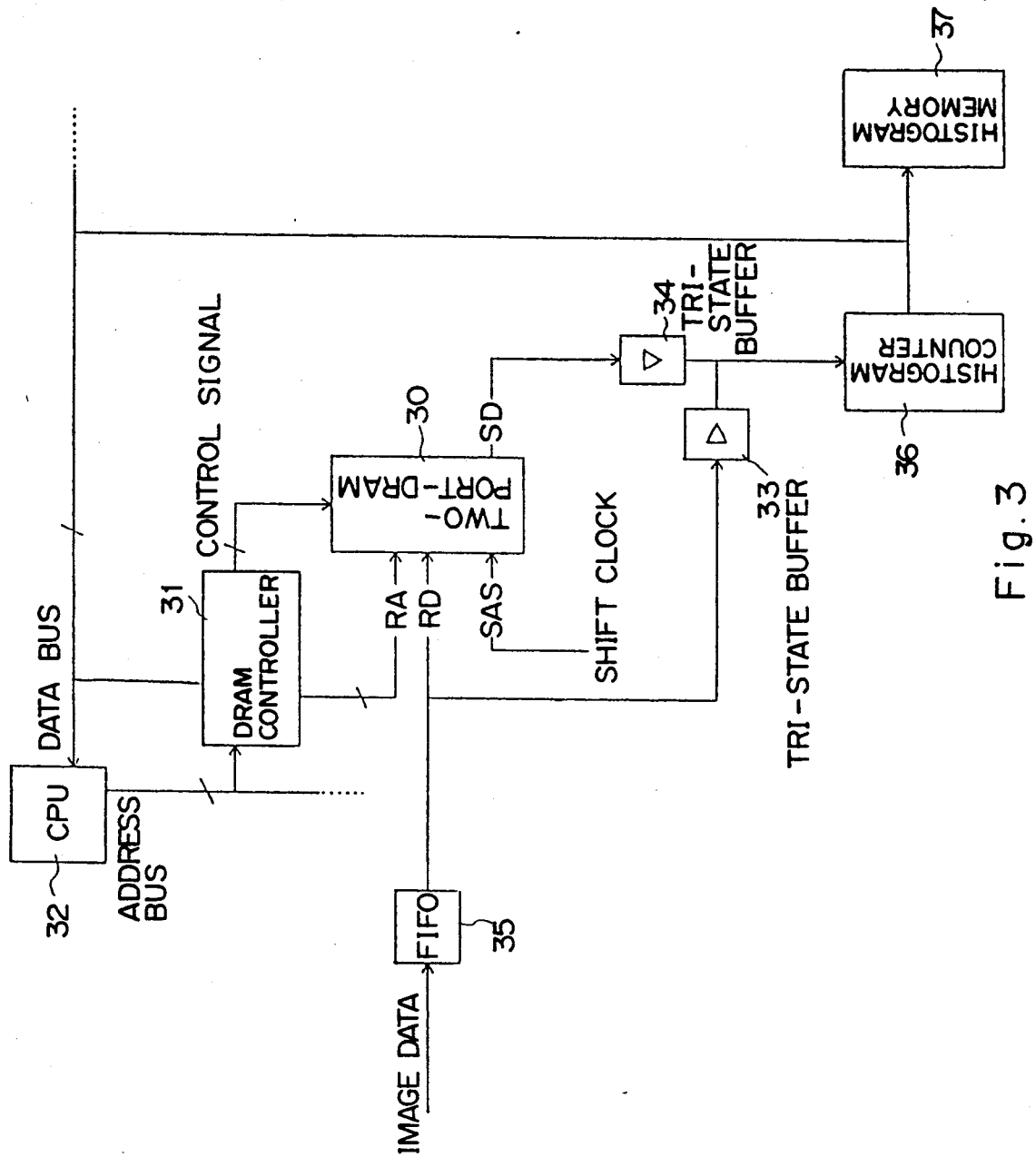
FIG. 3 shows in detail the circuit configurations of a row-histogram module and a column-histogram module using the first principle of this invention.

FIG. 3 shows in detail the circuit configuration of the row-histogram module 13 and the column-histogram module 14 using the first principle of this invention.

The embodiment of this invention shown in FIG. 3 provides a two-port DRAM 30 and a DRAM controller 31. The DRAM controller 31 specifies the addresses supplied to the two-port DRAM 30 at input and output times. When image data are supplied to an input terminal (RD) of the two-port DRAM 30 through a FIFO 35, the DRAM controller 31 supplies line data of a direction of the image data to the same column addresses as those specified earlier by sequentially changing row addresses of the two-port DRAM 30. The DRAM controller 31 is connected to an address bus and a data bus of a CPU 32. The CPU 32 controls the DRAM controller 31 for accessing the two-port DRAM 30, immediately before the read image data are supplied to the two-port DRAM 30 through the FIFO 35.

The control by the CPU 32 makes the DRAM controller 31 sequentially access row addresses. After accessing the row addresses of one line, the DRAM controller 31 changes the column addresses.

The outputs from the FIFO 35 (i.e., data supplied to the input terminal of the two-port DRAM 30) are supplied to a tri-state buffer 33. The outputs from the two-port DRAM 30 are supplied to a tri-state buffer 34. The outputs from the tri-state buffer 33 and the tri-state buffer 34 are supplied commonly to a histogram counter 36.

Either the tri-state buffer 33 or the tri-state buffer 34 is activated when the histogram counter 36 starts counting prompted by an instruction signal (not shown in the drawing) from the CPU 32. The histogram counter 36 is for counting a dot number in one direction along a line (e.g., one scanning direction or its vertical direction). A histogram memory 37 stores a result for each direction. The outputs from the histogram counter 36 are supplied not only to the histogram memory 37 but also to the data bus. If the DRAM controller 31 controls the histogram counter 36 (e.g., when the histogram counter 36 outputs a counting result), the outputs from histogram counter 36 open the buses and have the histogram memory 37 memorize the addresses through the buses.

Figure 4:
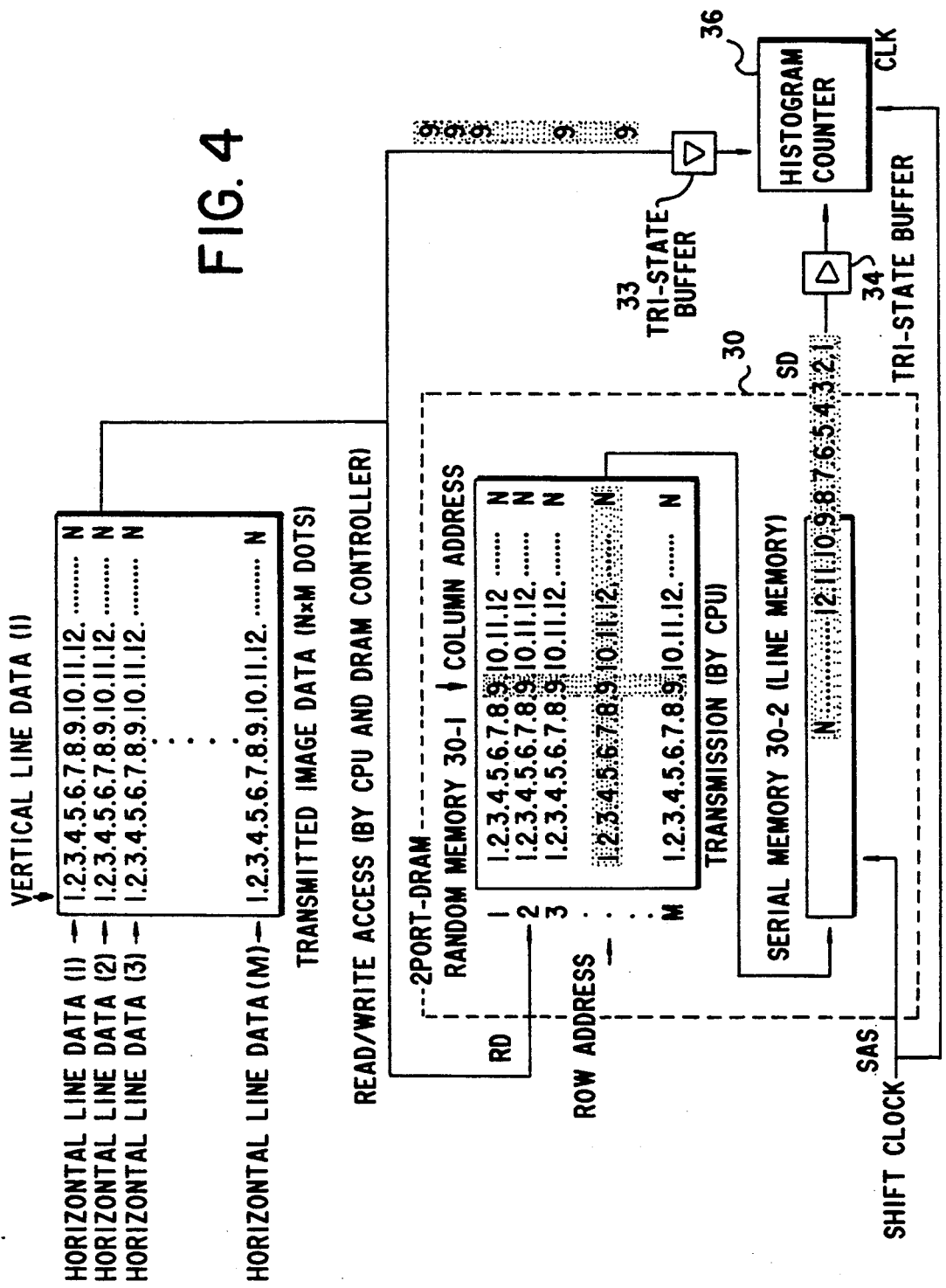
FIG. 4 explains the operations and the circuit configurations of the row-histogram module and the column-histogram module using the first principle of this invention, described in FIG. 3 further in detail.

FIG. 4 explains in more detail the operations and the circuit configurations of a row-histogram module 13 and a column-histogram module 14 using the first principle of this invention described in FIG. 3.

The two-port DRAM 30 comprises a random memory 30-1 for storing the row addresses and the column addresses and a serial memory (line memory) 30-2. Vertical line data of the read image data (of n by m dots) are supplied dot-serially to the two-port DRAM 30. At this time, the two-port DRAM 30 stores the row addresses sequentially changed by the DRAM controller 31 while keeping the column addresses constant in a vertical line, so that the vertical line data are sequentially stored in the same column addresses. By having the vertical line data (or the line numbers) sequentially changed and transmitting them to lines 1 through n, the DRAM controller 31 under the control of the CPU 32 has the random memory 30-1 store the transmitted image data (of n by m dots).

While these data are being stored, the vertical line data are sequentially supplied to the histogram counter 36 in one-dot units by activating the tri-state buffer 33.

The outputs from the tri-state buffer 33 are supplied to an enable terminal of the histogram counter 36 corresponding to a clock pulse supplied in one-dot units. When the inputted dot data are "1" (black), the histogram counter 36 performs a counting. When the inputted dot data are "0" (white), the histogram counter 36 does not perform it. That is, the histogram counter 36 counts the number of black dots whose value is "1". Since the results in vertical-line units are stored in the histogram memory 37 shown in FIG. 3, a histogram in vertical-line units is stored in the histogram memory 37.

Meanwhile, after the transmitted image data (of n by m dots) are stored in the random memory 30-1, a signal (not shown in the drawing) specifies row addresses. Dot data specified by the row addresses are transmitted to the serial memory 30-2. After the transmission controlled by the CPU 32, by applying a shift clock pulse SAS to the two-port DRAM 30, an output terminal SD of the two-port DRAM 30 outputs data (1 through n) corresponding to a row address in horizontal-line units.

At this time, the tri-state buffer 34 is activated and supplies the dot data outputted from the output terminal SD of the two-port DRAM 30 are sequentially supplied to the histogram counter 36. Since outputs from the tri-state buffer 34 are supplied to the enable terminal of the histogram counter 36, dot data are counted in the horizontal direction, similarly to those in the vertical direction described earlier. The counted value is supplied to the histogram memory 37 in horizontal-line units, and the histogram memory 37 obtains the vertical and horizontal histogram results.

Whereas image data are transmitted in one-dot units in the first embodiment shown in FIG. 3, when a histogram of one direction is inputted, a histogram of the other direction is already stored in the two-port DRAM 30. Since a hard circuit performs the accesses to the two-port DRAM 30 at high speed, it cuts the processing time.

Figure 5:
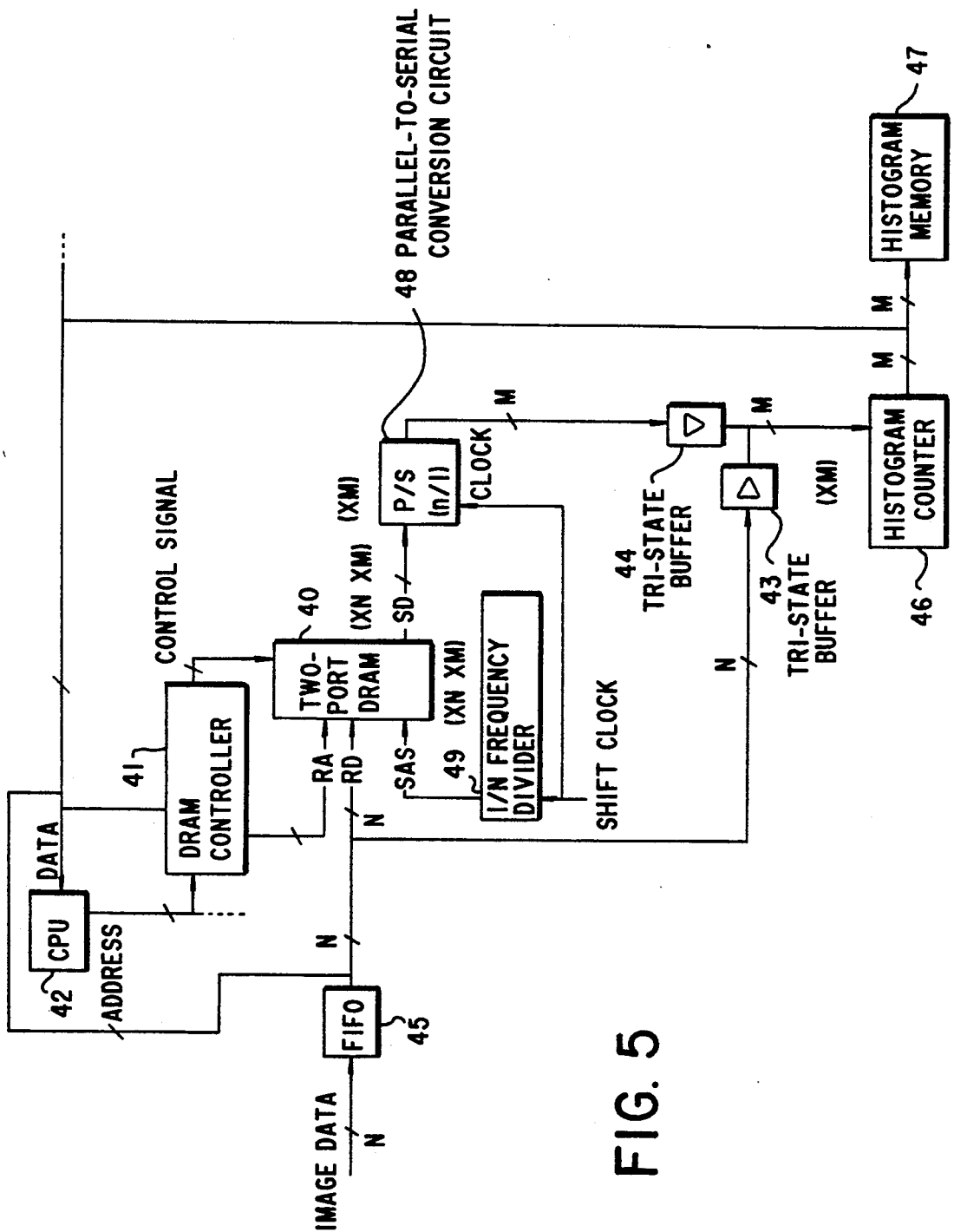
FIG. 5 shows the detailed circuit configurations of the row-histogram module and the column-histogram module using the first principle of this invention.

FIG. 5 shows in detail the circuit configurations of the row-histogram module 13 and the column-histogram module 14 using the first principle of this invention.

Figure 6:
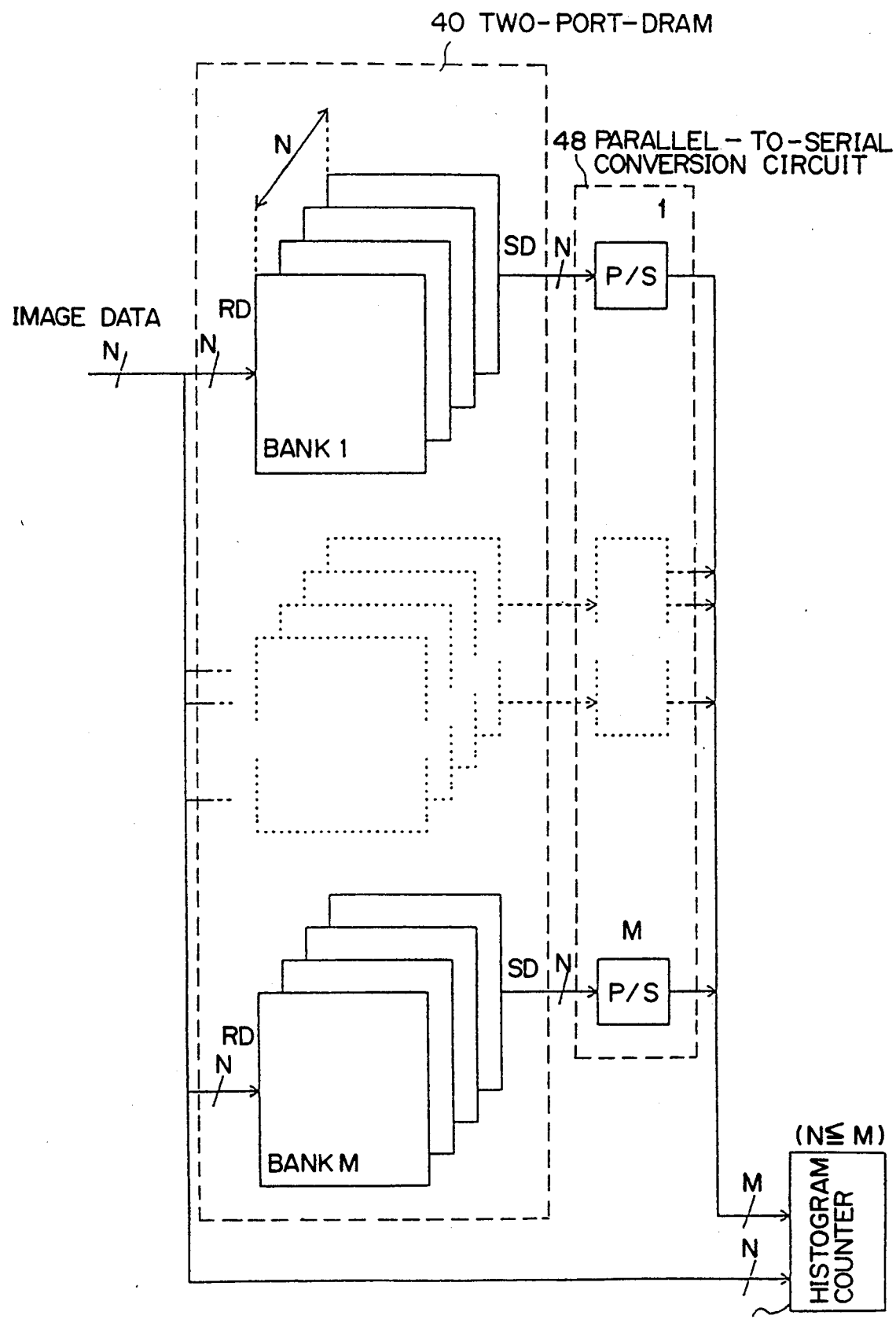
FIG. 6 shows schematically the configurations of the row-histogram module and the column-histogram module using the first principle of this invention.

FIG. 6 shows schematically the configurations of the row-histogram module 13 and the column-histogram module 14 using the first principle of this invention.

Whereas the first embodiment shown in FIG. 3 uses only one two-port DRAM 30, the second embodiment shown in FIG. 5 uses a two-port DRAM 40 comprising n by m pieces of the two-port DRAMs 30 for processing in n bit units. That is, n pieces of dot data are supplied to the two-port DRAM 40 in a batch.

A DRAM controller 41 is similar to the DRAM controller 31 shown in FIG. 3 and is for controlling the two-port DRAM 40 each comprising n by m pieces of the two-port DRAMs 30 by supplying respective addresses and control signals. When dot data are stored, n pieces of these addresses for storing dot data are supplied in a batch to n pieces of the two-port DRAMs 30 in the two-port DRAM 40. By outputting the n pieces of these addresses m times, n by m bits of dot data are stored in the two-port DRAM 40 comprising n by m pieces of the two-port DRAMs 30.

More specifically, image data of n dots (i.e., n bits of dot data) are stored in a FIFO 45 before they are supplied to the two-port DRAM 40, and a CPU 42 controls the DRAM controller 41. n bits of dot data are stored in a batch in n pieces of the two-port DRAMs 30 grouped in the two-port DRAM 40. By repeating the procedure m times, n by m bits of dot data are stored in the two-port DRAM 40.

The outputs from the FIFO 45 are supplied to a tri-state buffer 43 as well as to the two-port DRAM 40. Per an instruction from the CPU 42, when the tri-state buffer 43 is active, the n inputted bits of data are supplied to a histogram counter 46. The histogram counter 46 then counts the number of black dots included in these n bits of dot data received. That is, the histogram counter 46 comprises m pieces of counters, where m is no less than n. In order to be counted, the outputs from the tri-state buffer 43 are supplied respectively to n pieces of counters among the above m pieces of counters.

When the two-port DRAM 40 stores a page of image data, n by m pieces of the two-port DRAMs 30 in the two-port DRAM 40 output data in parallel in the direction vertical to their respective stored data. That is, n pieces of data comprising n by m bits (which is the number of the two-port DRAMs 30 in the two-port DRAM 40) are outputted.

Since the two-port DRAM 40 outputs n bits of dot data in the direction vertical to the stored direction, a parallel-to-serial conversion circuit 48 serially outputs the n bits by a further parallel-to-serial conversion of the n bits. Because a clock shifted by a frequency divider 49 is supplied to the respective input terminals for receiving the shift clock pulse SAS in the two-port DRAM 40, the two-port DRAM 40 simultaneously outputs n bits in synchronization with the shift clock pulse SAS. Accordingly, each time n bits are received, the parallel-to-serial conversion circuit 48 supplies the n bits to the histogram counter 46 through a tri-state buffer 44, by converting n bits from parallel data to serial data. Since the outputs from the parallel-to-serial conversion circuit 48 comprise n bits, the histogram counter 46 counts the respective n bits of dot data and supplies the result to the histogram memory 47.

As shown in FIG. 6, the two-port DRAM 40 as an image memory determines a bit width of one bank based on the transmitted image bit width, and the bank number is set equal to the the histogram counter number (i.e., limited by the histogram counter number), where m is never less than n.

Figure 7:
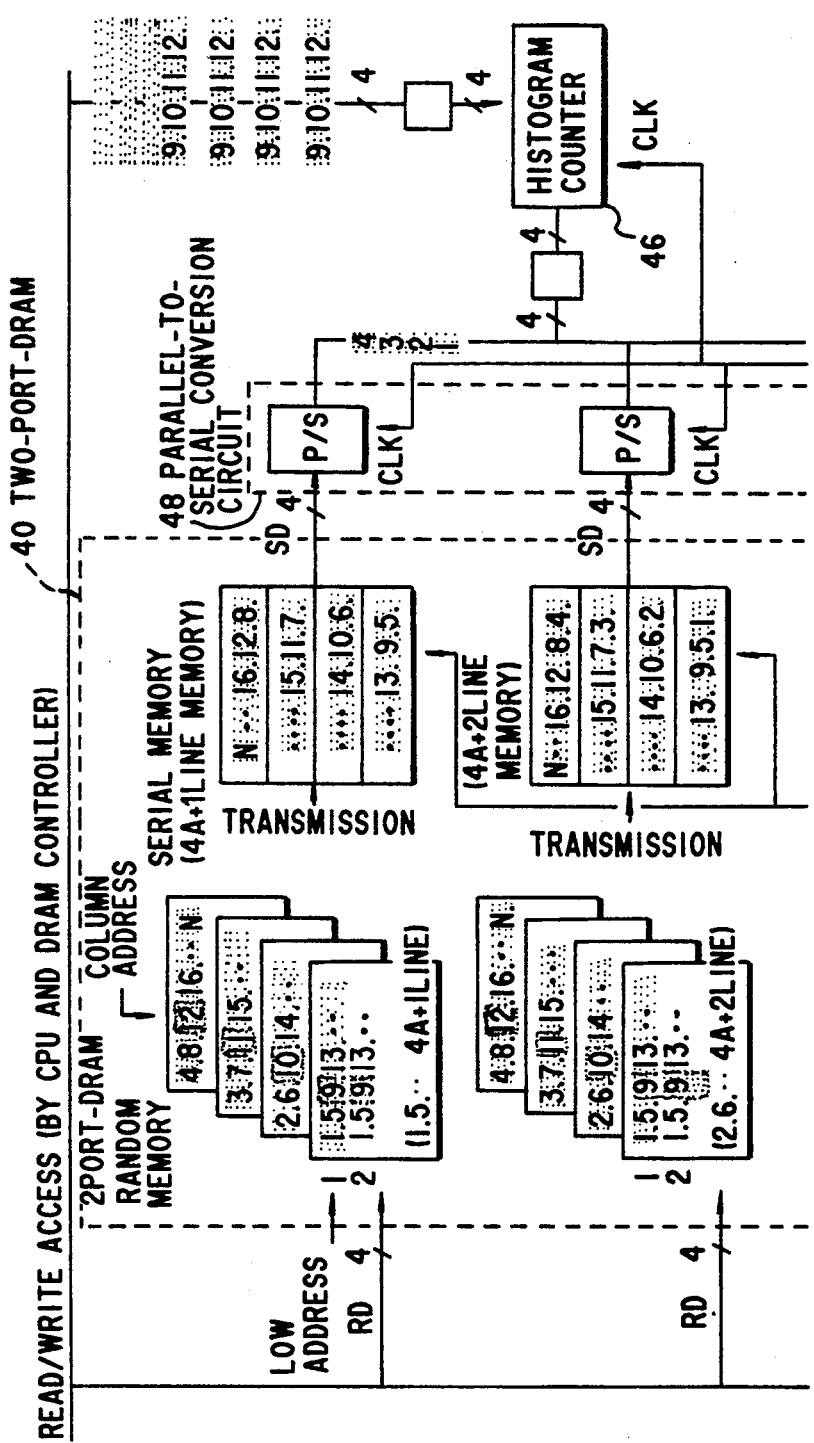
FIG. 7 illustrates that FIGS. 7a-b should be together.
Figure 7A:
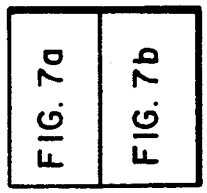
FIGS. 7a-b explain the operations of the row-histogram module and the column-histogram module using the first principle of this invention.
Figure 7B:
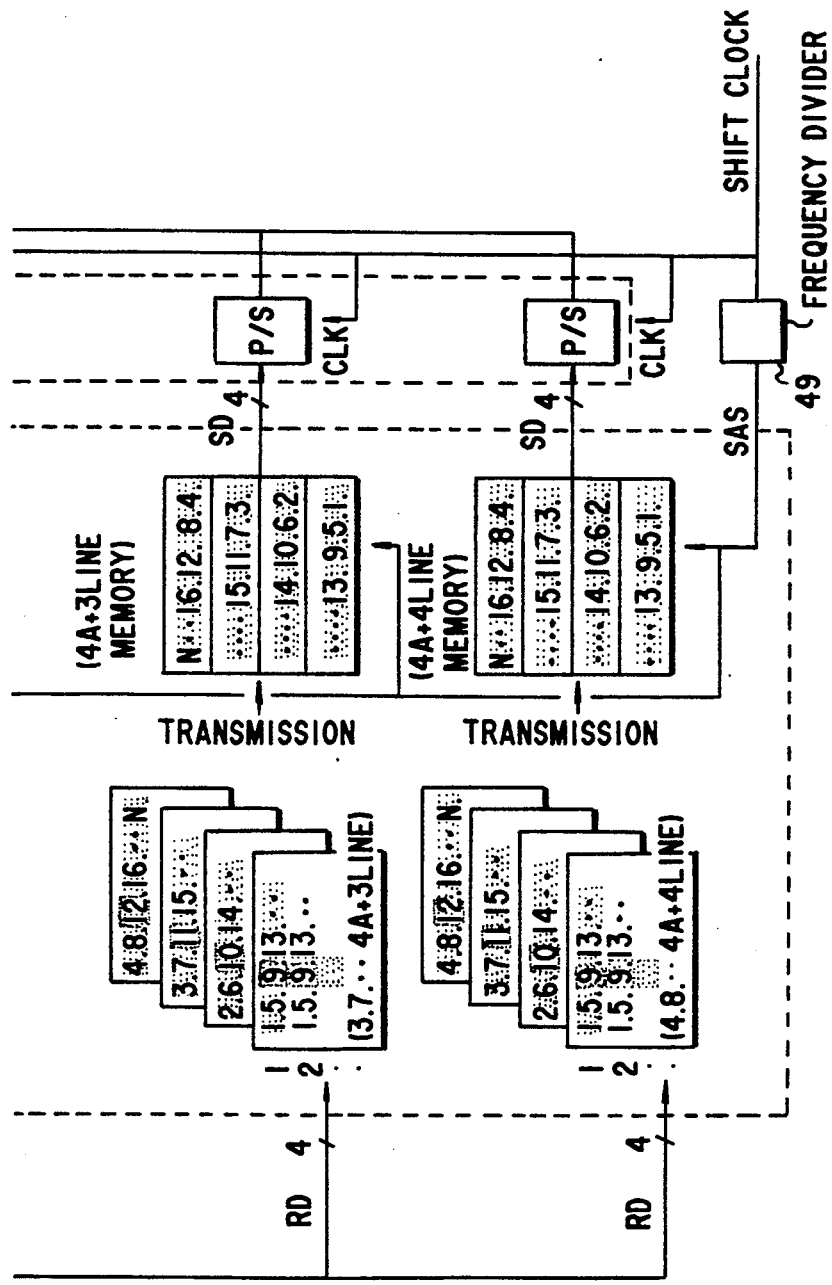

FIG. 7 explains the operations of the row-histogram module 13 and the column-histogram module 14 using the first principle of this invention.

The image data transmitted to the two-port DRAM 40 are stored, as shown in FIG. 7. After "i"-th horizontal line data are stored in an "i"-th bank, "i+1"-th horizontal line data are stored in an "i+1"-th bank. After the bank of the maximum number stores the corresponding line data, the line data storage operations are repeated from bank 1. At this time, horizontal line data in their respective banks are stored in the same column addresses so that the horizontal histogram can be easily calculated.

FIG. 7 illustrates the case where n=m=4. Data are supplied to the two-port DRAM 40 in four (4) bits. Banks 1 through 4 receive dot data of the lines $4a+1$ through $4a+4$, respectively.

For example, when dots of Nos. 9, 10, 11 and 12 in line $4a+1$, dots of Nos. 9, 10, 11 and 12 in line $4a+2$ Nos. 9, 10, 11 and 12 in line $4a+3$, and dots of Nos. 9, 10, 11 and 12 in line $4a+4$ are respectively supplied, the respective two-port DRAMs 40 of the same row and column addresses store them. By sequentially repeating the procedure, dots in the direction vertical to the inputted direction are read, parallel data of n by m bits (four (4) by four (4) in FIG. 7) are respectively supplied to a plurality of the parallel-to-serial conversion circuits (P/S) 48 provided externally at the shift clock pulse SAS. The parallel-to-serial conversion circuits (P/S) 48 which in turn output data in m bit units. By counting the number m, where m=4 in this case, the histogram counter 46 obtains a histogram of dot data in the direction vertical to the inputted direction.

The operations of the horizontal histogram calculation is explained, next.

Figure 8A:
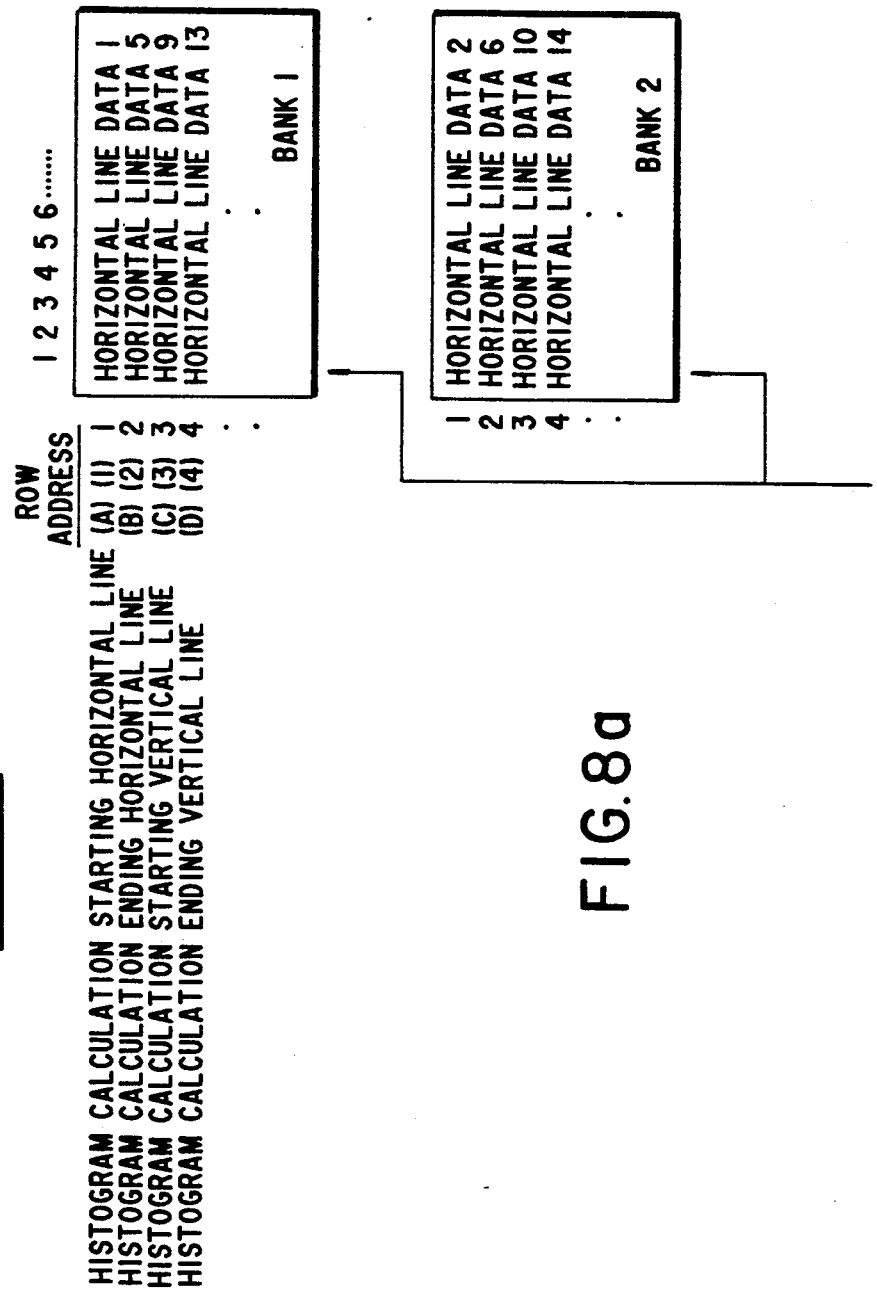
FIGS. 8a-b show the operations of the horizontal histogram calculation of the row-histogram module and the column-histogram module using the first principle of this invention.
Figure 8:
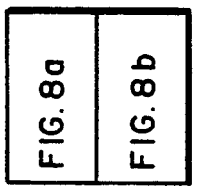
FIG. 8 illustrates that FIGS. 8a-b should be together.
Figure 8B:
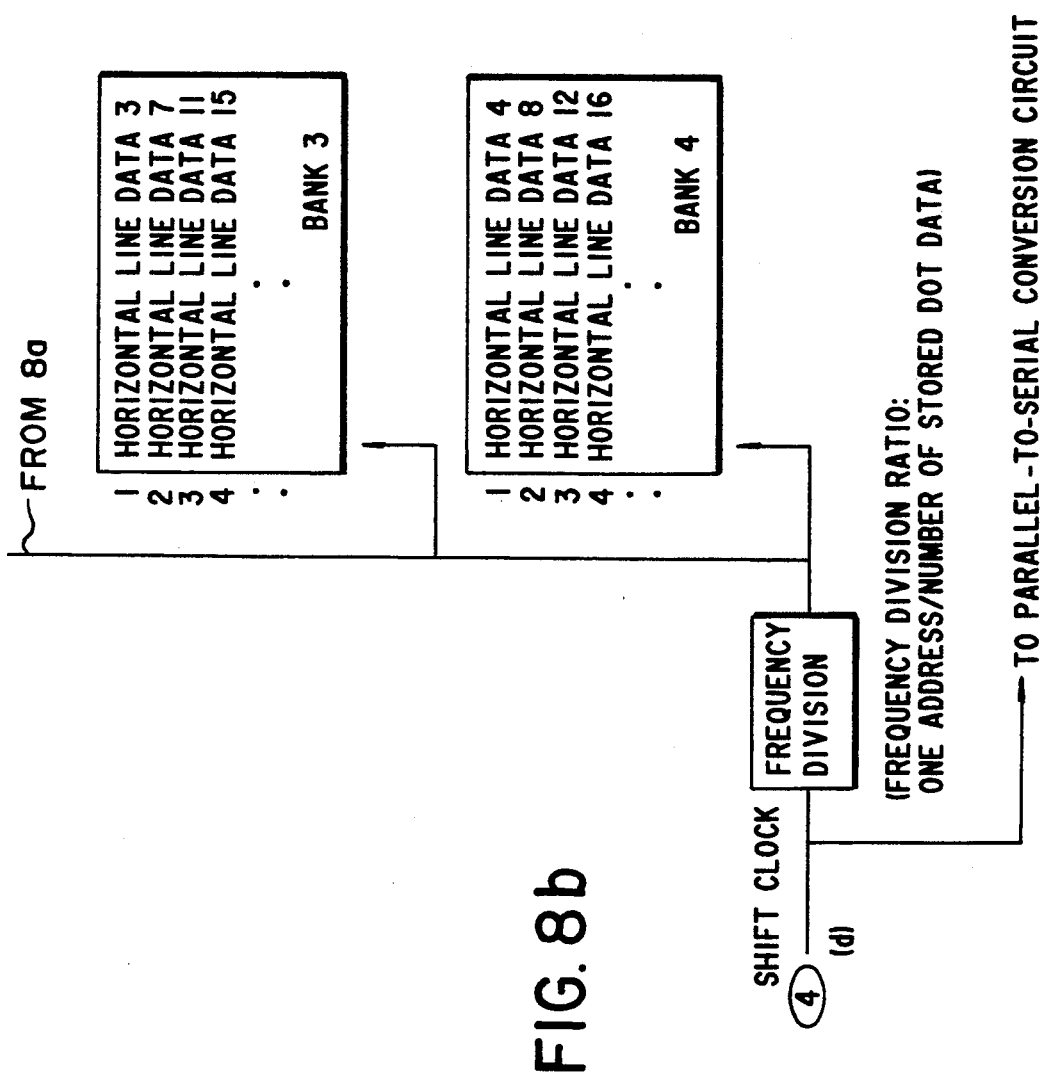

FIG. 8 shows the operations of the horizontal histogram calculation of the row-histogram module 13 and the column-histogram module 14 using the first principle of this invention.

Horizontal histogram calculation patterns are expressed by histogram calculation starting/ending horizontal lines and histogram calculation starting/ending vertical lines.

As shown in FIG. 8, the operating procedures are as follows. First, a target bank and a target address are obtained from the histogram calculation starting horizontal line and the histogram calculation ending horizontal line. Second, the number of a histogram calculation starting vertical line is set as a serial memory address for determining data outputted first from a serial memory after the shift clock pulse SAS is inputted, horizontal line image data are transmitted to the serial memory in the two-port DRAM 40 by inputting a computable address to the target bank, and the serial memory is set to a designated state by inputting the serial memory address.

If the histogram calculation ending vertical line and the histogram calculation starting horizontal line are inputted in this state, target image data are outputted from the serial output terminal of the two-port DRAM 40 and the histogram counter 46 counts the number of black dots (or white dots).

When the difference between the number of the histogram calculation ending horizontal lines and the number of the histogram calculation starting horizontal lines is greater than the number of banks, the above procedures are repeated.

The operations of the vertical histogram calculation is explained, next.

Figure 9:
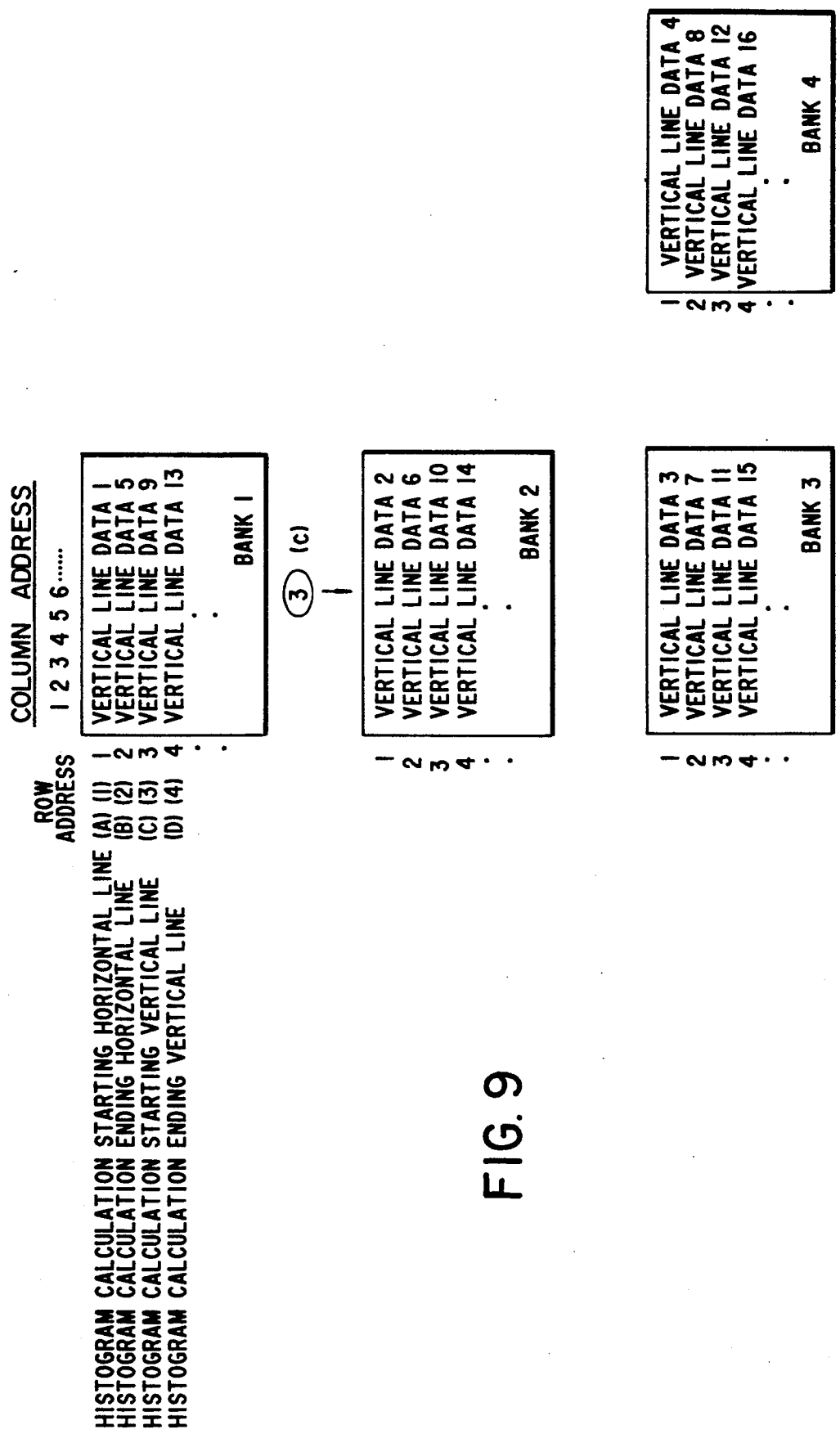
FIG. 9 shows the operations of the vertical histogram calculation of the row-histogram module and the column-histogram module using the first principle of this invention.

FIG. 9 shows the operations of the vertical histogram calculation of the row-histogram module 13 and the column-histogram module 14 using the first principle of this invention.

Vertical histogram calculation patterns are expressed by histogram calculation starting/ending horizontal lines and histogram calculation starting/ending vertical lines.

As shown in FIG. 9, the operating procedures are as follows. First, a target bank and a target address are obtained from the histogram calculation starting horizontal line and the histogram calculation ending horizontal line. Second, by setting the histogram calculation starting horizontal line and the histogram calculation ending horizontal line as addresses common to all banks, a calculation starting row address is inputted to the target bank. Third, upon receiving a common column address, a random board of the two-port DRAM 40 outputs a dot of a horizontal line image, and the histogram counter 46 counts the number of black dots (or-white dots).

When the difference between the number of the histogram calculation ending horizontal lines and the number of the histogram calculation starting horizontal lines is greater than the number of address storage bits, the above procedures are repeated.

Since the above operations enable hardware to obtain vertical or horizontal histograms in parallel in one-dot units or in units of a predetermined number of bits, high speed histogram calculations are realized.

Figure 10:
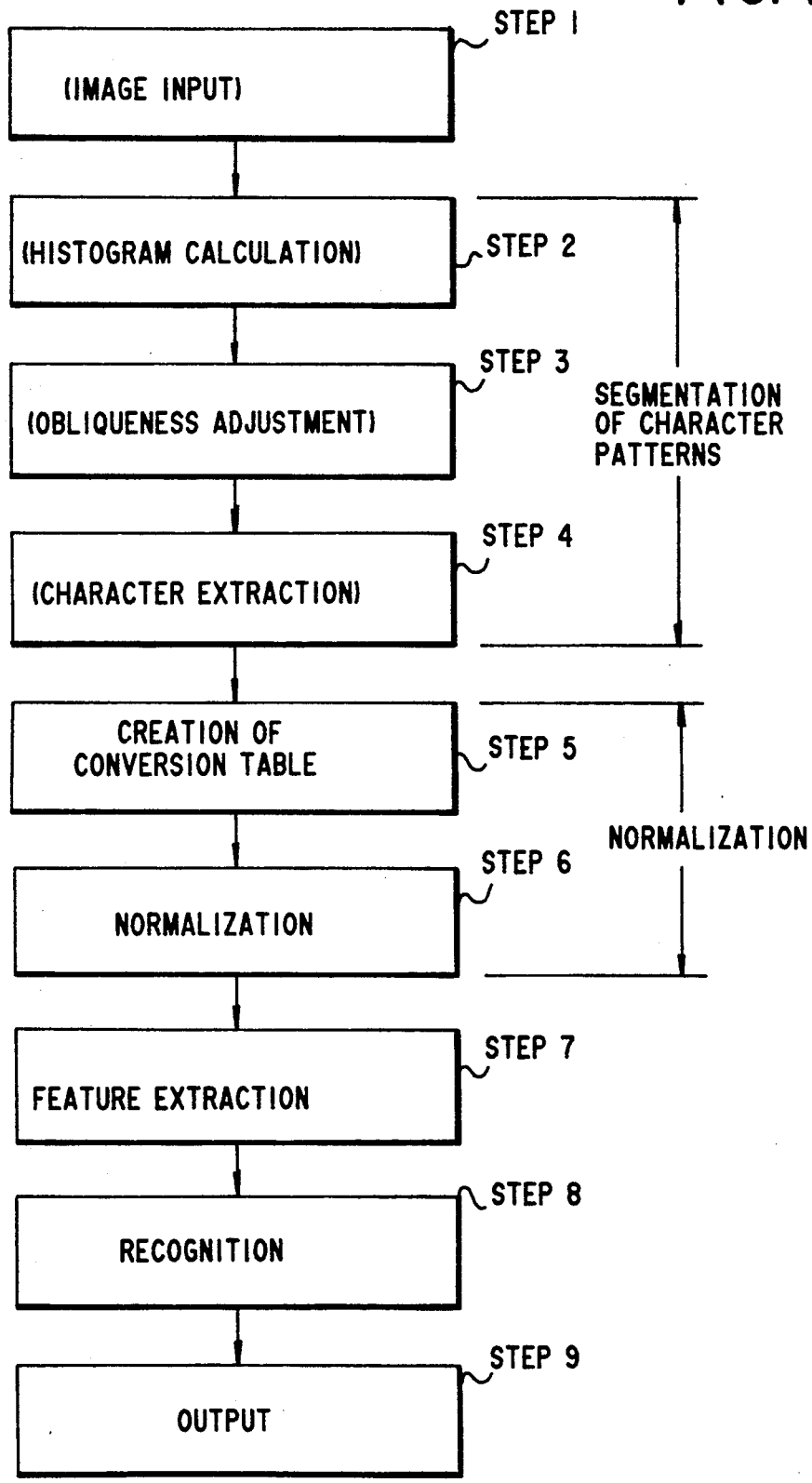
FIG. 10 is a flowchart of the character recognition method in a normalization module using the first principle of this invention.

FIG. 10 is a flowchart of the character recognition method in the normalization module 16 using the first principle of this invention.

(STEP 1: IMAGE INPUT) To recognize a character printed (e.g., on a form), a document image is read.

(STEP 2: HISTOGRAM CALCULATION) A histogram is calculated for the read page. This histogram calculation comprises addition to obtain the number of dots on a page projected vertically and horizontally. The histograms correspond to respective obliquenesses considered to be within an obliqueness range used for adjusting the obliqueness of the form.

(STEP 3: OBLIQUENESS ADJUSTMENT) The obliquenesses of the form obtained from the histograms are respectively adjusted. Since the histograms correspond to the obliquenesses, the difference between the maximum and minimum of the histogram values is maximized when the form is set at the proper position. That is, the obliqueness of the form is determined from the obliqueness that maximizes the difference between the maximum and minimum of the histogram values among those calculated in correspondence with a plurality of obliquenesses.

(STEP 4: CHARACTER EXTRACTION) The results of adjusting the forms' obliquenesses through histogram calculation are received for finding a character area to be used as a unit for extracting a character.

(STEP 5: CREATION OF CONVERSION TABLE) Although a document (form) is read as image inputs in page units in the embodiments of this invention, the above steps segment the image inputs into areas in character units, so that a character for which a conversion table is created is normalized. The conversion table is used for normalizing the extracted characters to a predetermined size by magnifying or contracting them in both directions in one-dot units.

(STEP 6: NORMALIZATION) All the extracted characters, (e.g., of M by M dots), in the read document are normalized (e.g., to D by D dots).

(STEP 7: FEATURE EXTRACTION) Features of respective inputted characters are extracted, and the distances (i.e. differences) between their features and those of the characters registered in the association dictionary are calculated.

(STEP 8: RECOGNITION) The characters registered in the association dictionary with the least differences are recognized.

(STEP 9: OUTPUT) The code of the recognized character is outputted as the result.

Whereas the pre-treatments in steps 2 through 6 for recognition are all done in one-dot units, which require a huge amount of processing, a systolic array is used for expediting the processings, as follows.

First, a normalization algorithm is explained. Second, a systolic array for realizing the normalization algorithm is explained. Unless otherwise noted, inputted images comprise M by M dots, have two-value images and are to be normalized to a size of D by D dots.

Algorithm for creating a conversion function for normalization

A normalization is a processing for absorbing the effect of differences in sizes and positions of the character areas of the inputted images by magnifying or contracting the originally inputted images to a predetermined size.

The simplest normalization, called linear normalization, linearly magnifies or contracts the sizes of inputted images to a predetermined size.

Other normalizations (i.e., non-linear normalizations), obtain line densities (the numbers of white elements inverted to black picture elements) f(i) and g(j) of the inputted image in row and column directions. Conversion functions F(i) and G(j) for mapping are defined as follows.

$$F(i) = SIGMA(i' = i_s - 1 \text{ through } i)[f(i')^*b + 1] \quad (i \geq i_s) \quad (1)$$
$$0 \quad (i < i_s)$$

$$G(j) = SIGMA(j' = j_s - 1 \text{ through } j)[f(j')^*b + 1] \quad (j \geq j_s) \quad (2)$$
$$0 \quad (j < j_s)$$

where $i_s$ and $j_s$ respectively represent the uppermost row and the leftmost column in an area where black picture elements exist, and b which usually is 1 represents a positive weight coefficient for deciding the degree of non-linearity.

That is, in a magnification of a non-linear normalization, the dots in the columns with fewer inversions from white picture elements to black picture elements are magnified in the row direction by smaller magnification rates, and the dots in the columns with more inversions from white picture elements to black picture elements are magnified in the row direction by larger magnification rates. Likewise, the dots in the rows with fewer inversions from white picture elements to black picture elements are magnified in the column direction by smaller magnification rates, and the dots in the rows with more inversions from white picture elements to black picture elements are magnified in the column direction by larger magnification rates.

Thus, in a magnification of a non-linear normalization, when lines which are long in the horizontal or vertical direction exist, they are not widened and dots in other graphics are magnified more than by a linear normalization.

Non-linear normalization is effective for all the embodiments of this invention, in which lines of the character to be recognized are narrowed.

Figure 11:
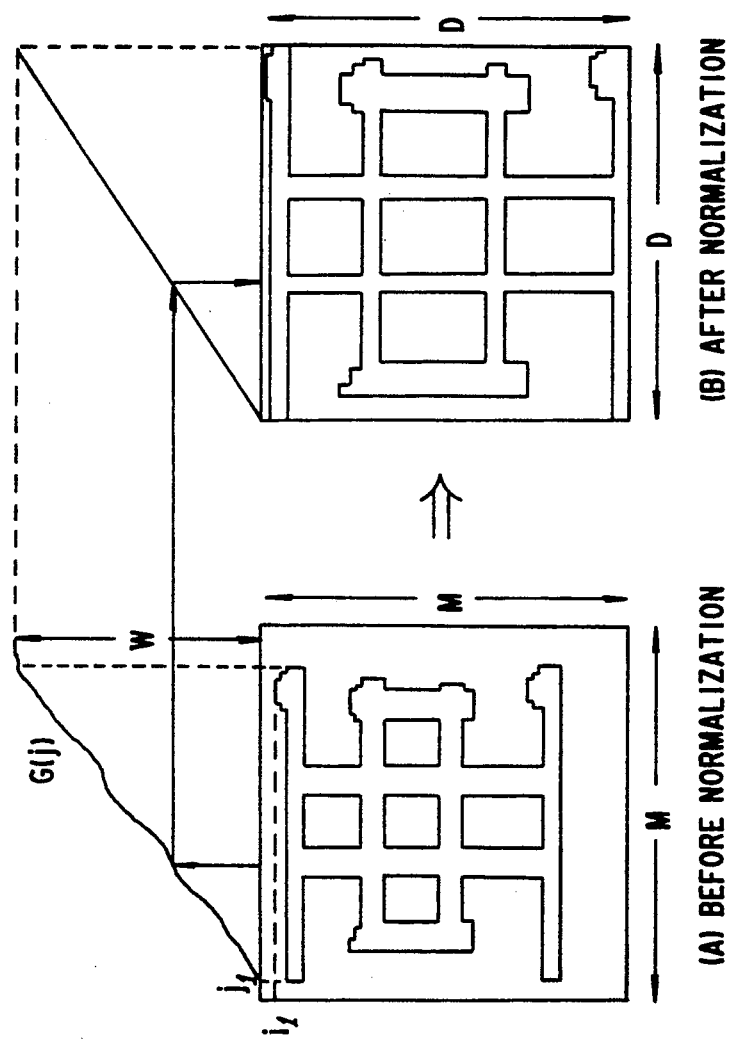
FIGS. 11A and 11B show an example for a non-linear normalization in the normalization module using the first principle of this invention.

FIGS. 11A and 11B show an example of a non-linear normalization in the normalization module 16 using the first principle of this invention. More specifically, FIG. 11A shows a character before a non-linear normalization and FIG. 11B shows a character after the non-linear normalization.

First, a normalization in the column direction is explained by referring to FIGS. 11A ad 11B. In case of a magnification, column j' in FIG. 11A is made to correspond with columns $G(j')^*D/W$ through $G(j'+1)^*D/W-1$ in FIG. 11B. In case of a contraction, column j in FIG. 11B is made to correspond with a plurality of consecutive columns in FIG. 11A determined by $G^{-1}("j^*W/D")$, where a variable sectioned in "" is rounded up and W is the maximum of G(j) in an area where a black picture element exists.

Second, a normalization in the row direction is similarly performed by using F(j) and H, where H is the maximum of F(j) in an area where a black picture element exists. These non-linear normalizations are effective for recognizing hand-written Chinese characters.

Meanwhile, linear normalizations are equivalent to cases where b=0 in equations (1) and (2). All the normalizations below are performed by the mapping of these conversion functions.

FIG. 12 illustrates creations of conversion functions in the normalization module 16 using the first principle of this invention.

FIG. 13 shows a loop program for a normalization by the normalization module 16 using the first principle in this invention.

These conversion functions F(i) and G(j) are obtained by the double-loop program shown in FIG. 12, where r_den[i] and c_den[j] respectively correspond with f(i) and g(j); r_acc[i] and r_acc[j] are respectively equivalent to F(i) and G(j); and img[i][j] represents the value of the picture element at row i and column j of the inputted image, which is 1 for a black picture element and 0 for a white picture element; as well as H=r_max[M] and W=c_max[M].

Algorithm for normalization (mapping by conversion function)

Figure 14:
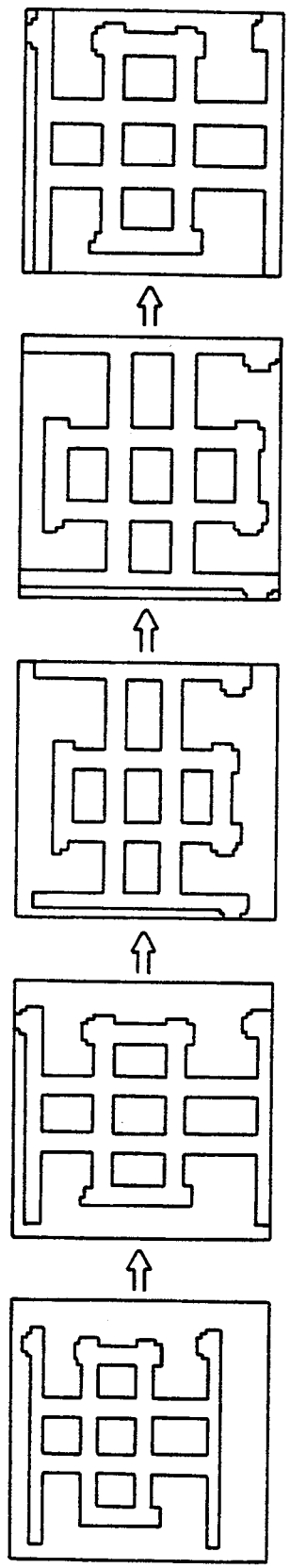
FIG. 14 shows an example of converted data at various stages of a normalization by the normalization module using the first principle of this invention.

FIG. 14 shows an example of converted data at various stages of a normalization by the normalization module 16 using the first principle of this invention.

A conversion function realizes a normalization in a procedure of "normalization in the row direction→horizontal conversion→normalization in the column direction→transposition", as shown in FIG. 14. Although a transposition is not described in detail, it is realized by a memory element circuit having an exclusive two-input/output port.

A normalization in the row direction is performed per the following algorithm.

$$\text{for } i=1 \text{ to } M \ [o\_img[i] = i\_img["G^{-1}(j*w/D"];] \quad (3)$$

where i_img[i], o_img[i] and D respectively indicate row i of the inputted image, row i of the image after a normalization and character dimensions after the normalization.

Generally, it is hard to convert a loop program like $$\text{for } i=1 \text{ to } N \ [a(i) = b[h(i);] \quad (4)$$

whose right-side variable is written in the form of a function, to a systolic algorithm. Thus, equation (4) is redundantly rewritten into the following double loop program.

$$\text{for } i=1 \text{ to } N \ ]\text{for } t=M_1 \text{ to } M_2 \ [a(i) = \text{if } t==h(i) \text{ then } b(t) \text{ else } a(i);]] \quad (5)$$

where h(i) takes only an integer between $M_1$ and $M_2$. It is easily understood that equations (4) and (5) are the same. By performing such a conversion, a systolic array realizing equation (4) is obtained.

A loop program shown in FIG. 13 is obtained by applying this conversion to equation (3) and rewriting the condition with the conversion function F(i), where it is expressed as an array F[i].

Normalizing systolic array

Figure 15:
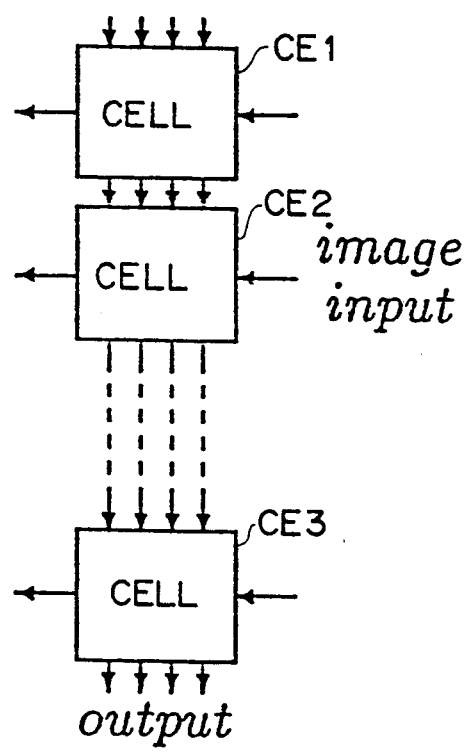
FIG. 15 shows a schematic view of an array in the normalization module using the first principle of this invention.

FIG. 15 shows a schematic view of an array in the normalization module 16 using the first principle of this invention.

Figure 16:
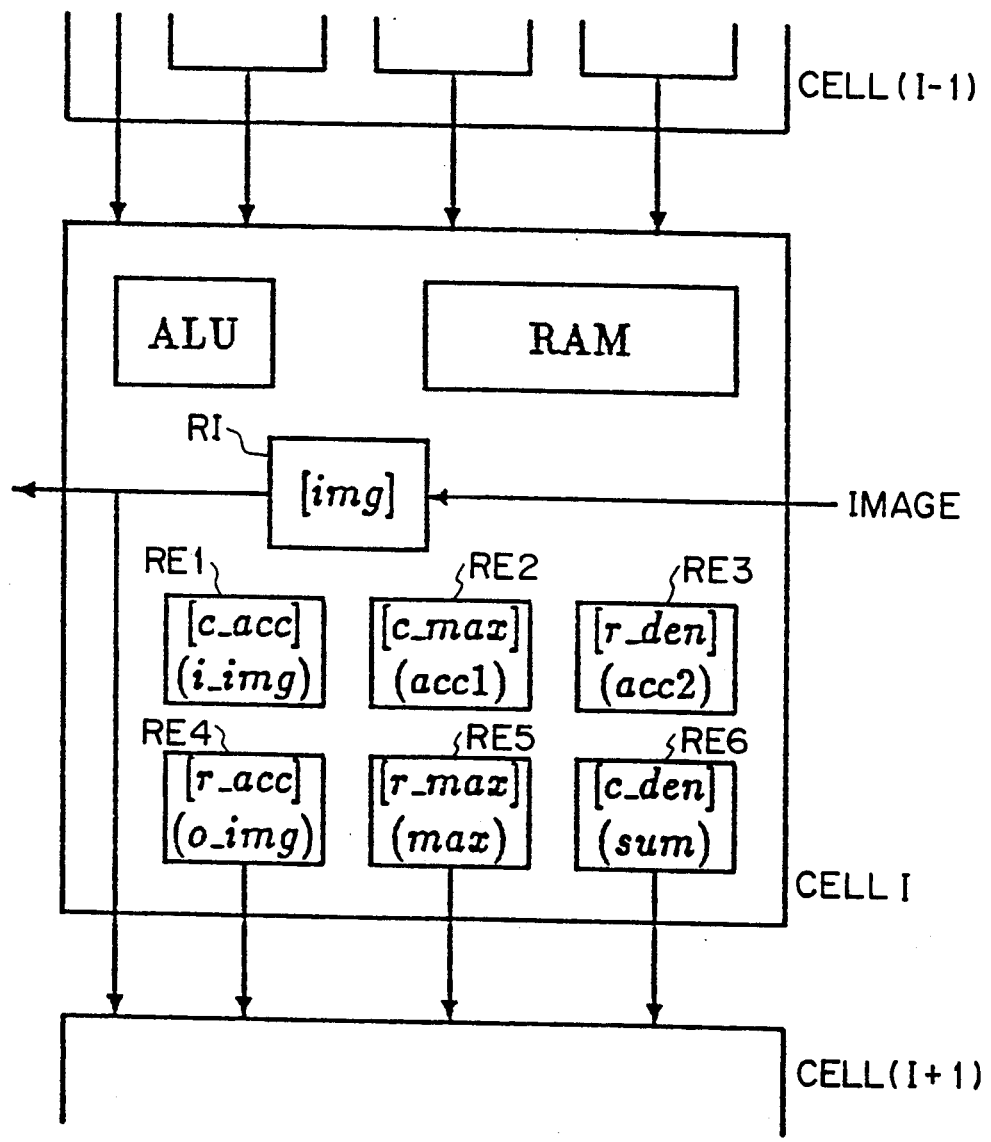
FIG. 16 shows a configuration of a cell in the normalization module using the first principle of this invention.

FIG. 16 shows a configuration of a cell in the normalization module 16 using the first principle of this invention.

By creating conversion functions from the normalizing loop programs shown in FIGS. 12 and 13, a uni-dimensional systolic array comprising M pieces of cells for normalization is configured as shown in FIG. 15.

A cell has a function of adding and comparing the register values and comprises a logical operation circuit ALU, six (6) registers RE1 through RE6 for storing computed values, one (1) register RI for inputting image data, and a memory circuit RAM for describing a cell function. Among them, four (4) registers RE4, RE5, RE6 and RI are capable of sending a value to a neighboring cell. Names of values memorized in registers at a creation of a conversion function and at a normalization are respectively put in parentheses [ ] and ( ) for describing cell functions.

The memory circuit RAM stores a microprogram for describing a cell function beforehand. Each cell updates the values of respective registers RE1 through RE6 and RI.

Next, inputting data into this systolic array and a cell function of CELL(i) are explained, where the input from the register of CELL(i−1) is expressed as r(−1) and the operation starting time is set as t=1.

Creation of a conversion function by a systolic array

Figure 17:
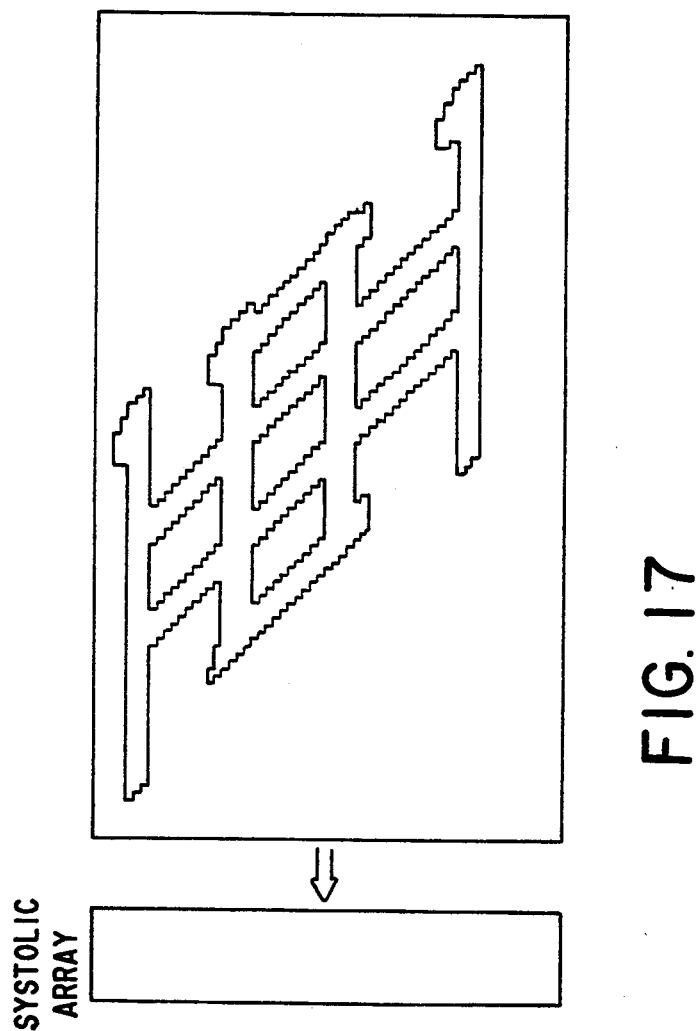
FIG. 17 shows an input sequence of shifted data in the normalization module using the first principle of this invention.

FIG. 17 shows an input sequence of shifted data in the normalization module 16 using the first principle of this invention.

The values of registers RE1 through RE6 and RI are all set to 0 in a cell initialization. When data are inputted, the picture element of row i and column (t−i+1) of the inputted image is inputted to CELL(i) at time t. As a result, data shifted by a row are inputted as shown in FIG. 17.

CELL(i) obtains the following values from the loop program shown in FIG. 12 and stores them in respective registers RE1 through RE6 and RI.

```
r_den = if img==0 and input==1
              then r_den+1
         else r_den;
r_acc = if r_den==0 and r_acc(−1)
              ==0 then 0
         else r_den*b+r_acc(−1)+1;
r_max = if r_den==0 then r_max(−1)
         else r_acc;
c_den = if img(−1)==0 and input==1
              then c_den(−1)+1
         else c_den(−1);
c_acc = if c_den==0 and c_acc==0 then 0
         else c_den*b+c_acc+1;
c_max = if c_den==0 then c_max
         else c_acc;
img = input;
where CELL(1) operates as
r_acc(−1)=r_max(−1)=c_den(−1)=0
``` because there is no neighboring cell and data are not inputted. The value of b is ordinarily 1 (for a non-linear normalization) or 0 (for a linear normalization). Such multiplications as a doubling and a quadrupling can be realized by shifting data without using an adder.

When data are outputted, the creation of a conversion function is completed at clock 2M, and the value of row i of a conversion function in the row direction is stored in register r_acc of CELL(i). The value of the column j of a conversion function in the column direction is outputted from register c_acc of CELL(M) at time $t=M+j$. In addition, the maximum values H and W in the row and column directions become register values r_max and c_max of CELL(M) at an operation completion time (at time $t=2M$).

Operation at a normalization

At a cell initialization, the value of register RE1 i_img stores all data (of M bits) for row i of the inputted image through a register RI for inputting image data (or directly) and sets the values of registers RE2 and RE3 to the values of $D*F(i-1)$ and $D*F(i)$, respectively. However, at a normalization in the column direction, the column direction conversion function G(j) is used instead of F(i).

The following functions are determined as the cell functions from the loop program shown in FIG. 13.

```
max = max(-1);
sum = if max = = 0 than 0
        else sum+max;
o_img = if acc1 < sum and sum≠acc2
            then i_img
        else o_img(-1);
However, CELL(1) is set as
o_img(-1)=0, max(-1)=r_max
``` where r_max is the maximum in the row direction obtained at the creation of the conversion function. At a normalization in the column direction, the maximum in the column direction c_max is obtained.

When data are outputted, a normalization is completed at clock M.D, and row i of the image after the normalization is outputted from the value o_img of register RE4 of CELL(M) at $t=M+i$. If the value i_img of the register RI cannot be anything but of N bits (where $N<M$), normalizations are performed by N columns. Values acc1 and acc2 of registers RE2 and RE3 can be computed without using a multiplier by substituting "+1" with "+D" by the cell functions at the creation of the conversion-function.

Whereas a non-linear normalization by a systolic array is explained above, various normalizations are further explained below.

By changing data in the registers by using a systolic array for a normalization, various normalizations considered to be useful in character recognition are realized. Although a changing method in the row direction is explained below, a changing method in the column direction is realized in an essentially similar manner. Also, the changing methods in the row and column directions can be mixed.

Below, value acc2 stored in register RE3 in CELL(i) and value acc1 stored in register RE2 in CELL(i+1) are set as $F(i)*size+pos$, and the value substituted into register RE5 in CELL(1) is described as max. Various normalizations are realized by how concretely size, pos and max are provided. In an ordinary normalization, size=D, pos=0, and max=r_max.

When an object of a character recognition is set as a printed character of a word processor in a designated size normalization, there are various points to be chosen. Although there is a method of normalizing characters of all the different fonts into the same size for recognition, since characters of different points have different fonts and they need to be recognized separately, it is better to be able to freely vary the size after a normalization rather than to fix it at D by D dots.

When such normalizations are performed, since the image after the normalization does not occupy the entire area of D by D dots, a blank area arises. Therefore, it is convenient if a character area can be placed in a designated area.

To enable a normalization to make the size d, size=d and max=r_max are satisfied. The values of pos differ according to the arranged position, and

```
           0                  (placed upward)
pos =  (D-d)*r_max/2          (placed centrally)
       (D-d)*r_max            (placed downward)
```

When an adder is not employed, d is limited to an integer exponent of two (2).

If vertically long or horizontally long characters such as "1" or "−" are normalized in an ordinary manner with the same ratios in both vertical and horizontal directions, since the clock picture element area extends to the entirety frame of D by D dots, information of the original form is lost. At such a time, it is desirable to normalize a character in the vertical and horizontal directions with the same ratios.

If an inputted image is vertically long, the normalization in the row direction is ordinary. If it is horizontally long (c_max > r_max), for normalizing in both directions with the same ratios,

```
size = D
max = c_max
            0                      (placed upward)
pos = D*(c_max-r_max)/2            (placed centrally)
      D*(c_max-r_max)              (placed downward)
```

This idea can be combined with a designated size normalization, and a normalization to fit a character into a frame of d by d dots with the same ratio vertically and horizontally becomes possible.

When a recognition is performed by a pattern matching method in a position normalization, a magnification, a contraction or a transformation is not performed and a normalization is only necessary for adjusting a position. For performing such a normalization,

```
size = 1
max  = 1
            0                 (placed upward)
pos  = (D-r_max)/2            (placed centrally)
       (D-r=max)              (placed downward)
```

Figure 18:
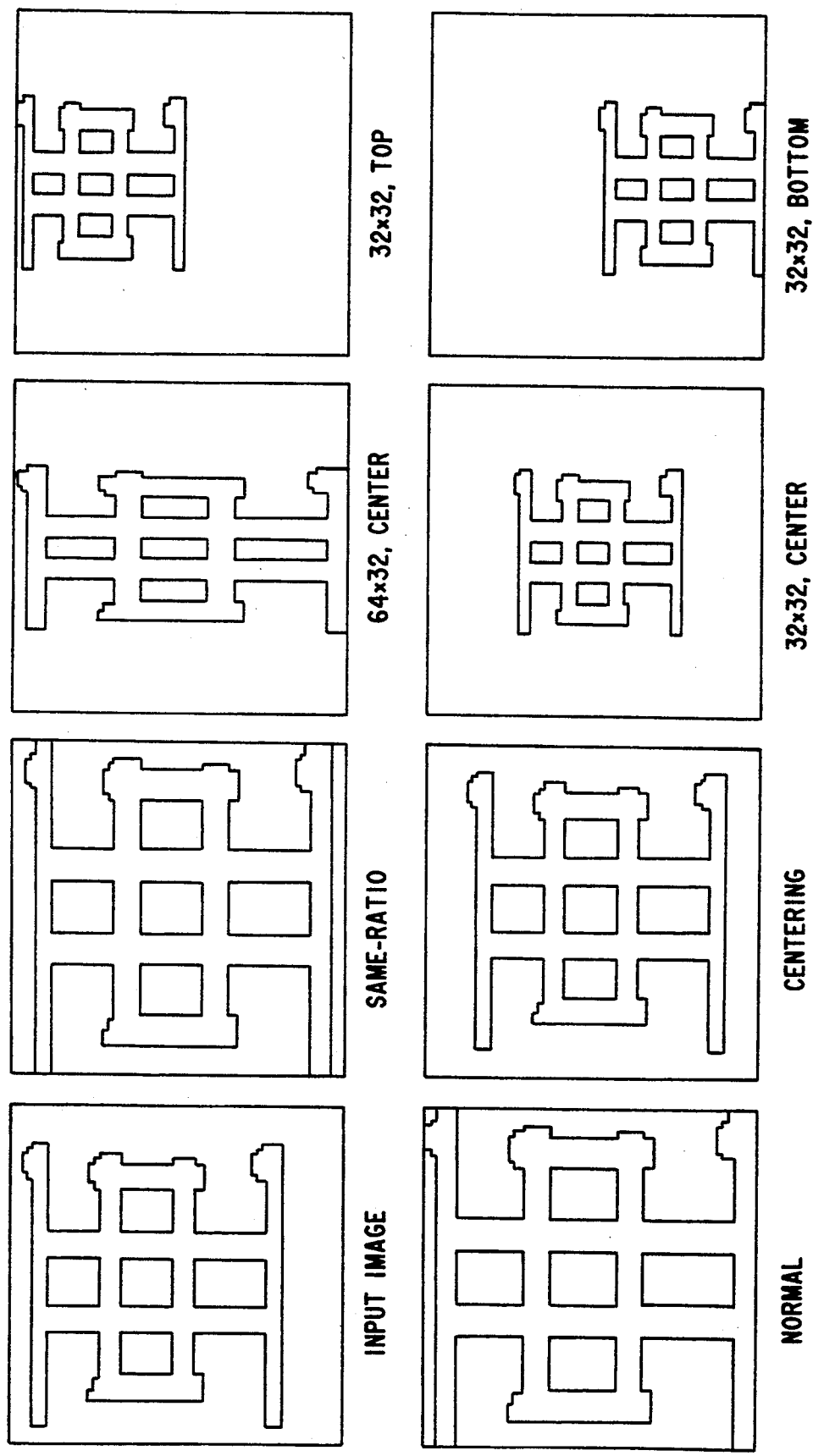
FIG. 18 shows various examples of normalizations of the same character in the normalization module using the first principle of this invention.

FIG. 18 shows various examples of normalizations of the same character in the normalization module 16 using the first principle of this invention. More specifically, FIG. 18 shows an example of an actual performance of the above three (3) kinds of normalizations with the systolic array shown in FIG. 16.

Whereas normalizations using embodiments of this invention are explained in detail above, application of embodiments of this invention to character extraction is explained below.

A systolic array for a normalization is applied to an obliqueness adjustment and to a histogram calculation of black picture elements necessary for a character extraction, where data handled are assumed to be two-value images of M by N dots. N is equivalent to the horizontal length of inputted image data.

Histogram calculation

FIG. 19 shows an algorithm for a histogram calculation in the normalization module 16 using the first principle of this invention.

A histogram is calculated by an algorithm, which is described by the loop program shown in FIG. 19. This program is similar to those used in creating conversion functions for normalizations. Cell functions are realized without changing the data inputting method, as follows.

$$r\_den = \text{if } input == 1 \text{ then } r\_den + 1$$
$$\text{else } r\_den;$$
$$c\_den = \text{if } input == 1 \text{ then } c\_den(-1) + 1$$
$$\text{else } c\_den(-1);$$

Although no other registers are used unless anything but a histogram is calculated, if register RE4 with value r_acc and register RE1 with value c acc are used and cell functions are defined as $$r\_acc = r\_den + r\_acc(-1);$$

$$c\_acc = c\_den + c\_acc;$$

it becomes possible to obtain the accumulation value of a histogram in the row and column directions and the number of black picture elements in the entire image. Some algorithms for extracting characters are thought to use these values.

Obliqueness adjustment

Figure 20:
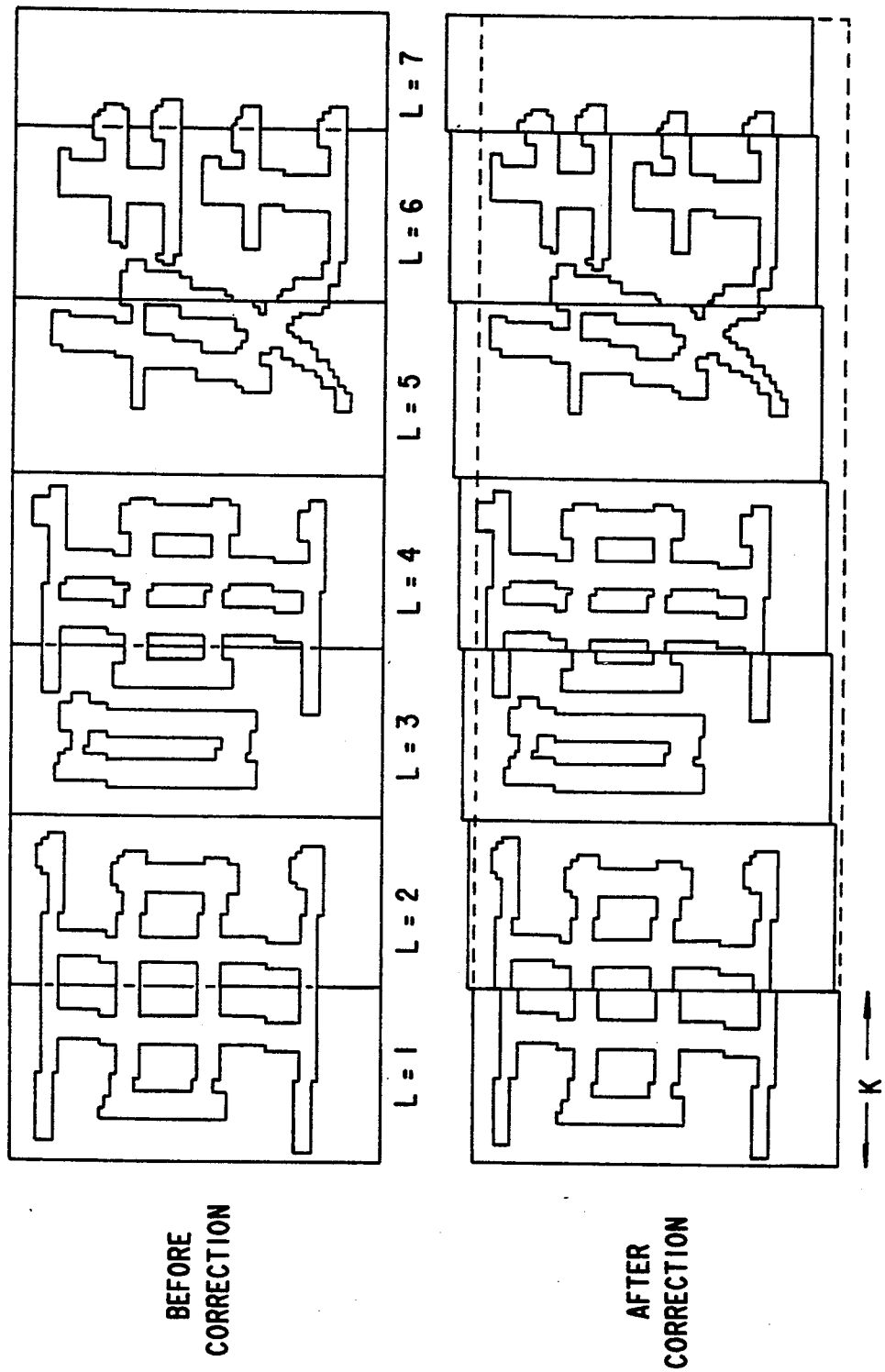
FIG. 20 shows adjustments of obliquenesses in the normalization module using the first principle of this invention.

FIG. 20 shows adjustments of obliquenesses in the normalization module 16 using the first principle of this invention.

As shown in FIG. 20, for obliqueness adjustment, an inputted image is divided into blocks every K rows and the "L"-th block is shifted up or down by L−1 rows. Here, obliqueness is assumed to be small and K is a value for adjusting the obliqueness by shifting blocks as described above and is a constant obtained from the obliqueness of the inputted image. These obliqueness adjustments are considered as position normalizations for respective blocks. The operations for handling "L"-th block are as follows.

In a cell initialization, register RE1 with value i_img stores data (of K bits) of row i of the inputted image. Data are not inputted.

CELL(i) has the following cell functions.

$$\max = \max(-1);$$
$$o\_img = \text{if } \max == i \text{ then } i\_img$$
$$\text{else } o\_img(-1);$$

However, at CELL(1)

$$o\_img(-1) = 0;$$
$$\max(-1) = t + L - 1 \text{ (Shifted upward)}$$
$$t - L + 1 \text{ (shifted downward)}$$

where t and L represent time and block number, respectively.

In outputting data, operations by respective blocks terminate at clock 2M and the row i of the image after conversion is outputted from register RE4 having value o_img in CELL(M) at time t=M+i.

Whereas the embodiments of this invention are explained in conversion function creation, normalization, histogram calculation and obliqueness adjustment, their processors can be similarly configured. Furthermore, since an arithmetic/logic unit ALU for comparison and addition can be used in a processor composing a cell, such a processor can be configured with LSI's with far fewer elements than conventional processors. Also, mere program changes enable various processings.

More detailed explanations of the principle of the conversion table creation module 17 and its circuit follow.

Figure 21:
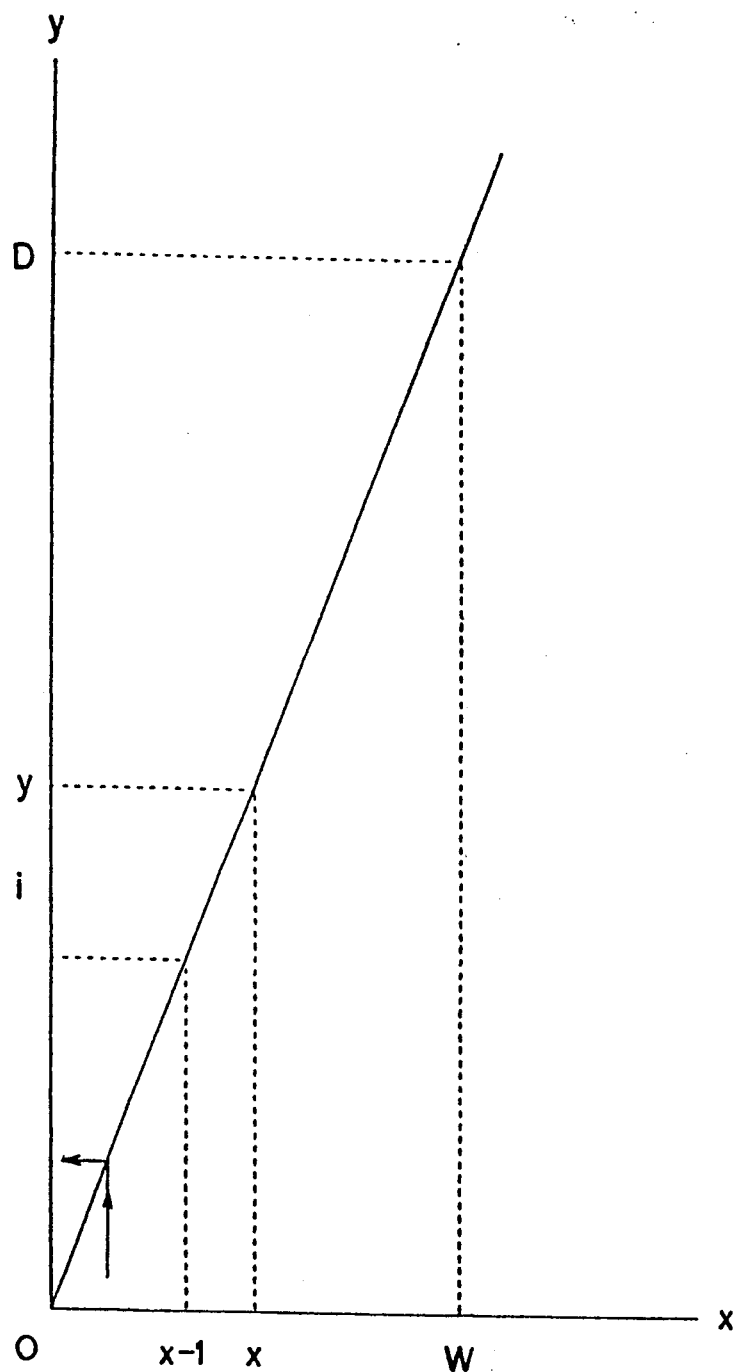
FIG. 21 explains the principle of magnification by the row-histogram module and the column-histogram module using the second principle of this invention, which utilizes a systolic array.

FIG. 21 explains the principle of magnification by the row-histogram module 13 and the column-histogram module 14 using the second principle of this invention, which utilizes a systolic array.

Figure 2B:
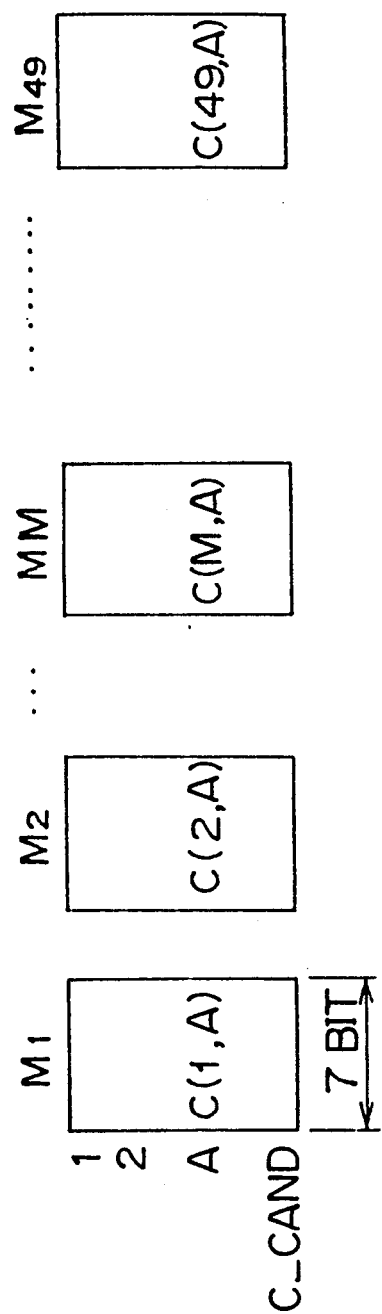

When the normalization module 16 in FIG. 2 performs a magnification or a contraction, a size of a character extracted by a read control module 15 in a character area needs to be obtained. This is because characters must be made the same size to ensure a good recognition rate in the recognition processings shown in the embodiments of this invention. FIG. 21 explains the principle for magnification, in which a processing is performed to change the area $0 \leq X \leq W$ on the X axis to the area $0 \leq Y \leq D$ on the Y axis.

After the magnification principle is explained, circuit operations of the conversion table creation module 17 and normalizations are explained in detail.

When X and Y are any real numbers, X on the X axis corresponding to Y on the Y axis are expressed as $$X = W*Y/D.$$

Thus, coordinate X on an original graphic corresponding to coordinate I on a magnified graphic satisfies $$X - 1 < W*I/D < X = \qquad (6)$$

where I is an integer being $1 \leq I \leq D$ and X is an integer. By transforming equation (6), $$D(X - 1) < W*I \leq DX \qquad (7)$$

is obtained. Consequently, by substituting coordinate I for the coordinate X, a magnified graphic transformed to width D is obtained.

Because inputted image data are thus normalized, character width W of the inputted graphic must be determined and histograms in horizontal and vertical directions are created, that is a conversion table is created.

If the column histogram is linear, it is obtained by assigning 1 to the value of the column to which leftmost point contained in the character area on the image data belongs and by sequentially incrementing the values of the columns to the right by 1. Similarly, if the row histogram is linear, it is obtained by assigning 1 to the value of the row to which the uppermost point contained in the character area on the image data belongs and by sequentially incrementing the values of the rows below by 1. The conversion table creation module 17 determines the width W of this character and the head ends of the column and the row.

Figure 22:
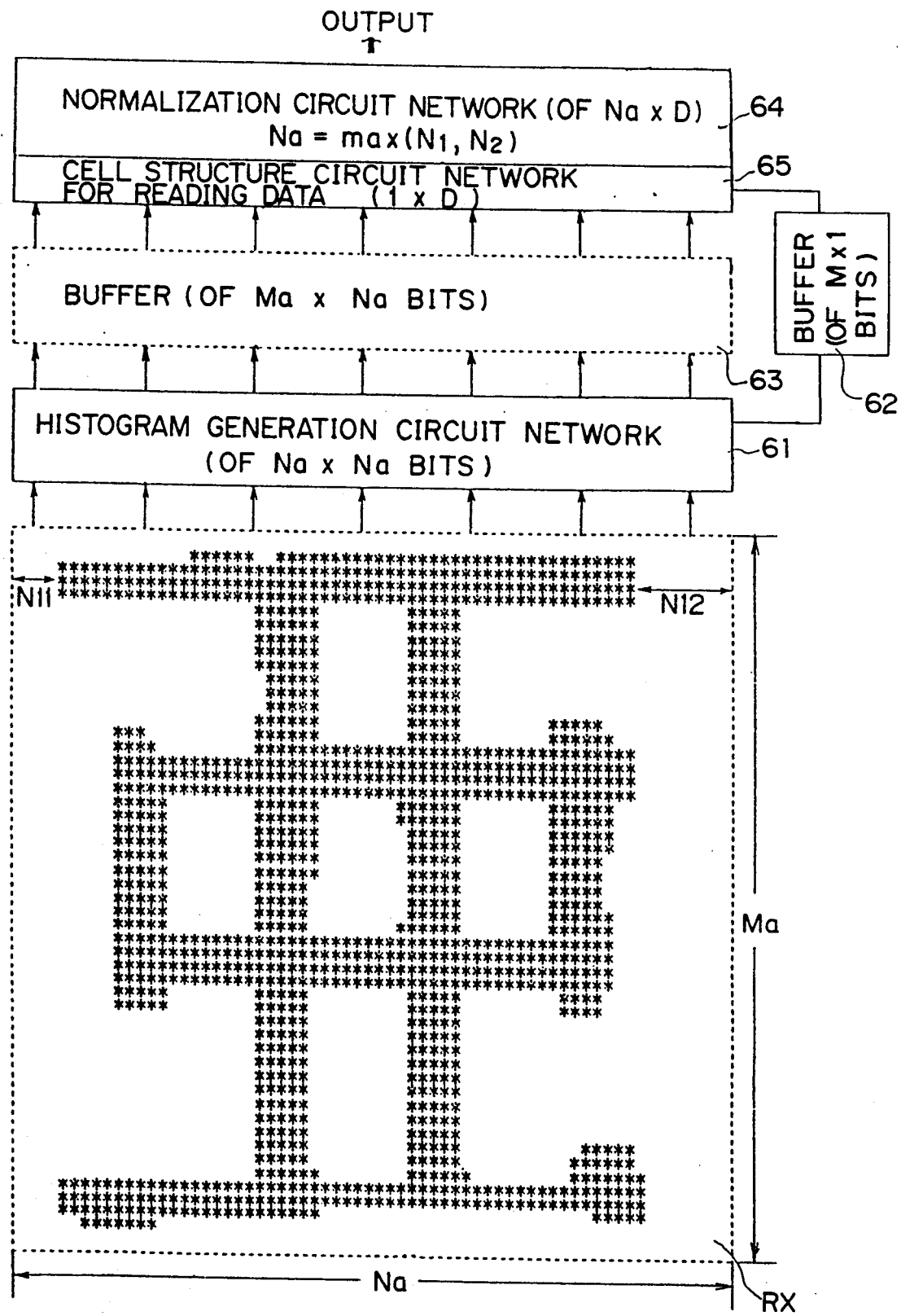
FIG. 22 shows the configurations of the row-histogram module and the column-histogram module using the second principle of this invention, which utilizes a systolic array.

FIG. 22 shows the configurations of the row-histogram module 13 and the column-histogram module 14 using the second principle of this invention, which utilizes a systolic array.

Figure 23:
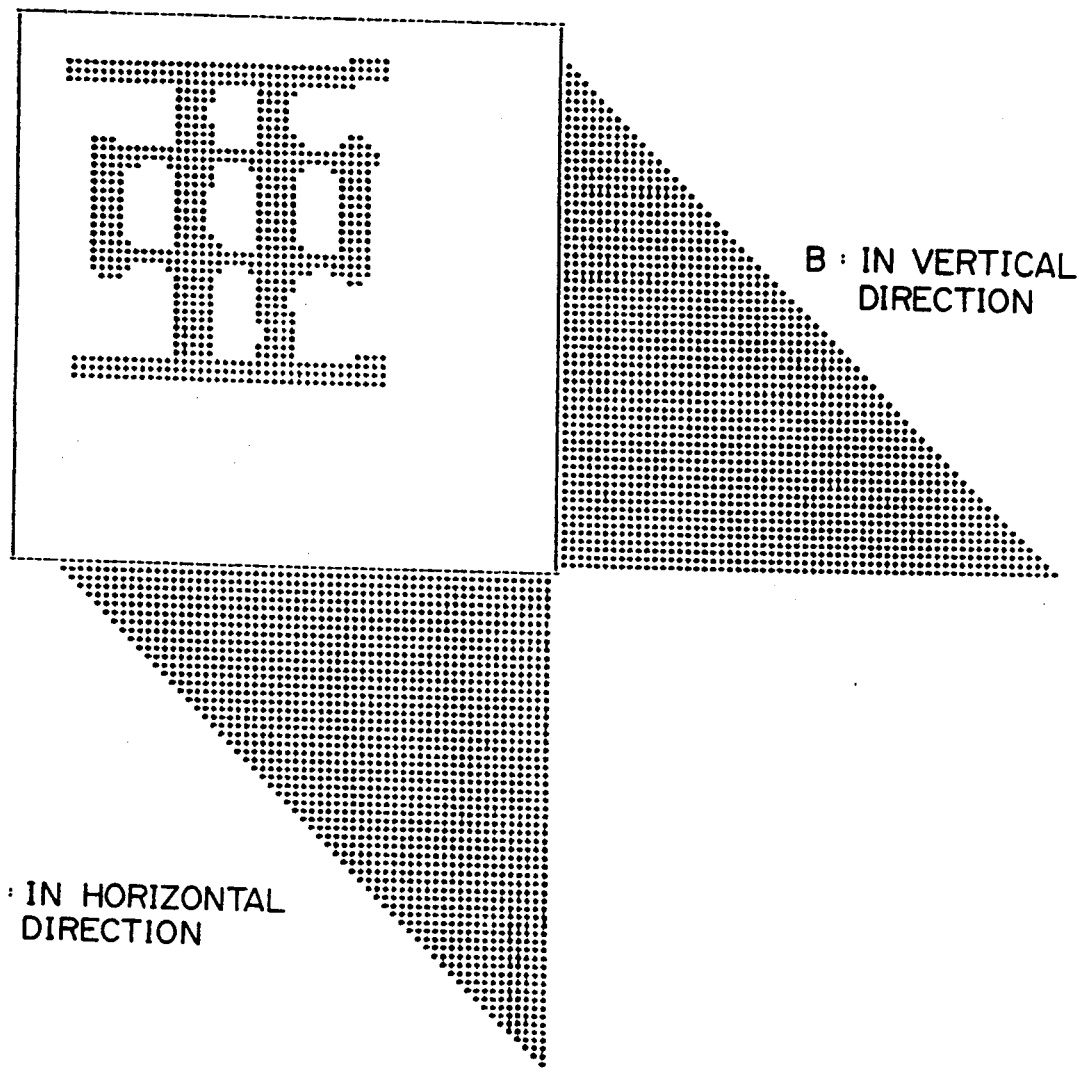
FIG. 23 shows exemplary histograms in the vertical and horizontal directions of the row-histogram module and the column-histogram module using the second principle of this invention, which utilizes a systolic array.

FIG. 23 shows exemplary histograms in the vertical and horizontal directions of the row-histogram module 13 and the column-histogram module 14 using the second principle of this invention, which utilizes a systolic array.

An image RX extracted by the read control part 15 (Refer to FIG. 2A.) is inputted into a histogram generation circuit network (of NA*NA bits) 61 which is for obtaining histograms of the vertical and horizontal directions and the width of the inputted character shown in FIG. 23. The histograms in the vertical direction is stored in a buffer (of MA*1 bits) 62 as values in a row unit. The histograms in the horizontal direction is directly supplied to a normalization circuit network (of nA*D bits) 64 from the histogram generation circuit network (of NA*NA bits) 61.

The histogram generation circuit network (of NA*NA bits) 61 has a systolic array structure of NA*NA bits, and image data passing through the histogram generation circuit network (of NA*NA bits) 61 are stored in a buffer (of NA*NA bits) 63. That is, the image RX is finally stored in the buffer (of MA*NA bits) 63. In FIG. 2A, since the output from the read control module is supplied directly to the normalization module 16, the buffer (of MA*NA bits) 63 is not required in this case or could be provided in the normalization module 16.

The histograms in the vertical and horizontal directions obtained by the histogram generation circuit network (of NA*NA bits) 61 are supplied to and control the operations of the normalization module 16. The normalization circuit network (of nA*D bits) 64 is for a normalization in the horizontal direction (in column units). A normalization in the vertical direction (in row units is performed by reading data in dot-row units by a cell structure circuit network (of 1*its) 65 for reading data from the buffer (of MA*NA bits) 63. That is, the cell structure circuit network (of 1*D bits) 65 for reading data performs necessary computations for normalization in the horizontal direction by contemporaneously performing normalization in the vertical direction, and outputs the values and inputted data to the normalization circuit network (of nA*D bits) 64.

The cell structure circuit network (of 1*D bits) 65 for reading data is for a normalization in the vertical direction and reads a row corresponding to row t of the graphic after being normalized at time t, where t=1 is defined as the time whereat the normalization circuit network (of nA*D bits) 64 and the cell structure circuit network (of 1*D bits) 65 for reading data start to operate. The cell structure circuit network (of 1*D bits) 65 for reading data reads row i' of the inputted image at time t so that $$D*h2(i'-1) < tL \leq D*h2(i') \quad (8)$$

is satisfied. In other words, if the cell structure circuit network 65 for reading data reads the inputted image and the histogram in the vertical direction (direction of sequentially reading rows), until the histogram values satisfy equation (8), a normalization in the vertical direction is performed. Thus, a cell can perform a processing such that while (tL > D*h2(i') && i' < M) read data && histogram;

When a normalization in the horizontal direction is performed, a processing satisfying equation (7) is performed. The cell having the value of the histogram in the horizontal direction and column J for calling in the horizontal character width W computes D*h1(j−1), jW and D*h1(j) and performs conversion such that if D*h1(j') < jW then j→j−1 and if jW < D*h1=(j'−1) then j→j+1 where j is a column of the normalized graphic and j' is a column of the inputted graphic.

These operations of the normalization circuit network (of na*D bits) 64 and the cell structure circuit network (of 1*D bits) 65 for reading data normalize the inputted image in the horizontal and vertical directions, thus producing a normalized graphic of D*D bits.

The histograms of the inputted character is required for the above normalization. The histogram generation is explained further in detail below.

Figure 24:
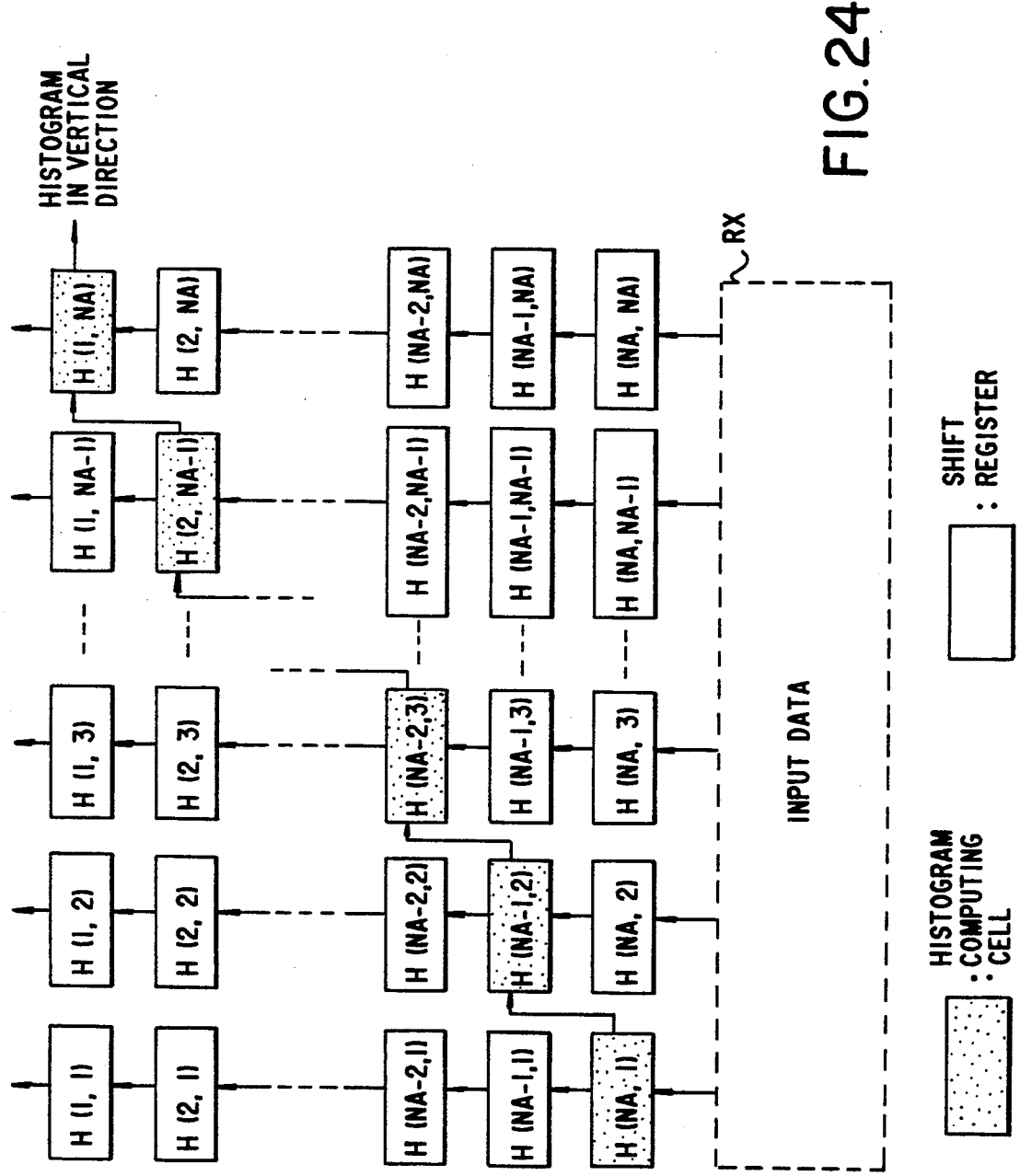
FIG. 24 shows the histogram generation circuit network of the row-histogram module and the column-histogram module using the second principle of this invention, which utilizes a systolic array.

FIG. 24 shows the histogram generation circuit network of the row-histogram module 13 and the column-histogram module 14 using the second principle of this invention, which utilizes a systolic array.

Respective cells H(1,1) through H(Na,Na) comprise a histogram computing cell or a shift register. As shown in FIG. 22, inputted data RX of MA*NA bits are supplied in dot-row units to histogram computing cell H(NA,1) and shift registers H(NA,2) through H(NA,NA). An output from histogram computing cell H(NA,1) is supplied to shift register H(NA−1,1), and an output from shift register H(NA,2) is supplied to histogram computing cell H(NA−1,2). Further, output shift registers H(NA,3) through H(NA,NA) are supplied to shift registers H(NA−1,3) through H(NA−1,NA).

That is, histogram computing cells are sequentially provided to the leftmost position in the lowermost row, the second leftmost position in the second lowermost row, the third leftmost position in the third lowermost row, and so forth, to the rightmost position in the uppermost row, and data are sequentially outputted to the next histogram computing cell in this order.

In other words, first, cell H(NA−1,1) through H(1,1) are provided as shift registers each corresponding to a dot, and cell H(NA,1) is provided as a histogram computing cell. Second, the second cell H(NA−1,2) is provided as a histogram computing cell. Third, the third cell H(NA−2,3) is provided as a histogram computing cell. Similarly, histogram computing cells are sequentially provided up to the last cell H(1,NA). The respective histogram computing cells sequentially output the results to the next ones right and above in dot units.

These respective histogram computing cells and shift registers output data to the histogram computing cells and shift registers in the next stages in one clock cycle. The shift registers delay received data by one clock cycle.

The operations of the histogram generation circuit network in the embodiments of this invention are explained in more detail below.

The histogram generation circuit network (of NA*NA bits) 61 starts its operations at t=1. If t increments by 1 at each clock increment, the operations of the respective cells at time t are as follows.

[1] At $t \leq M$, cells H(NA,1) through H(NA,NA) read row t of the inputted data. At $M<t$, cells H(NA,1) through H(NA,NA) read 0.

[2] Histogram computing cell H(i,NA−i+1) processes data sent from shift register cell H(i+1,NA−i+1) and the operation results sent from histogram computing cell H(i+1,NA−i), according to the cell operations to be described later.

[3] Histogram computing cell H(i,NA−i+1) sends the operation results to histogram computing cell H(i−1,NA−i+2). Any cell H(i,j) in rows 1 through NA−1 send data received from cell H(i+1,j) "as is" to cell H(i−1,j).

However, because the operation results of cell H(1,NA) become the values (xwidth, xcount) of row NA-t+1 at $NA \leq t$, they are stored in the buffer (of MA*1 bits) 62. The values (ywidth, xcount) stored as the data of cell H(1,j) ($0 \leq j \leq NA$) are sent to the buffer (of MA*NA bits) 63.

The above operations are all completed at clock $MA+NA-1$, the histogram value (in the horizontal direction) of row J of the inputted data are stored in the histogram computing cell H(J,NA−J+1) of row J, and the histogram value (in the vertical direction) of row I is stored in row I of the buffer (of MA*1 bits) 62.

Figure 25:
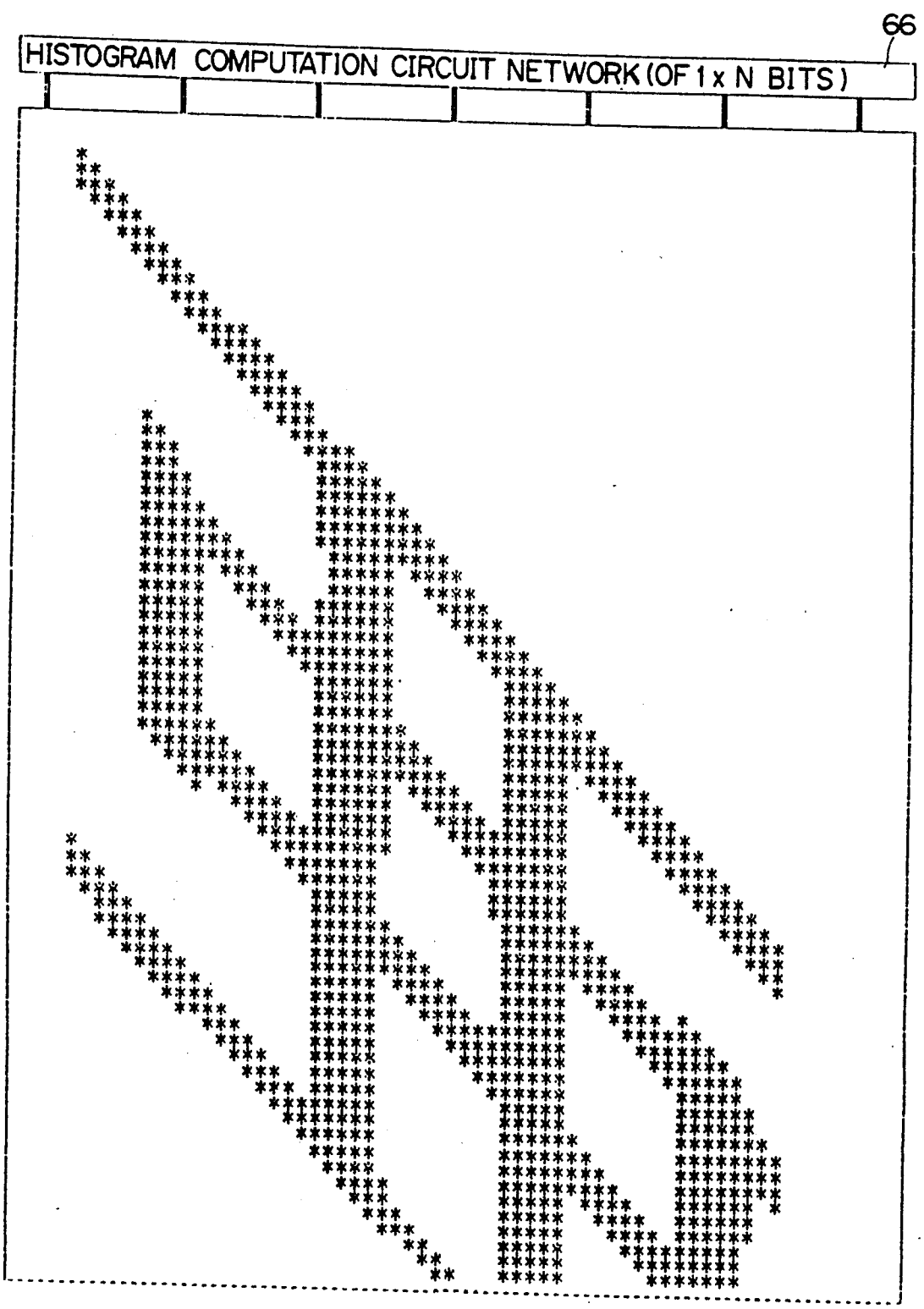
FIG. 25 shows an input sequence of shifted data of the row-histogram module and the column-histogram module using the second principle of this invention, which utilizes a systolic array.

FIG. 25 shows an input sequence shifted data of the row-histogram module 13 and the column-histogram module 14 using the second principle of this invention, which utilizes a systolic array.

When cells are positioned as shown in FIG. 24, as an example, data of row I of the inputted graphic are processed in cell H(NA,1) and the processing result and the data of the second row are processed in cell H(NA−1,2) at time $t=(I+1)$. Since data of the same row are sequentially met in this manner, the histograms in both the vertical and horizontal directions are created simultaneously. Instead of positioning cells as shown in FIG. 24, histograms arrayed in single dimension can be used to separately input data to a histogram computation circuit network 66 by delaying them by one clock cycle as shown in FIG. 25.

Whereas the operations in the horizontal and vertical directions are explained above, the operations of the histogram computing cells described earlier are explained in more detail below.

First, a linear histogram in the horizontal direction in the histogram computing cell is explained.

As described earlier, the column histogram in the horizontal direction is obtained by assigning 1 to the value of the column to which the leftmost point contained in the character area on the image data belongs and by sequentially incrementing the values of the columns to the right by 1.

Therefore, when a column of the inputted image is scanned, if the column contains a black picture element and no column to the left contains a black picture element, 1 is assigned to the histogram value of the column, and the histogram values of the columns to the right are incremented by 1. Cells in column j determine the values of the cells in column (j−1). Unless the values are less than 1, the cells in column j assign the values plus 1 to themselves.

If the values of the cells of column (j−1) are 0, when there is a black picture element in column j the values of the cells in column j become 1, and when there is no black picture element in column j the value of the cells in column j become 0. When the respective cells are provided with the processings described earlier, and the inputted image is processed sequentially from the first row, the histogram in the horizontal direction is finally obtained.

The character width can be obtained from the histogram value of the rightmost column having a black picture element on the inputted image data, because they are the same.

The histogram in the vertical direction can be similarly obtained. However, whereas functions are distributed spatially for the histogram in the horizontal direction, they are distributed time-wise for the histogram in the vertical direction.

FIG. 26 shows in detail the configuration of a linear histogram computing cell of the row-histogram module 13 and the column histogram 14 module using the second principle of this invention, which utilizes a systolic array.

A "flag" determines the existence of a black picture element in a scanning, a "count" is a histogram value, and a "width" is a character width value. An "x" and a "y" express the vertical direction and the horizontal direction. "yflag", "xwidth" and "xcount" are data sent to the right cell as a result of processing the cell value of the left column. "ywidth", "ycount" and "xflag" are data stored in the respective cells as a result of processing their own cell values. "xflag", "xcount" and "xwidth", as well as "yflag", "ycount" and "ywidth" are determined by the following expressions.

In the horizontal direction:

xflag = if data == 1 then 1
       else xflag
xcount = if xcount>0 then xcount+1
        else if xflag == 1 or data == 1 then 1
        else xcount
xwidth = if xflag == 1 or data == 1 then xcount+1
        else xwidth In the vertical direction:

yflag = if data == 1 then 1
       else yflag
ycount = if ycount>0 then ycount+1
        else if xflag == 1 or data == 1 then 1
        else ycount
ywidth = if xflag == 1 or data == 1 then ycount+1
        else ywidth If such cells are used in operations, then finally, the histogram in the horizontal direction, the horizontal character width and the vertical character width are expressed by the values of "xcount", "xwidth" and "ywidth", respectively.

Furthermore, the histogram in the vertical direction is outputted sequentially as the ycount of cell H(1,NA) after time NA.

The histogram in the horizontal direction of a nonlinear histogram computing cell is explained.

Figure 27:
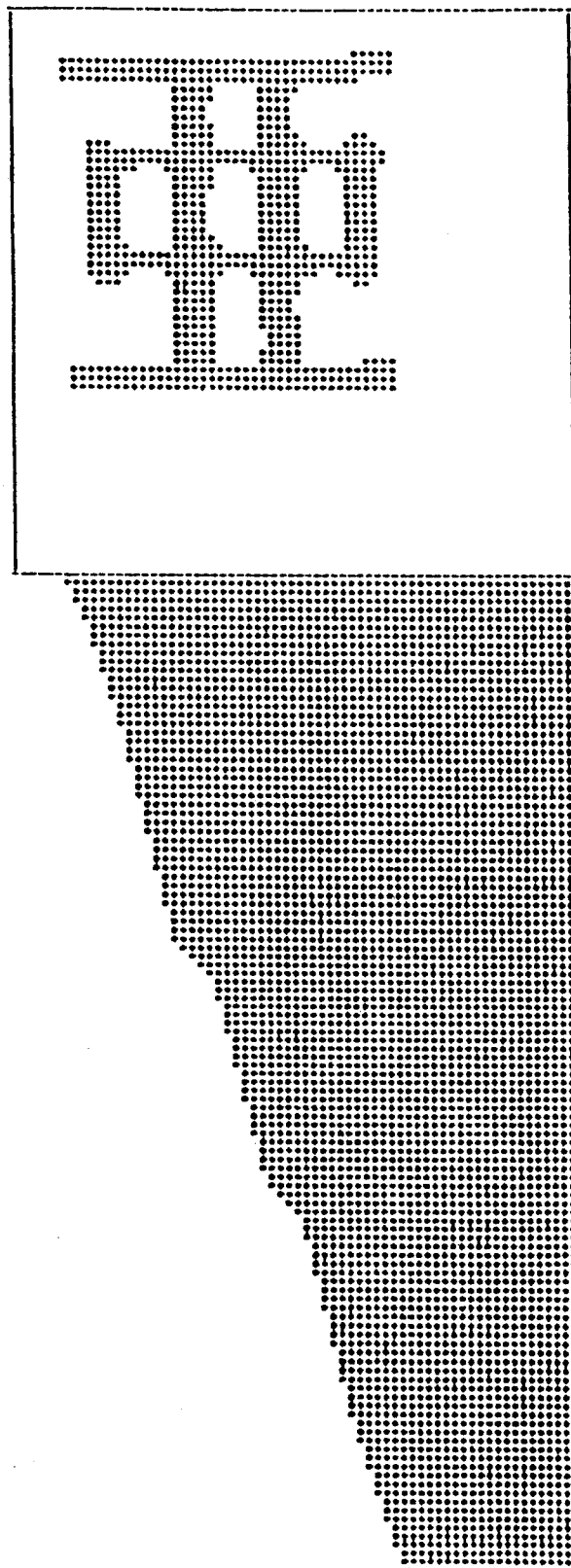
FIG. 27 shows an exemplary horizontal histogram of the row-histogram module and the column-histogram module using the second principle of this invention, which utilizes a systolic array.

FIG. 27 shows an exemplary horizontal histogram of the row-histogram module 13 and the column-histogram module 14 using the second principle of this invention, which utilizes a systolic array.

As shown in FIG. 27, in the case of a non-linear normalization, the numbers of black picture elements are counted for respective columns, which are accumulated. Therefore, the histogram computing cell H(N−j+1,j) in column j accumulates the number of black picture elements encountered in column j.

Figure 28:
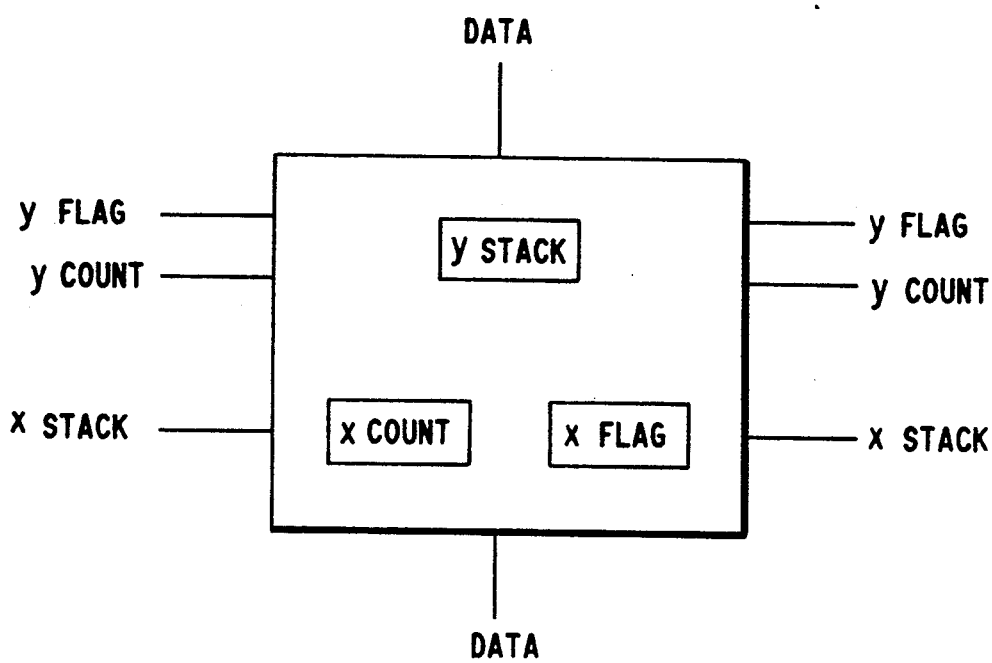
FIG. 28 shows in detail the configuration of a non-linear histogram computing cell of the row-histogram module and the column-histogram module using the second principle of this invention, which utilizes a systolic array.

FIG. 28 shows in detail the configuration of a non-linear histogram computing cell of the row-histogram module 13 and the column-histogram module 14 using the second principle of this invention, which utilizes a systolic array.

A "flag" determines the existence of a black picture element in a scanning, a "count" is a histogram value, and a "stack" is a value accumulated in the histogram at a row. "x" and "y" express the vertical and horizontal directions. "yflag", "xstack" and "ycount" are data sent to the right cell as a result of processing the cell value of the left column. "ystack", "xcount" and "xflag" are data stored in respective cells as a result of processing their own cell values. "xflag", "xcount" and "xstack", as well as "yflag", "ycount" and "ystack" are determined by the following expressions.

In the horizontal direction:

```
xflag   = if data ==0 then 0
          else 1
xcount  = if data==1 and xflag==0
          then xcount+xstack+1
          else xcount+xstack
xstack  = if data==1 and xflag==0 then xstack+1
          else xstack
```

In the vertical direction:

```
yflag   = if data==0 then 0
          else 1
ycount  = if data==1 and yflag==0
          then ycount+ystack+1
          else ycount+ystack+1
ystack  = if data==1 and yflag==0 then ystack+1
          else ystack
```

If such cells are used in operations, the histogram in the horizontal direction finally becomes the example shown in FIG. 28, the horizontal and vertical character widths are expressed by the values of "xcount" of cell H(1,NA) and "ycount" of cell H(1,NA), respectively, and the histogram in the vertical direction is sequentially outputted as "ycount" of cell H(1,NA) at and after time NA.

By configuring a histogram computing cell as above, conversion tables, which are linear or non-linear histograms, are obtained.

Figure 29:
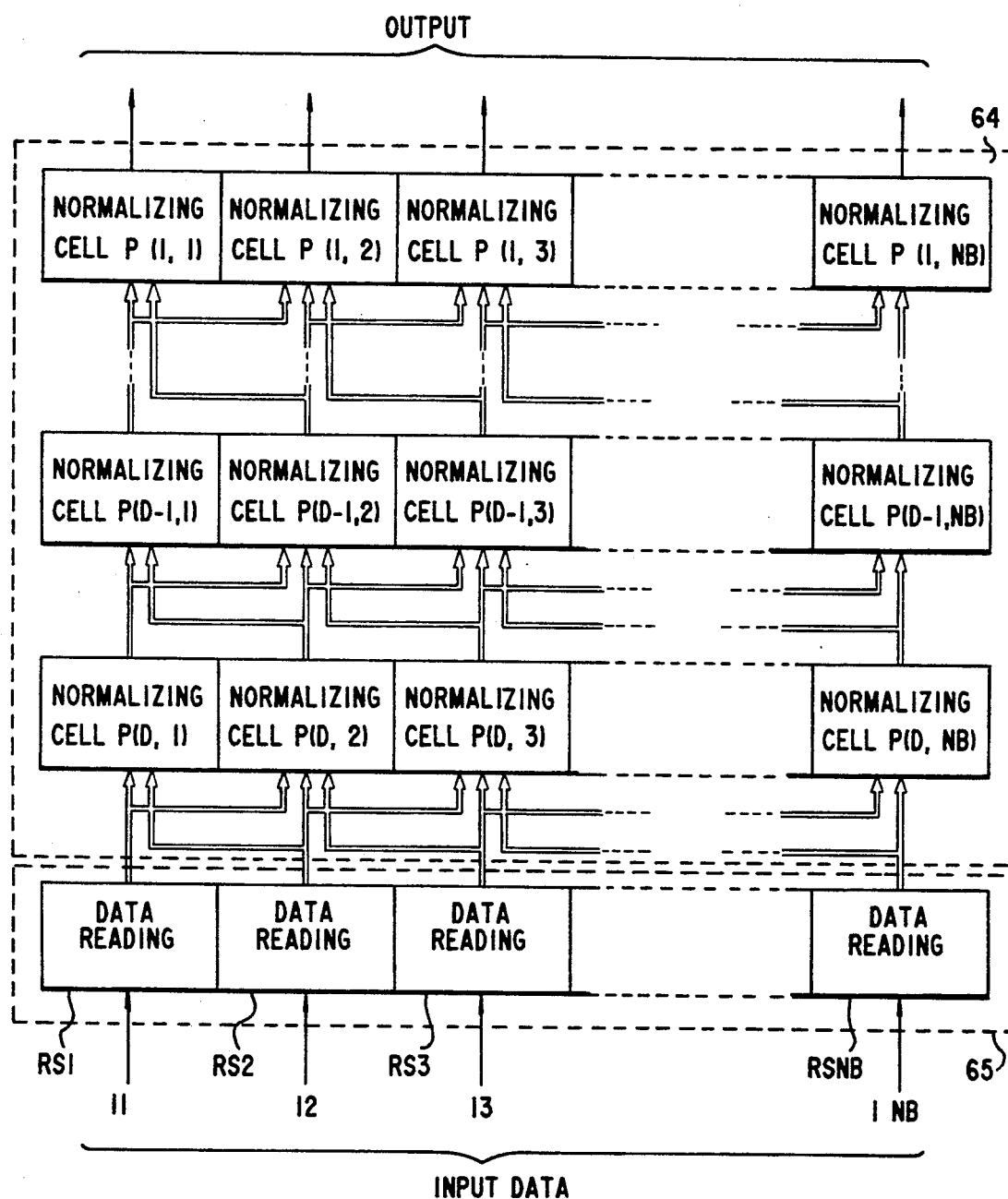
FIG. 29 shows the configuration of the normalization circuit network of the normalization module using the second principle of this invention, which utilizes a systolic array.

FIG. 29 shows the configuration of the normalization circuit network of the normalization module 16 using the second principle of this invention, which utilizes a systolic array.

The cell structure circuit network for reading data 65 (Refer to FIG. 22.) comprises data reading cells RS1 through RSn and reads data stored in the buffer (of MA*NA bits) 63 in dot-row units after the histogram generation circuit network (of NA*NA bits) 61 creates a histogram. In the embodiments of this invention, the normalization circuit network (of nA*D bits) 64 performs a normalization in the horizontal direction and the cell structure circuit network for reading data 65 performs a normalization in the vertical direction.

The cell structure circuit network for reading data 65 calculates the value necessary for a normalization in the horizontal direction by concurrently performing the earlier described normalization in the vertical direction and outputs the value and inputted data to the normalization circuit network (of nA*D bits) 64.

Figure 30:
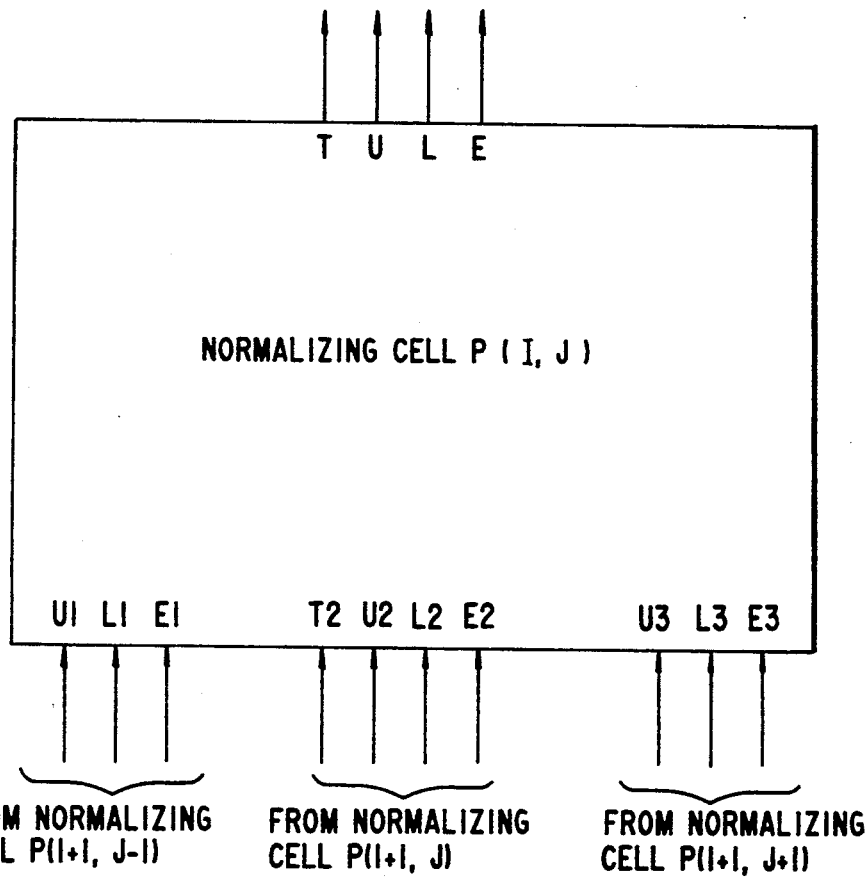
FIG. 30 shows the configuration of normalizing cells of the normalization module using the second principle of this invention, which utilizes a systolic array.

FIG. 30 shows the configuration of normalizing cells P(1,1) through P(D,NA) of the normalization module 16 using the second principle of this invention, which utilizes a systolic array.

Representative normalizing cell P(i,j) receives data t2, u2, l2 and e2 from corresponding normalizing cell P(i+1,j) in the prior state. P(i,j) also receives data u1, l1 and e1 from normalizing cell P(i+1,j−1), which neighbors to corresponding cell P(i+1,j), as well as u3, l3 and e3 from another normalizing cell P(i+1,j+1), which neighbors and is opposite to corresponding cell P(i+1,j). Each normalizing cell P(i,j) calculates data t, u, l and e from the inputs described earlier and supplies the data to a normalizing cell P(i−1,j) in the posterior stage. This normalizing cell P(i,j) performs the processings shown in FIG. 30. That is, they are expressed as follows.

```
t  = t2
u  = if l2 ≧ t2 then u1
     else if u2 < t2 then u3
     else u2
l  = if 2 ≧ t2 then l1
     else if u2 < t2 then l3
     else l2
e  = if l2 ≧ t2 then e1
     else if u2 < t2 then e3
     else e2
```

The obtained resultant data t,u, l and e are outputted to normalizing cell P(i−1,j) and neighboring normalizing cells P(i−1,j−1) and P(i−1,j+1) in the posterior stage.

By the above operations, the normalization circuit network (of nA*D bits) 64 processes a normalization in the horizontal direction.

The number of stages in the horizontal direction of the normalization circuit network (of nA*D bits) 64 described earlier corresponds to the numbers of bits n1 and n2 to be expanded to the left and right, as shown in FIG. 22. In other words, it is the greater value of the left and right margins n1 and n2 of the inputted data. That is, it is enough to input the maximum value of the dot width of the character input.

By this processing, a normalized character pattern of D*D dots is obtained.

Figure 31:
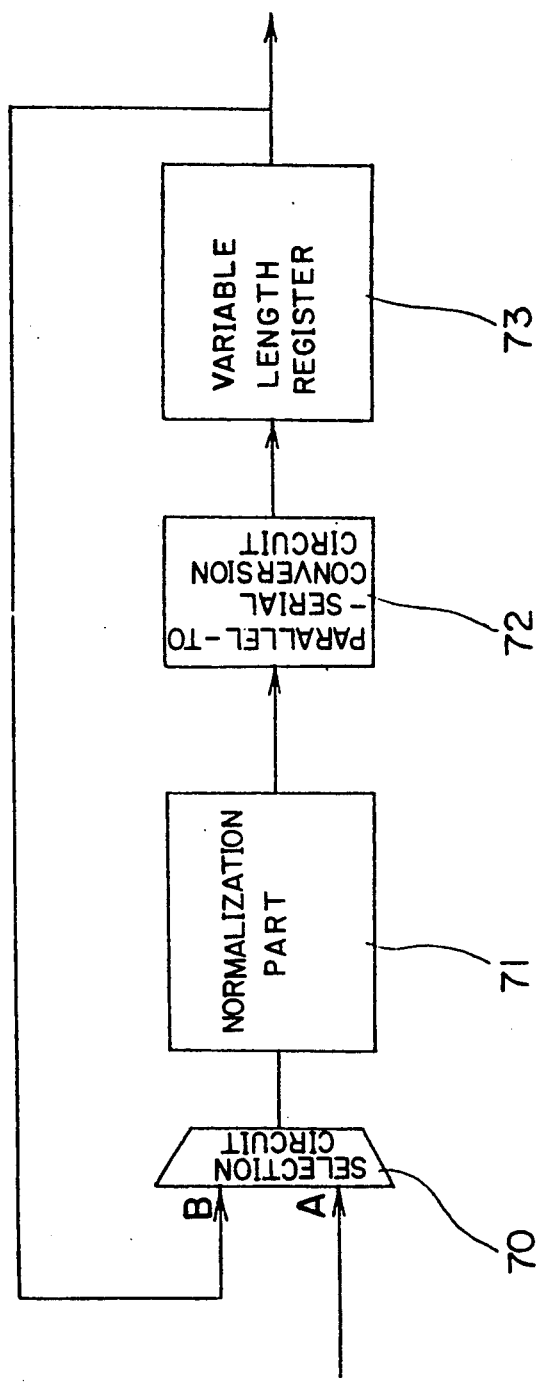
FIG. 31 shows the configuration of the normalization module using the third principle of this invention.

FIG. 31 shows the configuration of the normalization module 16 using the third principle of this invention.

A circuit configured as shown in FIG. 31 enables a normalization, other than a normalization by a systolic array described earlier.

Image data to be contracted or magnified are supplied to terminal A in dot-column units or in dot-row units. A selection circuit 70 outputs image data supplied from terminal A to a normalization part 71 by selecting them per the instruction from a control circuit not shown in the drawing.

The normalization part 71 normalizes parallelly supplied dot data in the vertical direction.

Figure 33:
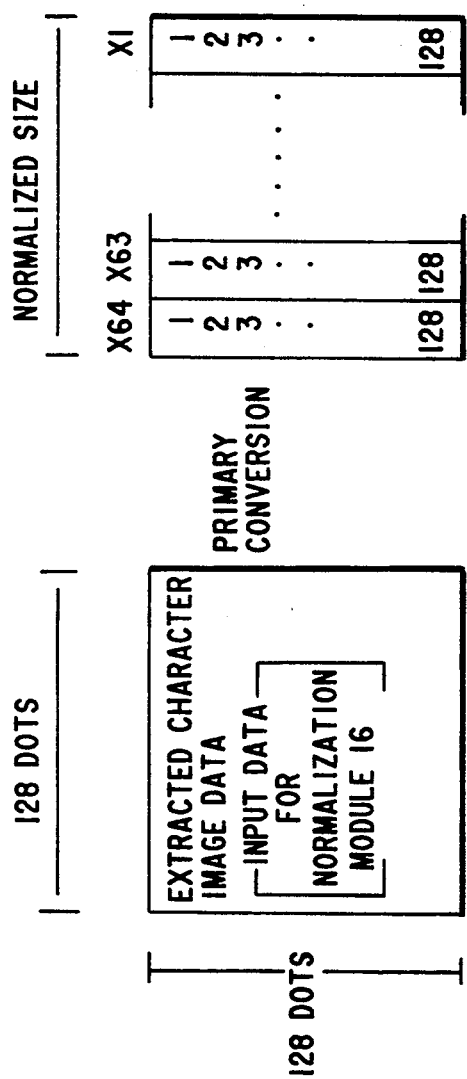
FIG. 33 illustrates the principle of the normalization module using the third principle of this invention.

FIG. 33 illustrates the principle of the normalization module 16 using the third principle of this invention.

If extracted character image data exist (e.g. of 128 dots by 128 dots of input data, for example, for normalization module 16) the normalization part 71 reads and contracts data sequentially supplied in dot-column units in the vertical direction. When the 128 dots by 128 dots are contracted (e.g., to 64 dots by 64 dots) to change one of the two sides to 64 dots (a primary conversion), data of a plurality of dot columns (two dot columns in this case) read in 128 dot units are "OR" added to be outputted as a single dot column. Normalized data outputted from the normalization part 71 (At this time, the dot number of one dot column does not change.) are supplied to a parallel-to-serial conversion circuit 72 (P/S) to be converted to serial data which are supplied to a variable length register 73.

When the normalization part 71 supplies parallel data of 128 dots in the first column to the parallel-to-serial conversion circuit 72, the variable length register 73 supplies the serial data of 128 dots in a first register. Parallel data of 128 dots of the second column are supplied to a second register.

Taking a magnification and a contraction into consideration, the variable length register 73 comprises a plurality of variable-length shift registers. In the configuration of FIG. 33, when data of 128 dots by 128 dots are inputted, serial data of 128 dots are supplied sixty-four (64) times to the variable length register 73.

Figure 35A:
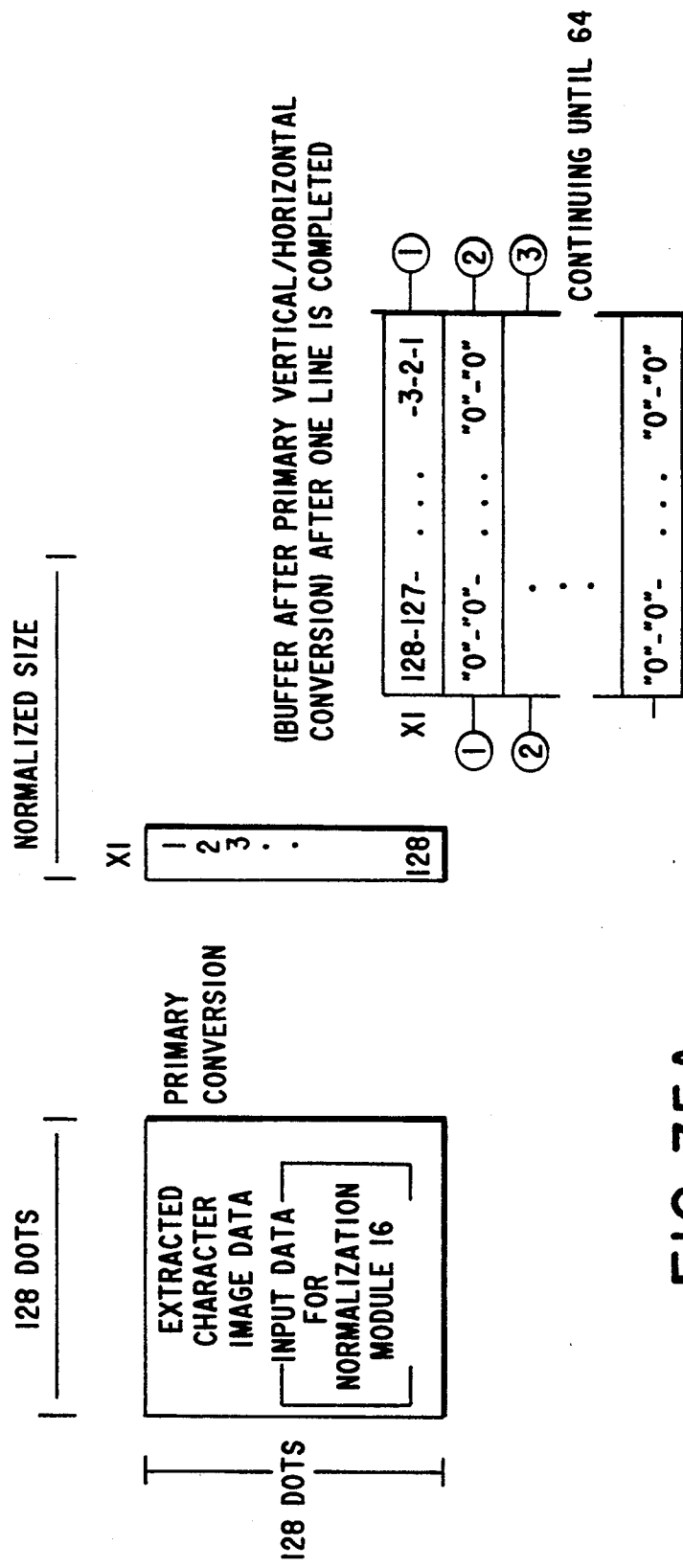
FIGS. 35A and 35B explain in detail the operations of the normalization module using the third principle of this invention.
Figure 35B:
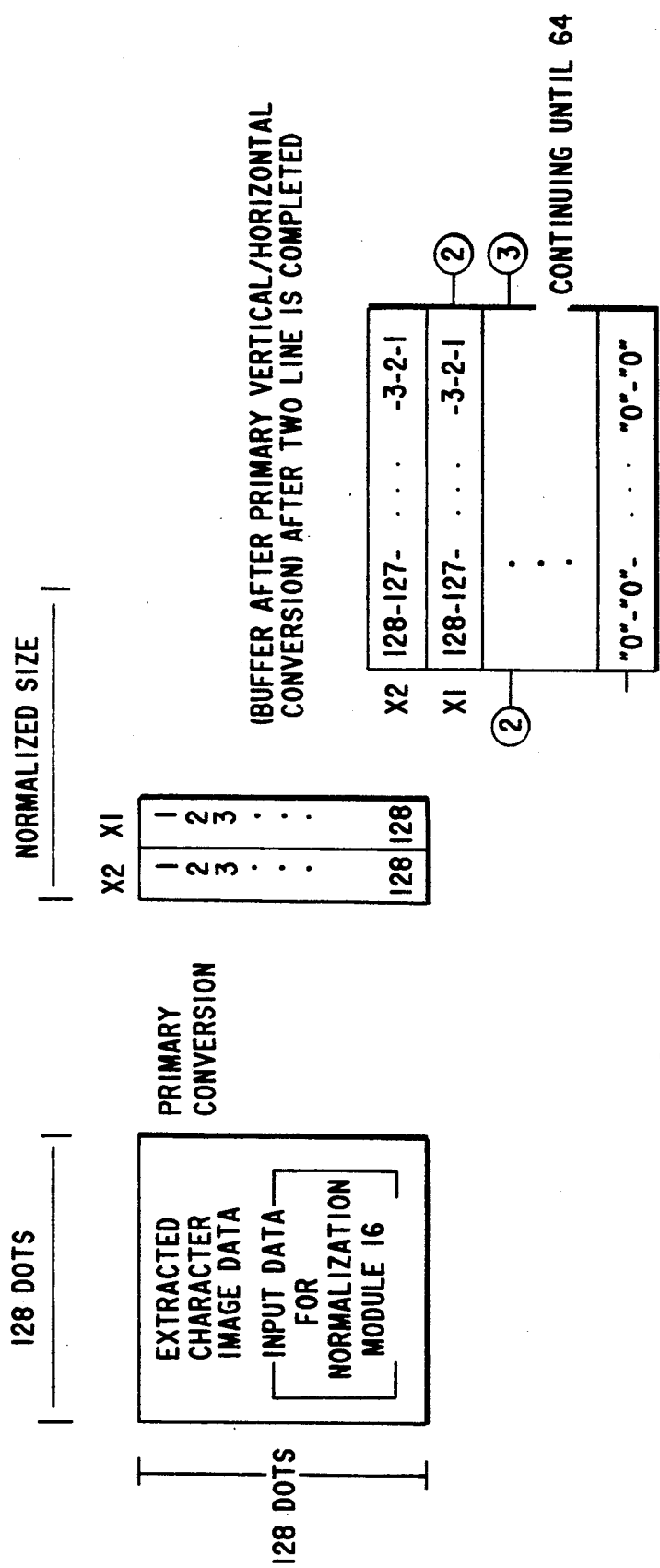

FIGS. 35A and 35B explain in detail operations of the normalization module 16 using the third principle of this invention.

In the primary conversion, as shown in FIGS. 35A and 35B, by "OR" additions for normalizing the size of 128 dots by 128 dots, a first dot column X1 through a sixty-fourth dot column X64 are outputted.

After the primary conversion is completed, the variable length register 73 outputs the result, which is supplied to terminal B of the selection circuit 70 that in turn selects and inputs data supplied to terminal B to the normalization part 71 per an instruction from a control circuit not shown in the drawing.

Since the variable length register 73 outputs head end dots respectively supplied in dot units from the parallel-to-serial conversion circuit 72, the variable length register 73 for memorizing data which have undergone the primary conversion from 128 dots by 128 dots as shown in FIG. 33 outputs the data in a 64 dot unit.

After the selection circuit 70 selects an output from the variable length register 73, the normalization part 71 contracts the character represented by the 64-dot data supplied a total of 128 times (e.g., to one represented by 64 dots by 64 dots).

The operations of the normalization part 71 are similar to the normalizing operations described earlier. In a secondary conversion, data of 64 bits are parallelly received to be outputted by a plurality of "OR" additions to be contracted before they are outputted to the parallel-to-serial conversion circuit 72, which in turn converts them to serial data to be inputted to the variable length register 73.

Whereas the normalization part 71 receives 128 pairs of 64-dot data in parallel, since the normalization part 71 contracts them in the direction along the 128 pairs, the result obtained from the normalization part 71 after the secondary conversion is of 64 dots by 64 dots.

The data which have undergone the secondary conversion are converted to serial data by the parallel-to-serial conversion circuit 72. The serial data of 64 dots by 64 dots are supplied to the variable length register 73 to be memorized and outputted to the next processing, e.g. at the line-narrowing module 18.

Figure 32:
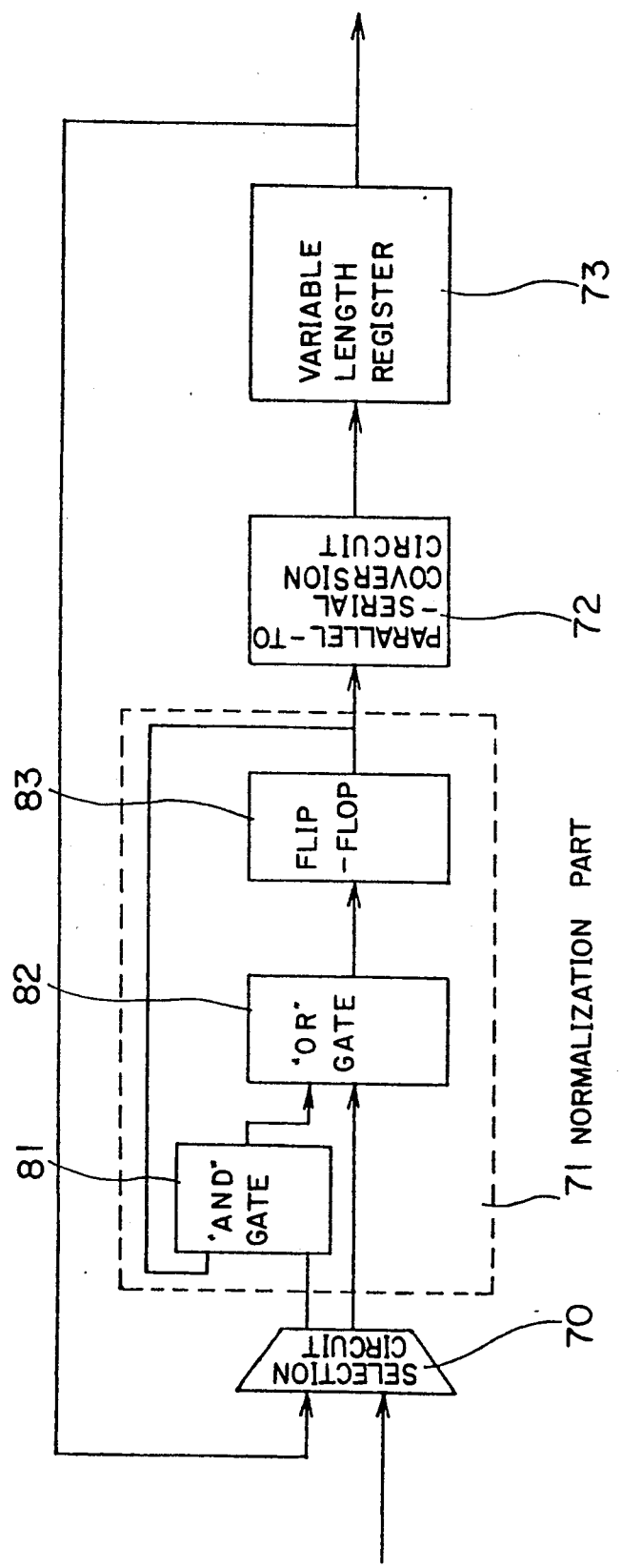
FIG. 32 shows in more detail the configuration of the normalizing part in the normalization module using the third principle of this invention.

FIG. 32 shows in more detail the configuration of the normalizing part 71 in the normalization module 16 using the third principle of this invention. Circuits in FIG. 32 the same as those in FIG. 31 have the same numbers, and their explanations are saved.

The normalization part 71 comprises an "AND" gate 81, an "OR" gate 82 and a flip-flop 83. One of the inputs of the "AND" gate 81 is supplied with a gate control signal from a control circuit not shown in the drawing.

A contraction requires an "OR" addition. Thus, to input the output from the flip-flop 83 to the "OR" gate 82, an H signal for turning on the "AND" gate 81 is applied from outside. Whereas the output from the flip-flop 83 is supplied to the "AND" gate 81, the "AND" gate 81 inputs data memorized in the flip-flop 83 to the "OR" gate 82. That is, the flip-flop 83 re-inputs data routed through the "AND" gate 81 and the "OR" gate 82 which the flip-flop 83 originally memorized by itself.

At this time, since the next dot row is supplied to the "OR" gate 82, data outputted from the "OR" gate 82 are the result of "OR" adding data memorized in the flip-flop 83 and data of the next dot row. This is because a black dot exists at a similar position even if a plurality of dots are read, e.g. in a contraction when only one dot column of black dots exists.

Since the black and white dots have the values 1 and 0, respectively, in the embodiment shown in FIG. 32, when data are inputted with negative logic, the "AND" gate 81 performs the "OR" addition.

Contracted data memorized in the flip-flop 83 are received in the parallel-to-serial conversion circuit 72 per an instruction by a receiving signal from a control circuit not shown in the drawing. A magnification or a contraction is performed in accordance with the sequence wherewith the receiving signal is supplied.

The conversion table creation module 17 shown in FIG. 2A is a circuit for creating a conversion table, indicating the relation between a variable I and a conversion table function value H(I), to obtain a receiving position in a magnification or a contraction.

FIG. 34 explains the operations of the normalization part 71 in the normalization module 16 using the third principle of this invention.

FIGS. 35A and 35B explain in detail the operations of the normalization module using the third principle of this invention.

The normalization part 71 obtains a conversion table value H(I)*D by sequentially incrementing I by 1 from the initial value 1. Initially, i.e. when i is 1, the value H(1)*D is obtained by multiplying H(1) by the dot number D to be changed. Since H(1) is 0, H(1)*D is also 0.

Meanwhile, the normalization part 71 multiplies the character width W by a variable J, which has the initial value 1 and is incremented by 1, each time the parallel-to-serial conversion circuit 72 receives data in dot-row units from the normalization part 71. That is, the accumulation of the character width W, SIGMA[W]=J*W, is calculated.

The example shown in FIG. 34 assumes that the dot number D to be changed and the character width W to be constant at 64 and 100, respectively.

Since the variable J is 1, initially, SIGMA[W] is 100. The normalization part 71 compares SIGMA[W] with H(I)*D, and declares the comparison result is effective when H(I)*D is greater than SIGMA[W]. Since H(2) is 0, the comparison result is ineffective. When I is incremented to 3 and then to 4, because H(3)=0 and H(4)=1, H(3)*D=0 and H(4)*D=64. Since SIGMA[W]>H(I)*D, their comparison results are still ineffective. Finally, when I is incremented to 5, since H(5) is 2, H(I)*D=128 and H(5)*D>SIGMA[W]. Thus the comparison result becomes effective, and the normalization part 71 outputs data at this time. In other words, the parallel-to-serial conversion circuit 72 receives data. When data are received, i.e. when the comparison result become effective, the variable J is incremented by 1.

Since the variable J changes to 2, SIGMA[W](=J*W) becomes 200. Thereafter, the normalization part 71 again compares H(5)*D(=128) with SIGMA[W]. Since SIGMA[W] is greater in this comparison, the comparison result becomes ineffective, and I is incremented to 6.

Thus, each time the parallel-to-serial conversion circuit 72 receives data from the normalization part 71, the normalization part 71 sequentially compares H(I)*D with SIGMA[W] by incrementing variable J by 1.

A character is normalized by the result obtained in the conversion table creation module 17 through the above operations. The comparisons are then performed with the character width W obtained simultaneously at the conversion table creation module 17 as described earlier. A magnification or a contraction in one direction is achieved by making J=64 effective by sequentially performing these operations.

Figure 36B:
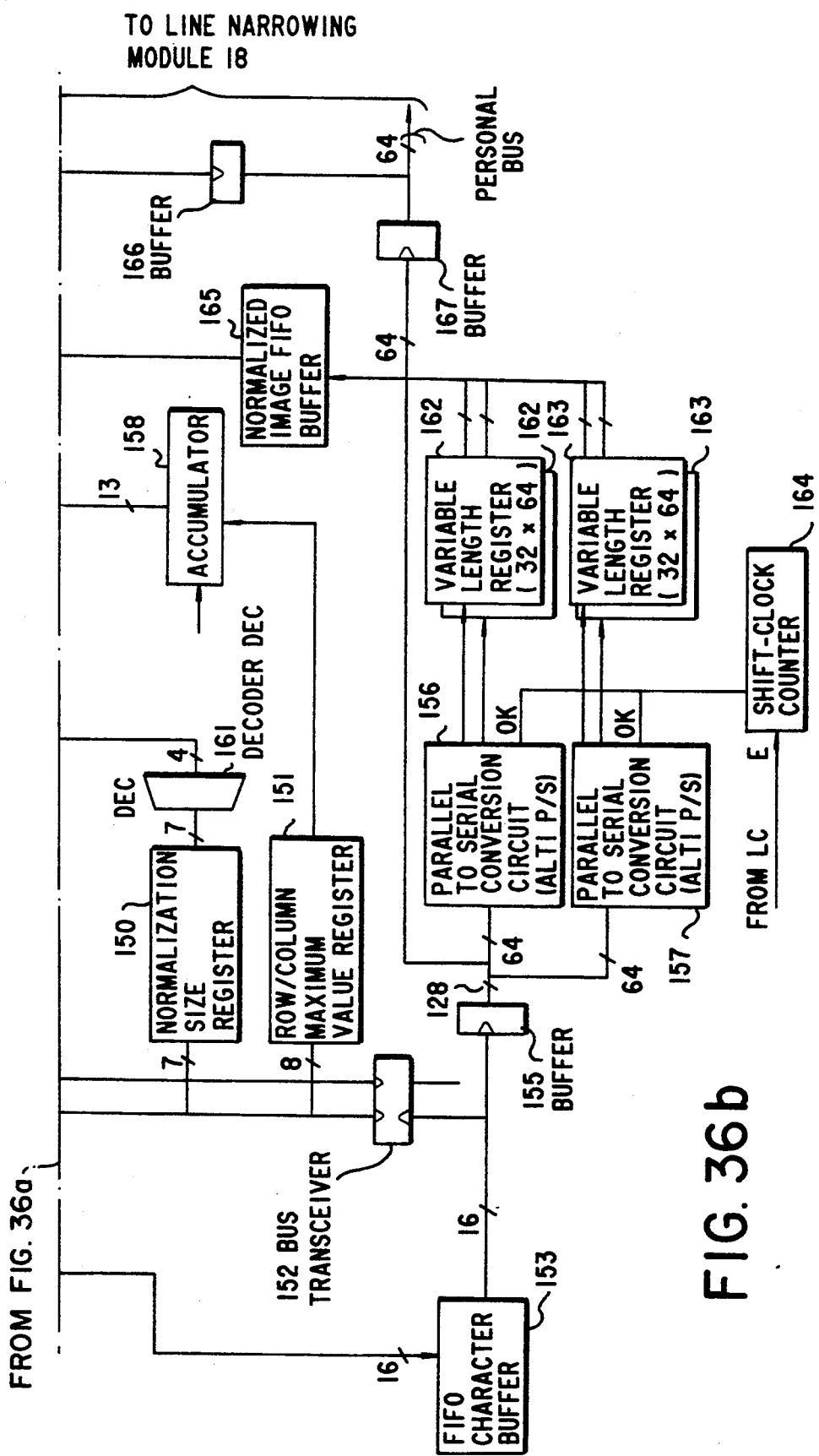

FIG. 36 shows in detail the system configuration of the normalization module 16 using the third principle of this invention.

In the embodiment shown in FIG. 2A, although it is not shown in the drawing, an instruction of a system CPU is supplied to each module by a system bus SBUS comprising a control bus, an address bus, and a data bus. Each module is provided with a local CPU 140 which exchanges data with the system bus SBUS through a bus arbiter (ARB) 141.

The system bus SBUS is connected to the local CPU 140 through the bus arbiter (ARB) 141. A local bus of the local CPU 140 is connected not only to the bus arbiter (ARB) 141 but also to a data memory 144 through a memory 142 and a bus transceiver 143. The data memory 144 is connected to the system bus SBUS through a bus transceiver 145 so that data can be accessed in response to an access from the local CPU 140, as well as from the system CPU through the bus transceiver 145. The local CPU 140 executes a program stored beforehand in ROM in the memory 142 to control the module operations.

The local CPU 140 is connected to the system bus SBUS described earlier through the bus arbiter (ARB) 141, as well as to a module bus 146 comprising an address bus and a data bus. The module bus 146 is connected to a FIFO character buffer 153 through a two-port SRAM 147, a common RAM 148, a normalization size register 150, a row/column maximum value register 151 and a bus transceiver 152. The two-port SRAM 147 which is a memory register is connected to an ID bus of the conversion table creation module 17, and upon receiving various information the two-port SRAM 147 notifies the local CPU 140 that the information is inputted, by interrupting the local CPU 140.

Per the controls described earlier, data stored in the FIFO character buffer 153 are supplied through a buffer 155 to parallel-to-serial conversion circuits (ALTI, P/S) 156 and 157. The buffer 155 outputs 16-bit data in 128 bit-units by sequentially memorizing eight (8) words (128 bits) of character pattern data inputted from the FIFO character buffer 153 and supplies them simultaneously to the parallel-to-serial conversion circuits (ALTI, P/S) 156 and 157 in 64-bit units. Although a clock instructing the parallel-to-serial conversion circuits (ALTI, P/S) 156 and 157 to receive 64-bit data is not shown in the drawing, a clock pulse of such a clock is supplied from a comparator 159. Each time a "big" signal for indicating big data is supplied from the comparator 159, the parallel-to-serial conversion circuits (ALTI, P/S) 156 and 157 receive 64-bit data.

An accumulator 158 accumulates the row/column maximum value W outputted from the row/column maximum value register 151 to output the result to the comparator 159.

The FIFO conversion table 149 memorizes a conversion table function value H(I) and supplies it to a barrel shifter 160. Meanwhile, a normalization size value D (7-bit data), by which H(I) is multiplied, is inputted to a decoder (DEC) 161 to be decoded.

Whereas the conversion sizes in the embodiments of this invention are expressed as $2^n$, such as 16, 32 and 64, the decoder DEC 161 decodes the conversion sizes into n by taking their exponents. Since the barrel shifter 160 shifts H(I) inputted from the FIFO conversion table 149 by the decoded value n, a multiplication of $2^n*H(I)$ is performed and the result is inputted to the comparator 159, which is a circuit for comparing the value supplied from the barrel shifter 160 with the value supplied from the accumulator 158. When the output from the barrel shifter 160 is small, the comparator 159 instructs the consecutive parallel-to-serial conversion circuits (ALTI, P/S) 156 and 157 to receive 128-bit data memorized in the buffer 155. The local CPU 140 controls the execution state and the result.

Meanwhile, respective 64-bit serial data obtained by the parallel-to-serial conversion circuits (ALTI, P/S) 156 and 157 are supplied to variable length registers 162, 162', 163 and 163'. The variable length registers 162, 162', 163 and 163' are shift registers each of 32 dots * 64 dots and are inputted with 64-bit serial data in units of 64-bit columns. For instance, in the primary conversion for the first row, the variable length registers 162 and 163 operate to simultaneously receive 128-bit data in 64-bit units.

When the local CPU 140 judges that the variable length registers 162, 162', 163 and 163' store data and complete the operations of the primary conversion, the local CPU 140 causes the parallel-to-serial conversion circuits (ALTI, P/S) 156 and 157 to supply two 32-bit data respectively to the variable length registers 162 and 162' and the variable length registers 163 and 163'. That is, that the variable length registers 162, 162', 163 and 163' sequentially re-input 64-bit data from the head end of the 64 pairs of serial data inputted from the parallel-to-serial conversion circuits (ALTI, P/S) 156 and 157.

Whereas data of 128 bits * 128 bits are supplied to the parallel-to-serial conversion circuits (ALTI, P/S) 156 and 157 in the primary conversion, since a contracted side is outputted in column units in the secondary conversion, only the parallel-to-serial conversion circuit (ALTI, P/S) 156 operates. At this time, the parallel-to-serial conversion circuit (ALTI, P/S) 156 receives data per the comparison result of the comparator 159 and outputs them as serial data, similarly to the case described earlier.

The output from the parallel-to-serial conversion circuits (ALTI, P/S) 156 and 157 are supplied through the variable length registers 162 and 163 to the normalized image FIFO buffer 165 as parallel data after the conversion.

Alternatively, since the parallel-to-serial conversion circuits (ALTI, P/S) 156 and 157 comprise an ALTI, the parallel output could be similarly supplied to the variable length registers 162, 162', 163 and 163', by providing a support for a parallel output from the local CPU 140.

Data contracted by the above procedures are memorized in the normalized image FIFO buffer 165 and image data after a normalization are supplied to the line-narrowing module 18 (e.g., through an ID bus or through a buffer 166 and the personal bus 154).

If something other than the line-narrowing module 18 needs the inputted character data, they could be outputted to the personal bus 154 through a buffer 167.

Although it is not shown in FIG. 36, the input parts of the parallel-to-serial conversion circuits (ALTI, P/S) 156 and 157 are provided with "OR" addition circuits for receiving the results of "OR" adding the inputted data.

Data conversion circuits of the line-narrowing module 18 are explained in more detail below.

Figure 37:
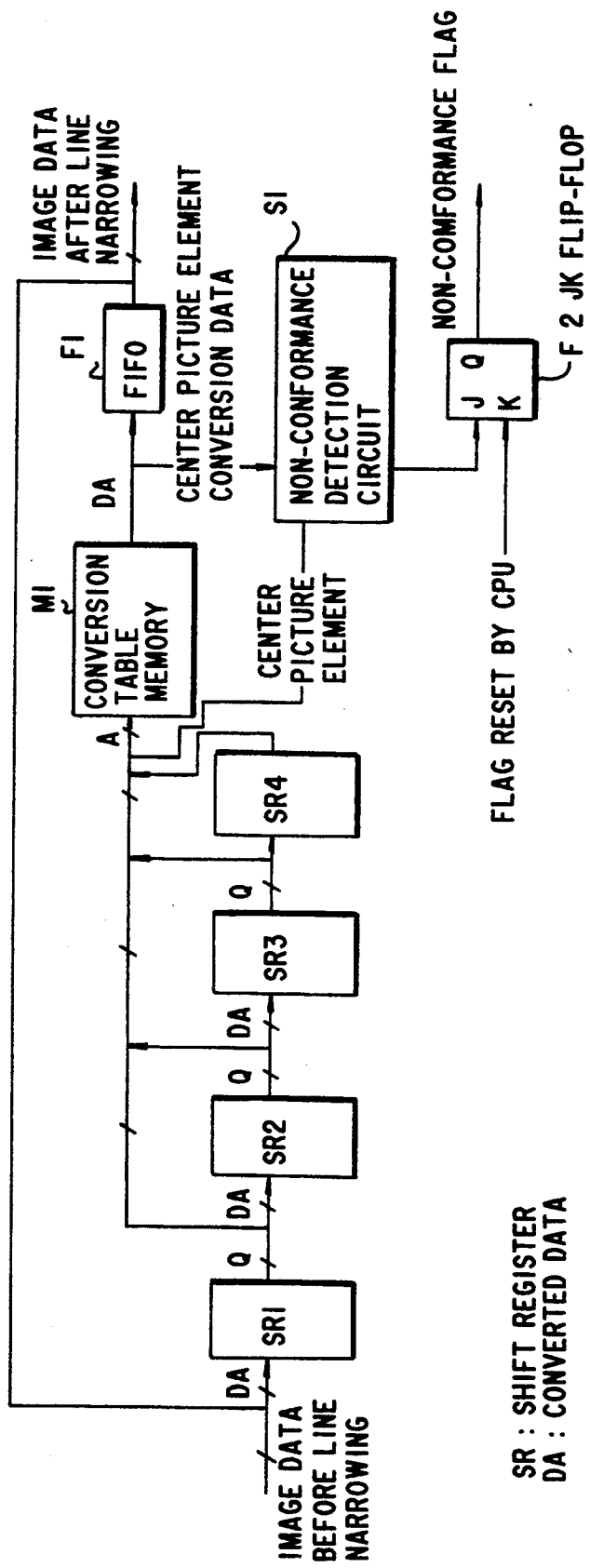
FIG. 37 shows in detail the configuration of the line-narrowing module using the first principle of this invention.

FIG. 37 shows in detail the configuration of the line-narrowing module 18 using the first principle of this invention.

Image data before a line is narrowed are supplied sequentially to a shift register SR1 by vertically read in 3-dot units comprising the center dot of the line to be narrowed and the dots to its left and right. Data memorized in the shift register SR1 are sequentially shifted to shift registers SR2, SR3 and SR4 after each time one clock cycle elapses. These shift registers SR1 through SR4 memorize in four stages a total of 11 bits of dot data. These memorized dot data are supplied to an address of a conversion table memory M1 for memorizing information that makes a black center dot of the 3*3+2 dots white when the dots around the center dot are of a particular pattern. Then, the center dot corresponding to the inputted dot data is determined (converted) by the information. The converted data DA are supplied to a FIFO F1 (or to a line-narrowing circuit in the next stage). The shift registers SR1 through SR4, and the FIFO F1 receive the center dot and the dots to its left and right, and the dots above and below it are supplied for one character or one document.

When a series of data (e.g. for a character), are terminated, no more image data are supplied from outside, but in turn converted data DA from the FIFO F1 are again supplied to the shift register SR1. (However, this is not the case for a multiple stage line-narrowing circuit.) As described earlier, the shift registers SR1, SR2 and SR3 shift the inputted data, and the result is again supplied to the address of the conversion table memory M1. The above operations are sequentially repeated.

A non-conformance detection circuit S1 compares the center picture element supplied to the address of the conversion table memory M1 with the converted data DA for the center picture element, and supplies a non-conformance signal to a JK flip-flop F2 when a non-conformance has arisen. On receipt of the non-conformance signal, the JK flip-flop F2 memorizes it.

Although it is not shown in the drawing, a CPU controls the circuits shown in FIG. 37. When a non-conformance flag arises, the JK flip-flop F2 memorizes it. The CPU considers that there are points to be changed by a series of converting operations in the area of the line to be narrowed. The CPU does not receive the data after line-narrowing outputted from the FIFO F1, but repeats the control operations described earlier. At this time, the CPU resets the flag of the JK flip-flop F2.

Unless non-conformance is detected in the series of operations, the JK flip-flop F2 receives no data and a non-conformance flag is not outputted. When the flag is not outputted, data of the previous time and data after the conversion are matched. The CPU considers this as a conversion termination and receives data from the FIFO F1.

Figure 38:
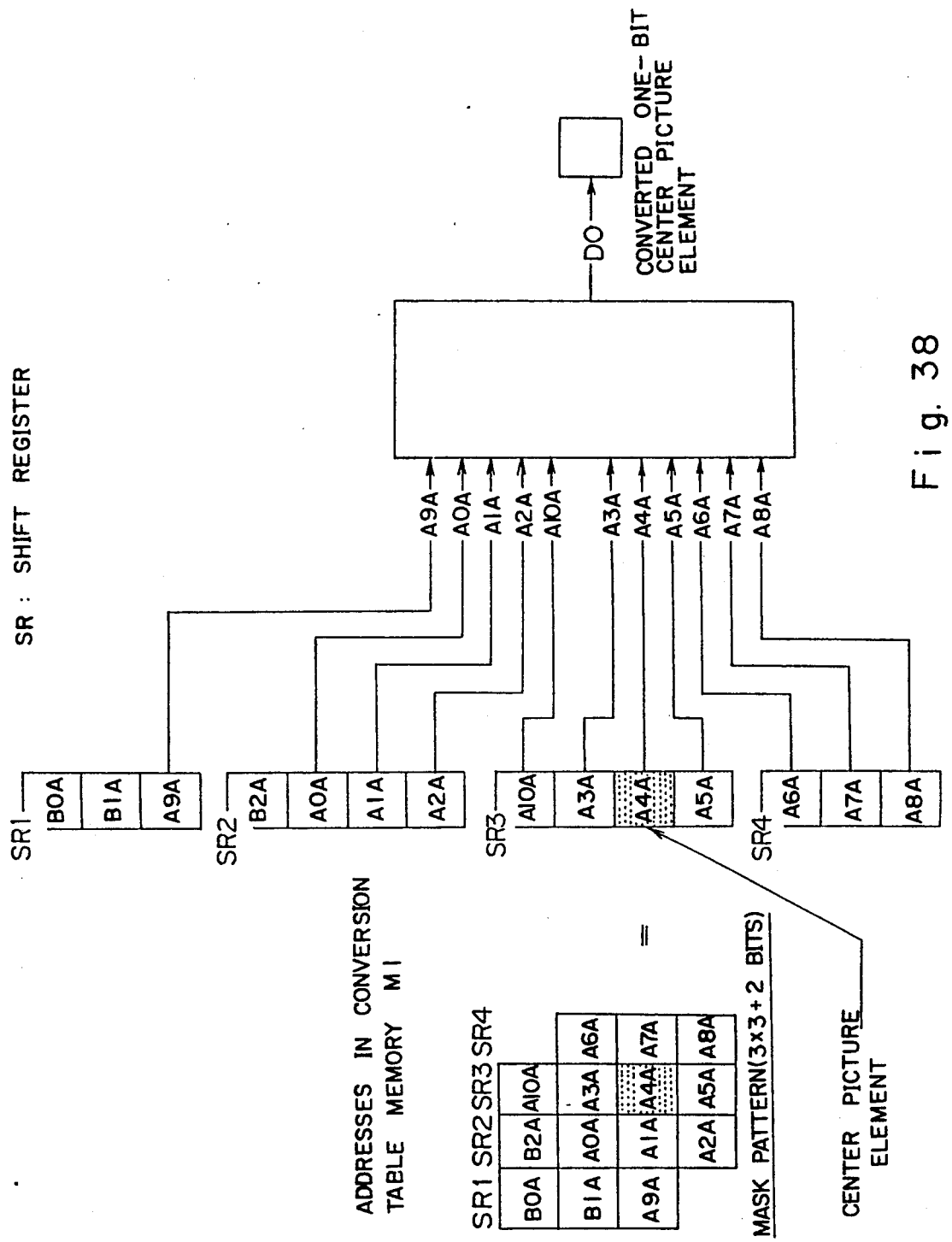
FIG. 38 illustrates the operation of the conversion in the line-narrowing module using the first principle of this invention.

FIG. 38 illustrates the operation of the conversion in the line-narrowing module 18 using the first principle of this invention.

Shift registers SR1, SR2, SR3 and SR4 receive 3-bit, 4-bit, 4-bit and 3-bit inputs, respectively. Thus, a total of fourteen (14) bits are memorized. However, only eleven (11) of the fourteen (14) bits memorized are actually supplied to addresses A0A through A10A in the conversion table memory M1.

Of the three (3) bits memorized in shift register SR1, one (1) is supplied to address A9A. Of the four (4) bits memorized in shift register SR2, three (3) are supplied to addresses A0A, A1A and A2A. All four (4) bits memorized in shift register SR3 are supplied to addresses A10A, A3A, A4A and A5A.

The center picture element of the conversion table memory M1 is in address A4. The conversion table memory M1 memorizes a determinant for determining whether or not the center picture element is changed per bit data stored in the surrounding addresses and outputs a converted one-bit center picture element.

Figure 39:
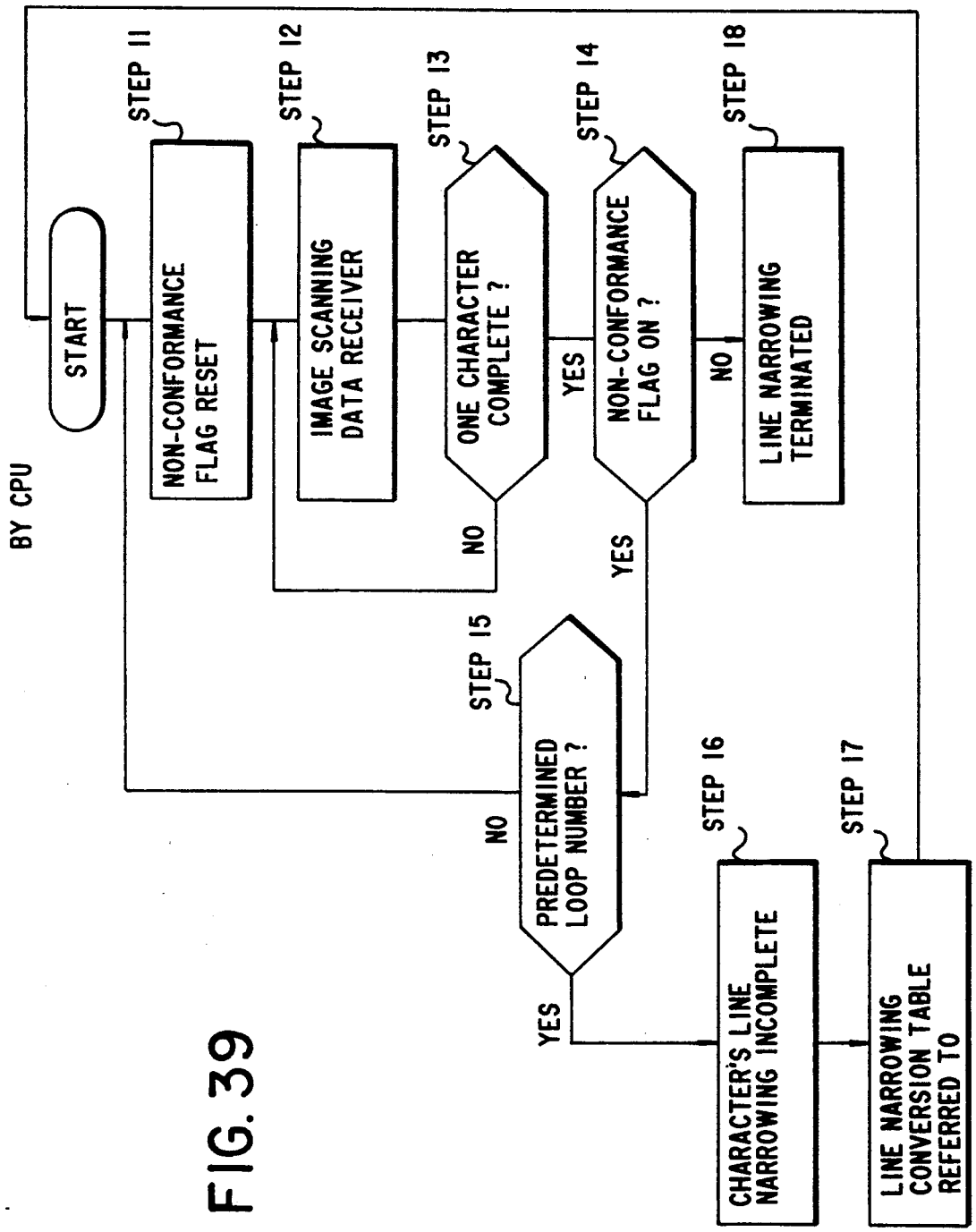
FIG. 39 is a flowchart of the operations of a CPU for controlling the line-narrowing module using the first principle of this invention.

FIG. 39 is a flowchart of operations of a CPU for controlling the line-narrowing module 18 using the first principle of this invention.

After the CPU starts an execution, it performs conversion processings in the following steps.

(STEP 11) The CPU resets the non-conformance flag.

(STEP 12) The CPU starts controlling for receiving the image scanning data stored (e.g., in an external device).

(STEP 13) The CPU judges whether or not all image scanning data for one character are completely received. If it judges that all the image scanning data are not received (N), STEP 12 is repeated. If it judges that all the image scanning data are received (Y), STEP 14 is invoked.

(STEP 14) The CPU judges whether or not the non-conformance flag is on. If the non-conformance flag is on (Y), STEP 15 is initiated. If the non-conformance flag is not on (N), STEP 18 is invoked.

(STEP 15) The CPU judges whether or not the loop processings from STEP 11 through STEP 14 have been performed a predetermined number of times. If the CPU judges they have (Y), STEP 16 is invoked. If the CPU judges they have not (N), STEP 11 is repeated.

(STEP 16) When the CPU judges that the loop processings from STEP 11 through STEP 14 have been performed a predetermined number of times (Y) and that the non-conformance flag is on (Y), the CPU determines that the line scanning data represents a different character, because line-narrowing has not yet been completed.

(STEP 17) A line-narrowing table conversion is performed in consideration of the possibility of another character. After the processing in STEP 17 has been performed, STEP 11 is repeated.

(STEP 18) The image scanning data at this time are processed by the data stored in the FIFO F1. After repeating the above operations, when the non-conformance flag is not on (N) in STEP 14, the line-narrowing processings are terminated.

Although it is not shown in the drawing, the conversion table memory M1, a RAM, is connected to the CPU. When the image scanning data are of a special character or a character whose line-narrowing is not yet completed, the CPU performs a new line-narrowing by accessing the conversion table in the conversion table memory M1.

By performing the processings shown in FIGS. 37, 38 and 39, a line is narrowed in the input direction of one-column dot data, i.e. in the vertical direction, into a line comprising one dot left and right. A line is narrowed by performing these operations a plurality of times for the number of columns of the inputted character. For example, if the inputted character comprises 64 dots by 64 dots, the above procedures are repeated 64 times.

Whereas a line is narrowed in dot-row units in the operations described in FIGS. 37, 38 and 39, a plurality of lines narrowed in dot-row units are provided in the column direction in these embodiments of this invention, so that 64-bit data for a row of a character, for example are processed in parallel.

Figure 40:
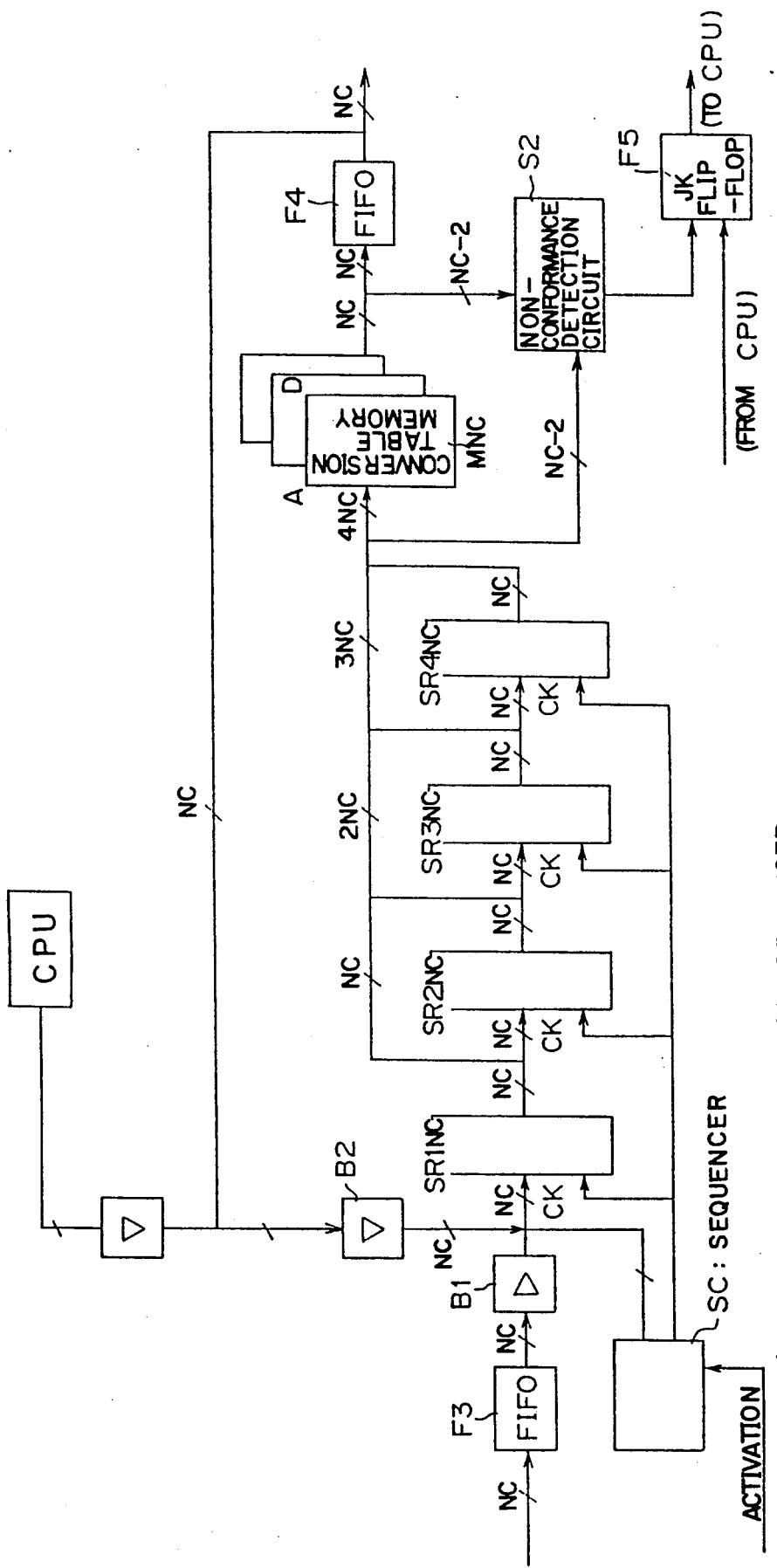
FIG. 40 shows in detail the configuration of the line-narrowing module using the first principle of this invention.

FIG. 40 shows in detail the configuration of the line-narrowing module 18 using the first principle of this invention.

Inputted data are stored in a FIFO F3. For instance, 64-bit data for a dot row of a character comprising 64 dots by 64 dots are supplied parallelly. (At this time, the FIFO F3 is, for example, a shift register of 64 stages.) Data memorized in the FIFO F3 are supplied to shift register SR1NC through a buffer B1. Its output is supplied to shift register SR1NC. Its output is in turn supplied to shift register SR2NC. Then its output is supplied to shift register SR3NC. Finally its output is supplied to shift register SR4NC. Shift registers SR1NC through SR4NC receive clock signals from a sequencer SC and shift data from the buffer B1 in correspondence with the clock signals. A total of 4NC pieces of data stored in shift registers SR1NC through SR4NC are supplied to a conversion table memory MNC which comprises (NC-2) pieces of memories for memorizing the same converted data, and determines the center from the center dot datum. The eight (8) surrounding dots, the dot two up and the dot two to the left are supplied to the respective memories.

Figure 41:
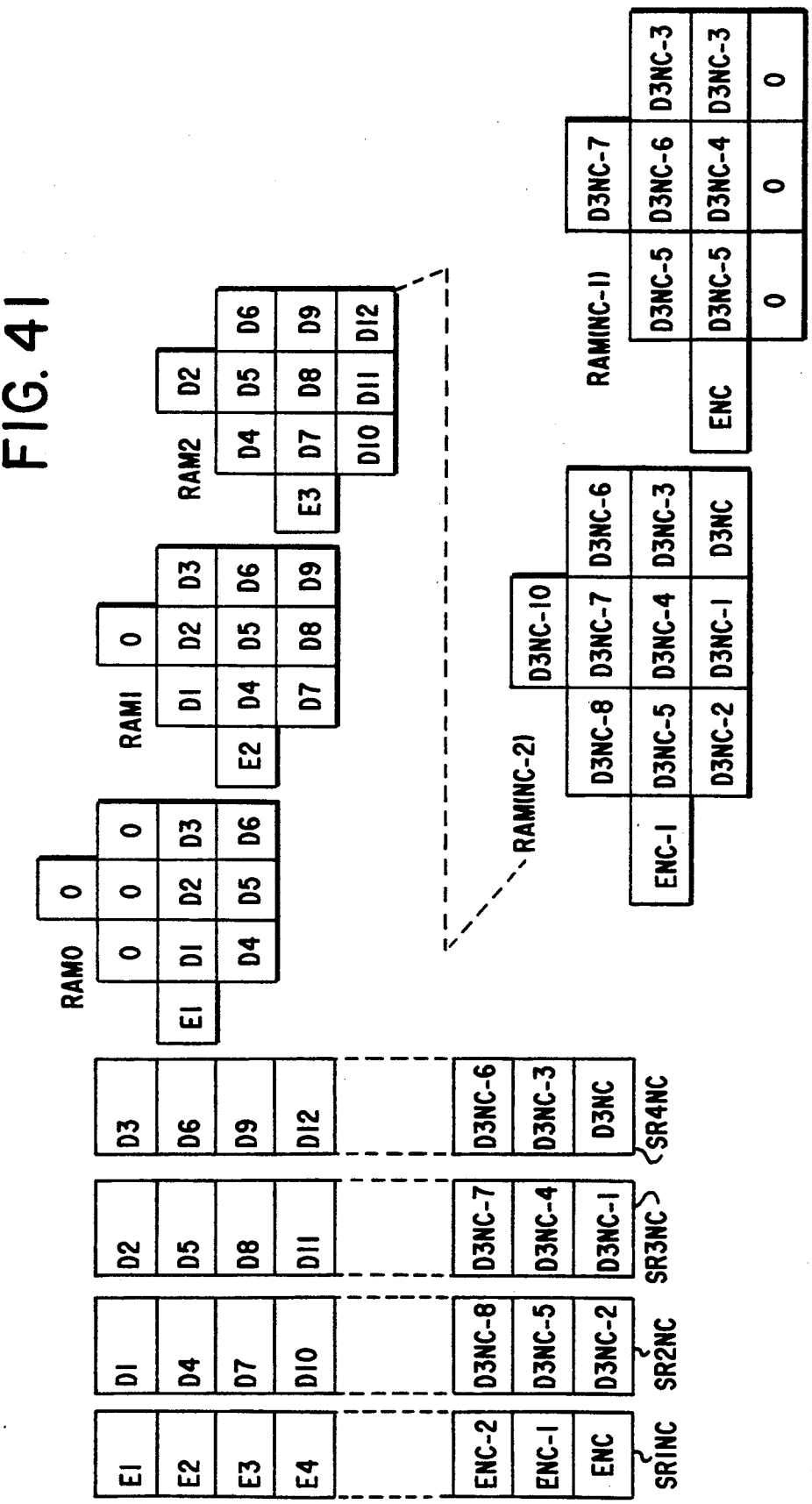
FIG. 41 illustrates in detail the operations of the line-narrowing module using the first principle of this invention.

FIG. 41 illustrates in detail the operations of the line-narrowing module 18 using the first principle of this invention.

As shown in FIG. 41, shift registers SR1NC SR2NC, SR3NC and SR4NC then memorize data E1 through ENC, data D1 through D(3NC-2), data D2 through D(3NC-1) and data D3 through D3NC, respectively.

Also as shown in FIG. 41, the conversion table memory MNC comprises RAM0 through RAM(NC-1) which receive data at their address terminals. RAM0 stores data E1 and D1 through D6, and its center datum is D2. RAM1 stores data E2 and D1 through D9. RAM2 stores data E3, D2 and D4 through D12, and its center datum is D5, and its center datum is D8. Other RAM's store data similarly. RAM(NC-2) stores data E(NC-1), D(3NC-10) and D(3NC-8) through D3NC, and its center datum is D(3NC-4). RAM(NC-1) stores data EN, and D(3NC-7) through D(3NC-3), and its center datum is D(3NC-4).

Respective data are inputted to RAM0 through RAM(NC-1) at their proper addresses, as shown in FIG. 41. The results of conversion at RAM0 through RAM (NC-1) are supplied to a FIFO F4 whose output is supplied again to shift register SR1 through a buffer B2.

As described earlier, NC pieces of memories RAM0 through RAM(NC-1) narrow lines. Whereas RAM0, RAM1 and RAM(NC-1), unlike all the other memories RAM2 through RAM(NC-2), have empty dots (outside of the 64 dots), data supplied to the address terminals of those empty dots are set to 0, so that lines at edge parts can be similarly narrowed. Also, by adding two dots to make data of 66 dots, lines at edge parts can be similarly narrowed.

When the CPU starts to control the processing of image data of one character memorized in the FIFO F3, the CPU activates the buffer B1 and the sequencer SC, thereby sequentially inputting data in the FIFO F3 to shift register SR1NC. The inputted data are converted by the operations illustrated in FIG. 40. The converted data are then supplied to the FIFO F4. After the FIFO F4 stores the converted data for one character, the CPU performs a control such that the buffer B2 is activated and the buffer B1 is deactivated, so that the data in the FIFO F4 are supplied again to shift register SR1NC.

The next conversion is performed by the above control. When data are supplied from the FIFO F3 to the FIFO F4 after being converted, and when data are supplied again from the FIFO F4 via shift registers SR1NC through SR4NC, a non-conformance detection circuit S2 compares NC bits of center data of the 4NC bits of data supplied to the conversion table memory MNC with NC bits of its output to determine whether or not they match with each other. When a non-conformance is detected, the non-conformance detection circuit S2 supplies a non-conformance signal to a JK flip-flop F5 to set it. When this setting signal is supplied even just once, the CPU again controls the execution of a conversion processing, by judging that a non-conformance exists, i.e. that a conversion has been performed and a change has been made. The CPU again resets the JK flip-flop F5 to a processing condition. The sequencer SC being terminated is reactivated.

When a non-conformance is not detected, the JK flip-flop F5 is not set. The CPU judges that no change has been made and reads the conversion data stored in the FIFO F4. The data are a collection of narrowed lines whose widths are, for example, one dot.

Figure 42:
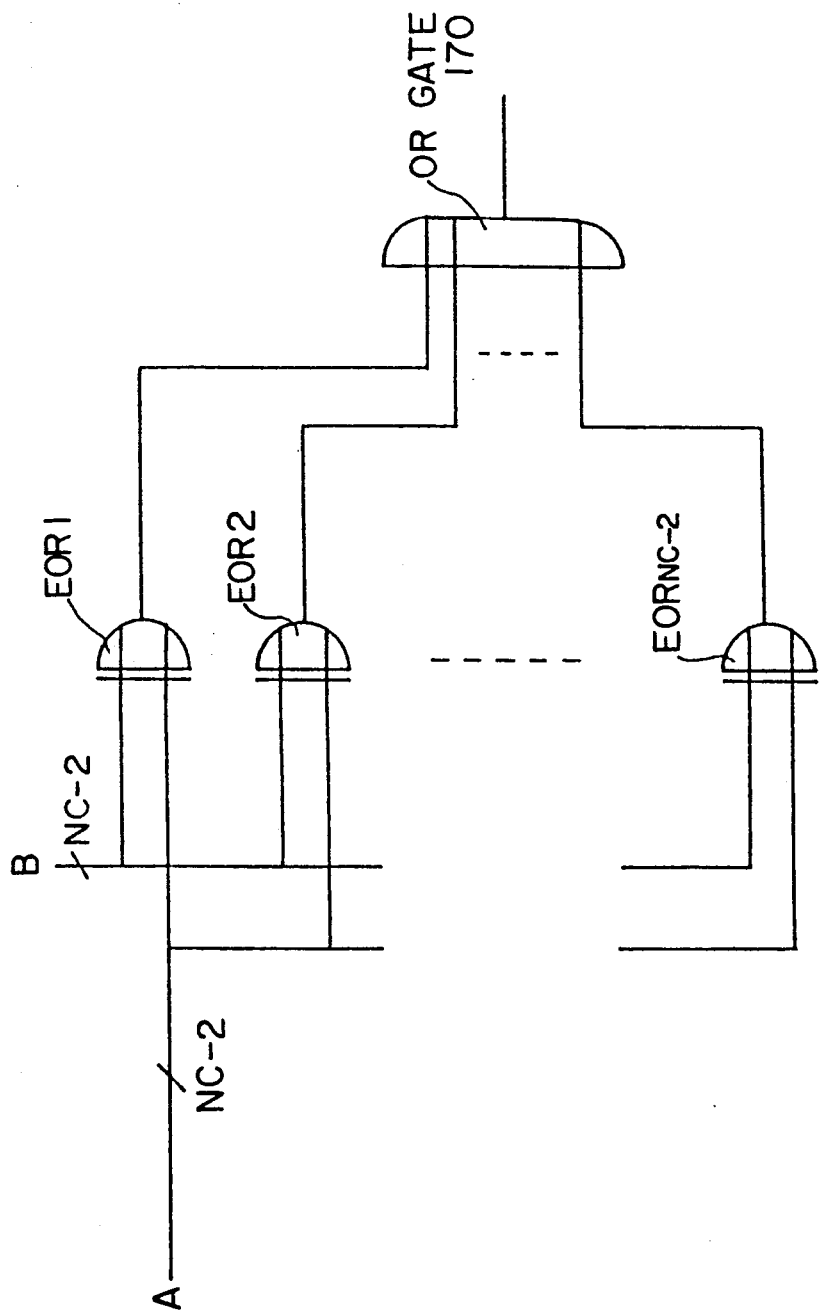
FIG. 42 shows the configuration of the non-conformance detection circuit in the line-narrowing module using the first principle of this invention.

FIG. 42 shows the configuration of the non-conformance detection circuit in the line-narrowing module 18 using the first principle of this invention.

The bit number NC described in FIGS. 40 and 41 is 64. The non-conformance detection circuit S2 compares bits respectively supplied bit-by-bit from NC-bit ports A and B, as shown in FIG. 42. That is, to judge whether or not they agree, the non-conformance detection circuit S2 supplies the compared bits to exclusive logical "OR" gates EOR1 through EOR(NC-2) whose outputs are in turn supplied to an "OR" gate 170. The non-conformance detection circuit S2 determines whether they conform with each other, depending on the output from the "OR" gate 170. Exclusive logical "OR" gates EOR1 through EOR(NC-2) output 0 when the compared bits agree with each other, and 1 when they don't. Thus, if at least one of the exclusive logical "OR" gates EOR1 through EOR(NC-2) outputs 1 because of the non-agreement of the compared bits, the "OR" gate 170 outputs a non-conformance (i.e., an "H" level).

By using the above non-conformance detection circuit S2, a non-conformance flag is set in the JK flip-flop F5, and the CPU determines whether or not line-narrowing should again be executed by judging the non-conformance.

Although it is not shown in the drawing, a clock signal indicating a conformance is supplied to the JK flip-flop F5 described earlier. The JK flip-flop F5 receives the output from the non-conformance detection circuit S2 upon receiving this clock signal.

Figure 43:
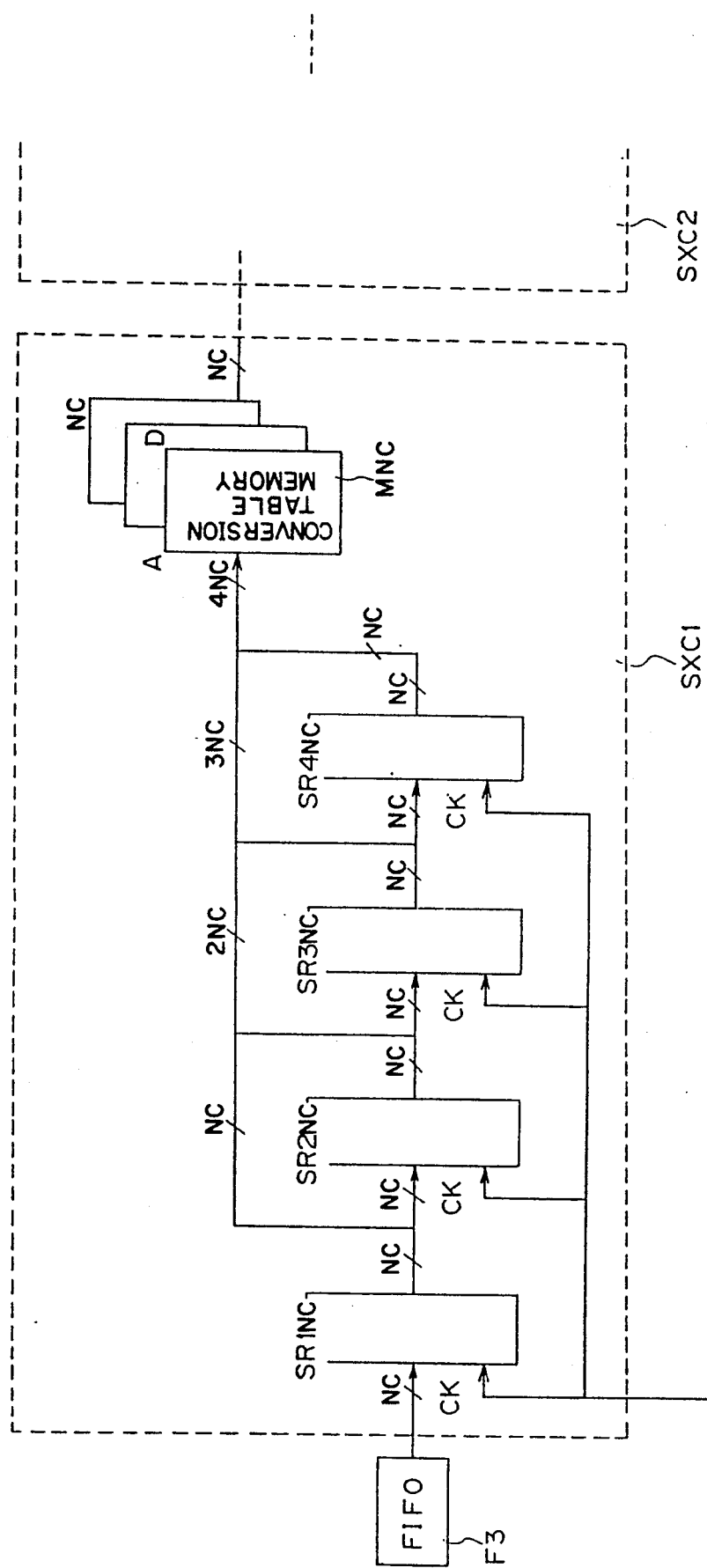
FIG. 43 shows the configuration of the line-narrowing module using the first principle of this invention.

FIG. 43 shows the configuration of the line-narrowing module 18 using the first principle of this invention.

Whereas the embodiment of the line-narrowing module 18 shown in FIG. 37 is explained in detail above, line-narrowing is not limited to sequential processings. For instance, as shown in FIG. 43, pairs of line-narrowing circuits SXC1, SXC2, etc. each comprising a plurality of stages for the line-narrowing amount (determined by the thickest line inputted) are provided for a pipeline processing that enables even faster line-narrowing.

Figure 44:
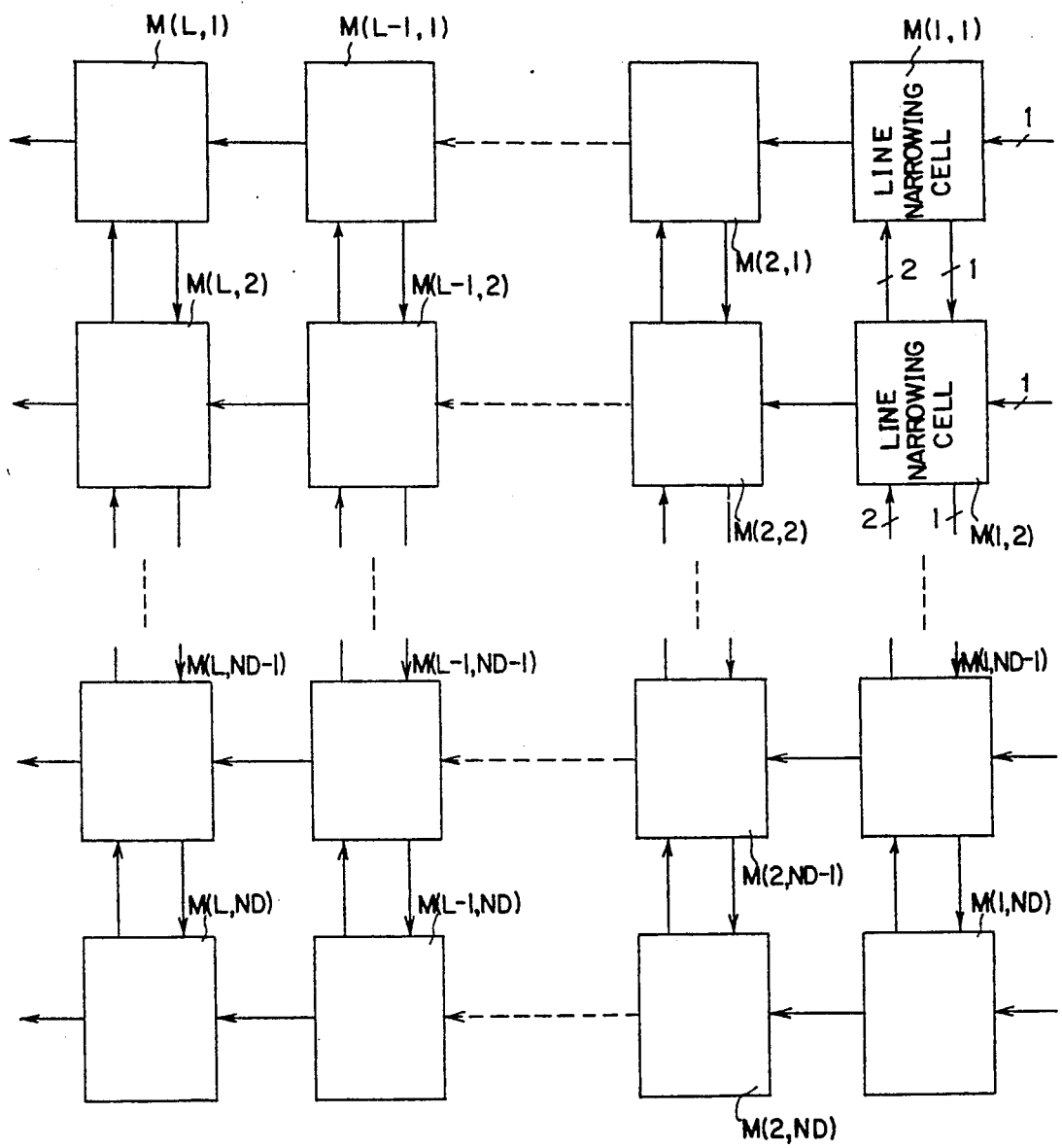
FIG. 44 shows the configuration of a line-narrowing array in the line-narrowing module using the second principle of this invention, which utilizes a systolic array.

FIG. 44 shows the configuration of a line-narrowing array in the line-narrowing module 18 using the second principle of this invention, which uses a systolic array.

The line-narrowing illustrated in FIGS. 37 through 43 is performed by processings in one-dot units or in parallel. The following processing uses an array.

Data in a character frame normalized by the normalization module 16 are supplied in dot-row units to the line-narrowing module 18, which comprises line-narrowing cells M(1,1) through M(L,ND).

Respective line-narrowing cells M(1,1) through M(L,ND) output two bits to the above cell and input one bit from the above cell.

Figure 45:
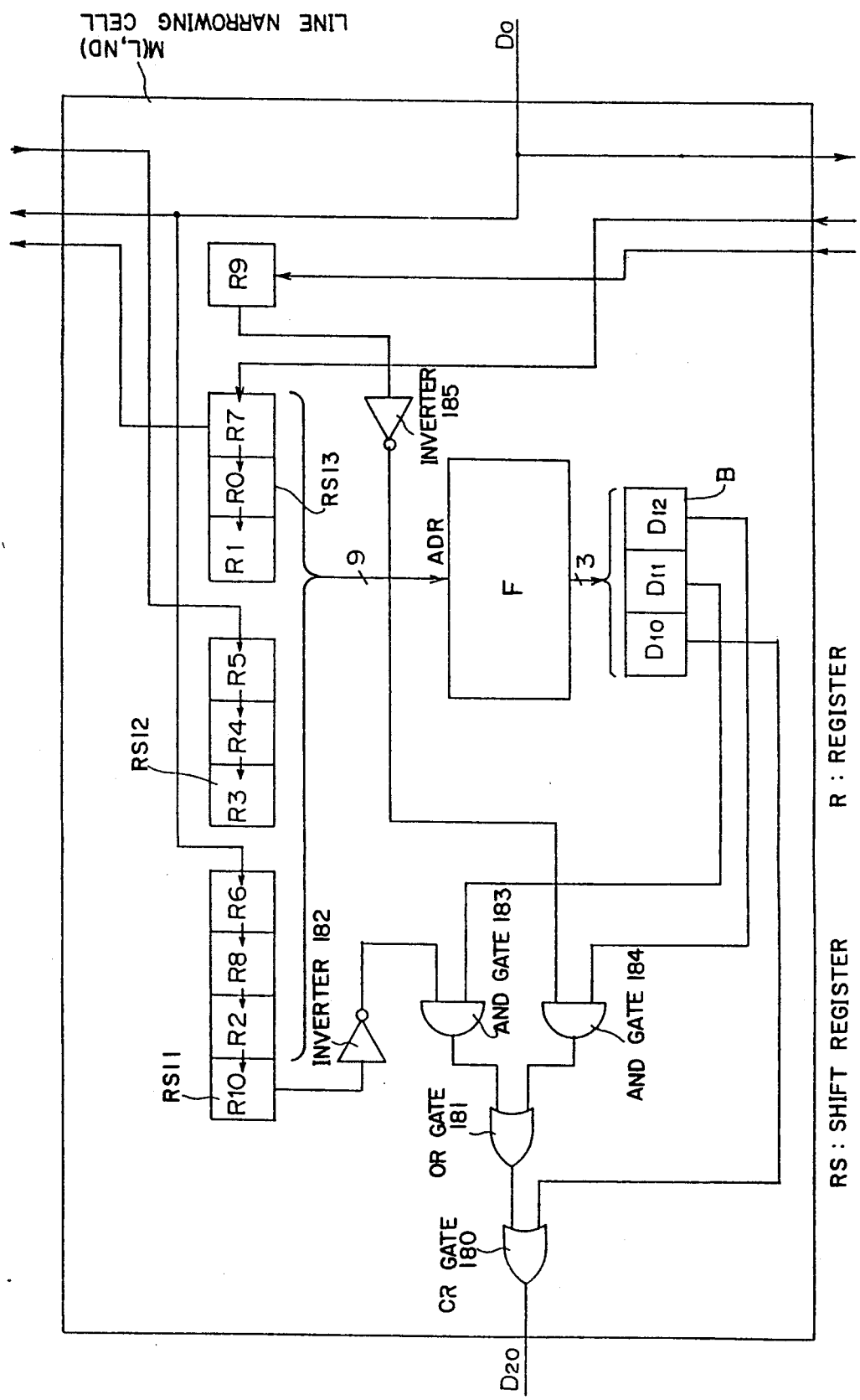
FIG. 45 shows in detail the configuration of line-narrowing cells in the line-narrowing module using the second principle of this invention, which utilizes a systolic array.

FIG. 45 shows in detail the configuration of line-narrowing cells M(1,1) through M(L,ND) in the line-narrowing module 18 using the second principle of this invention, which uses a systolic array.

Data $D_0$ supplied to line-narrowing cells M(1,1) through M(L,ND) are supplied to shift register RS11, which is a four-stage shift register comprising registers R10, R2, R8 and R6. The data $D_0$ are also supplied to the neighboring cells below. Meanwhile, data supplied from the neighboring cell below are supplied to shift registers RS12 and RS13.

In FIG. 45, data from an upper cell are supplied to shift register RS12, and data from a lower cell are supplied to shift register RS13. Shift register RS12 comprises registers R3, R4 and R5. Shift register RS13 comprises registers R1, R0 and R7. In addition, data supplied from a lower cell are supplied to register R9. Outputs from register R7 are supplied to register R0, as well as to an upper cell in FIG. 45. That is, register R9 is supplied with data shifted by one stage in the lower cell in FIG. 45.

Figure 46:
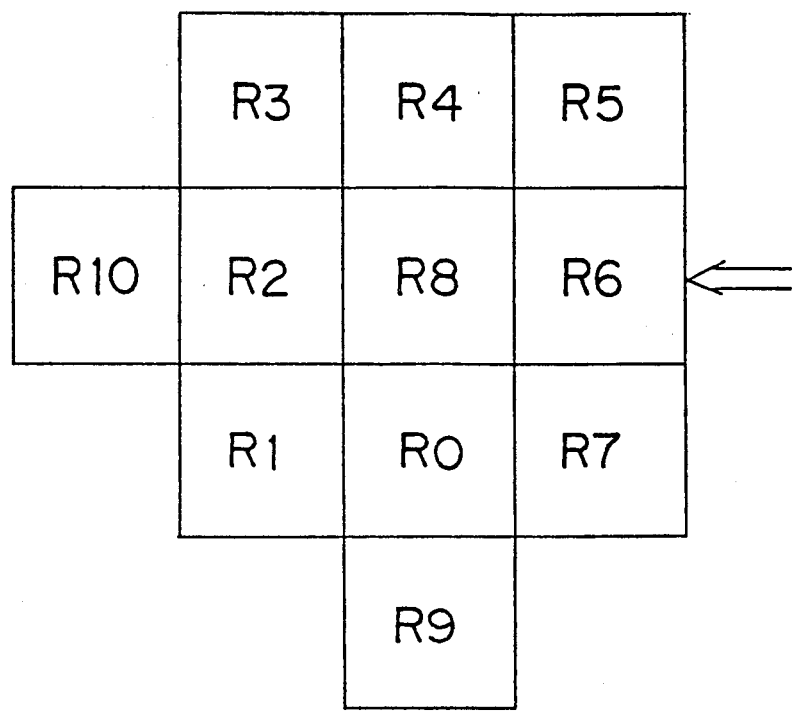
FIG. 46 illustrates the pattern positions of the registers in the line-narrowing module using the second principle of this invention, which utilizes a systolic array.

FIG. 46 illustrates the pattern positions of the registers in the line-narrowing module 18 using the second principle of this invention, which uses a systolic array.

As shown in FIG. 46, the data $D_0$ inputted to each cell comprises one (1) dot in register R8, eight (8) dots in eight (8) registers R0 through R7 around register R8, one (1) dot in register R10 two to the left of register R8, and one (1) dot in register R9 two down from register R8 (i.e., a total of eleven (11) dots).

Nine outputs from nine registers R6, R8, R2, R5, R4, R3, R7, R0, and R1 are supplied to address input terminal ADR in memory F, which outputs three bits to buffer B. Of data D10, D11 and D12 supplied to buffer B, data D10 is supplied to an input terminal of an "OR" gate 180.

As shown in FIG. 46, when the eight-dot data in the eight surrounding registers R0 through R7 determine the value (black or white) of the center dot, data D11 and D12 become 0 and data D10 take the determined value. That is, 1 for black or 0 for white is outputted through the "OR" gate 180.

Meanwhile, when these eight (8) dots cannot determine the value of the center dot stored in register R8, memory F sets the value of data D11 or data D12 to 1.

Data D11 and D12 are supplied to "AND" gates 183 and 184. As described earlier, if the value of the center dot stored in register R8 is determined, the values of data D11 and D12 are 0; if it is not determined, the value is obtained by considering two other dot values.

The data D11 and D12 act as instruction signals for determining output data obtained as a result of considering the dot values stored in registers R10 and R9.

Outputs from register R10 are supplied through an inverter 182 to an "AND" gate 183. Outputs from register R9 are supplied through an inverter 185 to an "AND" gate 184. When the value of data D11 is 1, the dot data value stored in register R10 is inverted, and the result determines the output. When the value of data D12 is 1, the value outputted from register R9 determines the output.

In other words, if the value stored in register R9 is 0 and the value of data D11 is 1, both input terminals of the "AND" gate 183 receive 1, and the "AND" gate 183 outputs 1. If the value of data D12 is 1 and the value stored in register R9 is 0, both input terminals of the "AND" gate 184 receive 1 and it outputs 1, i.e. an "H" level.

The outputs from the "AND" gates 183 and 184 are supplied to an "OR" gate 181. If either of the outputs is 1, the "OR" gate 181 outputs 1. The output from the "OR" gate 181 is supplied to an "OR" gate 180. Accordingly, the output data D20 represent the logical outputs from "AND" gates 183 and 184. That is, when the data stored in register R8 is set as the center dot value and the center dot value is not determined by the surrounding data (memorized in registers R0 through R7), the value stored in register R9 or R10 determines it.

FIG. 47 is an input data diagram in the line-narrowing module 18 using the second principle of this invention, which uses a systolic array.

Figure 48:
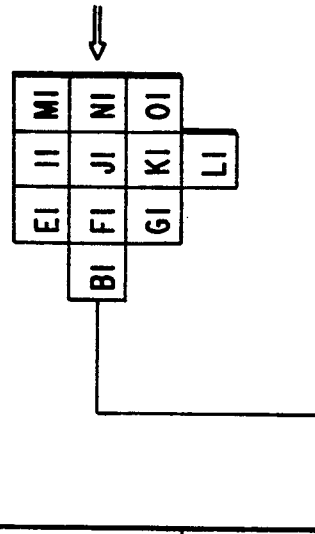
FIG. 48 illustrates data change in the register of the input data in the line-narrowing module using the second principle of this invention, which utilizes a systolic array.

FIG. 48 illustrates data change in the register of the input data in the line-narrowing module 18 using the second principle of this invention, which uses a systolic array.

At time t=1, data A1, B1, C1 and D1 are supplied respectively to cells J+1, J, J−1 and J−2. Shift registers RS11, RS12 and RS13 in cell J respectively store data B1, A1 and C1. Shift registers RS11, RS12 and RS13 in cell J−1 respectively store data C1, B1 and D1. Register R9 in cell J stores a void datum.

At time t=2, data E1, F1, G1 and H1 are supplied to cells J+1, J, J−1 and J−2. Shift registers RS11, RS12 and RS13 in cell J respectively store data B1 and F1, A1 and E1, C1 and G1. Shift registers RS11, RS12 and RS13 in cell J−1 respectively store data C1 and G1, B1 and F1, and D1 and H1. That is, those shift registers sequentially shift the data supplied at time t=1. Register R9 in cell J stores datum D1.

At time t=3, data I1, J1, K1 and L1 are supplied to cells J+1, J, J−1 and J−2. Shift registers RS11, RS12 and RS13 in cell J respectively store data B1, F1 and J1; A1, E1 and I1; C1, G1 and K1. Shift registers RS11, RS12 and RS13 in cell J−1 respectively store data C1, G1 and K1; B1, F1 and J1; and D1, H1 and L1. That is, those shift registers sequentially shift the data supplied at time t=1 and t=2. Register R9 in cell J stores datum H1.

At time t=4, data M1, N1, 01 and P1 are supplied to cells J+1, J, J−1 and J−2. Shift registers RS11, RS12 and RS13 in cell J respectively store data B1, F1 J1 and N1; E1, I1 and M1 and ; G1, K1 and O1. Shift registers RS11, RS12 and RS13 in cell J−1 respectively store data C1, G1, K1 and 01; F1, J1 and N1; and H1, L1 and P1. That is, those shift registers sequentially shift the data supplied at time t=1, t=2 and t=3. Register R9 in cell J stores datum L1.

Thus, evntually at time t=4, data as shown in the slashed area in FIG. 47 are memorized in registers RS11, RS12, RS13 and R9. At this time, the center dot of the target cell has datum J1.

Even when the center dot pattern of 3*3 dots cannot be determined, since the operation part operates to add the surrounding dot pattern, the target line-narrowing is appropriately performed.

Figure 49:
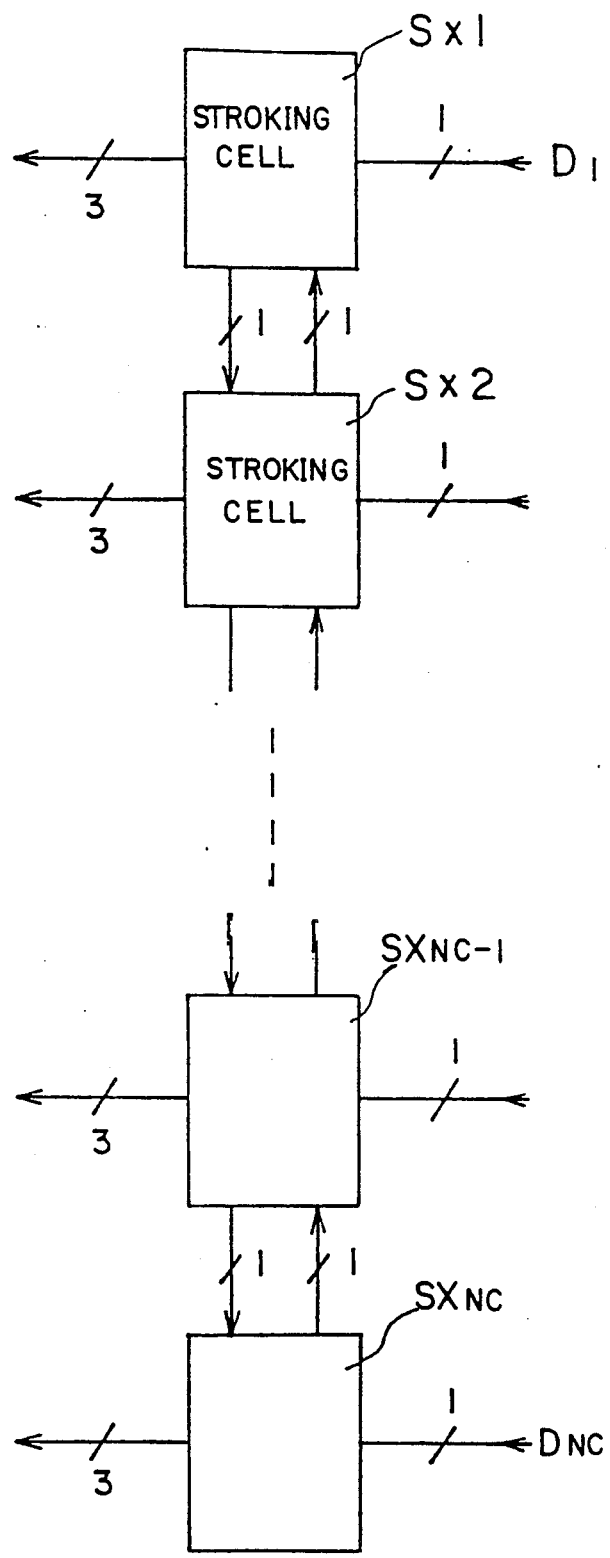
FIG. 49 shows the configuration of the stroking array in the stroking module in its embodiment of this invention using an array.

FIG. 49 shows the configuration of the stroking array in the stroking module 19 in the embodiment of this invention using an array.

Figure 50:
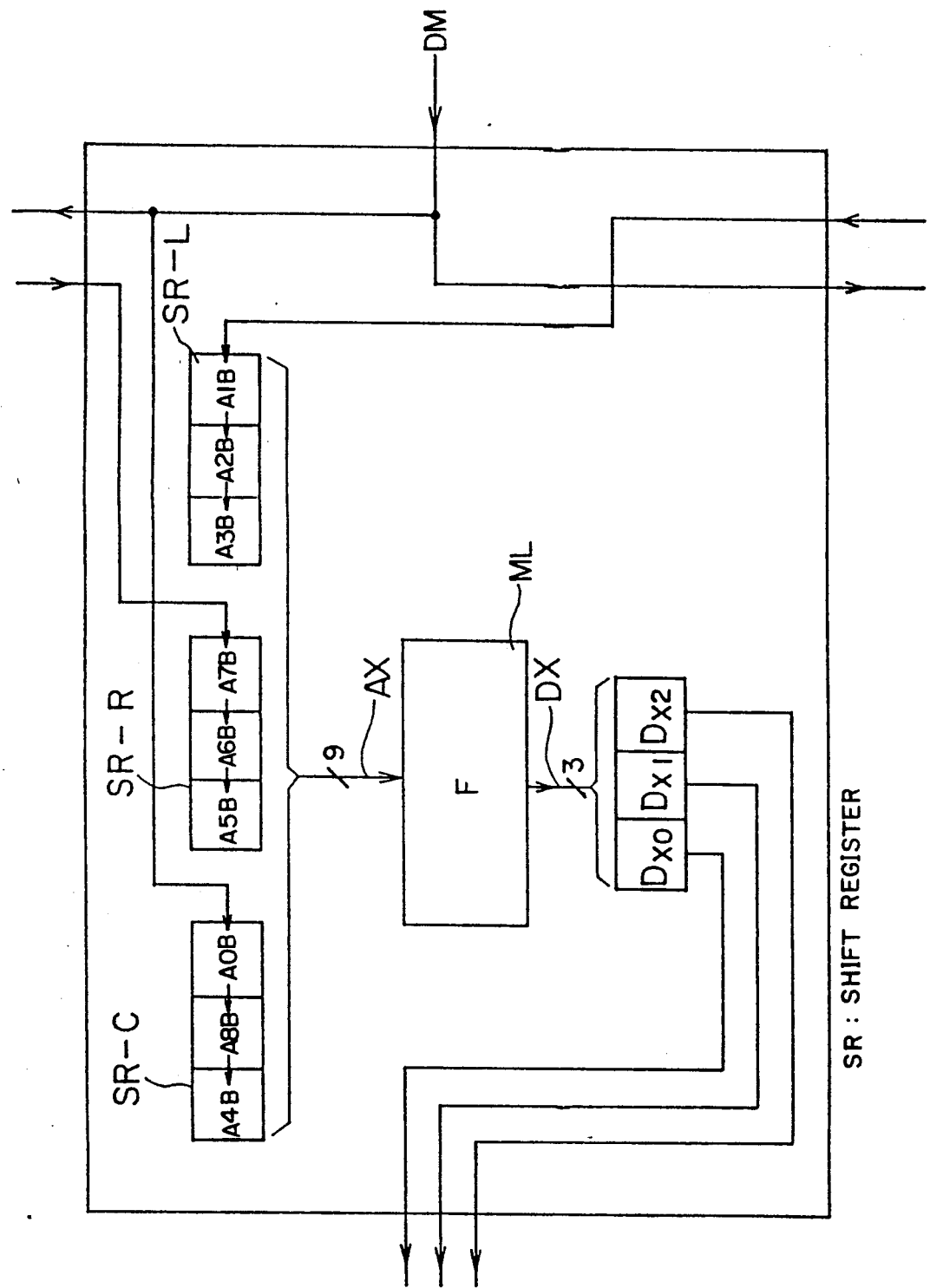
FIG. 50 shows the configuration of a stroking cell in the stroking module in its embodiment of this invention using an array.

FIG. 50 shows the configuration of a stroking cell in the stroking module 19 in the embodiment of this invention using an array.

Dot data for a character obtained at the line-narrowing module 18 are supplied to stroking cells SX1 through SXNE. That is, data D1 through DNE forming a dot row are respectively supplied to stroking cells SX1 through SXNE.

The stroking cells SX1 through SXNE simultaneously output the supplied data D1 through DNE to the neighboring cells. For example, the stroking cell SX2 simultaneously outputs data inputted to the stroking cells SX1 and SX3. In other words, each stroking cell is supplied from the neighboring cells with dots neighboring the dot of the corresponding position.

As shown in FIG. 50, respective stroking cells SX1 through SXNE comprise three shift registers SR-C, SR-R, SR-L, and dots supplied from the line-narrowing module 18 are inputted one dot at a time to shift register SR-C as well as shift to registers SR-R and SR-L in the neighboring cells. When data are supplied in dot-row units (or in dot-column units), shift register SR-C receives the dot datum corresponding to the cell, shift register SR-R receives the dot datum to the right of the center cell, and shift register SR-L receives the dot datum to the left of the center cell. When data of three dot rows are received, shift registers SR-L, SR-C and SR-R store data A3B, A4B and A5B in the first dot row; data A2B, A8B and A6B in the second dot row; and then data A1B, A0B and A5B in the third dot row.

Figures 51, 52:
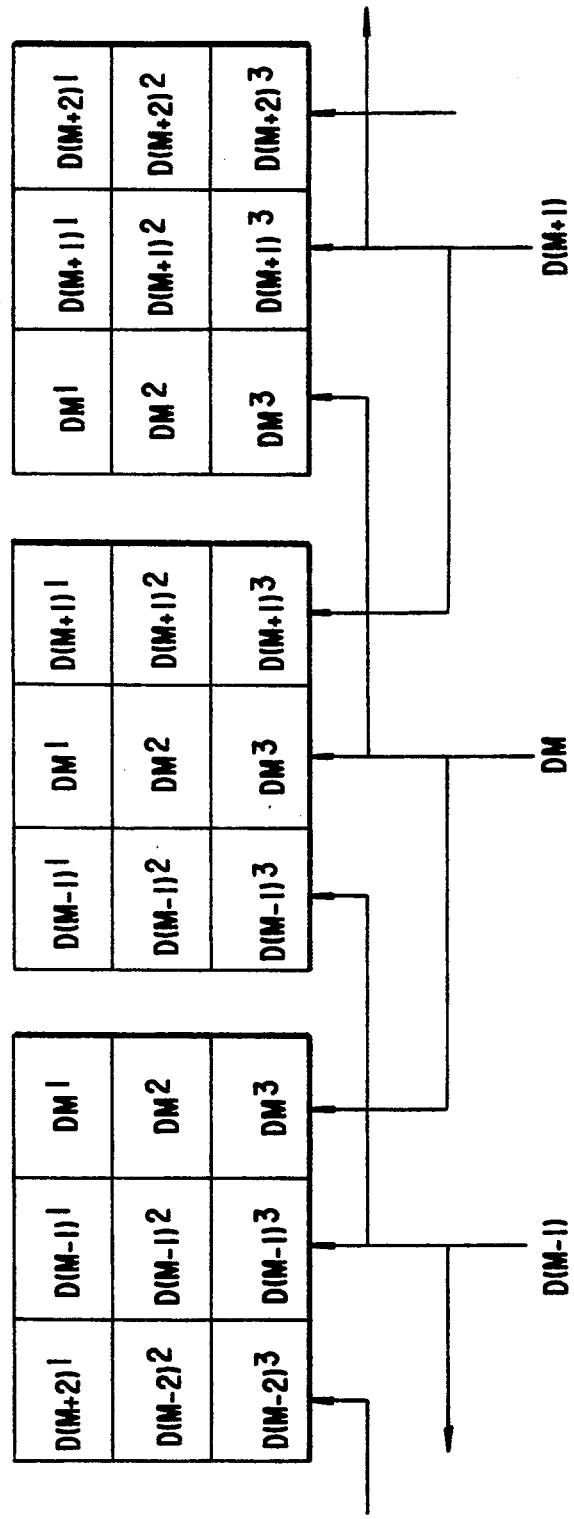
FIG. 51 shows a matrix of shift registers in the stroking module in its embodiment of this invention using an array.
FIG. 52 illustrates the operations in the stroking module in its embodiment of this invention using an array.

FIG. 51 shows a matrix of shift registers in the stroking module 19 in the embodiment of this invention using an array.

As shown in FIG. 51, the first, second and third lines of the stroking cell are respectively supplied with data A3B, A4B and A5b; A2B, A8B and A6B; and A1B, A0B and A7B.

FIG. 52 illustrates the operations in the stroking module 19 in the embodiment of this invention using an array.

Neighboring stroking cells are explained next. A stroking cell SXM supplied with data DM (refer to FIG. 52) receives its neighboring dots D(M−1) and D(M+1) through stroking cells SX(M−1) and SX(M+1). Therefore, shift register SR-C in the stroking cell SXM supplied with dot DM memorizes data DM1, DM2 and DM3. Shift register SR-R for the right dot stores data D(M+1)1, D(M+1)2 and D(M+1)3. Shift register SR-L for the left dot stores data D(M−1)1, D(M−1)2 and D(M−1)3. Shift register SR-C in the stroking cell supplied with data D(M+1) stores data D(M+1)1, D(M+1)2 and D(M+1)3. Shift register SR-L stores data DM1, DM2 and DM3. Shift register SR-R stores data D(M+2)1, D(M+2)2 and D(M+2)3.

Through the above operations, shift registers SR-C, SR-R and SR-L store a total of 3*3 dot data corresponding to the stroking cell comprising a center dot and surrounding dots above, below, right and left.

Shift registers SR-C, SR-L and SR-R supply the data to addresses of memory Ml which output 3-bit data corresponding to the pattern and memorized in advance.

FIG. 53 is a stroking table representing shift register values and an output in the stroking module 19 in the embodiment of this invention using an array.

A0B through A8B in the drawing refer to addresses corresponding to the 3*3 dot data described earlier. When the values of data A8B and data A4B are both "1", there is a case in which there is a dot above the center cell, so that the output is set to "010". When the value of data A8B and A6B are "1" and the value of data A4B is "0", the direction of the stroke is judged to be horizontal, and the output DX is set to "111".

When data A8B and A5B are "1" and data A4B and A6B are "0", the direction of the stroke is judged to be 45 degrees and the output DX is set to "110". When data A8B and A7B are "1" and data A4B, A5B and A6B are "0", the direction of the stroke is judged to be 135 degrees and the output DX is set to "011". Since the cell data stored in shift registers centered around A8B indicate the eight directions of the 8-dot data, other than those four directions, the four directions opposite to the above four directions are judged by considering such as a downward direction in the vertical case and a left direction in the horizontal case.

Therefore, when data A0B and A8B are "1" and data A6B, A4B, A5B and A7B are "0", the vertical output DX is set to "010". Similarly, when data A2B and A8B are "1", and data A6B, A4B, A5B, A0B and A7B are "0", the horizontal output DX is set to "111". When data A1B and A8B are "1", and data A2B, A6B, A4B, A5B, A0B and A7B are "0", the 45-degree output DX is set to "110". When data A3B and A8B are "1", and data A2B, A6B, A4B, A5B, A1B, A0B and A7B are "0", the 135-degree output DX is set to "011". In the present embodiment of this invention, other than the cases of 45 or 135 degrees, vertically or horizontally, there are cases in which no picture element exists or one exists in a block. When data A8B is "1" and all others are "0", the output DX is set to "100", and a code for expressing the existence of a dot only is outputted. When the value of data A8B is "0", it is considered that a picture element does not exist and "000" is outputted. When the values of data A2B, A8B, A6B, A4B and A0B are "1", the picture element is considered to be in the block, and "101" is outputted. When the value of data A3B, A5B, A1B, A7B and A8B are "1", it is considered to be a "cross" and "001" is outputted.

As stated above, data coded by respective 3*3 patterns are outputted from stroking cells SX1 through SXNE. Since stroking cells SX1 and SXNE are at the edges, terminals of SX1 and SXNE, not shown, are supplied with "0".

As described above, since the respective stroking cells are provided with tables, and neighboring dots are added in cell units, each time one dot row is added in the line direction in the 3*3 dot pattern in a column or row unit, the dot unit is obtained.

FIG. 54 is a noise reduction table in the stroking module 19 in the embodiment of this invention using an array.

In the array shown in FIG. 49, by making the content of the memory Ml in a stroking cell shown in FIG. 50 as shown in FIG. 54, the noise reduction module 11 shown in FIG. 2A is configured.

When the value of data A8B is "1" and all others are "0", "0" is outputted. Similarly, when the values of data A8B and A2B are "1" and all others are "0", when the values of data A8B and A6B are "1" and all others are "0", when the values of data A8B and A3B are "1" and all others are "0", when the values of data A8B and A4B are "1" and all others are "0", when the values of data A8B and A5B are "1" and all others are "0", when the values of data A8B and A4B are "1" and all others are "0", or when the values of data A8B and A7B are "1" and all others are "0", "0" is outputted. When the value of data A8B is "1", by making all others "1" except for the above patterns, noise can be reduced.

The present embodiment of this invention is explained for its application to image data, but the application of this invention is not limited to image data, but can be similarly applied to other two-dimensional data in finding their interrelations.

Figure 55:
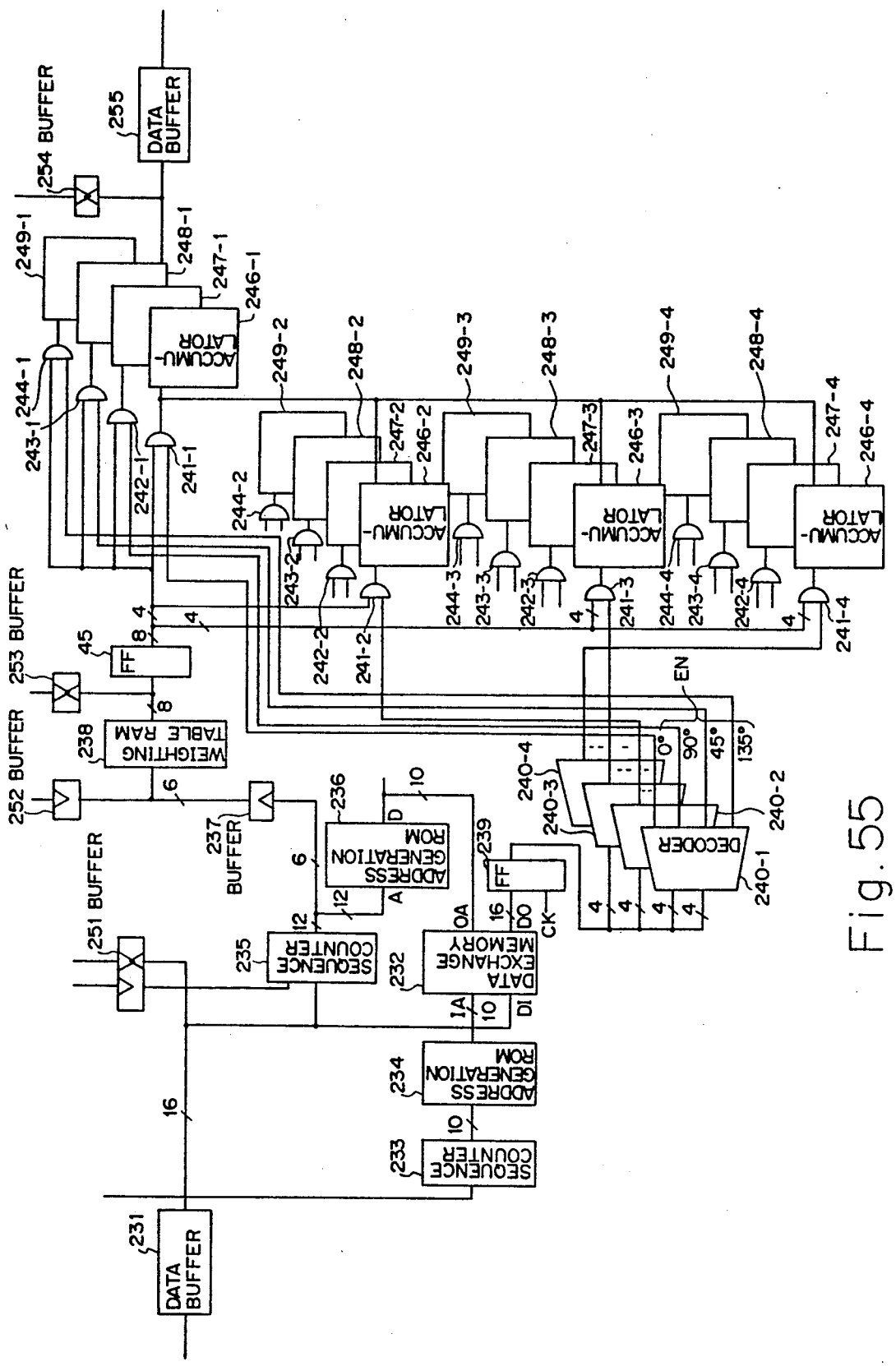
FIG. 55 is a detailed diagram of the feature vector module 20.

FIG. 55 is a detailed diagram of the feature vector module 20. The line narrowing module 18 converts the image data of an extracted character to the image data of a 1-dot-width character. The stroke module 18 determines, in dot units, the direction of the stroke comprising the narrow lines in the 1-dot-width character Linenarrowing data obtained at the line-narrowing module 18 are supplied to a data buffer 231, which is a FIFO having a capacity for memorizing line narrowing data in character units. Data memorized in the data buffer 231 are read in 16-bit units and supplied to a data exchange memory 232.

By a reading instruction from a CPU not shown in the drawing, clock pulses are sequentially supplied from the CPU to a sequence counter 233, which counts the number of clock pulses. The number of clock pulses corresponds to the number of readings from the data buffer 231. That is, one data reading causes the sequence counter 233 to increment its count value.

The 16-bit count value in the sequence counter 233 is supplied to an address generation ROM 234, which memorizes a storage position in the data exchange memory 232. The count values of the sequence counter 233 correspond one-by-one to positions read from the data buffer 231. When the sequence counter 233 indicates "1", data D01, D02, D03 and D04 are specified, as shown in FIG. 56.

In the embodiment of the feature vector module 20 shown in FIG. 55, stroke data of 16-bit length are read. Stroking data includes, e.g., four directions from one dot and the existence of strokes and crossings. Directions from one bit are expressed in three (3) bits. To improve the reading efficiency, stroke information of one dot is configured to comprise four (4) bits, which are supplied to the data exchange memory 232 in a single reading.

The data buffer 231 has a FIFO structure, and first inputted data FIFO-DATA1 (comprising D01 through D04) are supplied to the data exchange memory 232.

At this time, the address generation ROM 234 outputs "0000" and the exchange memory 232 stores data FIFO-DATA1 in address "0000". Then data FIFO-DATA2 are supplied. The sequence counter 233 indicates "0001". Address "0001" in the address generation ROM stores decimal 64 and this value is supplied to the input address terminal of the data exchange memory 232. Thus, data FIFO-DATA2 (comprising D05 through D08) are stored in the sixty-fourth address. (Refer to FIG. 57.) The address generation ROM 234 supplies addresses to the data exchange memory 232, so that data are sequentially stored in every sixty-four (64) addresses. When the seventeenth data FIFO-DATA17 are supplied, the address becomes "0001" and the data conversion memory 232 memorizes data FIFO-DATA17 in the first address. Then, the sixty-fifth address sequentially stores data FIFO-DATA18 after 16 pieces of earlier data are stored.

Figure 63:
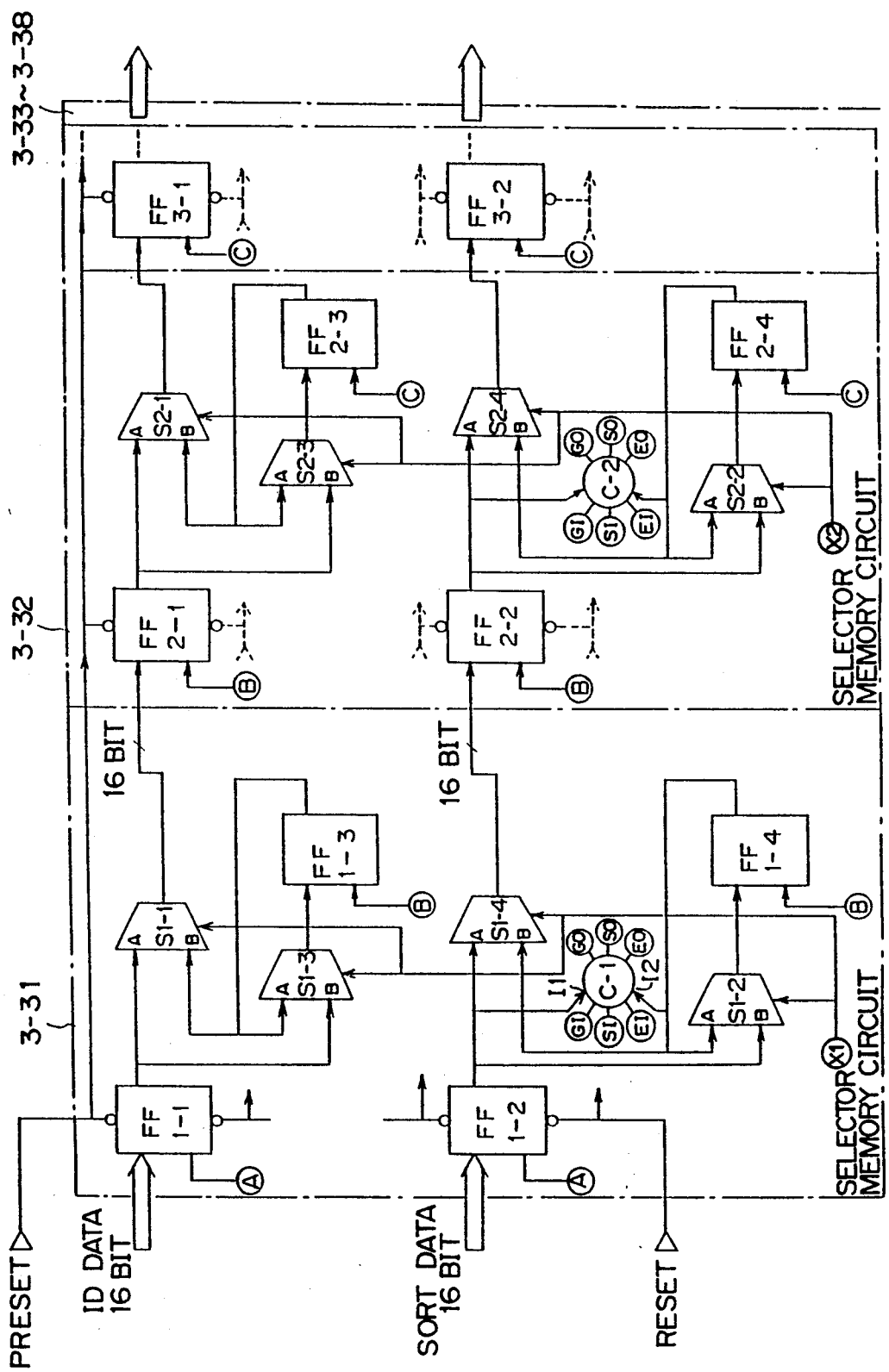
FIG. 63 shows a block diagram of the upper rank selection module 25, which is for obtaining the candidates of inputted characters.

The embodiment shown in FIG. 55 assumes a character region comprising 64*64 dots, which are supplied in 4-bit units to the data buffer 231. The buffer 231 is a 1024-stage FIFO for storing in 4-bit units a total of 4096 (64*64) bits. Data FIFO-DATA1 through FIFO-DATA1024 memorized in the data buffer 231 are stored sequentially in every sixty-four (64) address. The stroke data in 4-bit units are 4-dot data in the vertical direction. This is clear from FIG. 58 which show the relation between the image data after conversion and the memory addresses. Therefore, when stroke data of four (4) bits in the vertical direction are supplied as shown in FIG. 58, 0 through 63 become the horizontal addresses. That is, in the horizontal direction, addresses 0 through 63 represent a total of 64 dots. Since the four dots are read commonly in the vertical direction, there are 16 addresses.

Through the operations of the sequence counter 233 and the address generation ROM 234 shown in FIG. 55, the data exchange memory 232 sequentially stores e.g. data of four dots in the vertical direction in every sixty-four (64) addresses.

After the storing operation is completed, a sequence counter 235 starts the counting action, and addresses are supplied sequentially to the respective address terminals of a weighting table RAM 238 through an address generation ROM 236 and a buffer 237. Although it is not shown in the drawing, the sequence counter 235 is a circuit for starting the counting action upon receiving an instruction from a CPU. Count data incremented by the sequence counter 235 are supplied to an address of the address generation ROM 236, so that the address generation ROM 236 generates addresses to be accessed in region units comprising 16*16 bits.

Figures 59, 60:
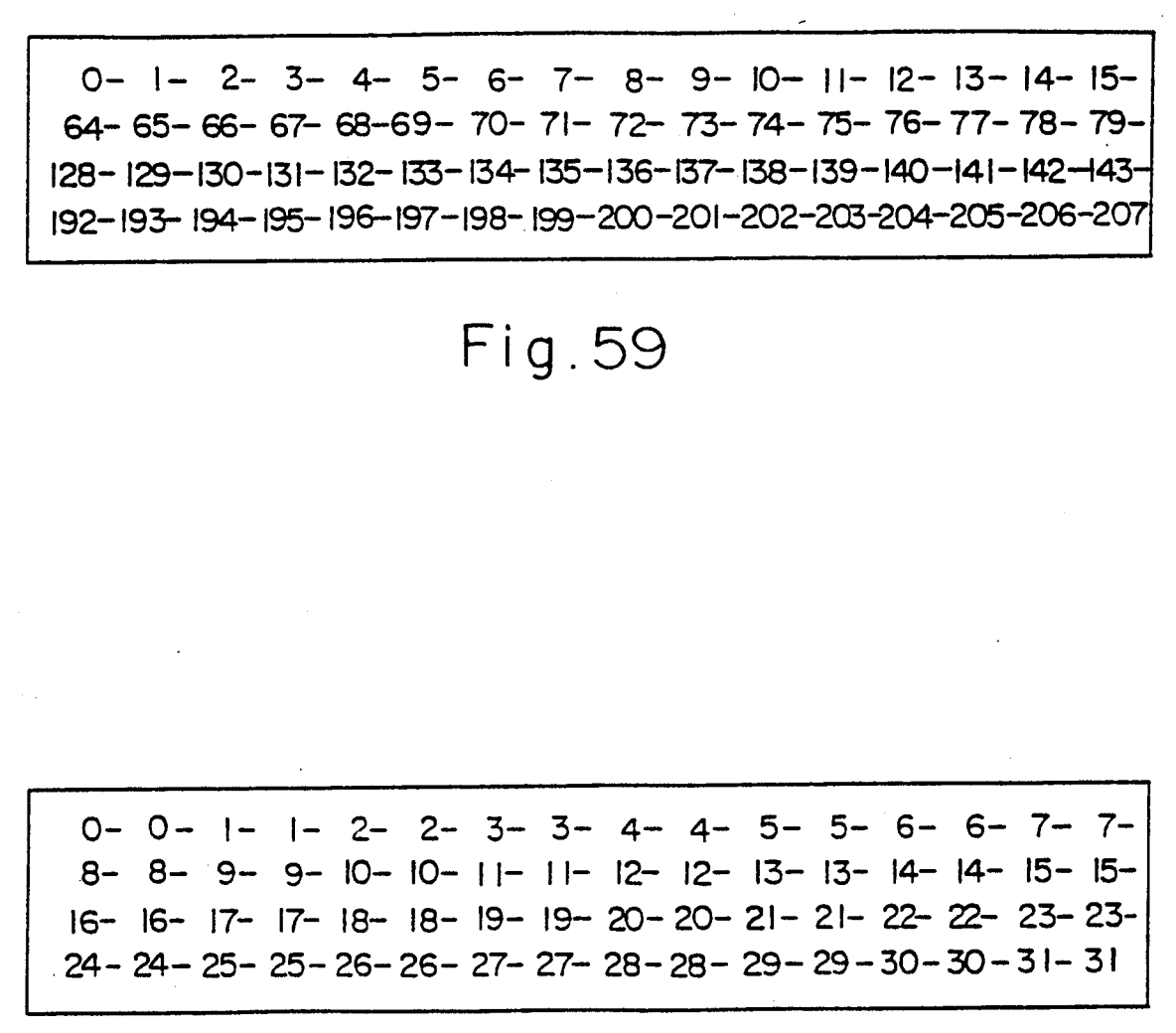

FIG. 59 is a generated address table for region 1. Region 1 contains generated addresses 0–15, 64–79, 128–143, and 192–207. When the count value of the sequence counter is expressed as CX0, the relation between the CX0 values and the generated addresses are as follows.

---

When CX0=0, the generated address is "0".
When CX0=1, the generated address is "1".
.
.
.
When CX0=14, the generated address is "14".
When CX0=16, the generated address is "64".
When CX0=17, the generated address is "65".
.
.
.
When CX0=30, the generated address is "78".
When CX0=32, the generated address is "128".
When CX0=33, the generated address is "129".
.
.
.
When CX0=46, the generated address is "142".
When CX0=48, the generated address is "192".
When CX0=49, the generated address is "193".
.
.
.
When CX0=62, the generated address is "206".

---

Data generated by the address generation ROM 236 are supplied to the output addresses of the data exchange memory 232.

The data exchange memory 232 outputs a total of sixty-four (64) addresses having horizontal addresses 0 through 15 and vertical addresses 0, 64, 128 and 192 as shown in FIG. 58, which illustrates the relation between memory addresses and image data after conversion. After temporarily storing the sixty-four (64) addresses for adjusting their timings, a flip-flop (latch) 239 supplies them in 4-bit units, i.e. in 1-dot units, to decoders 240-1 through 240-4.

Decoders 240-1 through 240-4 decode the vector direction (horizontal, vertical, slash and back slash) data of respective dots, and output "H" level signals when respective vector components exist. "H" level signals for the horizontal direction outputted from decoders 240-1 through 240-4 are supplied to "AND" gates 241-1 through 241-4. "H" level signals for the vertical, slash and back slash directions outputted from decoders 240-1 through 240-4 are supplied respectively to "AND" gates 242-1 through 242-4, 243-1 through 243-4, and 244-1 through 244-4.

The embodiment of this invention shown in FIG. 55 purports to obtain the distance, i.e. the difference, by weighting the vectors in different parts of a 16*16-dot character area. Respective "AND" gates turned on by the vector direction data receive 4-bit data from the weighting table RAM 238 through a flip-flop (latch) 245 for adjusting the timings. More specifically, different weights are assigned to solid 4*4 dots at the center, harrow 8*8 dots excluding the 4*4 dots at the center, harrow 12*12 dots excluding the 8*8 dots at the center, and harrow 16*16 dots excluding the 12*12 dots at the center. The weighting table RAM 238 outputs 8-bit data, because the weights for the neighboring two dots in a pair are the same. The weighting table RAM 238 supplies the weights corresponding to the pairs of two dots to appropriate "AND" gates.

The operations for the horizontal direction data are discussed below as an example. Since "AND" gates 241-1 and 241-2 correspond to two neighboring dots in a pair, they receive the same weights as those obtained from the first four (4) bits of the eight (8) bits outputted from the weighting table RAM 238. Since "AND" gates 241-3 and 241-4 correspond to the two neighboring dots in another pair, they receive the same weights as those obtained from the second four (4) bits of the eight (8) bits outputted from the weighting table RAM 238. Respective outputs from "AND" gates 241-1 through 241-4 are supplied to accumulators 246-1 through 246-4.

The embodiment shown in FIG. 55 purports to obtain weighted feature vectors also for the vertical, slash and back slash directions. Thus, the first and second four (4) bits outputted from the weighting table RAM 238 are supplied respectively to "AND" gates 242-1 and 242-2 and to "AND" gates 242-3 and 242-4 in the operations for the vertical direction; to "AND" gates 243-1 and 243-2 and to "AND" gates 243-3 and 243-4 in operations for the slash direction; and to "AND" gates 244-1 and 244-2 and to "AND" gates 244-3 and 244-4 in operations for the back slash direction. The outputs from "AND" gates 242-1 through 242-4, 243-1 through 243-4, and 244-1 through 244-4 are supplied respectively to accumulators 247-1 through 247-4, 248-1 through 248-4, and 249-1 through 249-4.

Since the operations, such as accumulations, for the respective directions are similar, those for the horizontal direction are explained in more detail. When decoders 240-1 through 240-4 determine the vector direction to be horizontal after decoding vector direction data, "AND" gates 241-1 through 241-4 for operations for the horizontal direction are turned on. Then, "AND" gates 241-1 and 241-2 supply the first 4-bit weight data outputted from the weighting table RAM 238 to accumulators 246-1 and 246-2; and "AND" gates 241-3 and 241-4 supply the second 4-bit weight data outputted from the weighting table RAM 238 to accumulators 246-3 and 246-4.

When all operations in region 1 are completed, a CPU not shown in FIG. 55 instructs accumulators 246-2 through 246-4 to sequentially supply data to accumulator 246-1, which thus obtains the weighted feature vector in the horizontal direction.

The weighting table RAM 238 described earlier memorizes the weight data in 2*2 dot units. The weight data pertaining to dot data for the vertical direction are common in dot units. As described earlier, the first 4-bit weight data are supplied to "AND" gates 241-1 and 241-2, and the second 4-bit weight data are supplied to "AND" gates 241-3 and 241-4. Since the two horizontally neighboring dots in a pair have the same addresses, according to the instruction from the sequence counter 235, the weighting table RAM 238 outputs the same weight data for the horizontally neighboring tow pairs of dots.

More specifically, the sequence counter 235 outputs the lowest six (6) bits, excluding the 1 LSB (least significant bit), of the 12 bits supplied to the address generation ROM 236 by sequentially incrementing the count value. Thus, when the sequence counter 235 shows 0 or 1, the weighting address RAM 238 receives address 0 for two dots, and then address 1 for the next two dots.

That is, the same address is assigned to the same two dots. Accordingly, the same weight data are outputted. Thus, each time two dots are read, decoders 240-1 through 240-4 decode the vector direction data, and the gates of accumulators 246-1 through 249-4 are controlled. The weight for the two dots does not change and 16*16 dot regions are weighted in 2*2 dot units and their weights are accumulated.

By operating as above, addresses generated by the generation address table of region 1 (refer to FIG. 59) enable the 16*16 dot data to be called up, and the corresponding output from the weighting data table 238 changes every two dots. The address generation ROM 236 for outputting addresses for 2*2 dot regions comprises a 12-bit address terminal and a 10-bit output terminal. By relating the address generation ROM 236 and the weighting table RAM 238, feature vectors in 2*2 dot region units can be obtained.

Figures 61, 62:
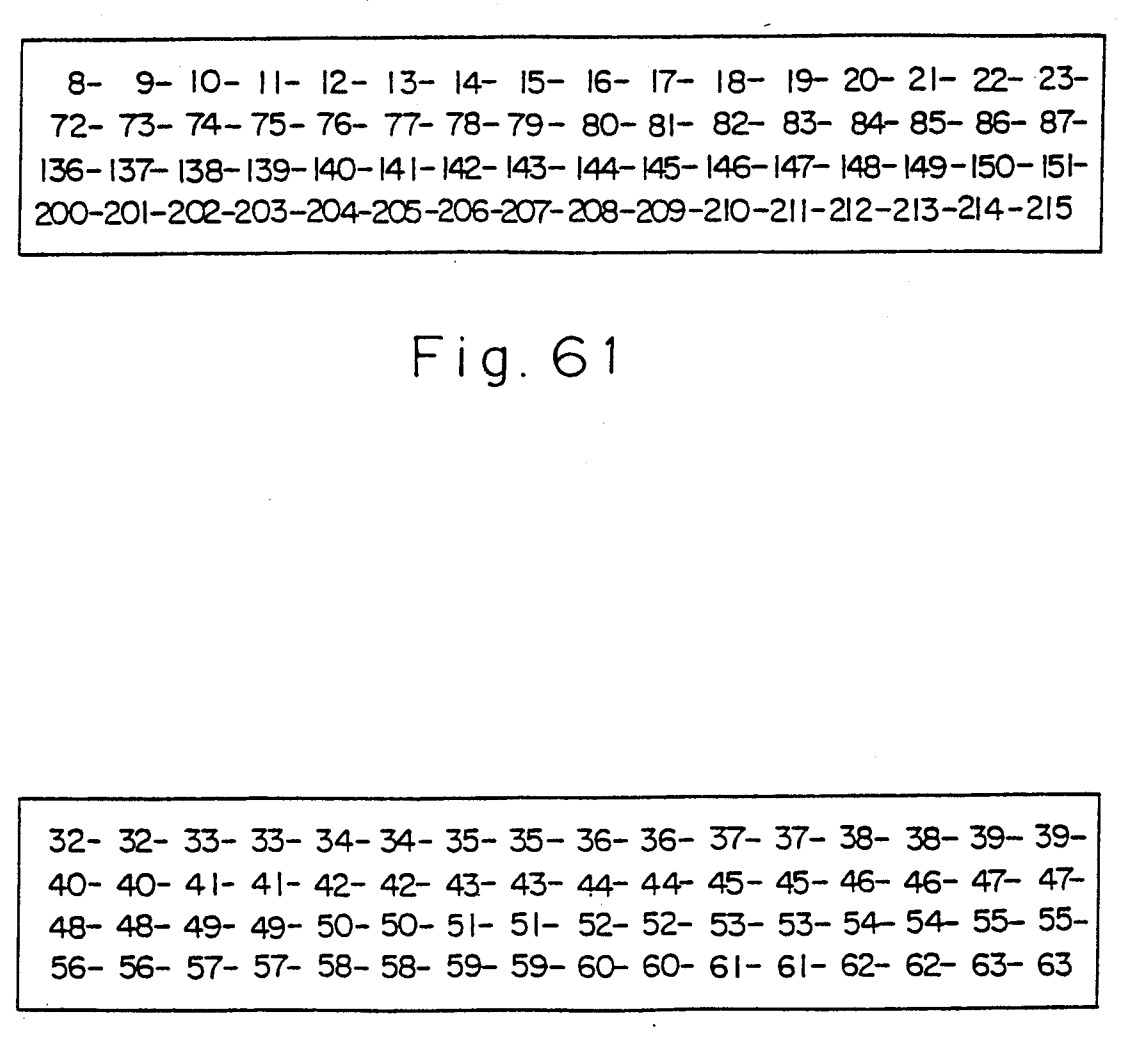

FIG. 61 shows a generation address table for region 2, and FIG. 62 shows a weighting table address table for region 2. Weights can be sequentially changed for region 2.

Since the outputs from the data buffer 231 are connected with a buffer 251 connected to a bus of a CPU not shown in the drawing, it is possible to monitor memorized data. Since the sequence counter 235 is connected to the buffer 251, the sequence counter 235 can be initialized by a CPU control.

The address input terminal and the data terminal of the weighting table RAM 238 are respectively connected to buffers 252 and 253. When dictionaries 23, comprising the class dictionary 23-1, the candidate dictionary 23-2 and the association dictionary 23-3, weight feature vectors differently, the CPU assigns the weights according to the dictionary data to the vector direction data, by storing in buffer 253 weight data obtained by accessing the weighting table RAM 238 through the buffer 252. That is, the content of the weighting table RAM 238 can be changed arbitrarily in accordance with an objective.

Meanwhile, the accumulators 246-1 through 249-1 are connected to a data buffer 255 and a buffer 254. These bufers enable a CPU to receive data. When, for example, a recognition in character units is performed again (confirmed recognition), the CPU can read data in accumulators 246-1 through 249-1 from buffer 254.

When respective circuits recognize characters as shown in FIG. 2A, by supplying data (e.g., in region units), stored in the data buffer 255 to the distance computing module 21, the distance for feature vectors obtained at high speed can be determined in a pipeline processing.

The following describes in detail the upper rank selection module 25. FIG. 63 shows a block diagram of the upper rank selection module 25, which is for obtaining the candidates of inputted characters. Selector memories 331 through 338 are serially connected.

16-bit data to be sorted are inputted to flip-flop FF1-2 and thence to input terminal A of selector S1-4, input terminal B of selector S1-2 and input terminal I1 of comparator C-1. Outputs from flip-flop FF1-4 are supplied to input terminal B of selector S1-4, input terminal A of selector S1-2 and input terminal I2 of comparator C-2. Outputs from selector S1-2 are supplied to flip-flop FF1-4. Outputs from selector S1-4 are supplied to the selector memory 332 in the next stage.

When flip-flop FF1-2 receives the 16-bit data to be sorted at clock A, comparator C-1 compares data memorized in flip-flop FF1-4 with data memorized in flip-flop FF1-2 and outputs the result to signal terminals GO, SO and EO according to the compared values.

Signal terminal GO receives 1 when data supplied from terminal I2 are greater than data supplied from terminal I1 and 0 otherwise. Signal terminal SO receives 1 when data supplied from terminal I2 are less than data supplied from terminal I1 and 0 otherwise. Signal terminal EO receives 1 when data supplied from terminal I2 are equal to data supplied from terminal I1 and 0 otherwise.

By selectively connecting signal terminals GO, SO and EO to selector terminal X1 of selectors S1-1 through S1-4, a desired sorting is performed.

For example, when signal terminal GO and selector terminal X1 are connected, since signal terminal GO and consequently selector terminal X1 receive 0 when data supplied from terminal I2 are not greater than data supplied from terminal I1, selector S1-2 selects data outputted from flip-flop FF1-2 and flip-flop FF1-4 receives the data (outputted from flip-flop FF1-2) at clock B, whose phase can be either the same as or different from that of clock A. Selector S1-4 selects data memorized in flip-flop FF1-4 and outputs them to the selector memory 332 of the next stage. However, when data supplied from terminal I2 are greater than data supplied from terminal I1, selector S1-4 selects data outputted from flip-flop FF1-2 and outputs them to the selector memory 332 of the next stage. Selector S1-2 selects data outputted from flip-flop FF1-4 and outputs them to the selector memory 332 of the next stage.

That is, since flip-flop FF1-4 does not change inputted data but outputs them "as is" when they are smaller than data memorized in flip-flop FF1-4, they are arrayed in the first stage, the second stage, the third stage, and so forth, of serially connected selector memories 331 through 338 from the inputted data with the highest score.

Similarly, when signal terminal SO and selector terminal X1 are connected, since signal terminal GO and consequently selector terminal X1 receive 1 when data supplied from terminal I2 are not greater than data supplied from terminal I1, selector S1-4 selects data outputted from flip-flop FF1-2. Selector S1-4 selects data memorized in flip-flop FF1-4 and outputs them to the selector memory 332 of the next stage. Hoever, when data supplied from terminal I2 are greater than data supplied from terminal I1, selector S1-4 selects data outputted from flip-flop FF1-4. Selector S1-2 selects data outputted from flip-flop FF1-2 and outputs them to the selector memory 332 of the next stage.

That is, the inputted data are arrayed in the first stage, the second stage, the third stage, and so forth, of selector memories 331 through 338 from the data of the lowest score.

When the signal terminal EO is connected to selector terminal X1, the number of the data outputted from flip-flop FF1-2, equal to the number of data outputted from flip-flop FF1-4, is memorized.

The upper rank candidate selection module 25 shown in FIG. 2A arrays data from the highest score and connects selector terminal X1 to signal terminal GO of comparator C-1.

Selector terminal X1 is also connected to selectors S1-1 and S1-3, which select 16-bit ID data corresponding to the 16-bit data to be sorted. Flip-flop FF1-1 receives the 16-bit ID data at clock A, and outputs the received data to input terminal A of selector S1-1 and input terminal B of selector S1-3. Data outputted from flip-flop FF1-3 are supplied to input terminal B of selector S1-1 and input terminal A of selector S1-3. Data outputted from selector S1-3 are supplied to flip-flop FF1-3 and data outputted from selector S1-1 are supplied to selector memory 332 of the next stage.

The configuration is essentially similar to that used in the selector operation of the 16-bit data to be sorted. That is, similar to selector S1-2 selecting data outputted from flip-flop FF1-2, when flip-flop FF1-4 memorizes the inputted 16-bit data to be sorted (when signal terminal GO is connected to selector terminal X1), selector S1-3 selects data outputted from flip-flop FF1-1 and supplies them to flip-flop FF1-3. Similar to selector 1-4 selecting data outputted from flip-flop FF1-4, selector S1-1 selects data outputted from flip-flop FF1-3 and outputs them to the selector memory 332 of the next stage.

In a contrary case, flip-flop FF1-4 does not change but selector S1-4 selects data outputted from flip-flop FF1-2 and outputs them to the selector memory 332 of the next stage. Thus, by outputting data outputted from flip-flop FF1-1 to the selector memory 332 of the next stage, selector S1-3 selects data outputted from flip-flop FF1-3. Thus, flip-flop FF1-3 does not change.

To reiterate the above processings, the selector memory 331 in the first stage connects selector terminal X1 to signal terminal SO, GO or EO, so that flip-flop FF1-4 memorizes e.g. the greatest value of the inputted 16-bit data to be sorted and flip-flop FF1-3 memorizes the corresponding ID data. All other data are outputted to the selector memory 332 of the next stage.

Selector memories 332 through 338, which are similar to selector memory 331, are connected serially. Their flip-flops FF2-1 through FF8-4, which are similar to flip-flops FF1-1 through FF1-4, memorize eight data from the one with the highest score (or the lowest score) and the corresponding ID data. Clock A of selector memory 331 and clock C of selector memory 332 may or may not be the same.

So far, the embodiment shown in FIG. 63 has been explained in detail. However, for instance, the largest or smallest four stages of multiple stage selector memories can be connected, thereby enabling multiple stages to be connected arbitrarily.

Although the embodiment shown in FIG. 63 explains the recognition processing part of a character recognition device, this invention is applicable to any means for sorting score data by comparisons.

Comparators C-1 through C-8 respectively comprise comparison input terminals. Although the embodiment shown in FIG. 63 assumes that 16-bit data to be sorted are inputted, by inputting the result of a lower ranked comparator to this comparator and by having the upper and lower ranked selector memories perform selections, more than 16 bits of data can be sorted. Not only sorting with the upper and lower ranked selector memories, but also sorting with multiple selector memories can be similarly realized for even more bits.

Figure 64:
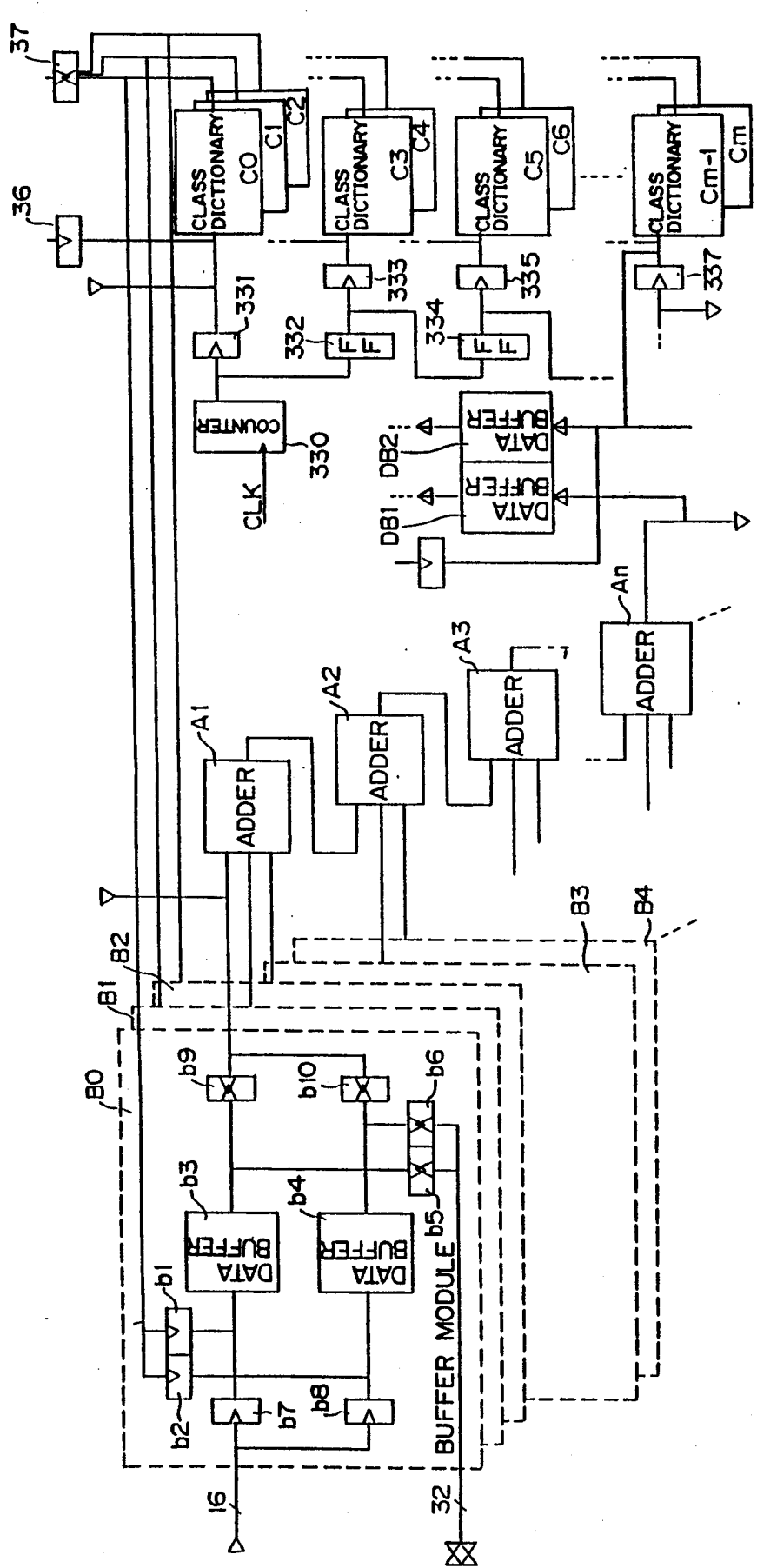
FIG. 64 shows the configuration of the comprehensive rating module 24.

FIG. 64 shows the configuration of the comprehensive rating module 24.

A counter 430 sequentially outputs a character code for adding a rating value (score) in character units, each time a clock pulse is supplied. The class dictionary 23-1 shown in FIG. 2A is divided into class dictionaried $C_o$ through $C_m$.

Outputs from the counter 430 are supplied through a buffer 431 to addresses of class dictionaries C0, C1 and C2, which memorize classes corresponding to character codes in 16*16 dot region units. In other words, the addresses become the character codes, and the class dictionaries C0, C1 and C2 memorize classes in region units of the characters to which the character codes belong.

Class dictionaries C0, C1 and C2 are commonly accessed by count values outputted from the counter 430. The class dictionaries C0, C1 and C2 output class numbers in 16*16-dot region units to which the same characters (codes) belong. The class numbers are inputted to address terminals of data buffers b3 and b4 through buffer b1 and b2 in buffer modules B0, B1 and B2.

Data buffers b3 and b4 memorize scores for classifications for respective regions by using class numbers as addresses (which comprise, for example, memories) and are supplied through buffers b7 and b8 with data corresponding to the class numbers obtained from the upper rank selection and score assignment module 22 before a comprehensive rating and the class numbers corresponding to the data. That is, when the addresses of data buffers b3 and b4 are inputted with a class number corresponding to a character outputted from a class dictionary, data buffers b3 and b4 supply their outputs, (i.e., scores), through buffers b9 and b10 to an adder A1 comprising three input terminals for adding three scores outputted from buffer modules B0, B1 and B2 and for outputting the result to the first input terminal of an adder A2.

Since an output from the counter 430 for a first clock is supplied commonly to class dictionaries C0, C1 and C2, the buffer modules B0, B1 and B2 simultaneously supply the rating values (scores) corresponding to the respective classes to the adder A1.

When adder A2 receives the sum of the scores of the 16*16-dot regions corresponding to buffer modules B0, B1 and B2 added by adder A1, the counter 430 receives the next clock pulse and increments its count value. Since an output from the counter 430 is also supplied to a flip-flop (latch) 432, the flip-flop 432 receives the count value before the counter 430 increments its count value.

Thus, a character code corresponding to the scores added by the adder A1 is supplied through a buffer 433 to class dictionaries C3 and C4, which output the class number to which the character belongs. Class dictionaries C3 and C4 are similar to class dictionaries C0, C1 and C2 described earlier. They memorize in character units classes to which characters belongs. More specifically, whereas class dictionaries C0, C1 and C2 memorize the class numbers of the codes belonging to region 0, region 1 and region 2, class dictionaries C3 and C4 memorize the class numbers of the codes belonging to region 3 and region 4.

When class dictionaries C3 and C4 are addressed by the values of the flip-flops 332 abd 334 described earlier, they output the class numbers corresponding to the character codes to buffer modules B3 and B4 configured similarly to buffer module B0 described earlier. Since data buffers b3 and b4 in buffer module B3 and B4 memorize the scores belonging to classes in 16*16-dot region units, buffer modules B3 and B4 output the class scores, and adder A2 supplies to an adder A3 the sum of the outputs from adder A1 and buffer modules B3 and B4.

As with adder A2 described earlier, adder A3 sequentially adds outputs from similar buffer modules, not shown in the drawing, for the next class dictionaries C5 and C6.

Finally, an adder An adds scores converted by a buffer module from data corresponding to the classes of class dictionaries Cm-1 and Cm, and the result is supplied to and memorized by a data buffer DB1.

Flip-flops 432 and 434 latch the addresses supplied to class dictionaries C0 through Cm described earlier, which together form the class dictionary 23-1 shown in FIG. 2A, before outputs from a counter 330 are changed on receipt of a first clock pulse of a system clock CLK. Class dictionary groups such as C0, C1 and C2; C3 and C4; C5 and C6; and Cm-1 and Cm, receive respective addresses sequentially delayed by one clock cycle.

Thus, the result of an addition at adder A1 is used in an addition at adder A2. The score at this time is added with the score of the class for the same character. Thus, the sum score stored in the data buffer DB1 corresponds to the score of the character code.

The outputs of the character codes sequentially shifted by the flip-flops, such as 432 and 434, and supplied finally to class dictionaries Cm-1 and Cm are also supplied to a data buffer DB2. Thus, the result of an addition outputted from adder An is supplied with the character code. That is, data buffers DB1 and DB2 memorize scores and their corresponding character code.

Class dictionaries C0 through Cm correspond to respective character codes when characters are classified into m classes and output the class numbers. Data buffers DB1 and DB2 output scores corresponding to the respective classes. The number of buffer modules B0 through B48 is equal to the number of divided regions. In this embodiment, the number is 49, since there are 7*7 regions.

In the buffer modules B0 through B48, a 16-bit address bus and a 32-bit data bus are connected to data buffers b3 and b4 through buffers b7 and b8 and through buffers b5 and b6, respectively. Class numbers corresponding to the respective classes are outputted to the 16-bit address bus. Scores corresponding to the class numbers are outputted to the 32-bit data bus. In other words, data buffers b3 and b4 memorize the class numbers and corresponding data inputted from the 16-bit address bus and the 32-bit data bus.

The class dictionaries C0 through Cm store class dictionary data for respective classes supplied from a system computer not shown in the drawing, which stores class dictionary data through buffers 438 and 439. The class dictionaries Co through Cm comprising RAMs can cope with various characters by rewriting the above described class dictionaries C0 through Cm.

In the embodiment of this invention shown in FIG. 64, adders A1 through An, each for adding three inputs, perform accumulations. The application of the principle of this invention is not limited to this embodiment. For example, the inputs to adders A1 through An can be made two (2) instead of three (3). so that class dictionaries C0 through Cm and buffer modules B0 through B48 can be accessed for each input. Sequential additions attain the same result. Adders A1 through An can also be configured to receive more than three inputs.

Figure 65:
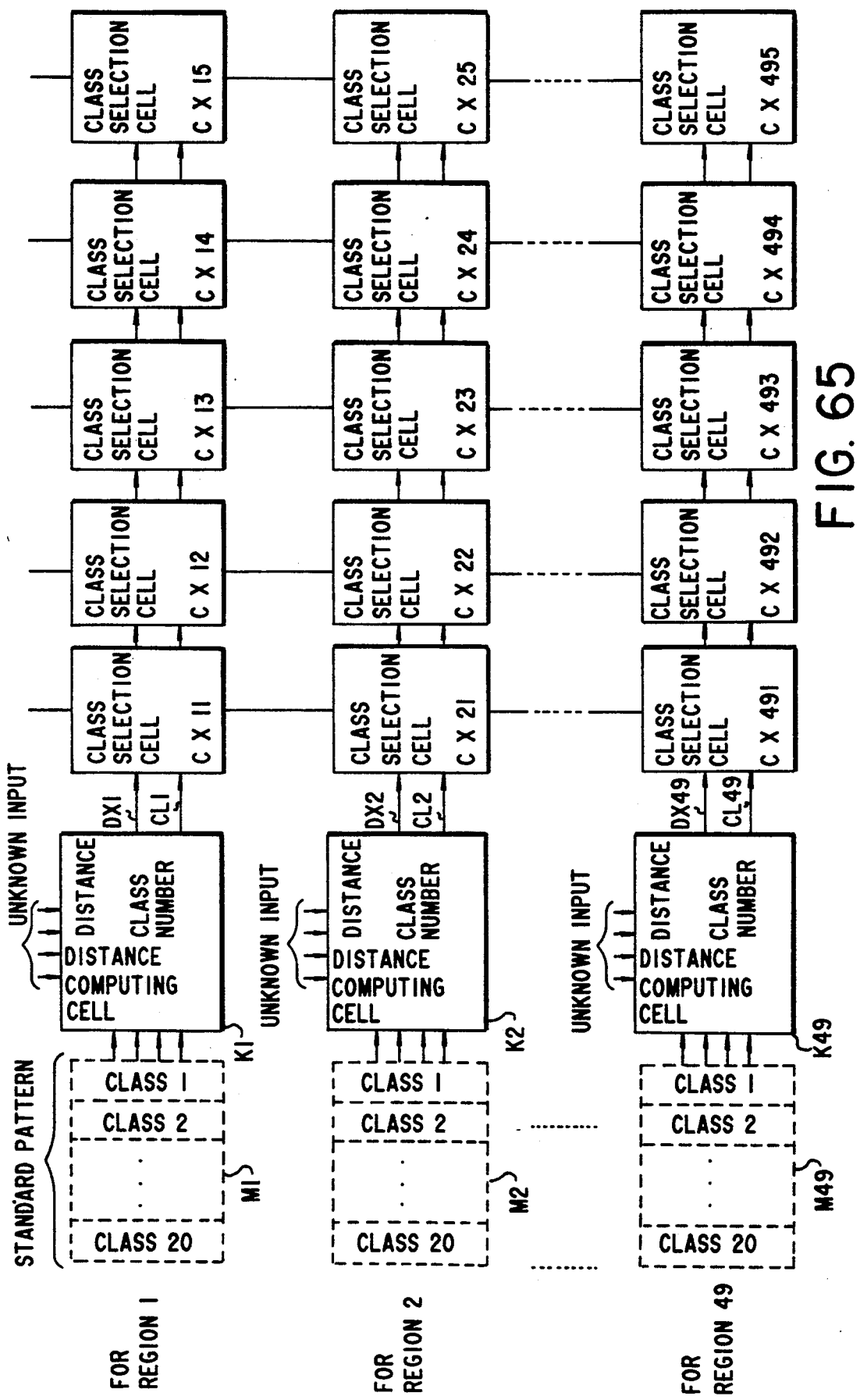
FIG. 65 shows the configuration of the cell structure circuit network for class selection in an embodiment of this invention.

FIG. 65 shows the configuration of the cell structure circuit network for class selection in an embodiment of this invention.

Standard patterns are stored in the class dictionary 23-1 in the vector dictionary 26 in the recognition processing part 27. Class dictionaries C0 through Cm memorize feature patterns of characters classified into m classes by a total of 49 4*4-dot regions each comprising four (4) 2*2-dot regions, as already explained in the description of the feature vector module 20. Here, m corresponds to the number assigned to the last class dictionary Cm. In this example, m is set twenty (20). Standard patterns represent class numbers comprising class 1 through class 20 by classifying 2965 Chinese characters of the JIS (Japanese Industrial Standards) first level for the respective forty-nine (49) 4*4-dot regions. In other words, character features are divided into forty-nine (49) regions, where similar features are classified into a total of twenty (20) classes.

Accordingly, the association dictionary 23-3 memorizes the classes to which characters belong in region units. However, since the association dictionary 23-3 needs only to memorize classes to which characters belong in region units, its capacity can be smaller than that of the candidate dictionary 23-2, which memorizes the features for the respective characters.

In the embodiment shown in FIG. 65, respective distance computing cells K1 through K49 correspond to memories M1 through M49 for memorizing standard patterns for region 1 through region 49 (each with 20 classes) and parallelly compute the distances for unknown inputs in respective region units.

The respective outputs from memories M1 through M49 are supplied to distance computing cells K1 through K49, which are supplied with additional unknown inputs in region units and obtain the distances between the feature vectors of the unknown inputs and the feature vectors of the standard patterns.

In the embodiment shown in FIG. 65, a total of forty-nine (49) feature vectors are obtained in the feature vector module 20. Hence, distance computing cells K1 through K49 compute the respective distances for the twenty (20) classes.

Figure 66:
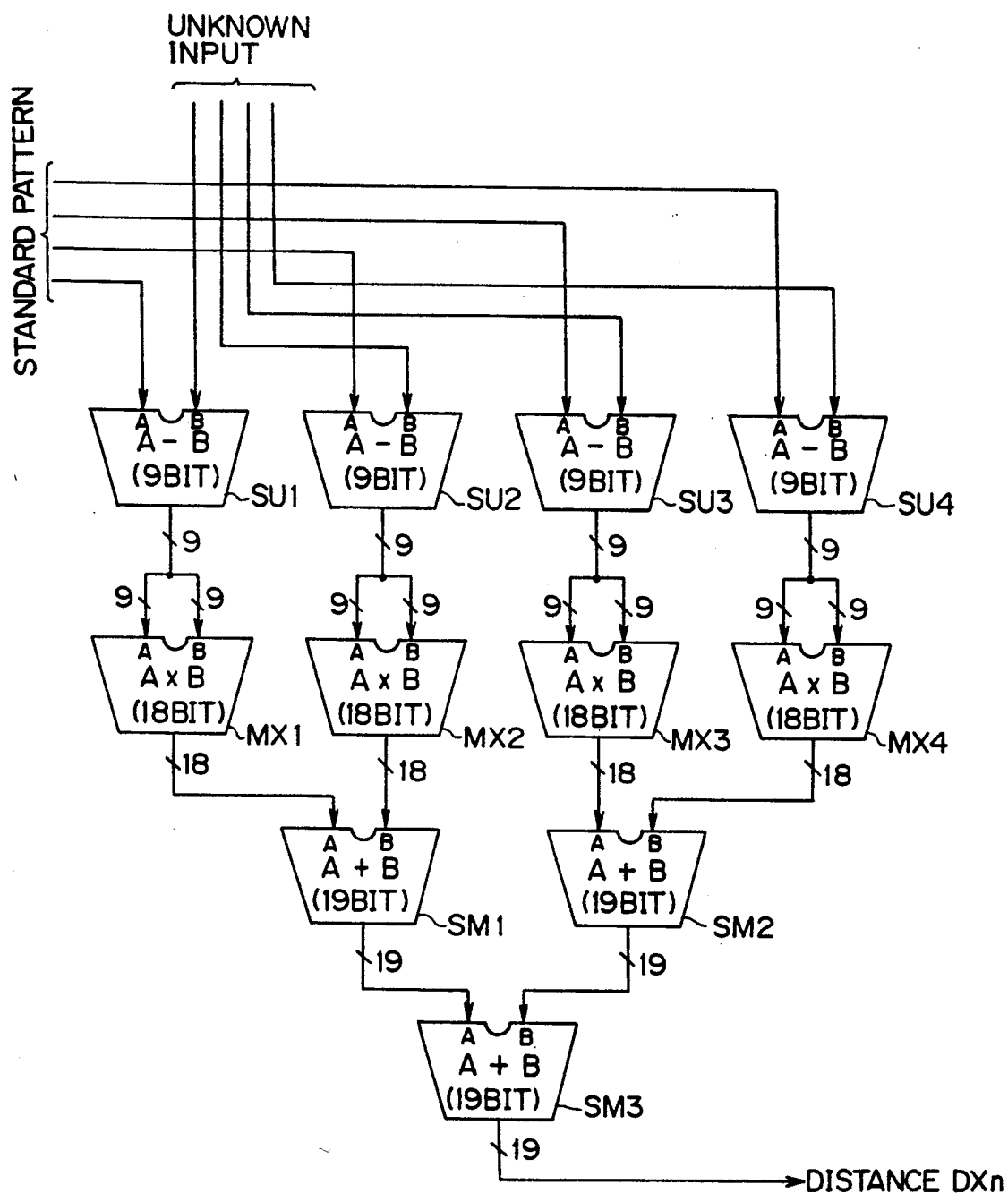
FIG. 66 shows the circuit configuration of distance computing cells K1 through K49 used in the embodiment shown in FIG. 65.

FIG. 66 shows the circuit configuration of distance computing cells K1 through K49 used in the embodiment shown in FIG. 65, which is supplied with unknown input values of the feature vectors (weighted sums) respectively in the horizontal, vertical, slash and back slash directions as well as standard pattern values (i.e., feature vectors of the standard patterns).

The standard pattern values (supplied from memories M1 through M49) and the unknown input values (supplied from the feature vector module 20) are outputted to subtracters SU1 through SU4 in correspondence with the respective directions. Input terminals A of subtracters SU1 through SU4 are supplied with the respective directional values of the standard patterns and input terminals B of the same are supplied with the respective directional values of the unknown inputs. Subtracters SU1 through SU4 output the difference of the values in the respective directions. These values comprise e.g. nine (9) bits and the outputted results of subtraction supplied to input terminals A and B of multipliers MX1 through MX4, which are circuits for outputting eighteen (18) bits by multiplying the values supplied to their respective input terminals A and B, are also of nine (9) bits.

In the embodiment shown in FIG. 66, since input terminals A and B of multipliers MX1 through MX4 are supplied with the same values, their outputs result in the second powers of the outputs from the subtracters SU1 through SU4.

The outputs from multipliers MX1 and MX2 are supplied to adder SM1. The outputs from multipliers MX3 and MX4 are supplied to adder SM2. Adders SM1 and SM2 are circuits for adding the values supplied to their respective input terminals A and B.

Since multipliers MX1 through MX4 output eighteen (18) bits, adders SM1 and SM2 output nineteen (19) bits. The outputs from adders SM1 and SM2 are supplied to input terminals A and B of adder SM3, which adds the values supplied to its input terminals A and B.

The three adders SM1, SM2 and SM3 together add the values in the multipliers MX1 through MX4. To summarize the above descriptions for the operations of the various components, distances are obtained by adding the second powers of the respective differences in the directional values of standard patterns and unknown inputs.

As described earlier, values outputted from memories M1 through M49 for region 1 through region 49 and unknown inputs undergo operations in the distance computing cells K1 through K49, so that distances DX1 through DX49 are obtained and outputted.

Although not shown in the drawing, class numbers are also supplied to distance computing cells K1 through K49 when the respective distances are determined from a control circuit. This control circuit instructs memories M1 through M49 to address the regions corresponding to the classes corresponding to the class numbers. The distance computing cells K1 through K49 concurrently compute distances DX1 through DX49 and output them better with the class numbers.

Distance computing cell K1 outputs distance DX1 and class number CL1 to a class selection cell CX11, which inputs its output data to a class selection cell CX12. Class selection cell CX12 then inputs its output data to a class selection cell CX13, which in turn inputs its output data to a class selection cell CX14. Finally, class selection cell CX14 inputs its output data to a class selection cell CX15. That is, class selection cells CX11 through CX15 are serially connected in five (5) stages and sequentially input their output data to the class selection cells of subsequent stages.

Class selection cells CX11 through CX15 are configured the same, and comprise registers for memorizing the distances and registers for memorizing the class numbers.

When the inputted distance values are smaller than the register values memorizing the distances, class selection cells CX11 through CX15 memorize the inputted distance values and the corresponding class numbers, and output the originally memorized distances and the corresponding class numbers to the class selection cells of the next stages.

When the inputted distance values are larger than the register values memorizing the distances, the class selection cells CX11 through CX15 output "as is" the register values of the distances, to the class selection cells of the subsequent stages.

Through these operations, class selection cells CX11 through CX15 sequentially memorize the pairs of distances and corresponding class numbers from the pair with the smallest distance.

Class selection cells CX21 through CX25 for region 2 and Class selection cells CX491 through CX495 for region 49 operate similarly.

Figure 67:
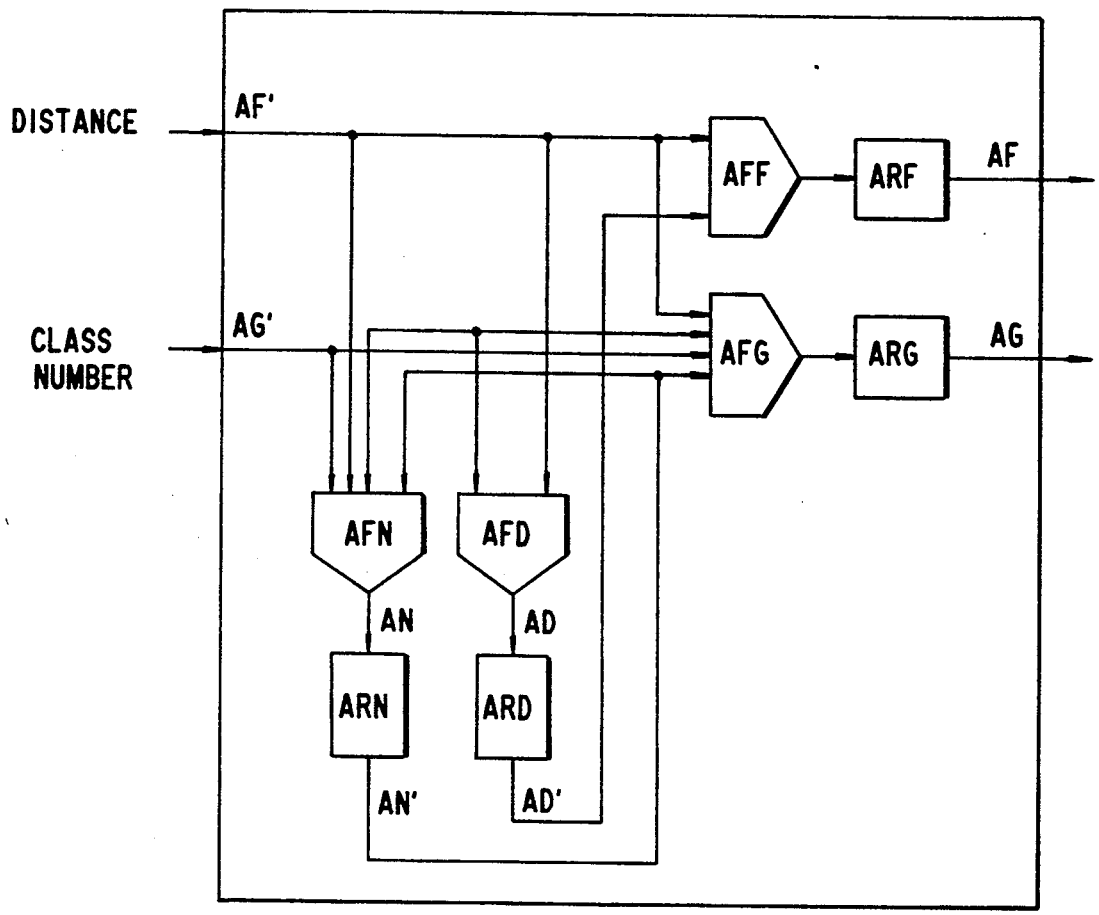
FIG. 67 shows the processing configuration in a first embodiment of class selection cells CX1 through CX49.

FIG. 67 shows the processing configuration in a first embodiment of class selection cells CX1 through CX49.

An inputted distance af' is supplied to functional operators $af_f$, $af_g$, $af_d$ and $af_n$. A class number ag' is supplied to functional operators $af_g$ and $af_n$. The output from functional operator $af_n$ is supplied to a register $ar_n$ and the output from functional operator $af_n$ is supplied to register $ar_d$. An output ad' from register $ar_d$ is supplied to functional operators $af_f$, $af_d$, $af_g$ and $af_n$. An output an' from register $ar_n$ is supplied to functional operators $af_g$ and $af_n$.

When the inputted distance af' is smaller than the value ad' memorized in register $ar_d$, functional operator $af_d$ outputs the inputted distance af' and outputs ad' at all times.

When the inputted distance af' is smaller than the distance ad' memorized in register $ar_d$, functional operator $af_n$ outputs the inputted class number ag' and outputs an' memorized in register $ar_n$ at all other times. Functional operator $af_f$ outputs the distance ad' when the inputted distance af' is smaller than the distance ad' memorized in register $ar_d$ and outputs the inputted distance af' at all other times. When the inputted distance af' is smaller than the distance ad' memorized in register $ar_d$, the output ag from functional operator $af_g$ is set to an'. It is set to inputted class number ag' at all other times.

Through the above actions of functional operators $af_n$, $af_d$, $af_f$ and $af_g$, the distance af' is supplied. When af' is smaller than the distance ad' stored in register $ar_d$ memorized before, register $ar_d$ stores the new distance af', and functional operator $af_f$ outputs the distance ad' outputted from register $ar_d$. The actions are similar for the class numbers. The distance ad' memorized in register $ar_d$ is compared with the inputted distance af'. When a new class number is stored in register $ar_d$, register $ar_n$ memorizes the new class number and the functional operator $af_g$ outputs the memorized value an' as the class number ag sent to the following stage.

Here, the registers $ar_f$ and $ar_g$ sequentially shift serially connected five-stage class selection cells CXn1 through CXn5, where n is an integer from 1 to 49 shown in FIG. 65 and not shown in FIG. 67 at each clock pulse. At the same time, registers $ar_f$ and $ar_g$ receive the outputs directly from functional operators $af_f$, and $af_g$ as well as indirectly from functional operators, $af_n$ and $af_d$.

Figure 68:
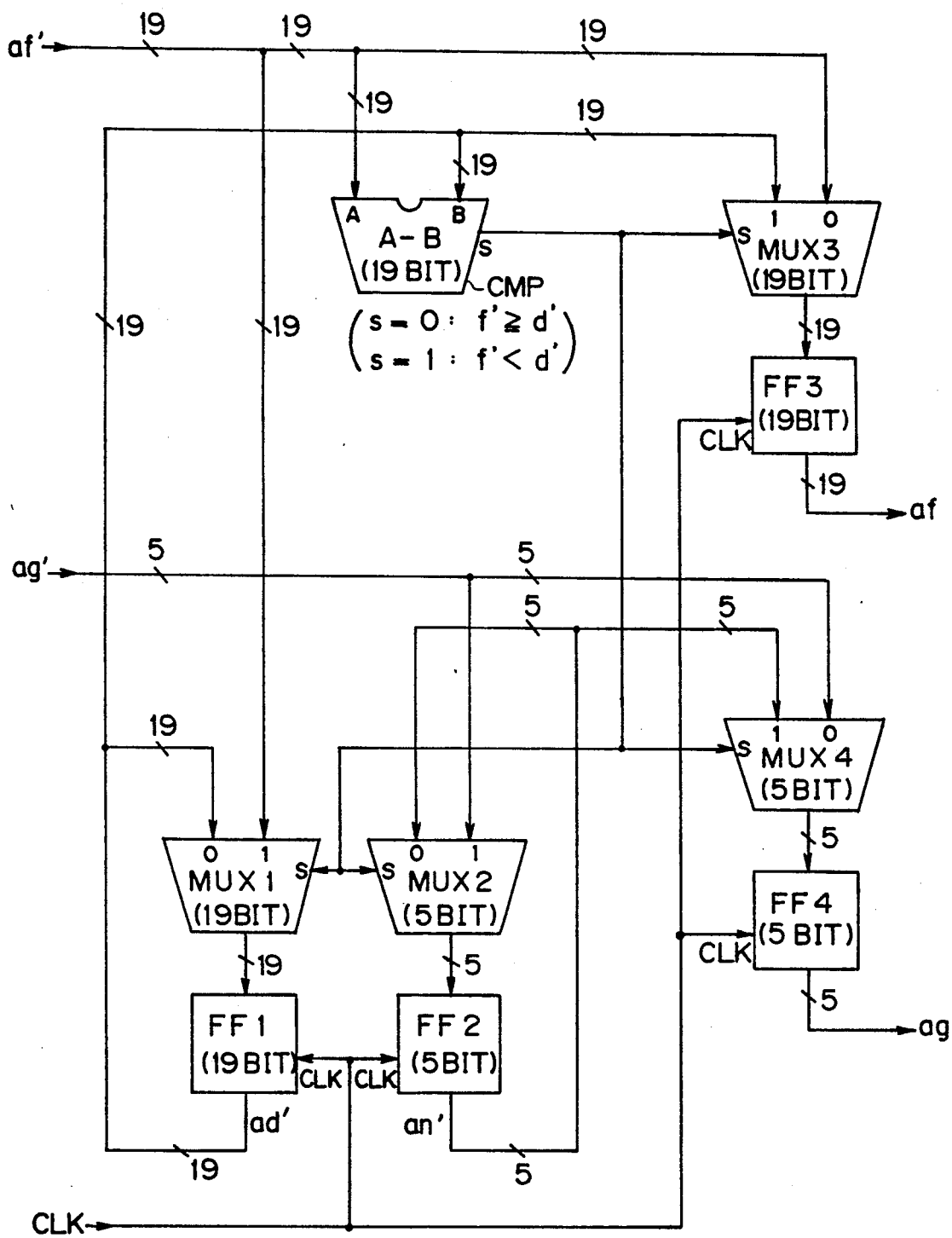
FIG. 68 shows the circuit configuration of a second embodiment of class selection cells CX11 through CX495.

FIG. 68 shows the circuit configuration of a second embodiment of class selection cells CX11 through CX495.

In the processing configuration shown in FIG. 67, respective functional operators $af_f$, $af_g$, $af_n$ and $af_d$ obtain the difference between the inputted distances and the memorized distances. However, in the circuit configuration shown in FIG. 68, the comparator CMP compares the inputted distances with the memorized distances That is, the distance ad' memorized in register FF1 is supplied to input terminal B of the comparator CMP, and the inputted distance af' is supplied to input terminal A of the comparator CMP. The comparator CMP is a circuit for calculating a difference by subtracting a value inputted to input terminal B from a value inputted to input terminal A. The comparator CMP outputs 1 when the difference is positive and 0 otherwise.

Since the comparator CMP outputs 1 when the distance ad' memorized in register FF1 is greater than the inputted distance af', 1 is supplied to selection control terminals S of selectors MUX1 through MUX4, which then select and output the inputs to their input terminals 1. Thus, selector MUX1 selects and outputs to register FF1 the inputted distance af, selector MUX2 selects and outputs to register FF2 the inputted class number ag', selector MUX3 selects and outputs to register FF3 the output from register FF1, and selector MUX4 selects and outputs to register FF4 the output from register FF2. After the inputted distance af and the inputted class number ag' are supplied, registers FF1 through FF4 receive the data selected by the above actions at the next clock pulse.

When the comparator CMP outputs 0, 1 i.e. when the distance ad' memorized in register FF1 is not greater than the inputted distance af, 0 is supplied to selection control terminals S of selectors MUX1 through MUX4, which then select and output the inputs to their input terminals 1. Thus, selector MUX1 selects and outputs back to register FF1 the value outputted from register FF1, selector MUX2 selects and outputs back to register FF2 the value outputted from register FF2, selector MUX3 selects and outputs to register FF3 the inputted distance af, and selector MUX4 selects and outputs to register FF4 the inputted class number ag'. That is, since register FF1 and FF2 respectively re-store their originally memorized values upon receiving the clock pulse from the system clock CLK, their data do not change, whereas registers FF3 and FF4 memorize and output the inputted distance af and the inputted class number ag' respectively as af and ag to the class selection cells in the following stage.

The class selection cells shown in FIG. 68 are serially connected in multiple stages (five (5) stages in the example illustrated in FIG. 65) and are supplied with the distances and the corresponding class numbers obtained in distance computing cells K1 through K49. Class selection cells CX11 through CX 15 are inputted with first five distances and their corresponding class numbers.

Class selection cell CX11 stores the minimum distance and the corresponding class number.

Class selection cell CX12 stores the second minimum distance and the corresponding class number.

Class selection cell CX13 stores the third minimum distance and the corresponding class number.

Class selection cell CX14 stores the fourth minimum distance and the corresponding class number.

Class selection cell CX15 stores the fifth minimum distance and the corresponding class number.

Although it is not specifically shown in the drawing, registers FF1 through FF4 initially store the maximum values (i.e. all bits are 1).

Through the earlier described actions illustrated in FIG. 65, features for the respective inputted characters are supplied, and the distance computing module 21 performs the distance computations in region units by using class dictionary 23-1. The upper rank selection and score assignment module 22 performs the selection of upper ranks in class units.

For example, the upper rank selection and score assignment module 22 is configured by five class selection cells CXn1 through CXn49, where n is an integer from 1 to 49, for selecting the five uppermost ranks in class units. One such class selection cell is shown in FIG. 68. That is, class selection cells CX11 through CX495 select the five uppermost classes with the shortest distances determined respectively for region 1 through region 49 in the upper rank selection and score assignment module 22. The results of the five classes for the respective forty-nine (49) regions obtained in the upper rank selection and score assignment module 22 are used for score assignment. Scores ranking the shorter distances are assigned to the five classes and are supplied to the comprehensive rating module 24.

Figure 69A:
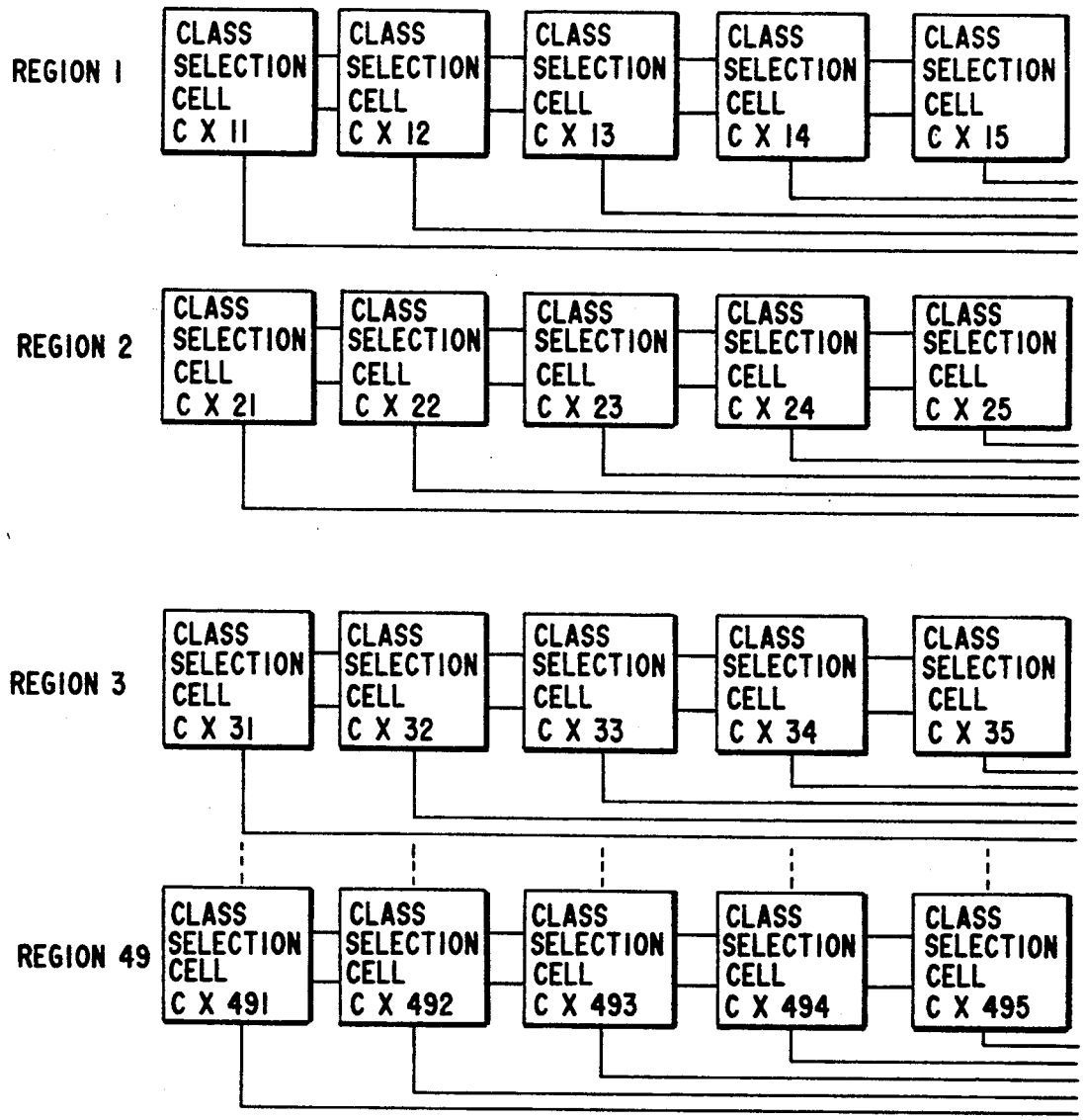
FIGS. 69a-b show the configuration of a cell structure circuit network for sorting and computing scores.
Figure 69:
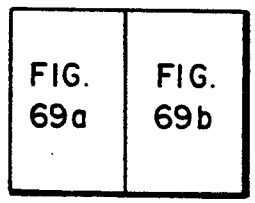
FIG. 69 illustrates that FIGS. 69a-b should be together.
Figure 69B:
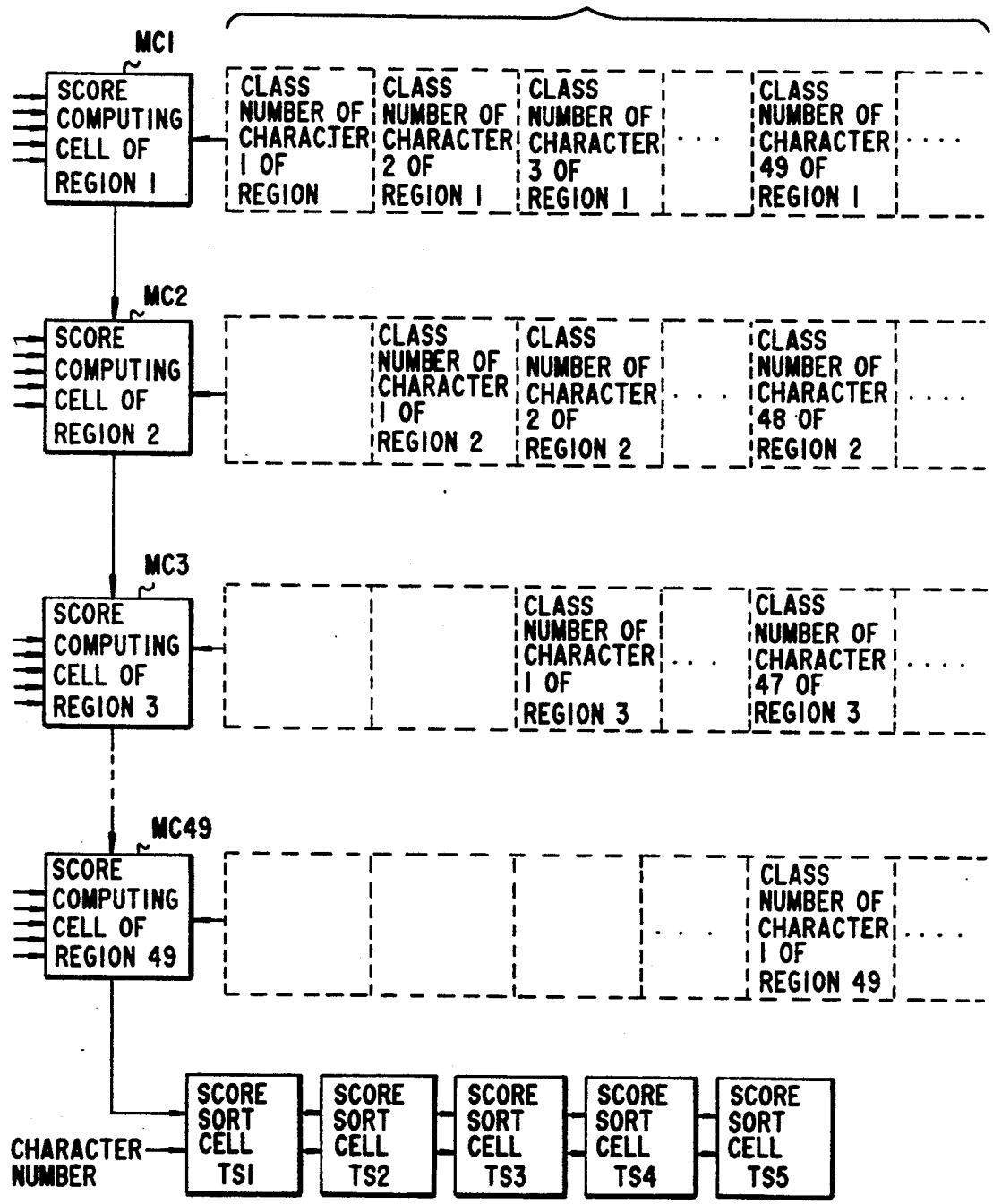

FIG. 69 shows the configuration of a cell structure circuit network for sorting and computing scores.

The comprehensive rating module 24 sorts and calculates scores. The association dictionary 23-3 stores the class numbers in character units corresponding to the class dictionary 23-1. The comprehensive rating module 24 obtains scores in character units from the class numbers.

The upper rank candidate selection module 25 selects the five uppermost ranked pairs of distances and class numbers (i.e., the five pairs having the highest scores and their corresponding character codes).

The comprehensive rating module 24 comprises score computing cells MC1 for region 1 through MC49 for region 49 and score sorting cells TS1 through TS5 shown in FIG. 69.

The class numbers in region units, e.g. for the 2965 Chinese Characters in the first JIS level, memorized in the association dictionary 23-3 in the recognition processing part 27 correspond to those memorized in the class dictionary 23-1 in the vector dictionary 26.

The score computing cells MC1 for region 1 through MC49 for region 49 are circuits for assigning scores in character units to classes to which characters belong. They assign 5 points to classes memorized in class selection cell CX11 for region 1, 4 points to classes memorized in class selection cell CX12, 3 points to classes memorized in class selection cell CX13, 2 points to classes memorized in class selection cell CX14, and 1 point to classes memorized in class selection cell CX15.

When the class number of character 1 in region 1 is supplied from the association dictionary 23-3, the score computing cell MC1 judges whether the class number of character 1 in region 1 matches the class number stored in the class selection cell CX11.

If it does, score computing cell MC1 assigns 5 points to the score of character 1.

If it doesn't, the next score computing cell MC2 judges whether the class number of character 1 in region 1 matches the class number stored in the next class selection cell CX12.

If it does, score computing cell MC2 assigns 4 points to the score of character 1.

If it doesn't, the next score computing cell MC3 judges whether the class number of character 1 in region 1 matches the class number stored in the next class selection cell CX13.

If it does, score computing cell MC3 assigns 3 points to the score of character 1.

If it doesn't, the next score computing cell MC4 judges whether the class number of character 1 in region 1 matches the class number stored in the next class selection cell CX14.

If it does, score computing cell MC4 assigns 2 points to the score of character 1.

If it doesn't, the next score computing cell MC5 judges whether the class number of character 1 in region 1 matches the class number stored in the next class selection cell CX15.

If it does, score computing cell MC5 assigns 1 point to the score of character 1.

If it doesn't, nothing is assigned to the score of character 1.

That is, when classes corresponding to characters memorized for respective characters exist, class selection cells CX11 through CX15 assign scores to the characters.

Score computing cells MC1 through MC49 act respectively for regions 1 through 49, until finally score computing cell MC49 for region 49 sequentially outputs the scores for characters 1 through 2965.

Here, since the result of calculation in score computing cell MC1 for region 1 is supplied to score computing cell MC2 for region 2, the class numbers in character units outputted from the association dictionary 23-3 in FIG. 69 are supplied and sequentially delayed by an operation cycle, i.e. one clock cycle of the system clock CLK for respective regions.

That is, the association dictionary 23-3 supplies class numbers in character units to score computing cells for respective regions delayed sequentially. As a result, character 1 is supplied to score computing cell MC1 for region 1, and character 2 is supplied to score computing cell MC2 for region 2, where the scores from the first and second score computing cells are accumulated. Other score computing cells perform similar processings until finally score computing cell MC49 for region 49 outputs the total accumulation of scores in character units.

Figure 70:
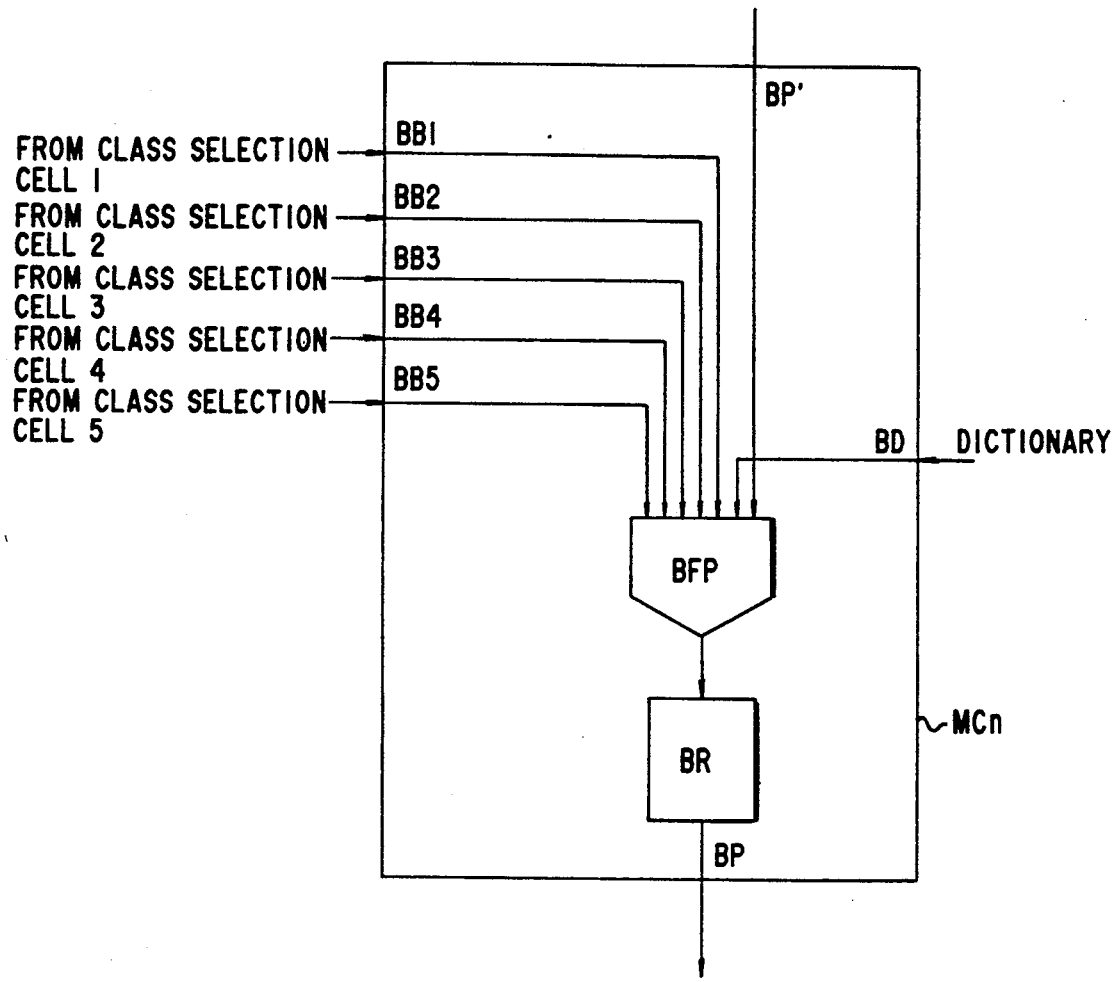
FIG. 70 shows the processing configuration of the score computing cells MC1 through MC49 illustrated in the embodiment shown in FIG. 69.

FIG. 70 shows the processing configuration of the score computing cells MC1 through MC49 illustrated in the embodiment shown in FIG. 69.

As shown in FIG. 69, class numbers for respective regions are supplied to score computing cells MCn, where n is an integer from 1 to 49. That is, five class numbers obtained in class selection cells CXn1 through CXn5 are supplied to score computing cells MCn for region n. Score computing cell MCn judges whether a class number bd for region n supplied from the association dictionary 23-1 is the same as a class number bb5 supplied from class selection cell CXn1. If it is, score computing cell MCn adds 5 to a result bp' supplied from the score computing cell in the earlier stage. If it is not, score computing cell MCn judges whether a class number bb4 supplied from class selection cell CXn4 is the same as the class number bd supplied from the association dictionary 23-3. If it is, score computing cell Mcn adds 4 to the class number bp' supplied from class selection cell CXn4. If it is not the same, score computing cell MCn judges whether the class number bb3 supplied from class selection cell CXn3 is the same as the class number bd supplied from the association dictionary 23-3. If it is, score computing cell MCn adds 3 to the class number bp' supplied from class selection cell CXn3 in the earlier stage. If it is not the same, score computing cell MCn judges whether a class number bb2 supplied from class selection cell CXn4 is the same as the class number bd supplied from the association dictionary 23-3. If it is, score computing cell MCn adds 2 to the class number bp' supplied from class selection cell CXn2 in the earlier stage. If it is not the same, score computing cell MCn judges whether a class number bb1 supplied from class selection cell CXn5 is the same as the class number bd supplied from the association dictionary 23-3. If it is, score computing cell MCn adds 1 to class number bp' supplied from class selection cell CXn4 in the earlier stage. If it is not the same, score computing cell MCn outputs "as is" the result bp' of the earlier stage as bp.

Score computing cell MCn executes a function $bf_p$ and outputs the result through a buffer $b_r$. That is, the output p from score computing cell MCn is given below.

$$f_p : bp = \text{if } bb_1 == bd \text{ then } bp' + 5$$
$$\text{else if } bb_2 == bd \text{ then } bp' + 4$$
$$\text{else if } bb_3 == bd \text{ then } bp' + 3$$
$$\text{else if } bb_4 == bd \text{ then } bp' + 2$$
$$\text{else if } bb_5 == bd \text{ then } bp' + 1$$
$$\text{else } p'$$

FIG. 70 shows a score computation expressed as a function.

Figure 71:
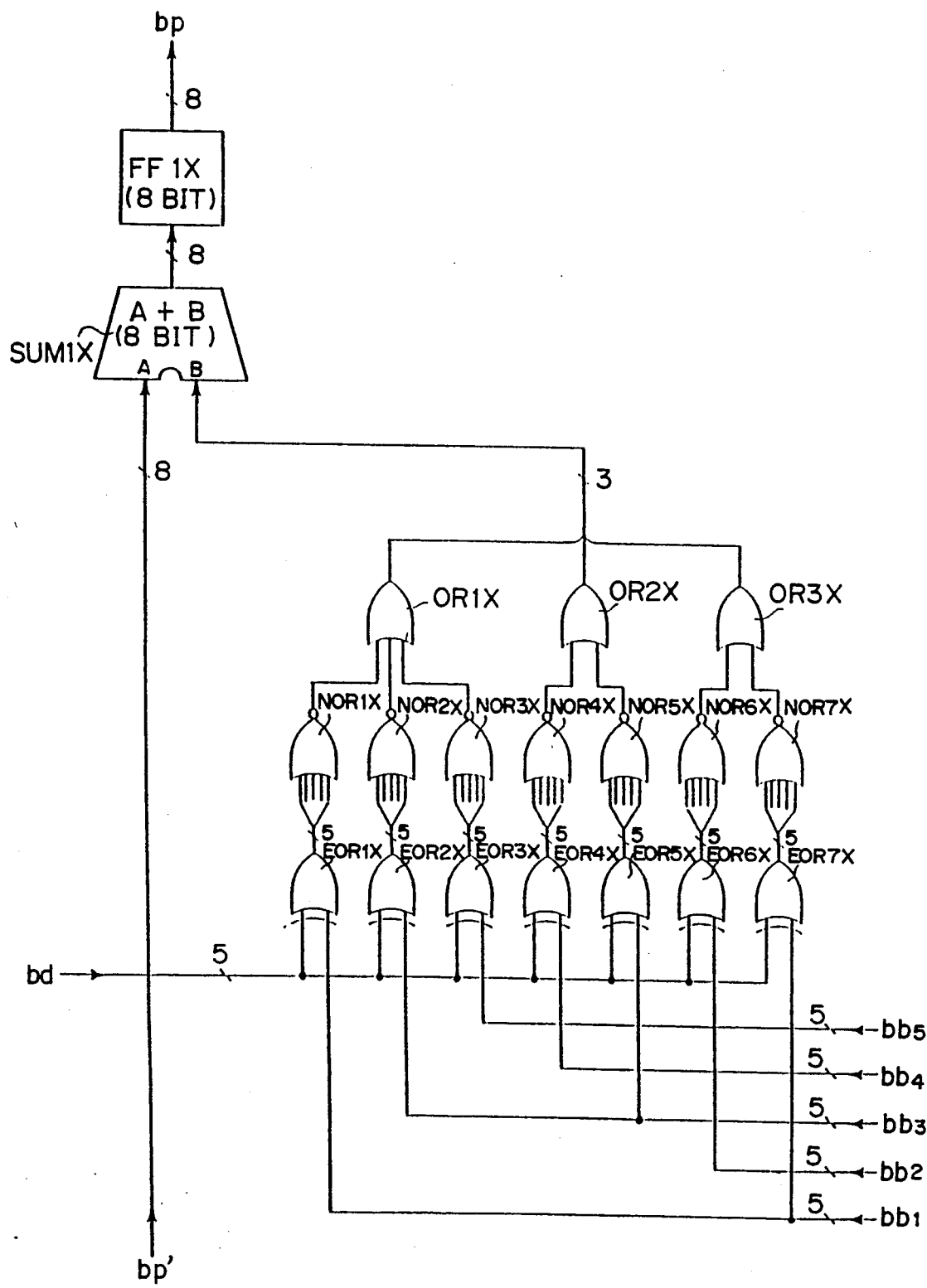
FIG. 71 shows in more detail the circuit configuration of the score computing cells MC1 through MC49.

FIG. 71 shows in more detail the circuit configuration of the score computing cells MC1 through MC49.

Respective circuits in FIG. 71 comprise logical circuits. Class numbers bb1 through bb5 supplied from class selection cells CXn1 through CXn5 (where n is an integer from 1 to 49, as described earlier) are signals which each comprise five (5) bits for expressing the twenty (20) classes employed.

Class number bd supplied from the association dictionary 23-3 are inputted commonly to seven (7) exclusive logic "OR" gates EOR1X through EOR7X respectively comprising five (5) exclusive logic "OR" gates. These are circuits for comparing, for conformance, class numbers bb1 through bb5 supplied from class selection cells CXn1 through CXn5 with the class number bd supplied from the association dictionary 23-3.

The other input terminals of exclusive logic "OR" gates EOR1X and EOR7X commonly receive class number bb1 supplied from class selection cell CXn1. The other input terminal of exclusive logic "OR" gate EOR6X receives class number bb2 supplied from class selection cell CXn2. The other input terminals of the exclusive logic "OR" gates EOR2X and EOR5X commonly receive class number bb3 supplied from class selection cell CXn3. The other input terminal of exclusive logic "OR" gates EOR4X receives class number bb4 supplied from class selection cell CXn4. The other input terminal of exclusive logic "OR" gates EOR3X receives class number bb5 supplied from class selection cell CXn5.

The 5-bit outputs from seven (7) exclusive logic "OR" gates EOR1X through EOR7X are respectively supplied to seven (7) "NOR" gates NOR1X through NOR7X. The outputs from "NOR" gates NOR1X, NOR2X and NOR3X are supplied to an "OR" gate OR1X. The outputs from "OR" gates NOR4X and NOR5X are supplied to an "OR" gate OR2X. The outputs from "NOR" gates NOR6X and NOR7X are supplied to an "OR" gate OR3X.

When the class number bd supplied by the association dictionary 23-3 and, for example, the class number bb1 supplied by the class selection cell CXn1 are the same, respective 5-bit outputs from the exclusive logic "OR" gates EOR1X and EOR7X are of "L" level, and respective 5-bit outputs from "NOR" gates NOR1X and NOR7X are of "H" level.

Since other exclusive logic "OR" gates EOR2X through EOR6X have at least one bit which is different from other bits, at least one bit of "H" level is supplied to respective input terminals of "NOR" gates NOR2X through NOR6X, which therefore output "L" level. As a result, since the outputs from "NOR" gates NOR1X and NOR7X are of "H" level, the outputs from "OR" gates OR1X and OR3X are of "H" level, and the output from "OR" gate OR2X is of "L" level.

When class number bb1 supplied from class selection cell CXn1 and class number bd supplied from the association dictionary 23-3 are the same, since the outputs from "OR" gates OR1X and OR3X are of "H" level, a score of 5 is supplied to an adder SUM1X.

The outputs from exclusive logic "OR" gates EOR6X are all of "L" level. Therefore, when class number bb4 supplied from class selection cell CXn2 and class number bd supplied from the association dictionary 23-3 are the same, the output from "NOR" gate NOR6X is of "H" level and all others are of "L" level. Consequently, the 3-bit outputs from "OR" gates OR3X, OR2X and OR1X represent a score of 4.

The outputs from the exclusive "OR" gates EOR2X and EOR5X are of "L" level. Therefore, when class number bb3 supplied from class selection cell CXn3 and class number bd supplied from the association dictionary 23-3 are the same, the outputs from "NOR" gates NOR2X and NOR5X are of "H" level, a score of 3 is supplied through "OR" gates OR1X and OR2X.

The output from the exclusive logic "OR" gate EOR4X is of "L" level. Therefore, when class number bb2 supplied from class selection cell CXn2 and class number bd supplied from the association dictionary 23-3 are the same, all 5-bit inputs to "NOR" gate NOR4X are of "L" level and its output is of "H" level. Hence, a score of 2 is outputted from "OR" gates OR3X, OR2X and OR1X.

All five (5) bits outputted from the exclusive logic "OR" gate EOR3X and inputted to the "NOR" gate NOR3X are of "L" level. Therefore, when class number bb5 supplied from class selection cell CXn5 and class number bd supplied from the association dictionary 23-3 are the same, the output from "NOR" gate NOR3X is of "H" level, and a score of 1 is outputted from "OR" gates OR3X, OR2X and OR1X.

To summarize, a score of 5, 4, 3, 2, or 1 is outputted through exclusive logic "OR" gate(s) EOR1X and EOR7X; EOR6X; EOR2X and EOR5X; EOR4X; or EOR3X, when class number bb1, bb2, bb3, bb4, or bb5 supplied respectively from class selection cells CXn1, CXn2, CXn3, CXn4, or CXn5, is equal to class number bd memorized in the association dictionary 23-3.

Although the above operations assume seven exclusive logic "OR" gates EOR1X through EOR7X for outputting scores corresponding to bit units, encoders enable the use of only five (5) exclusive logic "OR" gates each for comparing five (5) bits, in lieu of "NOR" gates NOR1X through NOR7X and "OR" gates OR1X, OR2X and OR3X.

Scores corresponding to class numbers and outputted from "OR" gates OR3X, OR2X and OR1X described earlier are inputted to input terminal A of the adder SUM1X, whose input terminal B receives score bp' supplied from the earlier stage. The adder SUM1X adds the values supplied to its input terminals A and B (i.e., the 8-bit value supplied from the earlier stage and the value obtained from the earlier described comparison result).

As described earlier, the values supplied to input terminal A of the adder SUM1X are the scores generated in correspondence with the class numbers. When the scores corresponding to the class numbers are supplied from the association dictionary 23-3, the scores corresponding to the class numbers are added to be memorized by the flip-flop FF1X.

By providing score computing cells MC1 through MC49 for regions 1 through 49 through the above actions, the scores for the 2,965 Chinese characters in the JIS first level can be obtained in character units.

Explanation is continued by referring back to FIG. 69.

Through the above actions, the score computing cell MC49 for region 49 sequentially outputs the character scores memorized in the association dictionary 23-3. The result is supplied to the score sorting cell TS1.

Score sorting cells TS1 through TS5 are circuits for memorizing pairs of scores and their corresponding character codes from the pair with the highest score. They memorize the scores sequentially inputted from score computing cell MC49 for region 49, for example, when they are greater than the score memorized in the score sorting cell TS1, and outputs them "as is" otherwise.

Class selection cells CXn1 through CXn5 shown in FIG. 65 sort pairs of distances and corresponding character codes from the one with the shortest distance, whereas score sorting cells TS1 through TS5 shown in FIG. 69 sort pairs of scores and corresponding character codes from the pair with highest score.

Figure 72:
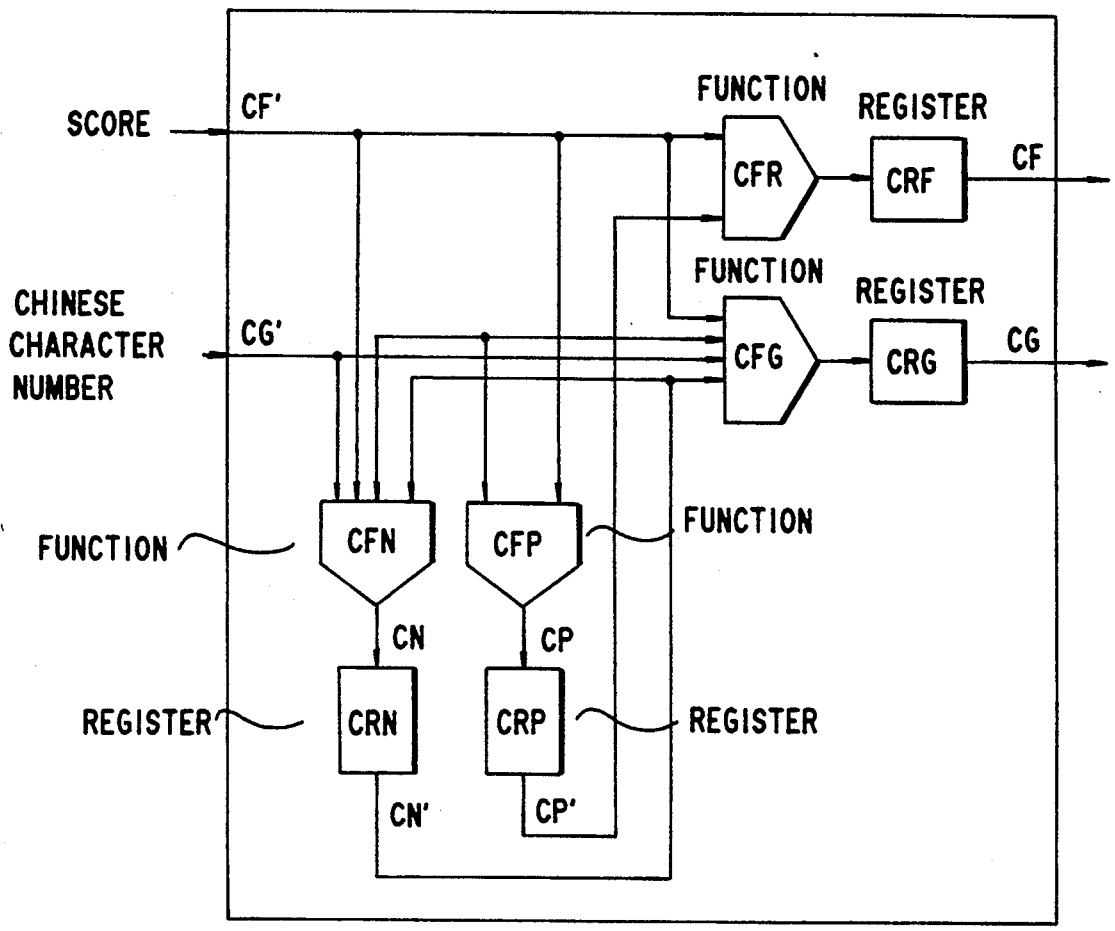
FIG. 72 shows the processing configuration of score sorting cells TS1 through TS5 illustrated in the embodiment shown in FIG. 69.

FIG. 72 shows the processing configuration of score sorting cells TS1 through TS5 illustrated in the embodiment shown in FIG. 69.

When inputted scores are greater than the values memorized in score sorting cells TS1 through TS5, these cells replace their memorized values with the inputted values and output the values memorized before the replacements "as is" to the score sorting cells in the latter stages.

Below, an inputted score, an inputted character code, a stored score, a stored character code, a score outputted to the next score sorting cell, and a character code outputted to the next score sorting cell are represented by cf', cg', cp, cn, cf, and cg.

The inputted score cf' is supplied to functions cfn, cfp, cff and cfg, whose explanations are given in FIG. 72. The inputted character code cg' is supplied to functions cfn and cfg. An output from function cfn is inputted to a register crn and an output from function cfp is inputted to a register crp.

A character code cn' outputted from register crn is supplied to functions cfn and cfg, and a score cp' outputted from register crp is supplied to functions cfn, cfp, cfg and cff.

Function cfp outputs the inputted score cf' to register crp and replaces the score cp' memorized in register crp with the inputted score cf' when the inputted score cf' is greater than the memorized score cp', and outputs the score cp' memorized in the register crp "as is" without replacing the memorized score cp' with the inputted value cf' otherwise.

As with function cfp, function cfn outputs an inputted character code cg' to register crn and replaces character code cn' memorized in register crn with inputted character code cg' when inputted score cf' is greater than memorized score cp', and outputs character code cn' memorized in register crn without replacing memorized character code cn' with inputted character code cg' otherwise. Thus, the register memorizes the character code corresponding to the highest score.

Through the operations illustrated in FIG. 72, when a score inputted from the score sorting cell in the preceding stage is greater than a score memorized in the score sorting cell in the present stage, score sorting cells TS1 through TS5 memorize the inputted score and the corresponding character code.

Further, functions cff and cfg enable score sorting cells TS1 through TS5 to output the scores and the corresponding class numbers to the score sorting cells in their subsequent stages when the inputted scores are less than the memorized scores, and to output the memorized scores and the corresponding class numbers to the score sorting cells in their subsequent cells otherwise.

Function off outputs the score cp' memorized in register crp through a register crf to the score sorting cell in the next stage as its input cf when the inputted score cf' is greater than the memorized score cp', and outputs the inputted score cf' otherwise.

As with function cff, function cfg outputs character code cn' memorized in register crn through a register crg to the score sorting cell in the next stage as its input cg when the inputted score cf' is greater than the memorized score cp', and outputs the inputted character code cg' otherwise.

Through the above actions, serially connected five-stage score sorting cells TS1 through TS5 memorize the highest scores and the character codes corresponding to them.

Figure 73:
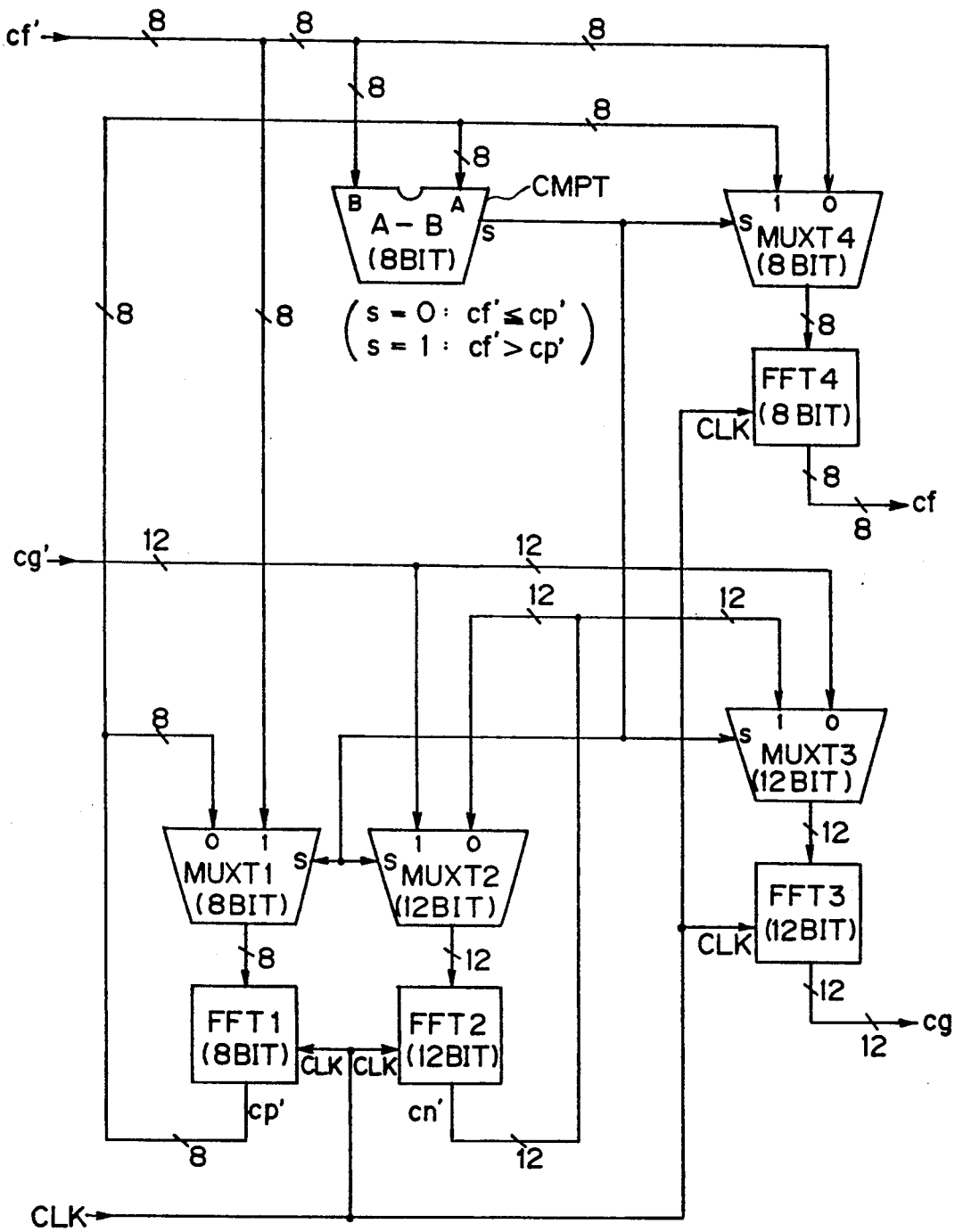
FIG. 73 shows the circuit configuration of score sorting cells TS1 through TS5 illustrated in the embodiment shown in FIG. 69.

FIG. 73 shows the circuit configuration of score sorting cells TS1 through TS5 illustrated in the embodiment shown in FIG. 69.

Whereas functions cfn, cfp, cff and cfg shown in FIG. 72 compare the inputted score cf' with the score memorized in the register crp, in the circuit configuration shown in FIG. 73, a single comparator CMPT performs such a comparison.

The inputted score cf' is supplied to input terminal B of the comparator CMPT and input terminals 0 of selectors MUXT1 and MUXT4. The inputted character code cg' is supplied to input terminals 0 of selectors MUXT2 and MUXT3. A flip-flop (register) FFT1 receives outputs from selector MUXT1. An output cp' from flip-flop FFT1 is supplied to input terminals 1 of the selectors MUXT1 and MUXT4 and input terminal A of the comparator CMPT. A flip-flop (register) FFT2 receives outputs from selector MUXT2. An output cn' from flip-flop FFT2 is supplied to input terminals 1 of selectors MUXT2 and MUXT3. A comparison output S from the comparator CMPT is supplied to the selection control terminals of selectors MUXT1 through MUXT4. A clock pulse of the system clock CLK is supplied to flip-flops FFT1 through FFT4.

On receipt of score cf' at its input terminal B, the comparator CMPT subtracts it from the score cp' supplied to its input terminal A. The comparison output S from the comparator CMPT is 0 when the result of the subtraction is not negative, and 1 when it is negative. That is, the comparison output S from the comparator CMPT is as follows.

$S=0$, when $cf' \leq cp'$ $S=1$, when $cf' > cp'$

As stated earlier, the comparison output S from the comparator CMPT is supplied to the selection control terminals of selectors MUXT1 through MUXT4. Selectors MUXT1 through MUXT4 select the values supplied to their respective input terminals 0 when the comparison output S is 0, i.e. when the inputted core cf' is not greater than the memorized score cp'. Selectors MUXT1 through MUXT4 select the values supplied to their respective input terminals 1 when the comparison output S is 1, i.e. when the inputted core cf' is greater than the memorized score cp'.

That is, when $cf' \leq cp$, i.e. when $S=0$, since selector MUXT1 selects the output cp' from the flip-flop FFT1, the output from selector MUXT1 to flip-flop FFT1 is the same as the value memorized in flip-flop FFT1.

Also, when $cf' \leq cp'$, i.e. when $S=0$, since selector MUXT2 selects the output cn' from flip-flop FFT2, the output from selector MUXT2 to flip-flop FFT2 is the same as the output from flip-flop FFT2 to selector MUXT2.

Further, when $cf' \leq cp'$ (i.e., when $S=0$), since selector MUXT3 selects the inputted character code cg', flip-flop FFT3 memorizes the inputted character code cg' and outputs the inputted character code cg' as its outputted character code cg.

In addition, when $cf' \leq cp'$ (i.e., when $S=0$), since selector MUXT4 selects the inputted score cf', flip-flop FFT4 memorizes the inputted score cf' and outputs the inputted score cf' as its outputted score cf.

Furthermore, when $cf' > cp'$ (i.e., when $S=1$), since selector MUXT1 selects the inputted score cf', flip-flop FFT1 memorizes the inputted score cf' and outputs the inputted score cf' as its outputted score cp'.

Also, when $cf' > cp'$ (i.e., when $S=1$), since selector MUXT2 selects the inputted character code cg', flip-flop FFT2 memorizes the inputted character code cg' and outputs the inputted character code cg' as its outputted character code cn'.

Further, when $cf' > cp'$ (i.e., when $S=1$), since selector MUXT3 selects the output cn' from flip-flop FFT2, the output from selector MUXT3 to flip-flop FFT3 is the same as the output from flip-flop FFT2 to selector MUXT3.

In addition, when $cf' > cp'$ (i.e., when $S=1$), since selector MUXT4 selects the output cp' from flip-flop FFT1, the output from selector MUXT4 to flip-flop FFT4 is the same as the output from the flip-flop FFT1 to selector MUXT4.

The above operations for memorizing the higher score and its corresponding class number in the present stage and transmitting the lower score and its corresponding class number to the next stage through score comparisons are performed in a single clock cycle of the clock pulse of the system clock CLK and enable the five serially connected score sorting cells TS1 through TS5 to sort five scores and their corresponding character codes from the highest score.

In the earlier described embodiment of this invention illustrated in FIG. 69, which shows the configuration of a cell structure network for score computation, score computing cells MC1 through MC49 for regions 1 through 49 sequentially select five (5) class numbers for the respective forty-nine (49) regions.

Figures 74, 74A:
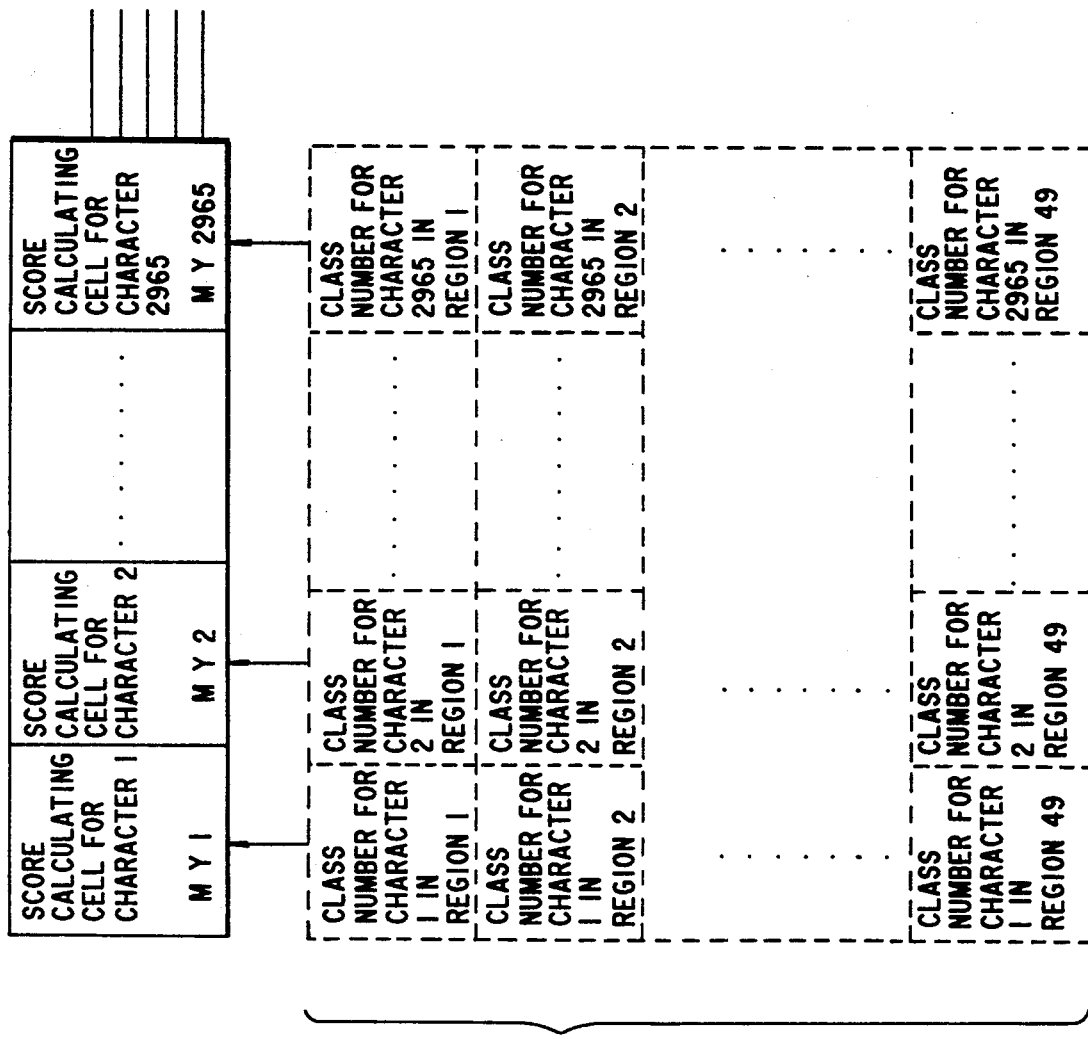
FIG. 74 illustrates that FIGS. 74a–b should be together.
FIGS. 74a–b show a configuration of another cell structure circuit network for score computation.
Figure 74B:
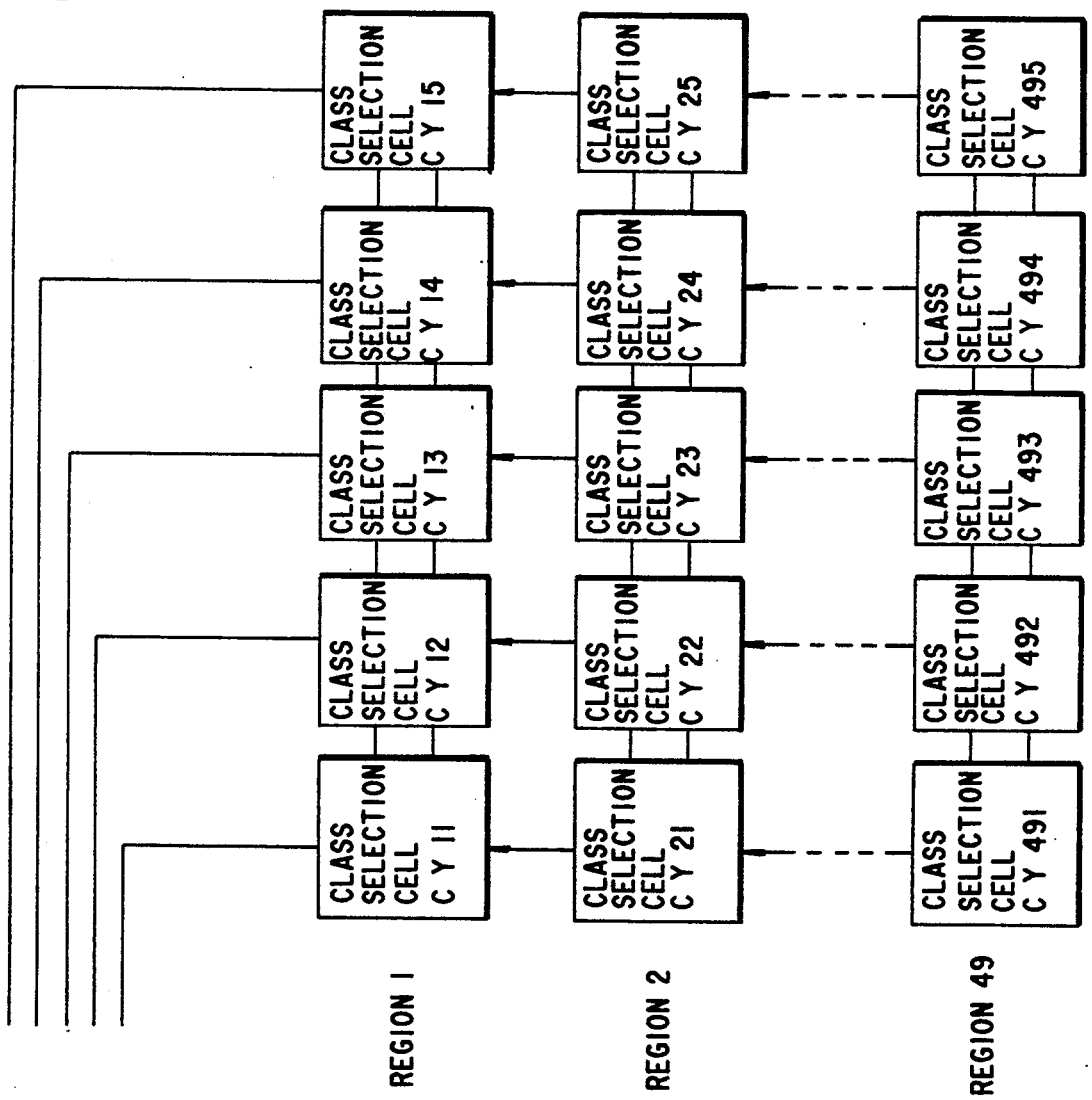

FIG. 74 shows a configuration of another cell structure circuit network for score computation.

The dictionaries 23', comprising the class dictionary 23-1, the candidate dictionary 23-2 and the association dictionary 23-3 provided in the recognition processing part 27 shown in FIG. 27, memorize the class numbers for characters in respective regions. Score computation cells MY1 through MY2965 for the respective 2965 Chinese characters in the JIS first level receive the class numbers to which the character belong, in regions 1 through 49.

Class selection cells CYn1 through CYn5 for region n, where n is an integer from 1 to 49, commonly supply the first through fifth class numbers to score computing cells MY1 for character 1 through MY2965 for character 2965. These cells compare the class numbers supplied from the class selection cells CYn1 through CYn5 with the class numbers supplied from the dictionaries 23' for respective characters. Class selection cells CYn1 through CYn5 are configured by shift registers for respective regions 1 through 49, so that they shift the results for region n to those for region n+1, after the results for region n are outputted.

When the class number supplied from class selection cell CYn1 matches the class number supplied from the dictionaries 23', five (5) points are given. When the class number supplied from class selection cell CYn2 matches the class number supplied from the dictionaries 23', four (4) points are given. When the class number supplied from class selection cell CYn3 matches the class number supplied from the dictionaries 23', three (3) points are given. When the class number supplied from class selection cell CYn4 matches the class number supplied from the dictionaries 23', two (2) points are given. When the class number supplied from class selection cell CYn5 matches the class number supplied from the dictionaries 23', one (1) point is given. These procedures are performed sequentially for the n values, which are 1 through 49. Finally, scores for the characters belonging to the classes for regions 1 through 49 are added.

The dictionaries 23' obtain class numbers for respective characters 1 through 2965 in regions 1 through 49. Score computing cell MY1 for character 1 through score computing cell MY2965 for character 2965 perform addition when they belong to the corresponding class numbers.

Figure 76:
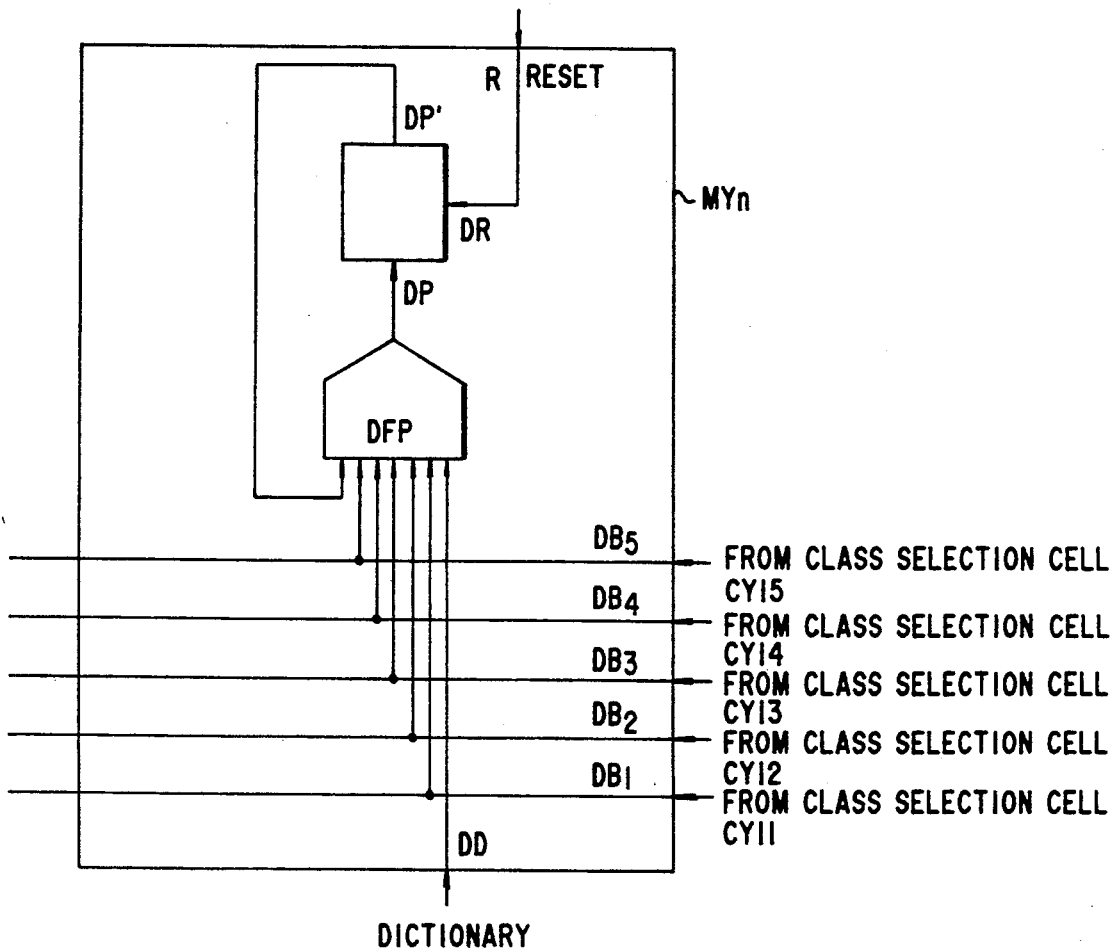
FIG. 76 shows the processing configuration of score computing cells MY1 through MY2965 earlier described in the embodiment illustrated in FIG. 74.

FIG. 76 shows the processing configuration of score computing cells MY1 through MY2965 earlier described in the embodiment illustrated in FIG. 74.

Class numbers db1 through db5 are supplied from class selection cells CY11 through CY15 for region 1 to a function $df_p$, which sets an output dp for the six inputs as follows.

$df_p$: dp = if $db_1$ == dd then dp' + 5
      else if $db_2$ == dd then dp' + 4
      else if $db_3$ == dd then dp' + 3
      else if $db_4$ == dd then dp' + 2
      else if $db_5$ == dd then dp' + 1
      else dp'

Here, dp' is an output from a register dr. That is, when class number dd supplied from the dictionaries 23' and class number $db_1$ supplied from class selection cell CY11 are the same, 5 is added to the output dp', an output from the register dr. When class number dd supplied from the dictionaries 23' and class number $db_2$ supplied from class selection cell CY12 are the same, 4 is added to the output dp' from register dr. When class number dd supplied from the dictionaries 23' and class number $db_3$ supplied from class selection cell CY13 are the same, 3 is added to the output dp' from register dr. When class number dd supplied from the dictionaries 23' and class number $db_4$ supplied from class selection cell CY12 are the same, 2 is added to the output dp' from register dr. When class number dd supplied from the dictionaries 23' and class number $db_5$ supplied from class selection cell CY15 are the same, 1 is added to the output dp' from register dr. When class number dd supplied from the dictionaries 23' is not the same as any of the class numbers $db_1$ to $db_5$ supplied from class selection cells CY11 through CY15, nothing is added to the output dp' from register dr.

Output dp from function $df_p$ is supplied to register dr. After being reset initially to 0, the score for region 1 is added to the value dp' stored in register dr and the result is latched. Then class selection cells CY11 through CY495 shift in five (5) classes and sequentially add the scores described earlier Class selection cells CYn1 through CYn5 for region n, where n is an integer from 1 to 49, determine the scores for the respective characters in a total of 49 operations.

Figure 77:
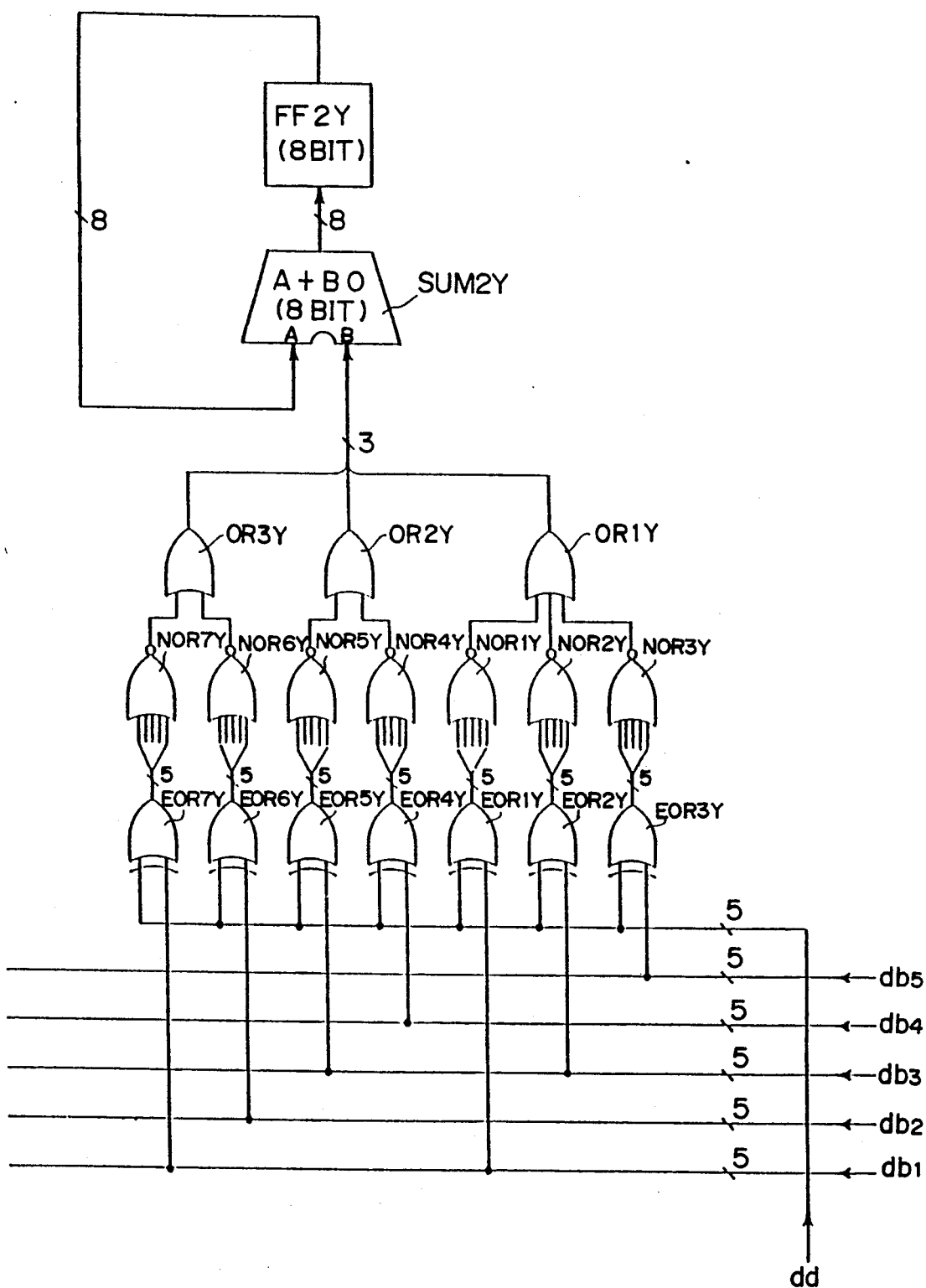
FIG. 77 shows the circuit configuration of score computing cells MY1 through MY 2965 illustrated in FIG. 74.

FIG. 77 shows the circuit configuration of score computing cells MY1 through MY 2965 illustrated in FIG. 74. Exclusive logic "OR" gates EOR1Y through EOR7Y; "NOR" gates NOR1Y through NOR7Y; and "OR" gates OR1Y, OR2Y and OR3Y; are configured similarly as the respective gates shown in FIG. 71.

These gates compare the inputted class number dd with class numbers $db_1$ through $db_5$ from each class selection cell and output the value corresponding to the class number when the two class numbers match. That is, when the inputted class number dd matches the class number $db_1$ supplied from the closest class, 5 is outputted as a 3-bit signal to input terminal B of an adder SUM2Y. When the inputted class number dd matches the class number db2 supplied from the second closest class, 4 is outputted as a 3-bit signal to input terminal B of the adder SUM2Y. When the inputted class number dd matches the class number db3 supplied from the third closest class, 3 is outputted as a 3-bit signal to input terminal B of the adder SUM2Y. When the inputted class number dd matches the class number db4 supplied from the fourth closest class, 2 is outputted as a 3-bit signal to input terminal B of the adder SUM2Y. When the inputted class number dd matches the class number db5 supplied from the fifth closest class, 1 is outputted as a 3-bit signal to input terminal B of the adder SUM2Y.

In the configuration of score computing cells MC1 through MC49 shown in FIG. 71, scores are sequentially added to those supplied from the score computing cell in the preceding stage.

In the embodiment shown in FIG. 77, since operations are performed for respective characters, outputs from a flip-flop FF2Y are supplied to input terminal A of adder SUM2Y.

In other words, the class number dd of each character for each region supplied from the dictionaries 23 is compared with class numbers db1 through db5 supplied from respective class selection cells for respective regions, and the corresponding values (weights) are accumulated for respective characters when the compared class numbers are matched.

In the embodiment shown in FIG. 74, score computing cells MY1 through MY 2965 output the scores by accumulating the scores outputted from regions 1 through 49.

Through the earlier described actions, the scores are accumulated either for respective regions or for respective characters.

If accumulations are performed for respective characters, since class numbers db1 through db5 supplied respectively for regions 1 through 49 are compared with the class number dd for regions 1 through 49 supplied from the dictionaries 23 and the corresponding scores are accumulated only when they are matched, the number of operations is only forty-nine (49) and the processing is thus sped up.

Figures 78, 78A:
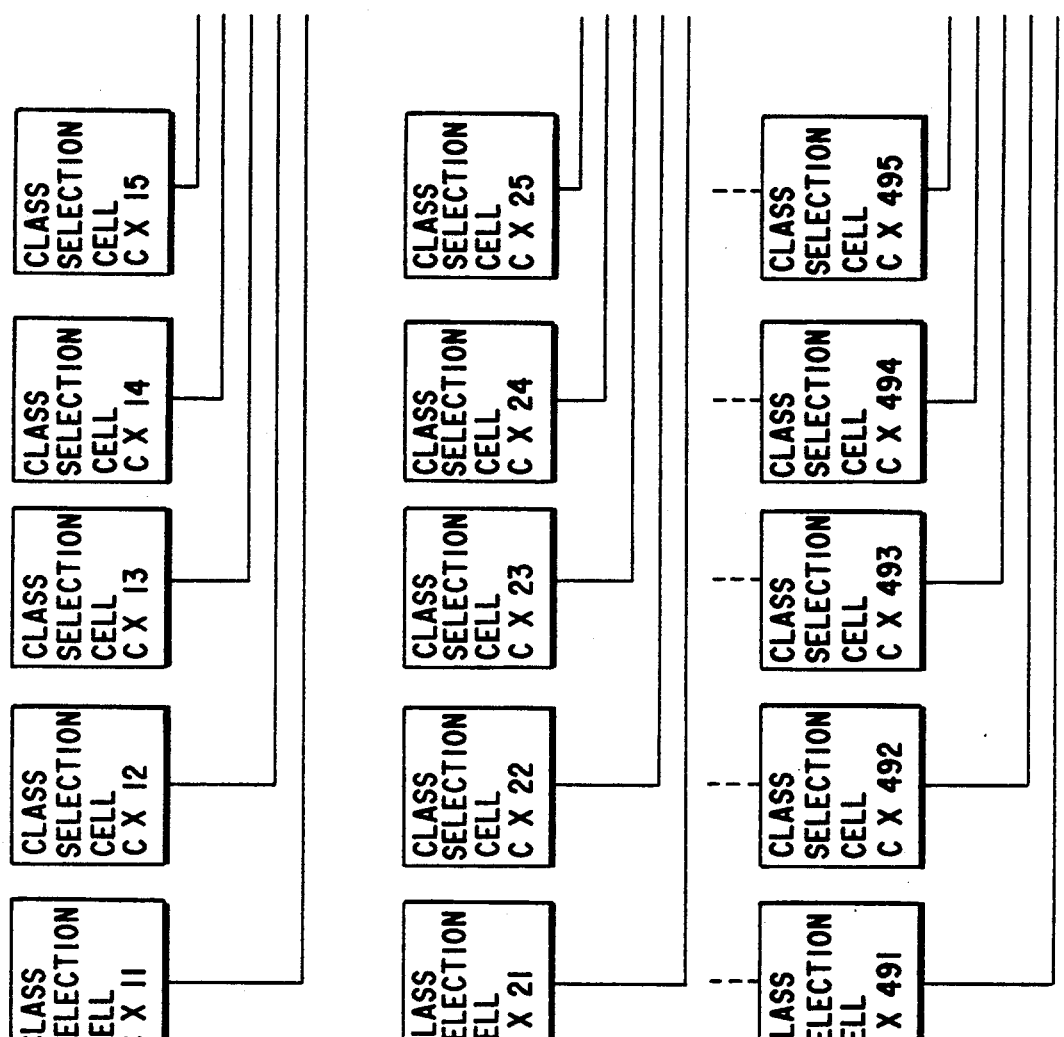
FIG. 78 illustrates that FIGS. 78a–b should be together.
FIGS. 78a–b–c shows the configuration of another cell structure circuit network for computing and sorting scores.
Figure 78B:
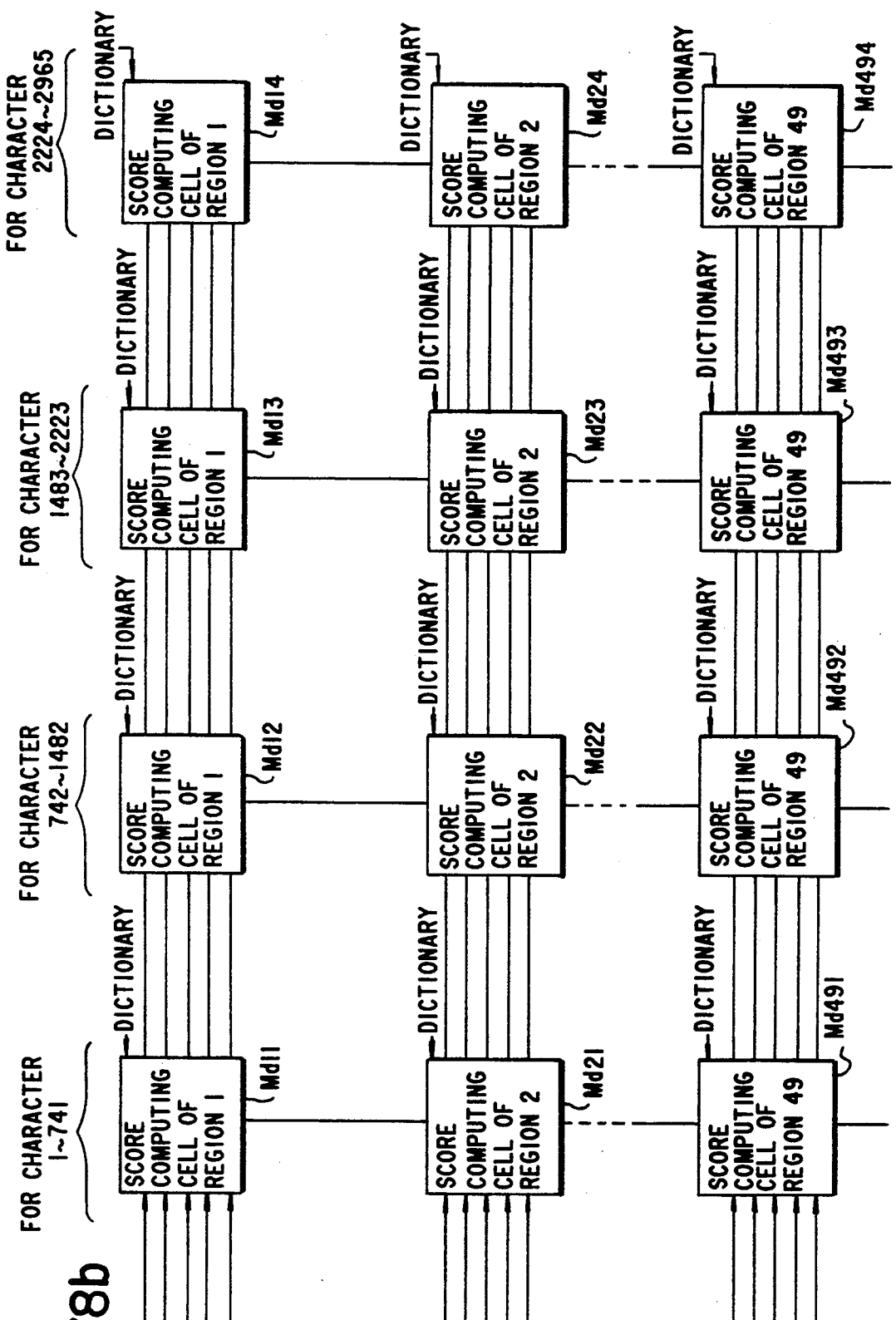
Figure 78C:
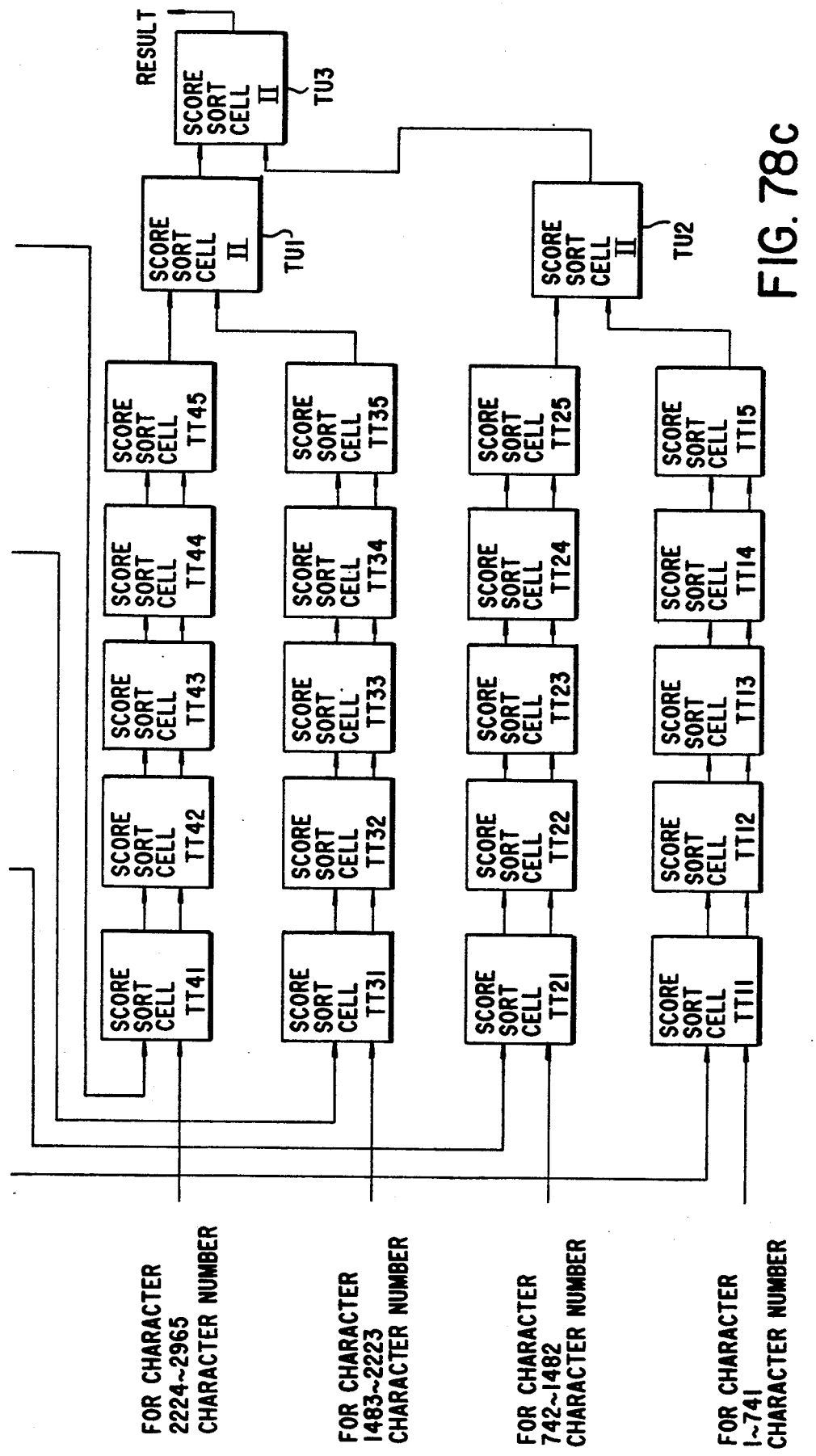

FIG. 78 shows the configuration of another cell structure circuit network for computing and sorting scores.

In the embodiment of the cell structure circuit network for computing and sorting scores illustrated in FIG. 69, to recognize a number of characters, e.g. 2965 Chinese characters in the JIS first level, that number of operations must be performed for each of regions 1 through 49. Thus, 49*2965 operations must be performed.

However, in the embodiment of the cell structure circuit network for computing and sorting scores illustrated in FIG. 74, although only forty-nine (49) operations need to be performed, 2965 score computing cells need to be provided. This number of cells is considered too high.

In the configuration of yet another cell structure circuit network for computing and sorting scores illustrated in FIG. 78, four (4) score computing cells Mdn1 through Mdn4 for region n (where n is an integer between 1 and 49) are provided by arbitrarily dividing the number of characters to be recognized into groups (e.g., characters 1 through 741, characters 742 through 1482, characters 1483 through 2223, and characters 2224 through 2965), and scores are separately accumulated.

The outputs from score computing cells Mdn1 through Mdn4 for region n are supplied to score computing cells Md(n+1)1 through Md(n+1)4 for region (n+1), except that the outputs from score computing cells Md491 through Md494 for region 49 are supplied to score sorting cells TT11, TT21, TT31 and TT41. Thus, forty-nine (49) operations are performed for the four (4) character groups.

In other words, the configuration illustrated in FIG. 78 is essentially the same as dividing the configuration of the circuit network and the association dictionary 23-3 illustrated in FIG. 69 into four (4) groups for parallel processing.

In the present embodiment illustrated in FIG. 78, since the scores for as many as four characters are outputted simultaneously, those characters outputted from score computing cells Md49m through Md49mm for region 49 (where m is an integer from 1 to 4) are sorted by inputting scores to score sorting cell TTm1 in the input stage of serially connected score sorting cells TTm1 through TTm5.

That is, four groups of five-stage serially connected score sorting cells TT11 through TT45 receive and sequentially sort four groups of five scores for the respective four character groups.

In the embodiment of this invention illustrated in FIG. 78, since five (5) characters must be selected in the end from the dictionaries 23 as candidates for the inputted character to be recognized, a score resorting cell TU1 compares the scores in the first character group with the scores in the second character group and selects the group whose characters have the higher scores. Score resorting cell TU2 compares the scores in the third character group with the scores in the fourth character group and selects the group whose characters have the higher scores. Score resorting cell TU3 receives the results of selections at score resorting cells TU1 and TU2, so that finally the five characters with the highest scores are outputted as candidates for the inputted character to be recognized.

Score sorting cells TT11 through TT45 receive and sequentially sort the character codes corresponding to the received scores. Score resorting cells TU1 and TU2 compare the scores outputted from score sorting cells TT11 through TT45 and output the character codes with the higher scores to score resorting cell TU3 in the next stage.

Through the above actions, the respective score computations for regions 1 through 49 are parallelly performed for the four (4) character groups, so that the whole processing is expedited.

When the scores outputted from score sorting cells CYn1 through CYn5 (where n is an integer from 1 to 49) or the scores outputted from score resorting cells TU1, TU2 and TU3 in the cell structure networks illustrated in FIGS. 74 and 78 are sorted, the results are obtained by matching characters with the character with the highest score.

FIG. 79 shows the hierarchical configuration of score resorting cells TU1, TU2 and TU3, score sorting cells TT11 through TT45, and score computing cells MY1 for character 1 through MY2965 for character 2965.

Figure 80:
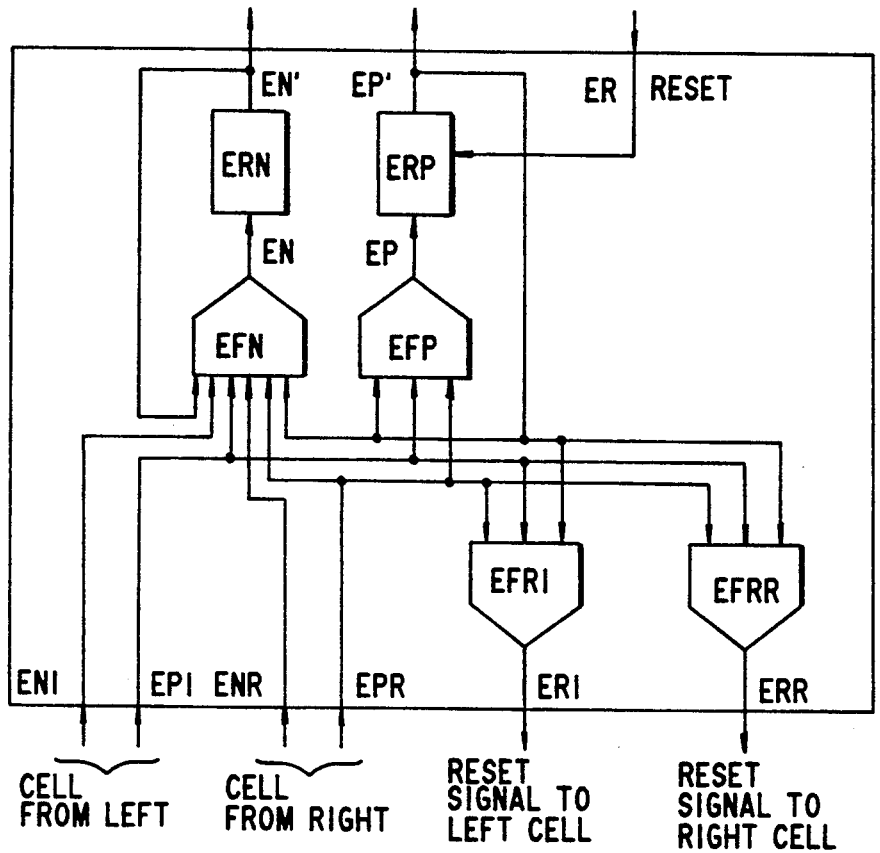
FIG. 80 shows the processing configuration of score resorting cells.

FIG. 80 shows the processing configuration of the score resorting cells TU1, TU2 and TU3 for selecting by the scores the candidate characters outputted from the score sorting cells TT11 through TT45, which select by the scores the candidate characters outputted from the score computing cells MY1 through MY2965.

Score resorting cells TU1, TU2 and TU3 and score sorting cells TT11 through TT45 receive candidate characters from cells LL and RL in the immediately lower hierarchy. That is, scores epl and epr inputted from cells LL and RL are fed to functions $ef_n$, $ef_p$, $ef_{rl}$ and $ef_{rr}$.

Character codes $en_l$ and $en_r$ inputted from cells LL and RL are fed to function $ef_n$. An output en from function $efn_n$ is supplied to a register ern, whose output en' is supplied to cells LH and RH in the immediately higher hierarchy, as well as to function $ef_n$. An output ep from function $ef_p$ is supplied to a register erp, whose output ep' is supplied to cells LH and RH in the immediately higher hierarchy, as well as to functions $ef_n$, $ef_p$, $ef_{rl}$ and $ef_{rr}$. An output $er_l$ from function $ef_{rl}$ becomes a reset signal for cell LL. An output $er_r$ from function $ef_{rr}$ becomes a reset signal for cell RL.

Functions $ef_n$, $ef_p$, $ef_{rl}$ and $ef_{rr}$ illustrated in FIG. 80 are expressed as follows.

$ef_n$ : ep = if ep' ≠ −1 then ep'
    else if $ep_l$ > $ep_r$ then $ep_l$
    else $ep_r$ $ef_p$ : en = if ep' ≠ −1 then en'
    else if $ep_l$ > $ep_r$ then $en_l$
    else $en_r$ $ef_{rl}$ : erl = if ep' ≠ −1 then 0
    else if $ep_l$ > $ep_r$ then 1
    else 0

$ef_{rr}$ : err = if ep' ≠ −1 then 0
    else if $ep_l$ > $ep_r$ then 0
    else 1

Figure 81:
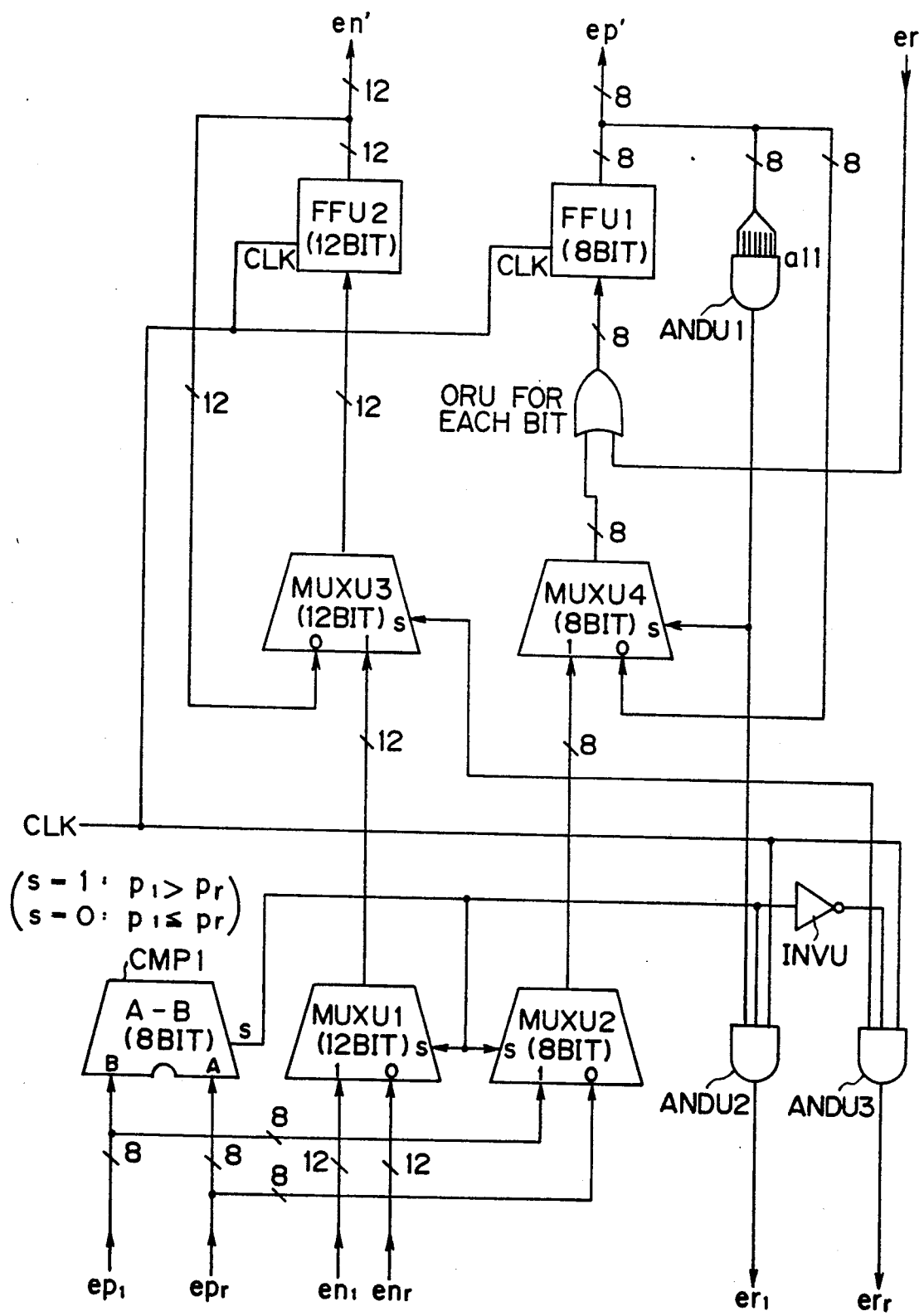
FIG. 81 shows the configuration of the circuits representing functions $ef_n$, $ef_p$, $ef_{rl}$ and $ef_{rr}$ illustrated in FIG. 80.

FIG. 81 shows the configuration of the circuits representing functions $ef_n$, $ef_p$, $ef_{rl}$ and $ef_{rr}$ illustrated in FIG. 80.

The score $ep_l$ supplied from cell LL and the score $ep_r$ supplied from cell RL are are supplied to input terminals A and B of comparator CMP1, which for comparison subtracts data supplied to its input terminal B from data supplied to its input terminal A and outputs an output signal S of 1 when the comparison result is positive and of 0 when the comparison result is not positive. The relation between the output signal S outputted from comparator CMP1 and input scores $ep_l$ and $ep_r$ are expressed as follows.

$$S = 1, \text{ when } ep_l > ep_r$$

$$S = 0, \text{ when } ep_l \leq ep_r$$

The output signal S is inputted to selectors MUXU1 and MUX2, which select the signals supplied to their input terminals 1 upon receiving the signal S of 1 at their selection control terminals and the signals supplied to their input terminals 0 upon receiving the output signal S of 0 at their selection control terminals.

The outputs from selectors MUXU1 and MUX2 are inputted respectively to selectors MUXU3 and MUXU4.

When S = 1 (i.e., when $ep_l > ep_r$), selectors MUXU1 and MUXU2 select the character code enl and the score $ep_l$. That is, comparator CMP1 and selector MUXU2 select the score outputted from cell LL. This score is larger than that outputted from cell RL. Selector MUXU2 outputs the selected score to selector MUXU3. Selector MUXU1 selects the character code corresponding to the selected score outputted from cell LL and outputs the selected character code to selector MUXU4.

Since the complement notation of 2 is used in the embodiment shown in FIG. 81, a flip-flop FFU1 memorizes −1 as the score ep' when it is initially reset. Since the eight (8) bits outputted from flip-flop FFU1 and inputted to an "AND" gate ANDU1 are all 1 at this time, "AND" gate ANDU1 outputs 1 to selectors MUXU3 and MUXU4, which select the signals received at their input terminals 1.

When the higher score code selected by selector MUXU2 is supplied through selector MUXU4 to flip-flop FFU1, the character code selected by selector MUXU1 is supplied through selector MUXU3 to a flip-flop FFU2.

When flip-flop FFU1 does not memorize −1 as the score ep', since "AND" gate ANDU1 outputs 0, selectors MUXU3 and MUXU4 select the signals received at their input terminals 0. Since the outputs from flip-flops FFU1 and FFU2 are supplied to input terminals 0 of selectors MUXU4 and MUXU3, when "AND" gate AND1 outputs 0, selector MUXU4 selects the output from flip-flop FFU1 and selector MUXU3 selects the output from flip-flop FFU2. The output from selector MUXU3 is inputted to flip-flop FFU2 and the output from selector MUXU4 is inputted to flip-flop FFU1 through an "OR" gate for outputting "OR" logical sums for the respective bits, which receive a reset signal er at one of their input terminals.

When "AND" gate ANDU1 outputs 1 (i.e., when flip-flop FFU1 stores −1), selector MUXU4 selects the selection result outputted from selector MUXU2 and flip-flop FFU1 stores the selection result. Since flip-flops FFU1 and FFU2 store the score and the character code of the cells in the immediately lower hierarchy, the flip-flops of the cells in the immediately lower hierarchy must be reset. To reset them, "AND" gate ANDU1 supplies its output to "AND" gates ANDU2 and ANDU3, and the output signal S from comparator CMP1 are supplied to "AND" gate ANDU3 through an inverter INVU and also to "AND" gate ANDU2. "AND" gates ANDU2 and ANDU3 receive a clock pulse of the system clock CLK and, when "AND" gate ANDU1 outputs 1, one of the signals erl or $er_r$ for resetting the flip-flops in the cells of the immediately preceding hierarchy is 1.

That is, the score memorized in flip-flop FFU1 is supplied to a score sorting (or resorting) cell in the subsequent hierarchy, the sorting cell. When the score sorting (or resorting) cell is selected and the score is memorized, the "R" from a cell in the immediately following hierarchy is transmitted through the "OR" gate and flip-flop FFU1 stores −1. In other words, when the score sorting (or resorting) cell in the following hierarchy receives scores of the score sorting (or resorting) cells in the present hierarchy, the flip-flops in the preceding hierarchy are reset. Flip-flop FFU1 also receives a clock pulse from the system clock CLK, which governs the entire system.

Score computing cells MC1 through MC49 illustrated in FIG. 71 are explained when there are eight (8) inputs. When the inputs are 1, 3, 2, 9, 5, 8, 7 and 6 at the initial clock pulse of the system clock CLK, the cells with the higher scores 3, 9, 8 and 7 of the respective four pairs of the above inputs are selected at the next clock pulse. Concurrently, the registers in the preceding stage corresponding to the received cells with the scores 3, 9, 8 ,and 7 are cleared. That is, the register values of the preceding stage become 1, −1, 2, −1, 5, −1, −1 and 6. Further at the next clock pulse of the system clock CLK, 3 and 8 are respectively compared with 9 and 7, and the score computing cells in the following stage receive 9 and 8.

Therefore, at the third clock pulse the computing cells in the first stage do not change their values, those in the second stage have values 3, −1, −1 and 7, and those in the third stage have values 9 and 8.

Since the cells outputting 9 and 8 are reset, they have the value of −1, and receive 2 and 5 at the fourth clock pulse. Thus, the values of the first stage become 1, −1, −1, −1, −1, −1, −1 and 6; those of the second stage become 3, 2, 5 and 7; and those of the third stage become −1 and 8; and that of the fourth stage becomes 9.

Then, the value 9 is received, and 3 in the second stage is compared at the third stage with 2 in the second stage. Thus, the third stage receives 3, and the value of the second stage becomes −1. Similarly, the fourth stage adopts a value of −1 by receiving 9 at the fifth clock pulse.

Further, 8 is received at the sixth clock pulse. Similarly the value −1 in the second stage changes and the second stage stores 1 in the first stage.

In addition, at the seventh clock pulse, by receiving 8, the fourth stage memorizes 8 and becomes −1. Simultaneously, −1 in the third stage is changed to 7.

Finally, at the eighth clock pulse, by receiving 7 in the second stage, the third stage becomes 7. Contemporaneously, the second stage is reset to −1, since its 7 is already received. The fourth stage selects and receives 7 at the next clock pulse. Concurrently, 7 in the third stage is set to −1. Similarly, −1 in the second stage receives 6.

As explained above, the rank of score computing cells MC1 through MC49 from the highest scores can be obtained. These scores are used to select candidate characters for sorting. Contemporaneous with the receipt of scores described earlier, the corresponding character codes are received, so that finally, the character codes are sequentially outputted from the ones with the highest scores.

The invention described so far enables scores for respective characters, character groups or regions to be obtained. Since the character codes with the highest scores are outputted, the candidate characters are sequentially obtained. The processings are performed in parallel and further expedited in pipeline processes.

The score computing and upper rank selection circuits described earlier enable a plurality of upper rank candidate characters to be obtained by their character codes.

To summarize the discussed systems, there are a plurality of configurations as follows.

(a) Character scores for respective regions are sequentially obtained, and the scores and corresponding character codes are sorted. (Refer to FIG. 69.)

(b) By parallel processings according to the system described in (a), the result of the respective parallel processings are sorted. (Refer to FIG. 78.)

(c) Score computing cells for respective characters are provided and score calculations for respective regions are sequentially performed. (Refer to FIGS. 74 and 79.)

(d) By parallel processings according to the system described in (c), the result of respective parallel processings are sorted. (Not specifically shown in the attached drawings.)

In the above methods, respective processing time periods, (i.e., clock numbers for obtaining sorting results) are different. The numbers of score computing cells and score sorting cells are different, too. The following describes the number of respective types of cells and their processing time periods according to these four methods. The following assumes the number of character codes to be KV, the number of upper rank selections to be CV, the number of divisions for parallel processings to be SV, and the maximum number of characters in the SV divisions to be MV. (Therefore, $KV \leq MV * SV$.)

System (a),
The number of cells = 49 + CV
Time period required = KV + 49 + CV

System (b), assuming SV divisions,
The number of cells = (49 + CV) * SV + 2SV
Time period required = MV + 49 + CV - $+ \log_2 SV$ + CV Since the SV divisions are processed parallely, CV candidates must be selected by tree sorting from among SV divisions. Hence, 2SV is the last term in the expression for the number of cells. That is, since SV inputs are provided, besides the (49 + CV) * SV sorting cells, 2SV sorting cells for tree sorting are required.

System (c),
The number of cells = KV + 2KV = 3KV
Time period required = 49 + $\log_2 KV$ 2 KV in the second term at the center of the first expression is a number needed for System (d), since parallel processings are performed for MV character codes divided into SV groups:
Number of cells = (MV + 2MV) * SV = 3MV*SV
Time period required = (49 + $\log_2 MV$) * SV + CV Here, 49 is the number of the regions, comprising four (4) 2*2-dot-regions, used for recognizing a character divided into 16*16 dots. Also, it is implicitly assumed that the processing time required by respective steps are the same, since they are all controlled by the system clock CLK. Thus, the number of such steps represents the time period required by the respective systems.

The above described systems (a) through (d) can be selected in accordance with the objectives, such as the processing time or the cost. To improve operation speeds, it is necessary to increase the number of cells performing the processes, whereas to economize the system, it is crucial to configure a simple system with a reduced number of cells.

As shown in the table of the division numbers illustrated as FIG. 75 (in which example KV=4096), by changing the SV, which is a division number, naturally MV changes inverse proportionately. At this time, by determining $\log_2 MV$, $SV * \log_2 MV$, $MV + \log_2 SV$, appropriate speeds can be selected with a desired tradeoff with the cost.

With the above configuration, score computing cells and upper rank selection circuits can be designed within desired numbers of cells by changing the numbers of parallel processings, according to the size of the system.

What is claimed is:

1. A data processing device for processing feature data for a plurality of characters being compared through an associative matching method of character recognition, comprising:

a first data memory means for memorizing at least stroke information for input character pattern supplied in dot units;

a first address generating means for generating first addresses for specifying positions at which the stroke information is memorized;

a second data memory means for memorizing weight data for the stroke information;

a second address generating means for generating second addresses for reading the stroke information memorized in said first data memory means and third addresses for reading, from the second data memory means, the weight data corresponding to the stroke information read by the second addresses;

a plurality of accumulation means provided in correspondence with a number of stroke directions, for accumulating weight data outputted from said second data memory means;

a decoding means for decoding the stroke information memorized in said first data memory means and for determining weights in respective stroke directions to enable said plurality of accumulation means according to decoding results from said decoding means so as to generate feature data of the input character patterns;

a dictionary memory for memorizing feature data of dictionary patterns, the feature data being divided into classes of features;

a plurality of distance computing means operatively connected to receive feature data of input character patterns, for computing distances between the feature data of the dictionary patterns memorized in said dictionary memory and the feature data of the input character patterns, and for sequentially inputting result values from computing the distances to a first stage of plural pairs of serially connected plural class selection means;

plural pairs of serially connected plural class selection means operatively connected to said plurality of distance computing means, for comparing the sequentially inputted result values with memorized result values of distances inputted sequentially earlier by said plurality of distance computing means so as to at least one of maintain memory of the earlier memorized result values and output the inputted result values when the earlier memorized result values are less than the inputted result values, and of output the earlier memorized result values and memorize the inputted result values;

a plurality of score computing means operatively connected to respective outputs from said plural paris of serially connected plural class selection means, for obtaining scores corresponding to the feature data of the input patterns of the characters to be recognized; and a score sorting means for determining rankings of the dictionary patterns in terms of which of the dictionary patterns derived highest scores obtained at said plurality of score computing means.

2. The data processing device according to claim 1, wherein said plurality of accumulation means are provided in m pairs for processing the stroke information in parallel in m-bit units.

3. The data processing device according to claim 1, wherein said dictionary memory memorizes feature data classified in classes of standard pattern units and codes of the patterns belonging to the classes.

4. The data processing device according to claim 1, wherein said dictionary memory memorizes feature data in classes of pattern units.

5. The data processing device according to claim 3 or 4, wherein the classes are in region units divided from pattern areas.

6. The data processing device according to claim 1, wherein said plural pairs of serially connected plural class selection means being further for selecting classes in said dictionary memory to which the characters to be recognized are associated, identification of selected classes being inputted from said plural pairs of serially connected plural class selection means to respective ones of said plurality of score computing means, and said plurality of score computing means including a class memory for memorizing classes to which the characters to be recognized belong, means for determining whether the classes inputted from said plural pairs of plural class selection means match the classes to which the characters belong, and means for accumulating weighted scores for the respective ones of said plural pairs of plural class selection means when both classes match.

7. The data processing device according to claim 1, wherein each of said plurality of score sorting means respectively incorporates a plurality of sorting cells, each of the plurality of sorting cells respectively including two input terminals, the plurality of sorting cells being connected in a tree form in a plurality of stages so as to receive in a current stage higher scores inputted into the two input terminals, reset the sorting cells in a preceding stage supplying the scores, and output higher scores to sorting cells in a following stage.

8. The data processing device according to claim 6, wherein said plurality of score computing means are provided for respective characters for sequentially accumulating scores for respective regions divided from a pattern area of a character in said dictionary memory.

9. A data processing device for processing a plurality of accumulated score data used in computing a plurality of characters for an associative matching method used in character recognition, comprising:

a first data memory means for memorizing at least stroke information for a character pattern supplied in dot units;

a first address generating means for generating first addresses for specifying positions at which the stroke information is memorized;

a second data memory means for memorizing weight data for the stroke information;

a second address generating means for generating second addresses for reading the stroke information memorized in said first data memory means and third addresses for reading, from the second data memory means, the weight data corresponding to the stroke information read by the second addresses;

a plurality of accumulation means provided in correspondence with a number of stroke directions, for accumulating weight data outputted from said second data memory means;

a decoding means for decoding the stroke information memorized in said first data memory means and for determining weights in respective stroke directions to enable said plurality of accumulation means according to decoding results from said decoding means so as to generate score data of input character patterns to be recognized;

first and second selection memory means for receiving and memorizing inputted score data such that one of said first and second selection memory means memorizes an inputted first score data while the other of said first and second selection memory means maintains memory of an earlier inputted second score data, said first and second selection memory means being operatively connected to each other so as at least one of said first and second selection memory means outputs the first score data while the other of said first and second selection memory means maintains memory of the second earlier inputted second score data, and one of the first and second selection memory means outputs the earlier received second score data while the other of said first and second selection memory means transfers memory of the first score data to the one of the first and second selection memory means, said first and second selection memory means being controlled by a received selection signal; and comparison means for comparing the earlier inputted second score data with the first score data so as to control output operation of said first and second selection memory means.

10. The data processing device according to claim 9, wherein said first and second selection memory means include a first memory means for temporarily memorizing the inputted first score data, a second memory means for memorizing the earlier inputted second score data, a first selection means operatively connected to receive the first score data temporarily memorized in the first memory means at a first input terminal and the second score data memorized by the second memory means at a second input terminal, for outputting at least one of the first and second score data according to a comparison by said comparison means, and a second selection means operatively connected to receive second data memorized in the second memory means at a first input terminal and the first score data temporarily memorized in the first memory means at a second input terminal, for outputting at least one of the first and second score data according to the comparison by said comparison means.

11. The data processing device according to claim 9, wherein said comparison means includes at least an output terminal for outputting data indicating a comparison result showing whether data inputted from the first input terminal are at least one of greater than, less than and equal to data supplied from the second input terminal.

12. A data processing device used in an associative matching method in which feature areas are divided into a plurality of classes represented by division area units and scores are assigned to the classes to which the division area units belong, so that the scores of the classes to which a plurality of codes of candidates belong are accumulated by the code units for recognition, said data processing device comprising:

a first data memory means for memorizing at least stroke information for input character pattern supplied in dot units;

a first address generating means for generating first addresses for specifying positions at which the stroke information is memorized;

a second data memory means for memorizing weight data for the stroke information;

a second address generating means for generating second addresses for reading the stroke information memorized in said first data memory means and third addresses for reading, from the second data memory means, the weight data corresponding to the stroke information read by the second addresses;

a plurality of accumulation means provided in correspondence with a number of stroke directions, for accumulating weight data outputted from said second data memory means;

a decoding means for decoding the stroke information memorized in said first data memory means and for determining weights in respective stroke directions to enable said plurality of accumulation means according to decoding results from said decoding means so as to generate feature data of the input character patterns;

a dictionary memory for memorizing feature data of dictionary patterns, the feature data being divided into classes of features, said dictionary means including a counter for specifying the plurality of codes, a plurality of latch circuits sequentially shifting memorized values, each time a value of the counter changes, and a plurality of class dictionaries, addressed by a value of the counter and values memorized in the latch circuits, for memorizing classes to which the plurality of codes belong in the division area units;

a plurality of distance computing means operatively connected to receive feature data of input character patterns, for computing distances between the feature data of the dictionary patterns memorized in said dictionary memory and the feature data of the input character patterns, and for sequentially inputting result values from computing the distances to a first stage of plural pairs of serially connected plural class selection means;

plural pairs of serially connected plural class selection means operatively connected to said plurality of distance computing means, for comparing the sequentially inputted result values with memorized result values of distances inputted sequentially earlier by said plurality of distance computing means so as to at least one of maintain memory of the earlier memorized result values and output the inputted result values when the earlier memorized result values are less than the inputted result values, and of output the earlier memorized result values and memorize the inputted result values;

a plurality of score computing means operatively connected to respective outputs from said plural paris of serially connected plural class selection means, for obtaining scores corresponding to the feature data of the input patterns of the characters to be recognized, said plurality of score computing means incorporating a plurality of score buffers operatively connected to receive class outputs from the class dictionaries at their addresses, for memorizing, as class addresses, scores corresponding to the classes in the division area units; and a score sorting means for determining rankings of the dictionary patterns in terms of which of the dictionary patterns derived highest scores obtained at said plurality of score computing means, said score computing means including a plurality of address, provided in correspondence with said score buffers, for sequentially adding the class scores outputted from the score buffers.

* * * * *